United States Patent [19]
Takahashi

[11] Patent Number: 6,055,036
[45] Date of Patent: *Apr. 25, 2000

[54] BOOK IMAGE READING APPARATUS AND BOOK IMAGE FORMING APPARATUS

[75] Inventor: Hiroshi Takahashi, Kanagawa, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/023,106

[22] Filed: Feb. 13, 1998

[30] Foreign Application Priority Data

Feb. 14, 1997 [JP] Japan ................................ 9-030613
Jul. 18, 1997 [JP] Japan ................................ 9-193533

[51] Int. Cl.⁷ ................................................ G03B 27/32
[52] U.S. Cl. ................................ 355/25; 281/42; 116/234
[58] Field of Search ................................ 281/42; 355/25, 355/82, 53; 116/234

[56] References Cited

U.S. PATENT DOCUMENTS

| | | | |
|---|---|---|---|
| 1,346,729 | 7/1920 | Vanderveer | 281/42 |
| 4,663,873 | 5/1987 | Shinbrot | 40/531 |
| 4,680,080 | 7/1987 | Instance | 156/357 |
| 4,954,849 | 9/1990 | Koike et al. | 355/319 |
| 4,975,749 | 12/1990 | Tsunoda et al. | 355/320 |
| 5,014,091 | 5/1991 | Koike et al. | 355/321 |
| 5,224,693 | 7/1993 | Taguchi et al. | 271/9 |
| 5,255,904 | 10/1993 | Taguchi et al. | 271/18.1 |
| 5,286,060 | 2/1994 | Rivera | 281/42 |
| 5,297,376 | 3/1994 | Taguchi et al. | 53/504 |
| 5,325,213 | 6/1994 | Takahashi et al. | 358/474 |
| 5,444,518 | 8/1995 | Hashiguchi et al. | 355/201 |
| 5,640,252 | 6/1997 | Turner et al. | 358/497 |
| 5,713,606 | 2/1998 | Kleinburg et al. | 281/42 |

FOREIGN PATENT DOCUMENTS

| | | |
|---|---|---|
| 44 06 080 | 9/1994 | Germany . |
| 7-110528 | 4/1995 | Japan . |
| 7-110529 | 4/1995 | Japan . |
| 7-110530 | 4/1995 | Japan . |

OTHER PUBLICATIONS

Derwent Abstracts, AN 95–191269/199525, JP 7–110528, Apr. 25, 1995.

Primary Examiner—Georgia Epps
Assistant Examiner—Tim Thompson
Attorney, Agent, or Firm—Oblon, Spivak, McClelland, Maier & Neustadt, P.C.

[57] ABSTRACT

An image reading apparatus capable of automatically reading the images of a book or similar bound document while turning over its pages, and an image forming apparatus capable of printing the images of the book in accordance with an image signal output from the image reading apparatus are disclosed. These apparatuses allow the operator to set the last page or the end page surely and easily. This frees the operator from time- and labor consuming complicated procedure for setting desired pages of a book to be copied.

34 Claims, 93 Drawing Sheets

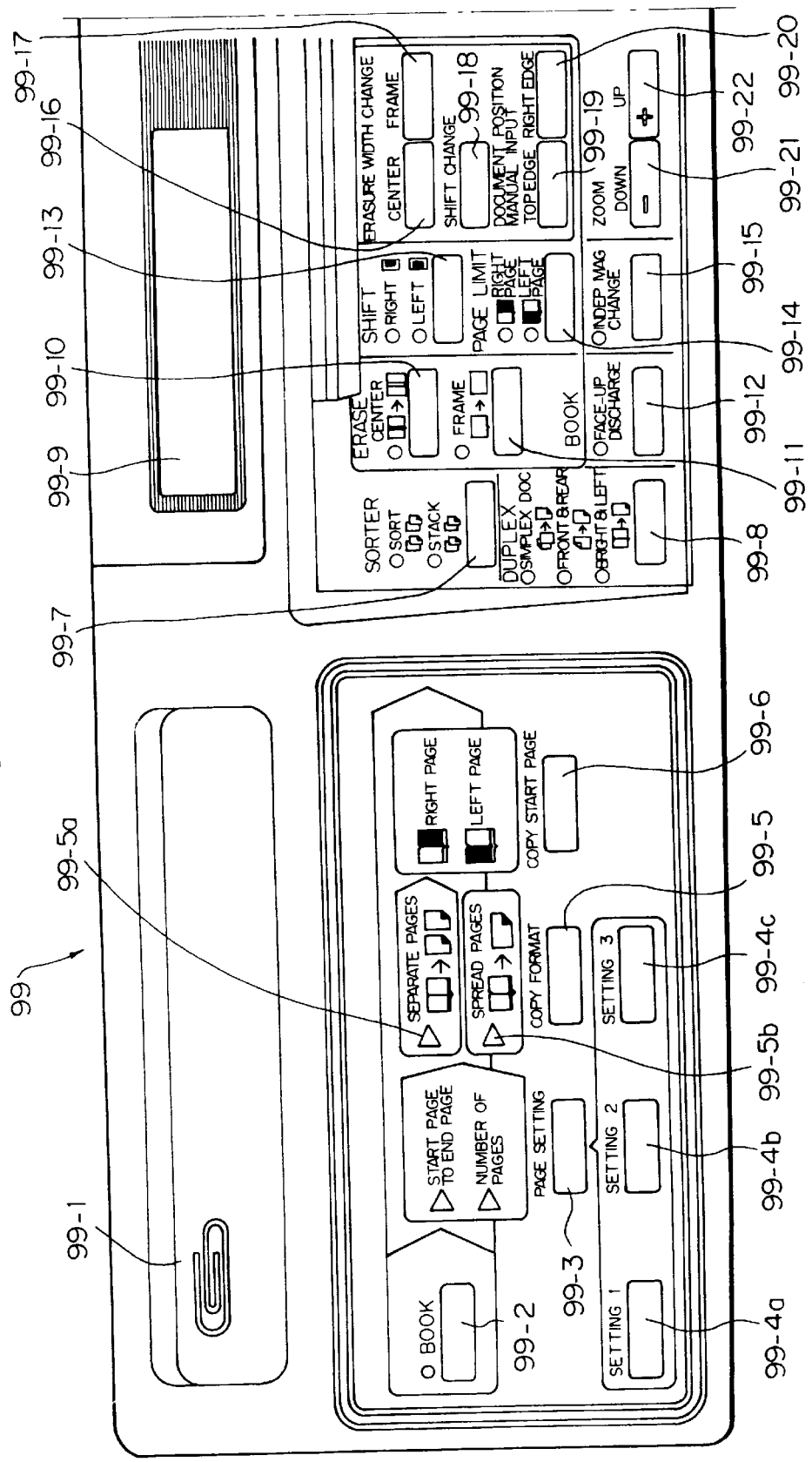

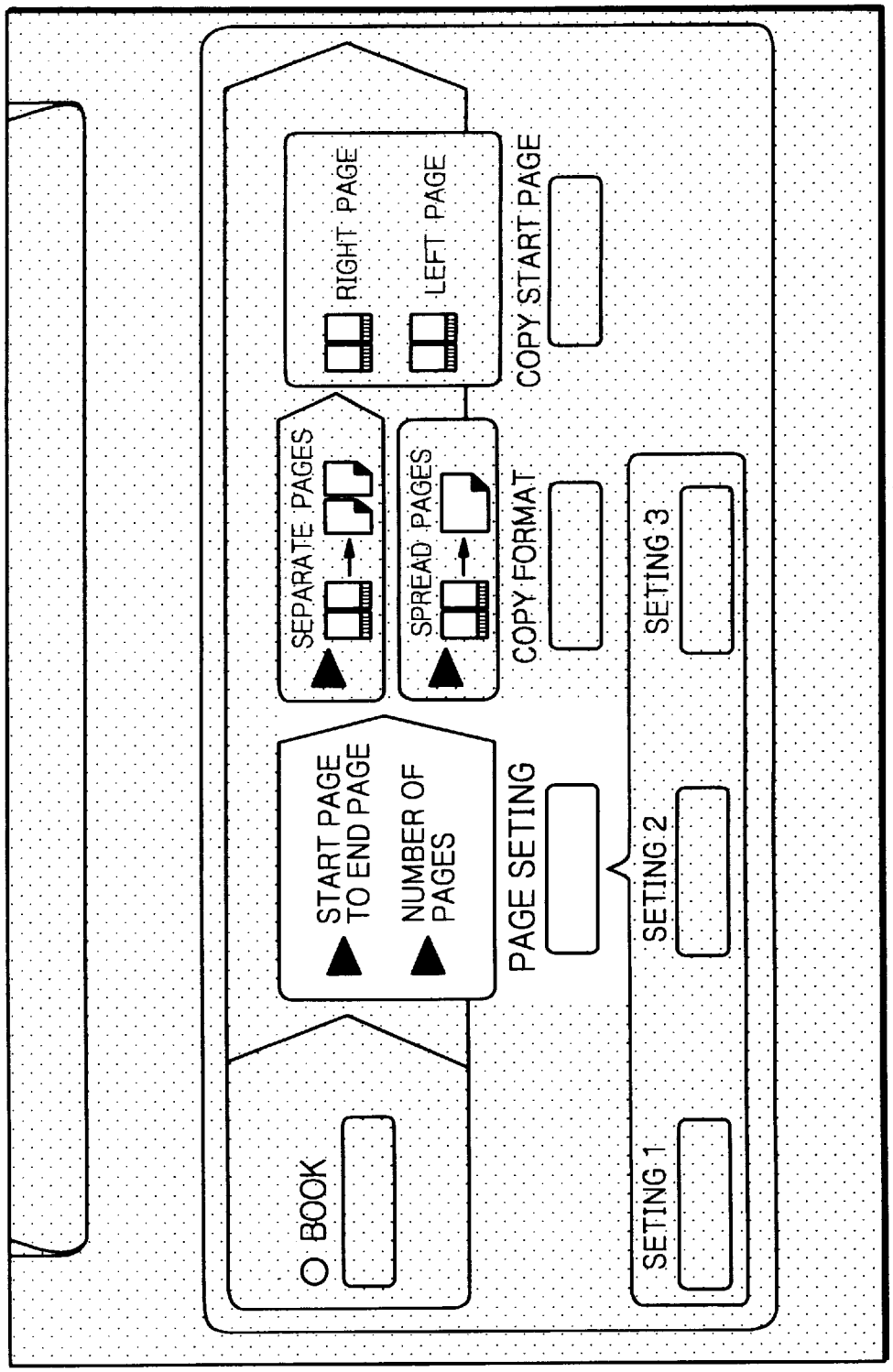

Fig. 5

SHEET 100%

Fig. 6

ENDED AT DESIGNATED PAGE

Fig. 7A

PLEASE INPUT START PAGE AND END PAGE
( 1 - 9 9 9 / # )  P. _ _ _ _ - P. _ _ _ _

Fig. 7B

PLEASE INPUT TOTAL NUMBER OF PAGES
( 1 - 9 9 9 / # )   _ _ _ _

Fig. 8A

BOOK
RIGHT   P.  _           100%
                    P.  1 2 3

Fig. 8B

BOOK
LEFT    P.  _           100%
                    P.  2 4 6

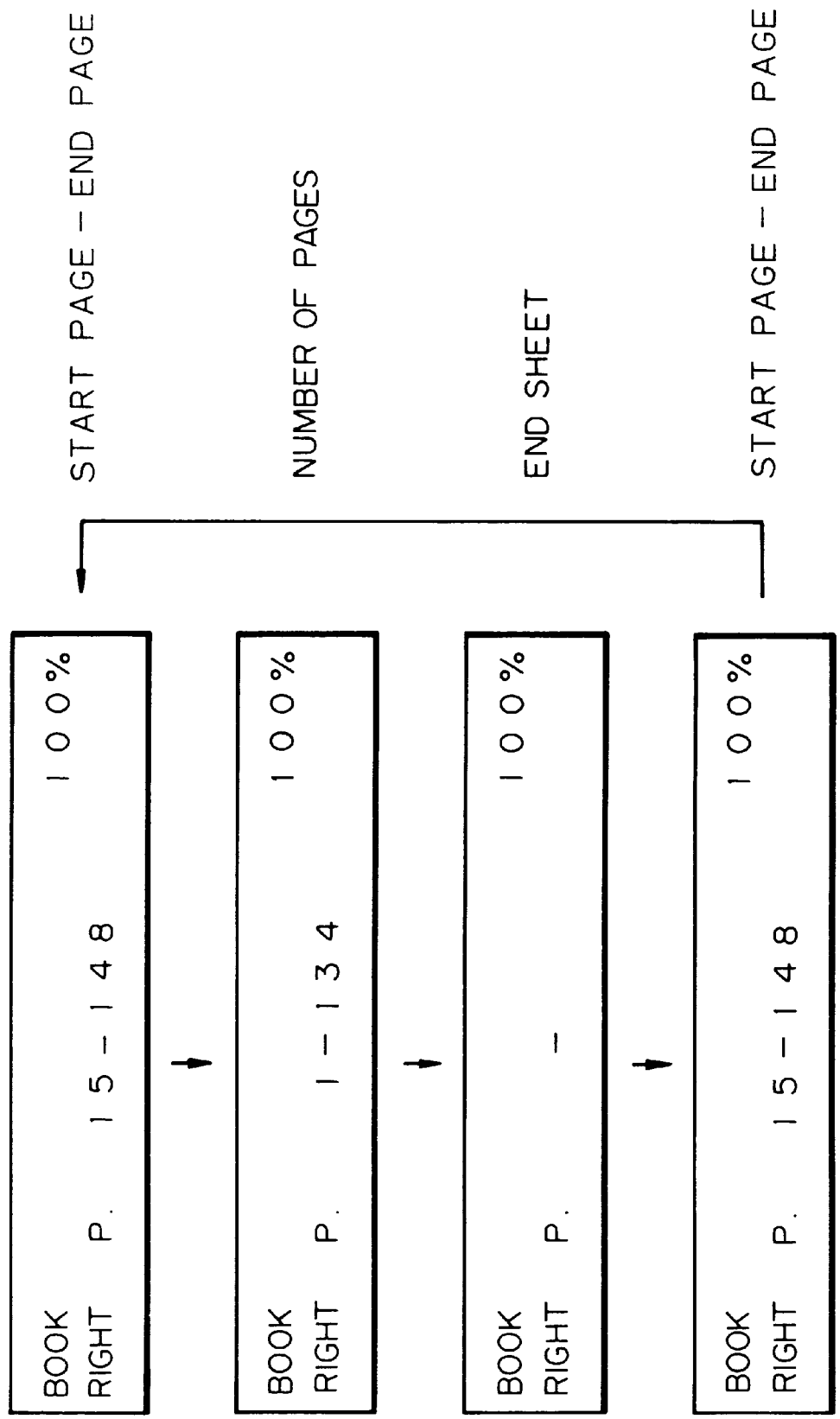

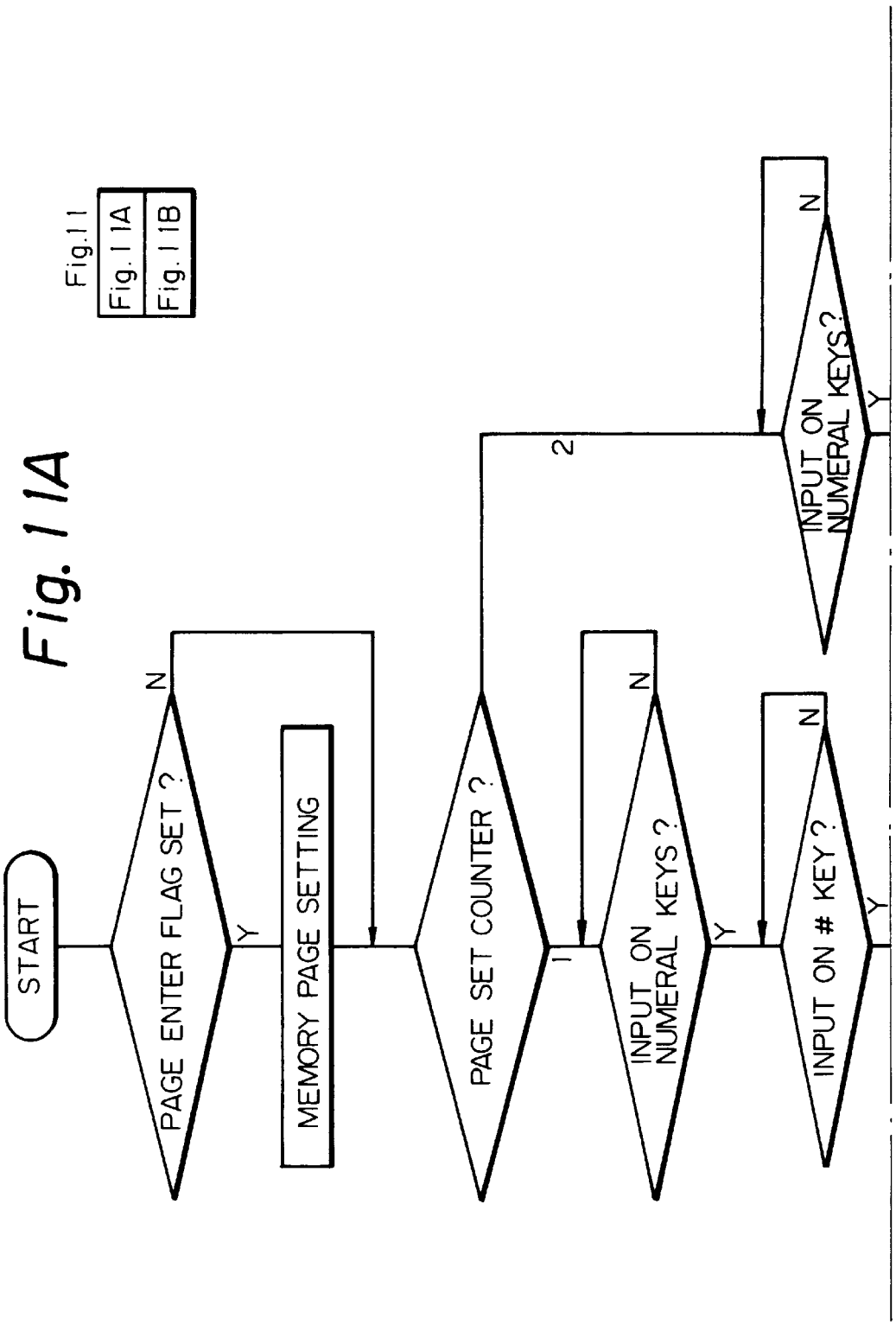

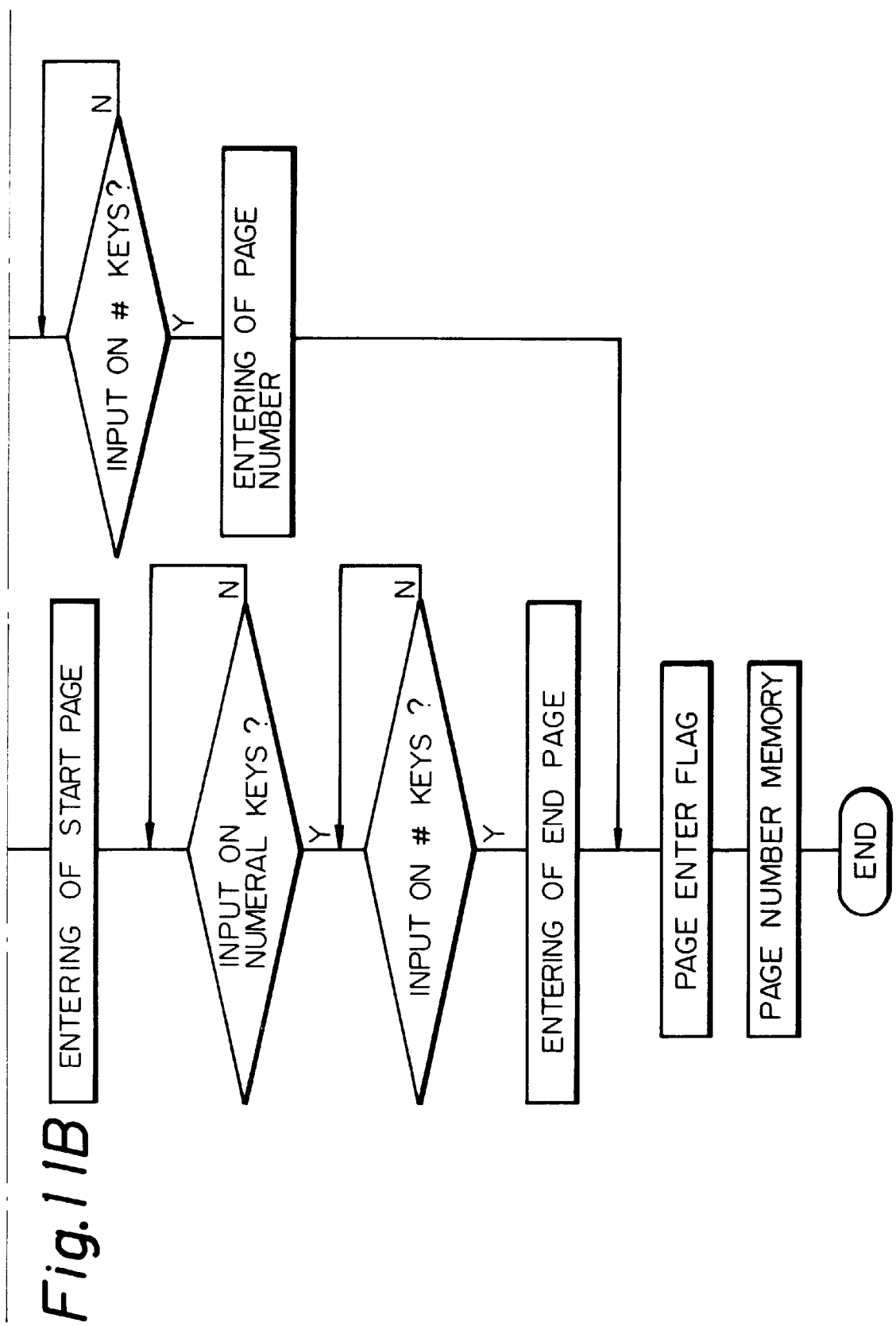

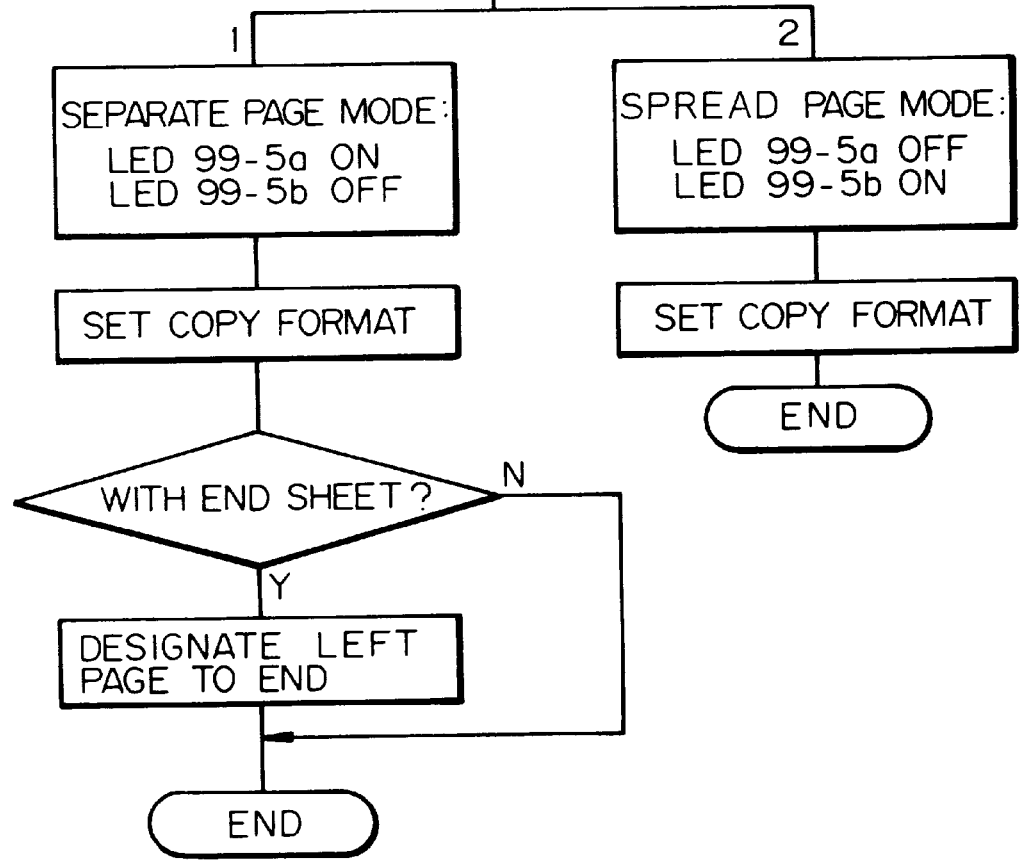

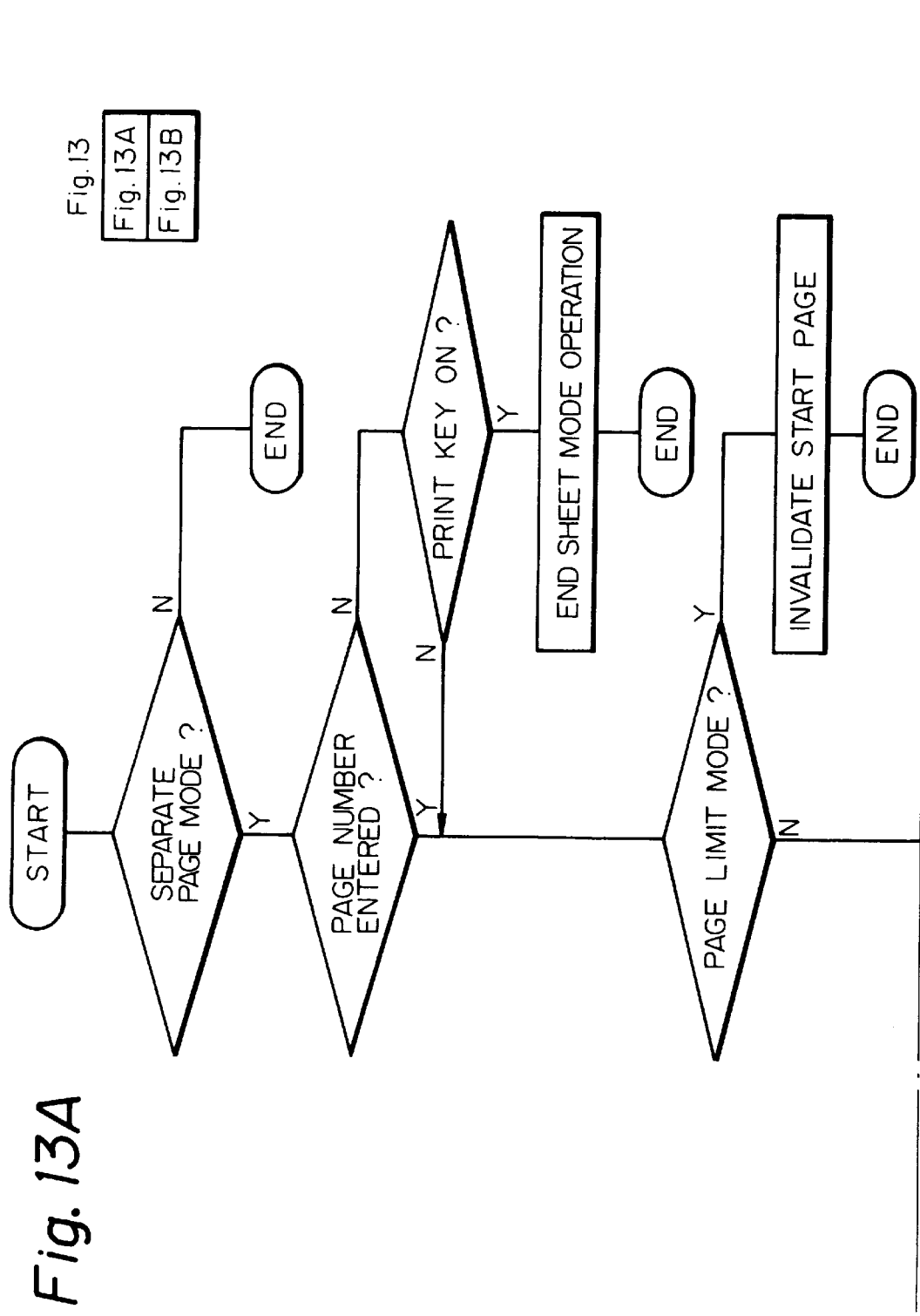

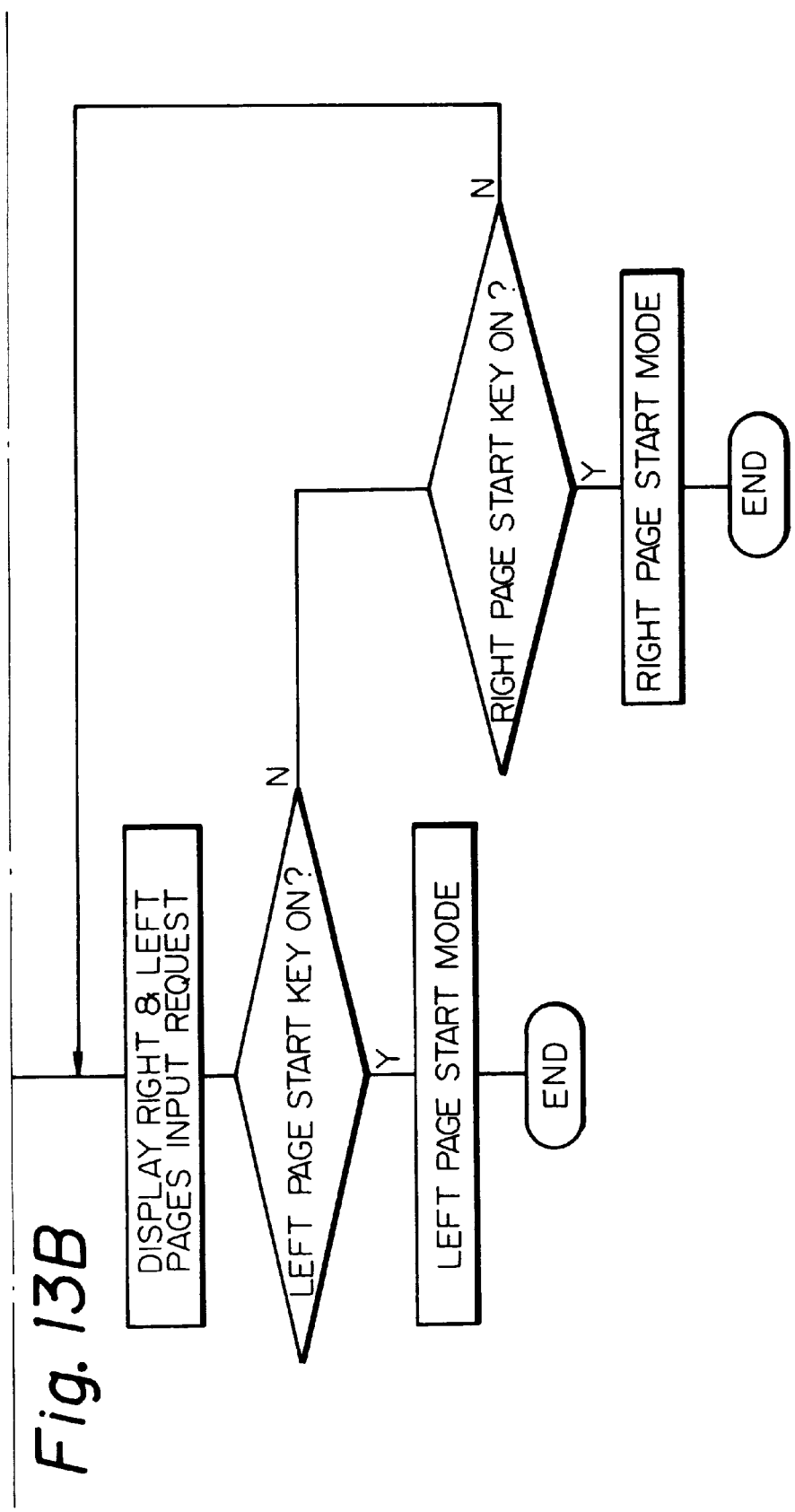

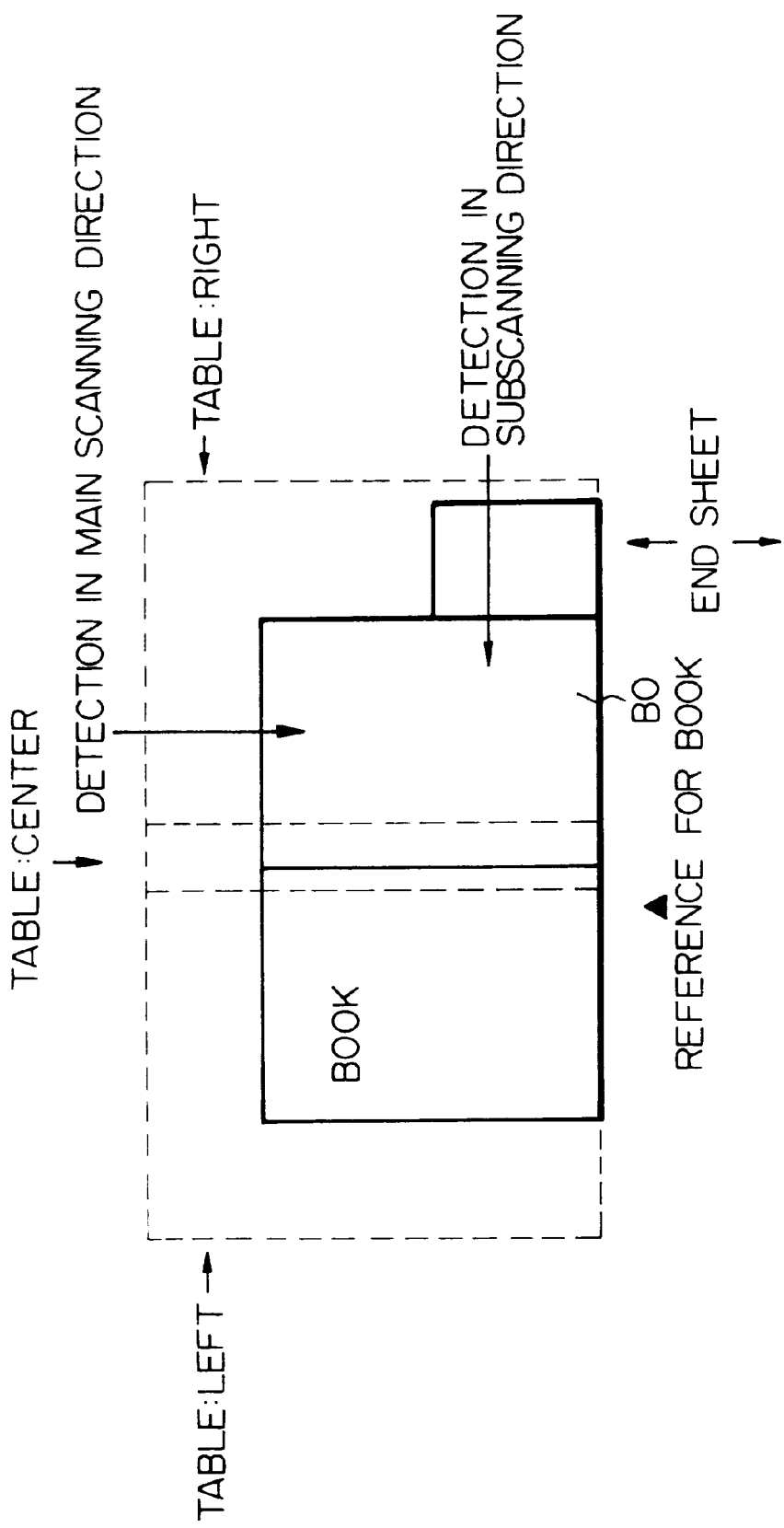

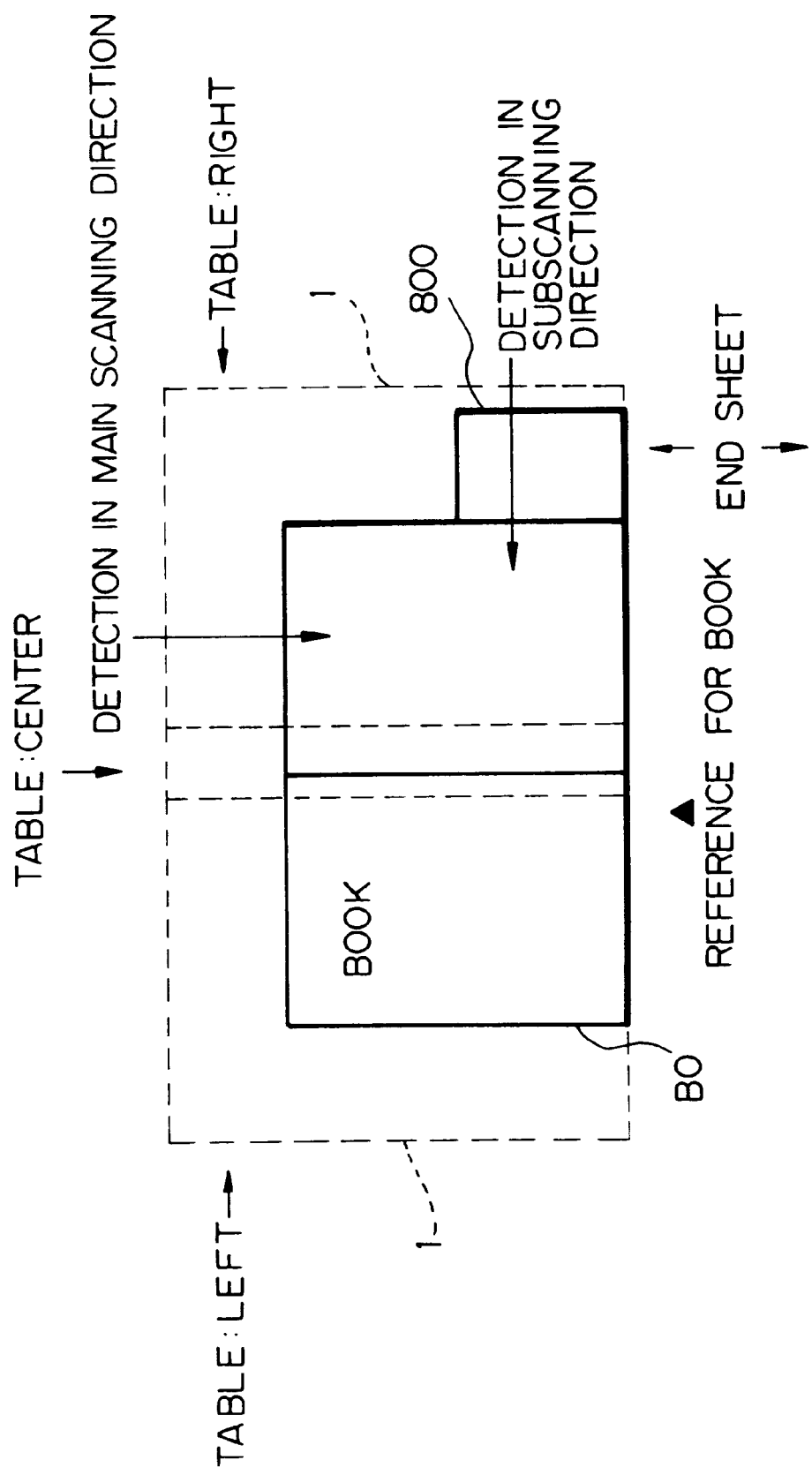

Fig. 81A
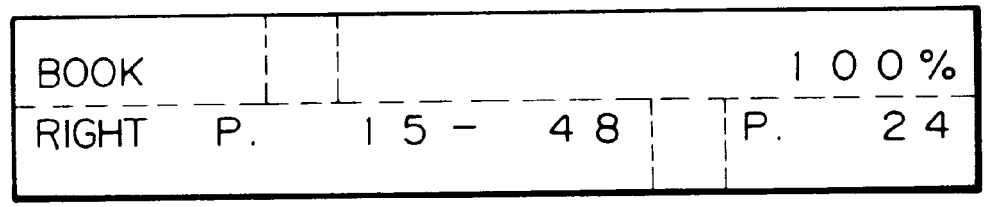
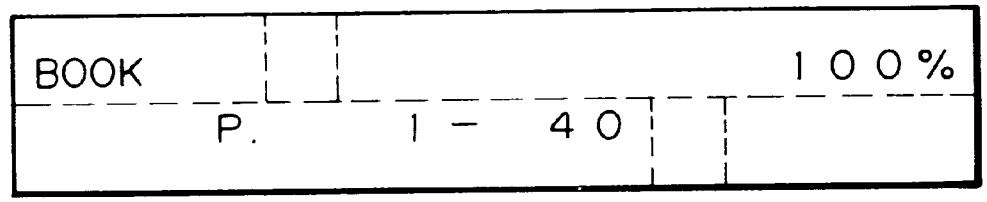
Fig. 81B
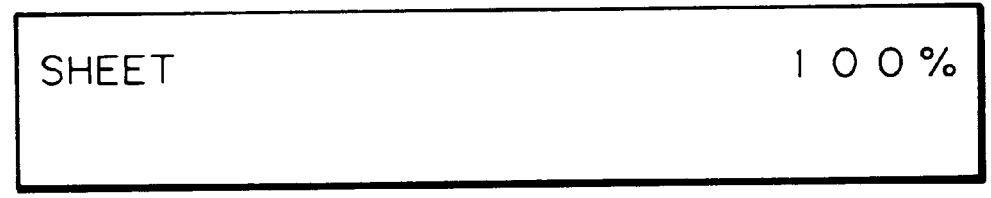
Fig. 81C
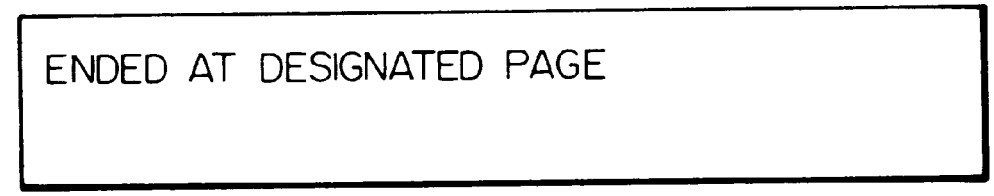
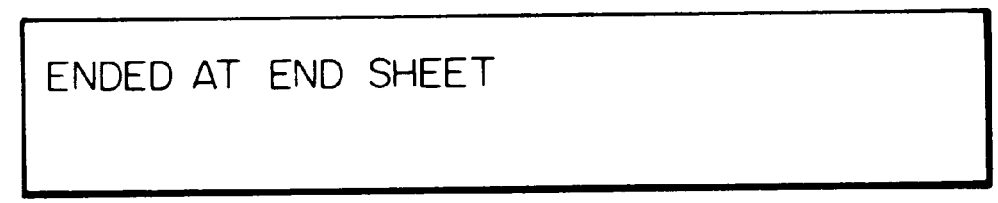

Fig. 81D

```
PLEASE INPUT START PAGE AND END PAGE
( 1 - 9 9 9 / # )  P. ____ - P. ____
```

```
PLEASE INPUT TOTAL NUMBER OF PAGES
( 1 - 9 9 9 / # )                    ____
```

Fig. 81E

```
BOOK                                100%
RIGHT    P.       -          P. 1 2 3
```

```
BOOK                                100%
LEFT     P.       -          P. 2 4 6
```

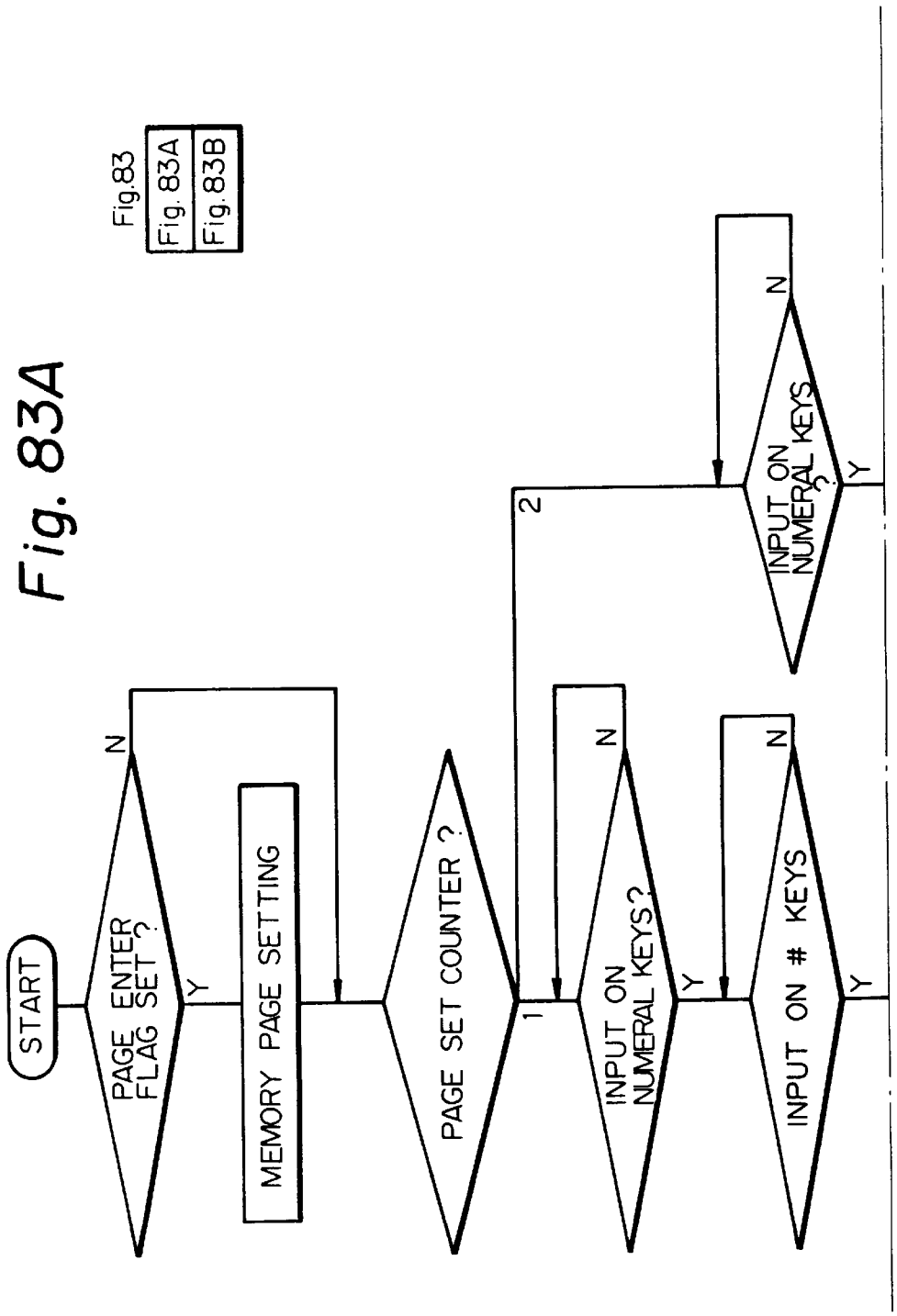

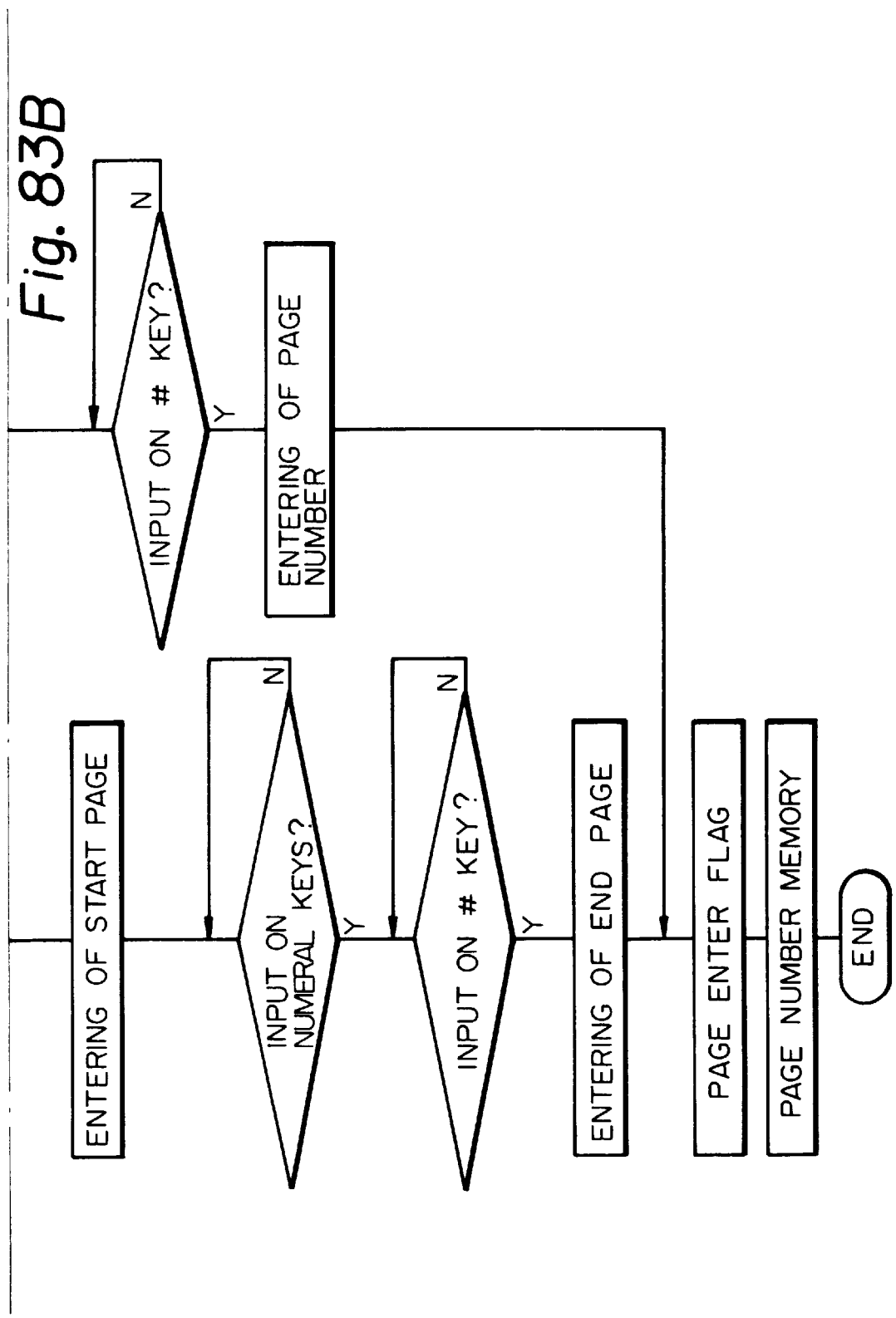

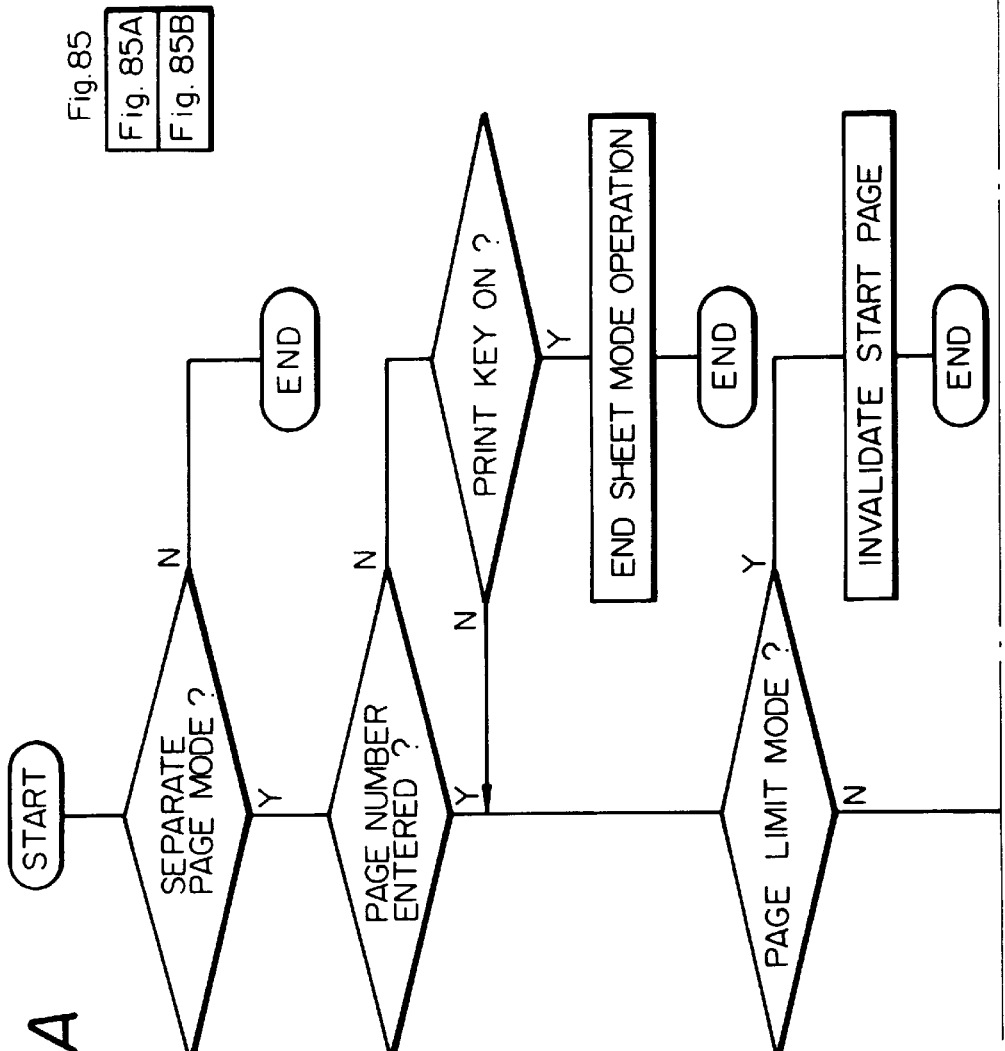

BOOK IMAGE READING APPARATUS AND BOOK IMAGE FORMING APPARATUS

BACKGROUND OF THE INVENTION

The present invention relates to an image reading apparatus capable of automatically reading the images of a book or similar bound document while turning over its pages, and an image forming apparatus capable of printing the images of the document in accordance with an image signal output from the image reading apparatus. More particularly, the present invention relates to an image reading apparatus advantageously applicable to a copier, facsimile apparatus, printer or similar image forming or image outputting apparatus or an image storing apparatus.

An image reading apparatus and an image forming apparatus each having the above capability are conventional. When only particular pages of a book should be automatically read or copied or otherwise output by either one of the above devices, they must be designated and have customarily been designated by any one of the following three different methods:

(1) a method causing the operator to input the start page and end page of of a spread book, i.e., the page where the image reading or image outputting operation should start and the page where it should end (see Japanese Patent Laid-Open Publication No. 7-110528);

(2) a method causing the operator to input the total number of pages of a book to be read or output (see Japanese Patent Laid-Open Publication No. 7-110529); and (3) a method allowing the operator to designate a plurality of bunches of pages of a book by inputting the start page and end page of each bunch (see Japanese Paten Laid-Open Publication No. 7-110530).

The image reading apparatus or the image forming apparatus of the type described reads or outputs, in many cases, the images of many pages or all of the pages of a book. Because such apparatuses each is capable of automatically reading the images of a book or automatically outputting the images of the book, they must be provided with means for allowing the operator to designate the pages of a book to be read or output. It is a common practice with the apparatuses to input the pages to be read or output by using either one of the above methods (1) and (2).

The prerequisite with the methods (1) and (2), i.e., inputting the start page and end page or the total number of pages is that the last page to be read or output be accurately designated. However, with a book not paginated at all or not serially paginated, the operator must count the desired pages of the book to be read or output. In practice, therefore, it is difficult for the operator to designate the last page accurately. Further, if the operator does not know the number of pages of a book to be read or output, then the operator must set a last page greater in number than the actual last page by using the method (1) or a total number of pages greater than the actual total number of pages by using the method (2). In this case, the operator is required to stop the machine as soon as the desired last page is read or output, standing by the apparatus.

As stated above, when all the pages of a book following a certain page or the entire book should be read or copied, the conventional apparatuses do not allow the operator to designate the desired range of the book by a single touch.

This results in a time- and labor-consuming setting procedure or even makes the procedure unclear to the operator.

SUMMARY OF THE INVENTION

It is therefore an object of the present invention to provide an image forming apparatus allowing the operator to set the last page or the end page of a book surely and easily and thereby obviating a time- and labor-consuming complicated page setting procedure.

In accordance with the present invention, an image reading apparatus capable reading the image of a book and turning over the page of the book has an inputting section for inputting a command for stopping the operation for reading the book at an end sheet, and a setting section for setting, in response to a command signal from the inputting section, a condition for ending the operation for reading the image of the book and turning over the page of the book document between the pages of the book where the end sheet is inserted.

Also, in accordance with the present invention, an image reading apparatus capable reading the image of a book, outputting the image of the page of the book read, and turning over the page of the book has an inputting section for inputting a command for stopping the operation for outputting the image of the book at an end sheet, and a setting section for setting, in response to a command signal from said inputting section, a condition for ending the operation for reading the image of the book and turning over the page of the book between the pages of the book where the end sheet is inserted.

BRIEF DESCRIPTION OF THE DRAWINGS

The above and other objects, features and advantages of the present invention will become apparent from the following detailed description taken with the accompanying drawings in which:

FIGS. 1A and 1B show the overall configuration of an operation and display panel included in an image forming apparatus embodying the present invention;

FIGS. 2A–2C each shows a part of an operation panel included in a conventional image forming apparatus and used to set the pages of a book to be copied;

FIG. 5 shows a specific guidance appearing when the illustrative embodiment copies a sheet, as distinguished from a book;

FIG. 6 shows a specific guidance also appearing in the illustrative embodiment;

FIGS. 7A and 7B each shows a particular guidance appearing in the illustrative embodiment for urging the operator to set pages;

FIGS. 8A and 8B respectively show specific guidances appearing when an end sheet mode particular to the illustrative embodiment is selected;

FIG. 9 shows the transition of the guidances each being assigned to a particular page set mode;

FIG. 11 is a flowchart showing how pages are set in the illustrative embodiment;

FIG. 13 is a flowchart showing how the left page or the right page is set;

FIG. 37A is a plan view showing the directions for detecting the edges of a spread book and an end sheet particular to the illustrative embodiment;

FIGS. 79A and 79B shows references used to position a book in the alternative embodiment;

FIGS. 81A–81F each shows a particular guidance to appear in the alternative embodiment;

FIGS. 82–86 are flowcharts each demonstrating a particular operation of the alternative embodiment.

DESCRIPTION OF THE PREFERRED EMBODIMENTS

Preferred embodiments of the present invention will be described hereinafter. It is to be noted that although some identical references are used in the different embodiments, they do not always denote identical structural elements. Also, a document in the form of a book or similar bound document and a document in the form of a sheet will be simply referred to as a book and a sheet, respectively.

Figure 1B:
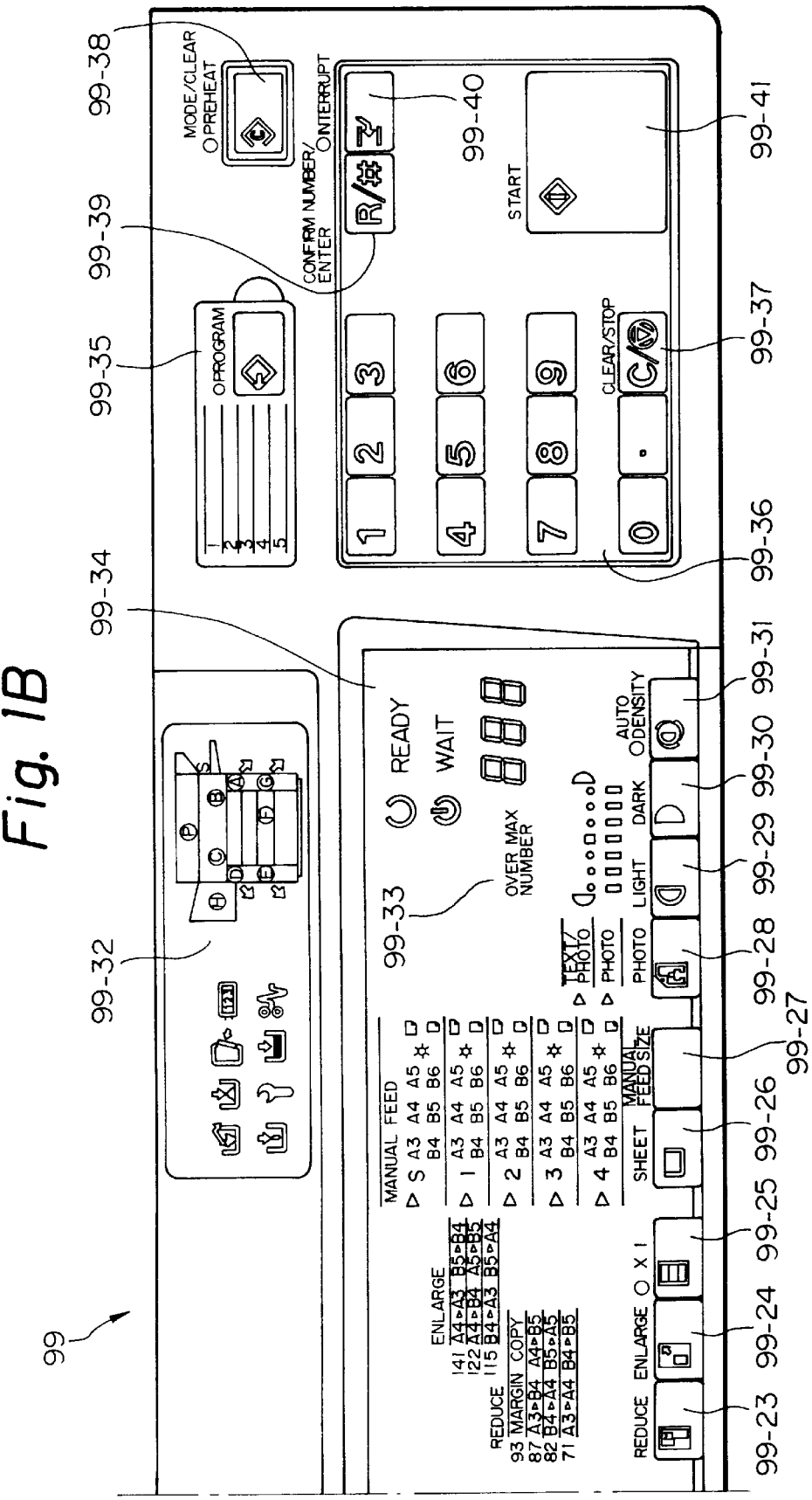
Figure 2B:
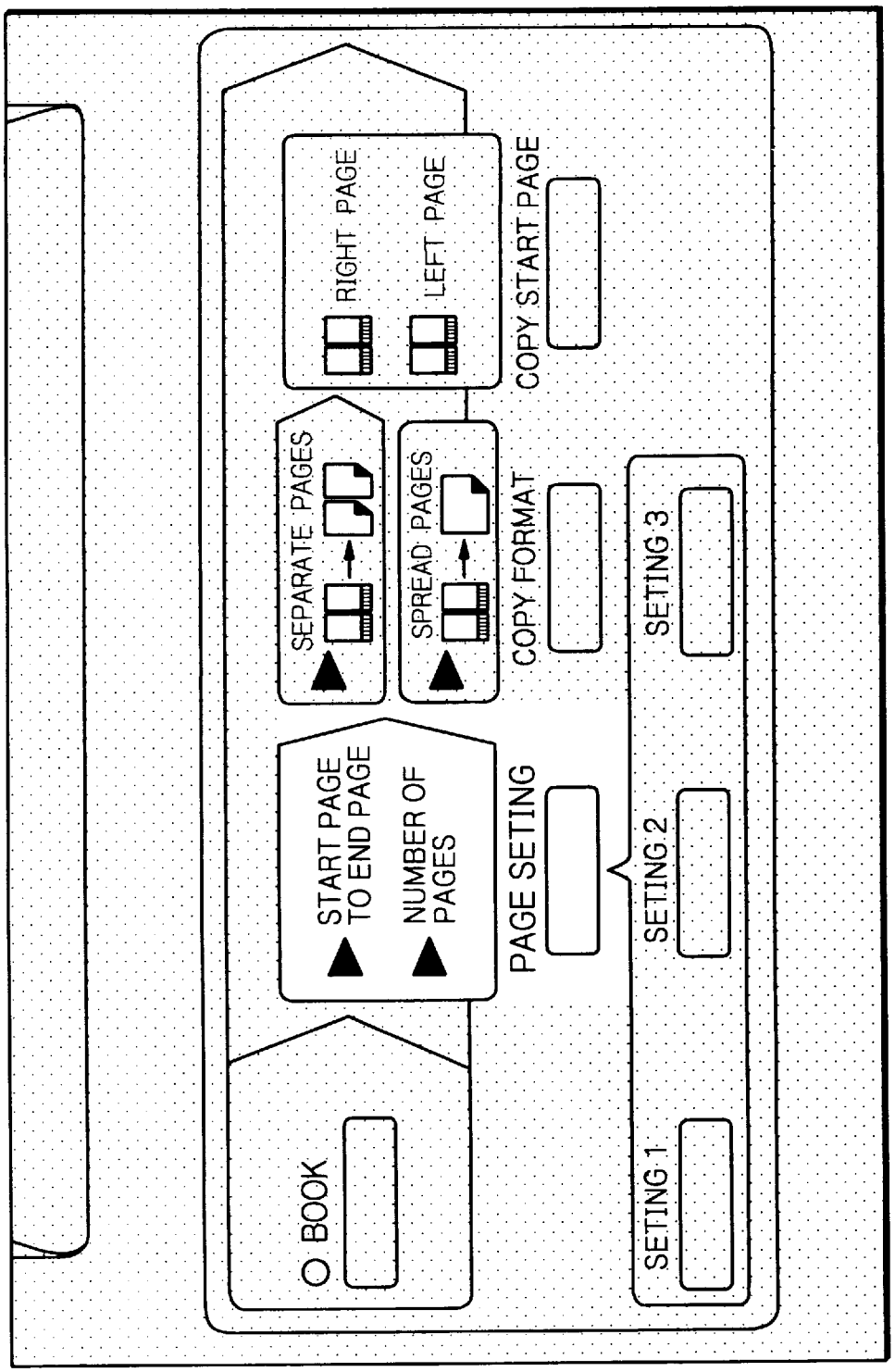
Figure 2C:
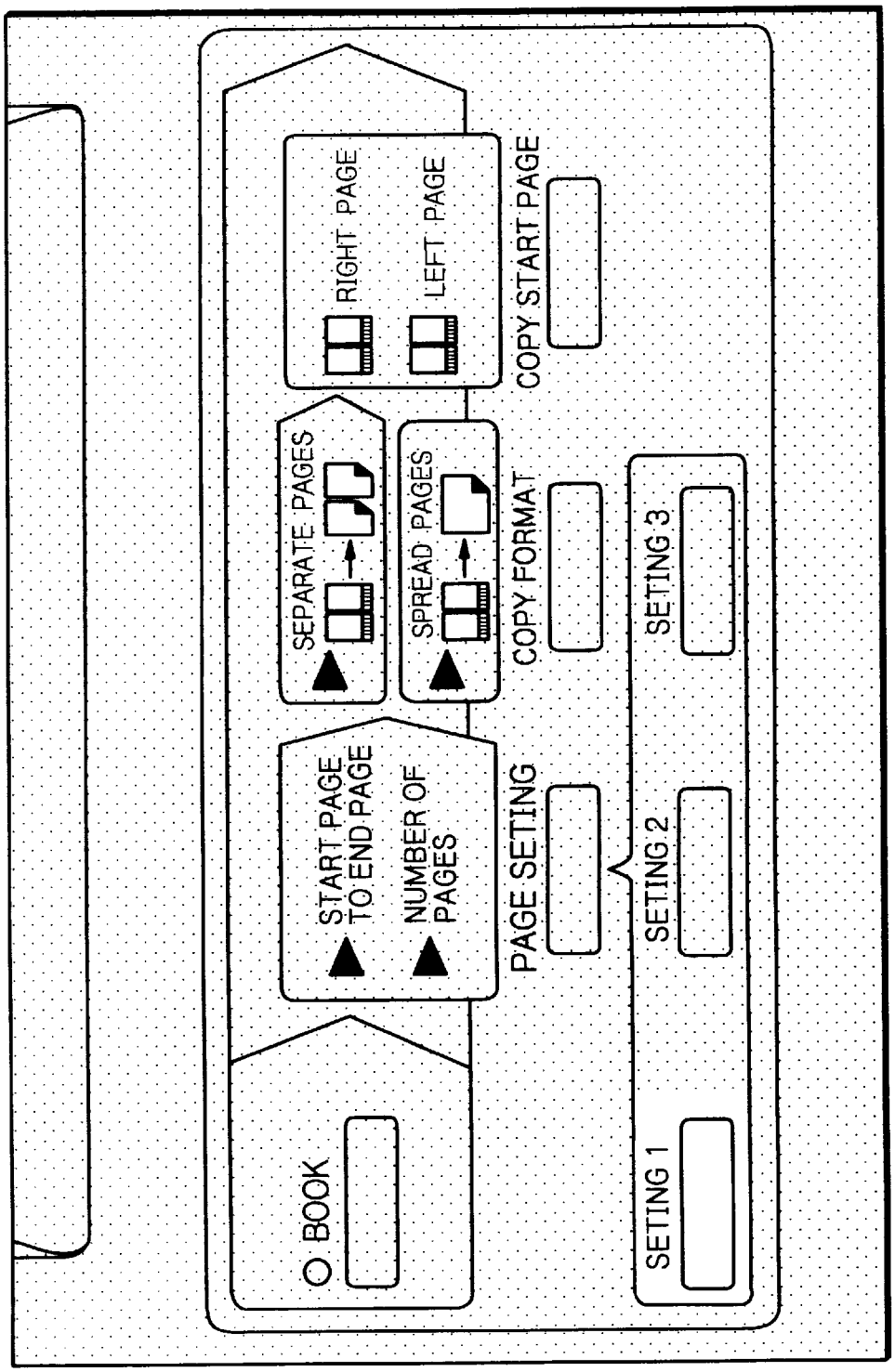

Referring to FIGS. 1A and 1B, an operation panel included in a book image forming apparatus embodying the present invention is shown. FIGS. 2A–2C show a copy page inputting or setting section included in a conventional book image forming apparatus. The operation and display panel shown in FIGS. 1A and 1B includes a recess 99-1 for putting clips or staples. A book key 99-2 is used to select a book mode for causing the apparatus to copy a book while automatically turning over its pages. A copy page set key 99-3 is used to set pages to be copied. A setting 1 key 99-4a, a setting 2 key 99-4b and a setting 3 key 99-4c are used to set a plurality of bunches of pages of a book to be copied while skipping the pages which should not be copied. A copy format key 99-5 is used to select either a separate page mode for causing the apparatus to copy the right and left pages of a book separately or a spread page mode for causing it to copy the right and left pages on a single paper or similar recording medium. A copy start page key 99-6 is used to select, when the separate page mode is selected on the key 99-5, the page to be copied first. A sorter key 99-7 is used to select either a sort mode for causing the apparatus to sort a plurality of sets of copies one by one by use of a sorter or a stack mode for causing it to stack a plurality of sets of copies page by page.

A duplex copy key 99-8 is used to select one of a simplex document mode in which two sheet documents or a book (in a page limit mode) is copied on both sides of a single paper by use of a duplex paper feed table, a right-left page mode in which the right and left pages of a spread book are copied on both sides of a single paper, and a front-rear page mode in which the front page and rear page of a spread book are copied on both sides of two papers independently or four consecutive pages (spread right and left pages) of a spread book are copied on both sides of a single paper. A liquid crystal display (LCD) 99-9 displays the operating statuses of the apparatus, error messages, and so forth. A center erase key 99-10 is used to erase a shadow ascribable to the bound portion of a spread book. A frame erase key 99-11 is used to erase portions around an image to be output. A face-up discharge key 99-12 is used to cause the apparatus to discharge copies face up. A shift key 99-13 is used to shift the position of an image on a copy. A page limit key 99-14 is used to cause, when the separate page mode is selected on the key 99-5, the apparatus to copy only the right page or the left page of a spread book. An independent magnification change key 99-15 is used to change horizontal and vertical magnifications independently. A center erasure width change key 99-16 is used to change the erasure width in the above center erasure mode while a frame erasure width change key 99-17 is used to change the erasure width in the frame erasure mode. A shift change key 99-18 is used to change the amount of shift of an image. An upper end key 99-19 and a right end key 99-20 are used to manually input the position of a spread book when the page is not turned over or when an image is partly lost. A down key 99-21 and an up key 99-22 are used to change the magnification of an image by zooming. A reduce key 99-23 and an enlarge key 99-24 are selectively used to reduce and enlarge an image from a preselected size. An ×1 key 99-25 is used to produce a copy in the same size as the document. A paper key 99-26 is used to select a desired paper size. A manual size select key 99-27 is used to select a paper or papers set on a manual feed table when a book is to be copied. A photo key 99-28 is used to select the kind of documents (text/photo or photo). A light key 99-29, a dark key 99-30 and an auto density key 99-31 are selectively used to adjust the density of a copy. An error display portion 99-32 displays various kinds of errors occurred in the apparatus. An excess number display portion 99-33 informs the operator of, e.g., the fact that the number of copies input is greater than one available with the apparatus.

A set number/copy number display portion 99-34 shows the number of copies set before the start of copying or the number of copies output during copying. A program key 99-35 is used to register or call settings of frequent use. Numeral keys 99-36 are used to input a desired number of copies, magnification, and so forth. A clear/stop key 99-37 is used to clear the number of copies set or to stop or interrupt copying. A mode clear/preheat key 99-38 is used to cancel modes set and restore the original picture or to set up a preheat mode; for the preheat mode, the key 99-38 is pressed down for more than about 1 second. A number check/enter key 99-39 is used to confirm the number of copies set during copying or when copying is interrupted or to enter a numerical value or a command. A start key 99-41 is pressed to cause the apparatus to start copying.

FIG. 2A shows a procedure for designating the pages of a book to be copied by inputting the start page and end page. As shown, the operator presses the book key 99-2, sets a book, and then selects "Start Page-End Page" on the copy page set key 99-3; a message changes from "Number of Pages" to "Start Page-End Page" when the key 99-3 is pressed. Subsequently, the operator inputs the start page on the numeral keys 99-36 and then enters it by pressing a "#" key (enter key 99-39). When the operator has input a wrong number, the operator presses the clear/stop key 99-37, presses the "#" key, and then returns to the copy page setting procedure. Finally, the operator inputs the end page to be copied on the numeral keys 99-36 and presses the "#" key.

FIG. 2B shows a procedure for designating the pages of a book to be copied by inputting the total number of pages. As shown, the operator presses the book key 99-2, sets a book, and then selects "Number of Pages" on the copy page set key 99-3. Subsequently, the operator inputs the total number of pages to be copied on the numeral keys 99-36 and presses the "#" key.

FIG. 2C shows a procedure which allows the operator to sequentially select a first setting 1 to a third setting 3. As shown, the operator presses the book key 99-2, sets a book, and then presses the setting 1 key 99-4a. Subsequently, the operator inputs the start page to be copied on the numeral keys 99-36, enters it by pressing the "#" keys inputs the end page to be copied on the numeral keys 99-36, and again presses the "#" key. Thereafter, the operator may press the setting 2 key 99-4b and repeat the above procedure (inputting the start page and end page). The operator may further press the setting 3 key 99-4b and repeat the same procedure if any another bunch of pages should be copied. Finally, the operator selects papers on the paper key 99-26 and then presses the start key 99-41 for causing the apparatus to operate.

The problem with the this type of apparatus is that when all the pages of a book following a certain page or the entire book should be copied, such a range of the book cannot be designated by the operator's single touch, resulting in time- and labor consuming setting. Moreover, a procedure for setting such a range is unclear to the operator.

Figures 3, 4A, 4B:
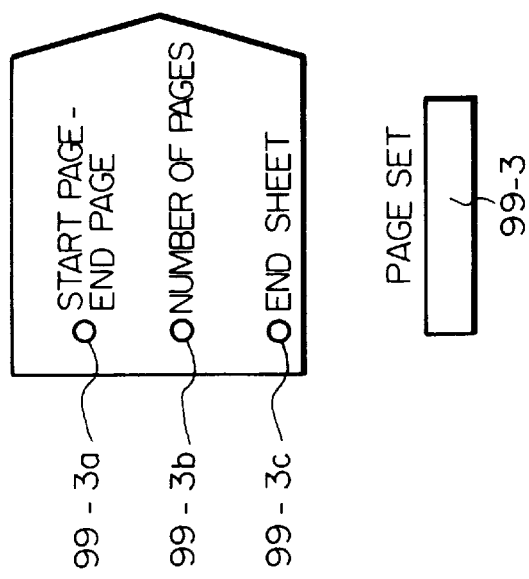
FIG. 3 shows a portion of the part of the operation panel of the illustrative embodiment.
FIGS. 4A and 4B respectively show specific guidances usually appearing during copying of the illustrative embodiment and during waiting of the same.

In light of the above, as shown in FIG. 3, the illustrative embodiment additionally provides the above copy page inputting or setting section with end sheet inputting means or stopping means for designating the last page. Every time the page set key 99-3 is pressed, messages "Start Page-End Page", "Number of Pages" and "End Sheet" each indicating a particular page input mode sequentially appear. At the same time, LEDs (Light Emitting Diodes) 99-3a, 99-3b and 99-3c respectively assigned to the above three messages sequentially turn on. Further, a guidance showing the number of pages appears on the LCD 99-9, as will be described specifically later. The LCD 99-9 is implemented as an LCD panel capable of displaying characters in twenty figures and two lines.

FIGS. 4A and 4B each shows a particular guidance available with the illustrative embodiment. FIG. 4A shows a guidance usually appearing on the LCD 99-9 during copying of a book. The guidance of FIG. 4A shows that a book held in its spread position is read from page 15 on the right-hand side to page 48 at ×1 magnification, and that page 24 is being copied. Specifically, the guidance shows read selection at its top left portion, a magnification at its top right portion, pages set at its bottom left portion, and a page being copied at its bottom right portion.

FIG. 4B shows a guidance usually appearing when the apparatus is waiting in the book mode. The guidance shows specifically that a book in its spread position has forty pages in total and will be copied at ×1 magnification. At this stage, a page being copied does not appear at the bottom right because the apparatus is not in operation.

As stated above, for copying a usual book, the operator inputs the start page and end page or the total number of pages to be copied, while confirming (and correcting, if necessary) the number of pages set. Also, when a book should be spread to show its start page, as in the illustrative embodiment, the operator sets the pages or the total number of pages, looks at the display, and then spreads the book. The pages or the total number of pages set is displayed when the apparatus is in its waiting status and when it ends the reading operation. Further, the pages or the total number of pages set and the page being copied are displayed during document reading and copying.

In this manner, the apparatus automatically reads a book, forms the images of consecutive pages read, and turns over the last page read in a single continuous procedure. During such a procedure, the apparatus displays the pages or the total number of pages set and the page being read or copied, informing the operator of the operating conditions of the apparatus. When the stop key 99-37 is pressed, the apparatus interrupts or ends its operation, depending on the page being read or copied.

Figures 5, 6:
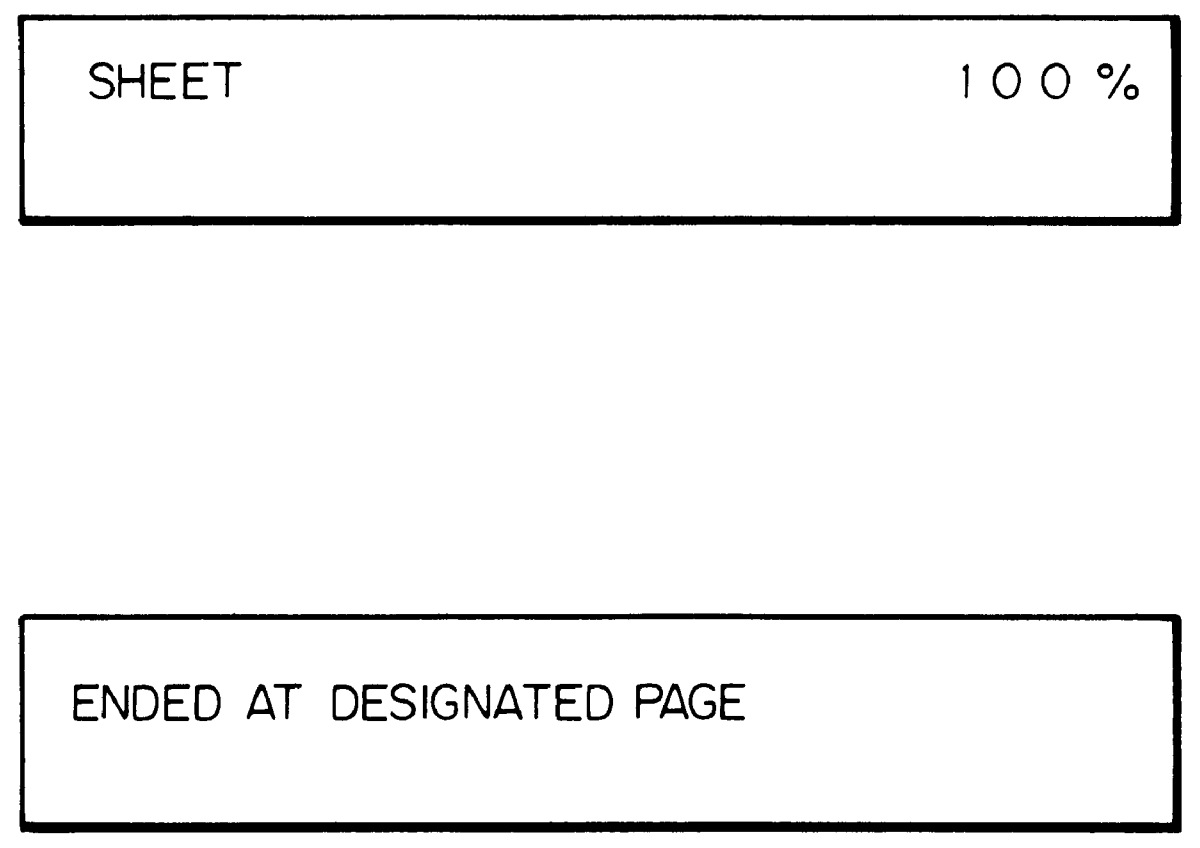

FIG. 5 shows a specific guidance usually appearing when a document in the form of a sheet is copied. The guidance shows that a sheet is read at ×1 magnification.

FIG. 6 shows a specific guidance showing the operator that the apparatus has automatically ended its operation at the last page of a book designated by an end sheet which will be described later. This guidance appears only when the apparatus has completed its operation without any error on the basis of the designation using the end sheet.

FIGS. 7A and 7B each demonstrates the procedure beginning with the selection of the book mode and ending with the setting of the start and end pages or the total number of pages. Setting the two pages or the total number of pages is essential with book reading, so that the guidances to be described are displayed with priority. The operator selects "Start Page-End Page", "Number of Pages" or "End Sheet" on the copy page set key 99-3. In the case of the start page and end page mode and total number page mode, the guidances shown in FIGS. 7A and 7B, respectively, are continuously displayed until the pages or the total number of pages has been input.

As shown in FIG. 7A, in the start page and end page mode selected by the operator, the portions expected to show numerical values blink while the start page and end page are being input. The operator inputs a numerical value representative of the start page on the numeral keys 99-36 and then presses the enter key 99-39 or a start-end page key to enter it. In response, the guidance changes in order to urge the operator to input a numerical value representative of the end page on the numeral keys 99-36. The operator entered the end page again presses the enter key 99-39 in order to enter it. On the other hand, in the total page number mode, the guidance shown in FIG. 7B appears continuously until the operator inputs and enters the total number of pages to be copied; the operator inputs a numerical value representative of the number pis on the numeral keys 99-36 and then presses the enter key 99-39.

FIGS. 8A and 8B each shows a particular guidance usually appearing in the end sheet mode or stop page mode in which a book is copied up to the page where the end sheet is positioned. Specifically, FIG. 8A shows the separate page mode to be executed in the end sheet mode selected on the copy page set key 99-3. As shown, the apparatus automatically selects the right page as the initial separate page to be copied first. FIG. 8B shows that copying in the spread page mode is under way, and that page 246 is being copied; the page number sequentially increases by two at a time.

FIG. 9 shows the transition of display occurring at the time of page setting. As shown, the guidances "Start Page-End Page", "Number of Pages" and "End Sheet" sequentially appear every time the copy page set key 99-3 is pressed. The pages input and entered in the start page and end page mode are also set in the total page number mode as page 134. Therefore, when the operator again presses the copy page set key 99-3 in order to select the start page and end page mode, the above value is again read out. If the pages set do not need correction, the enter key 99-39 is pressed.

Reference will be made to FIGS. 10–13 for describing control procedures to be executed in the above various modes. The control to be described is executed by a main controller executing image formation mode control which will be described. An IPU (Image Processing Unit) controls image reading, data processing and page turning in response to commands received from the main controller. A sequence controller controls the timings of loads included in an image forming section.

Figure 10:
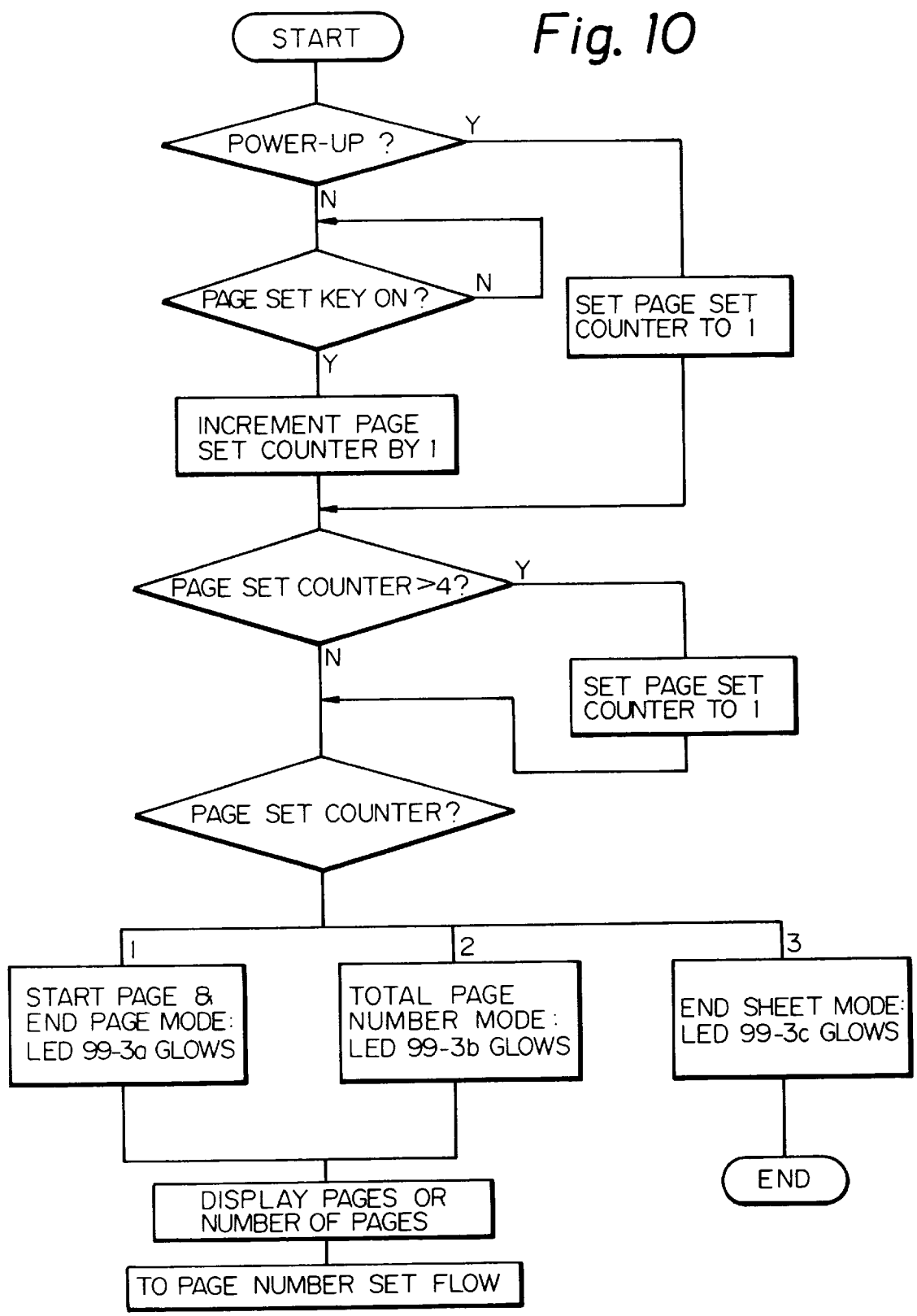
FIG. 10 is a flowchart demonstrating how a desired page set mode is selected in the illustrative embodiment.

Specifically, FIG. 10 shows a copy page setting selection procedure. As shown, every time the copy page set key 99-3 is pressed, the start page and end page mode, total page number mode and end sheet mode are sequentially selected in this order. When the end sheet mode is selected, it is not necessary for the operator to input the pages or the number of pages on the numeral keys 99-36. When the start page and end page mode or the total page number mode is selected, the procedure shown in FIG. 11 is executed to allow the operator to input and enter the pages or the number of pages.

As shown in FIG. 11, in the start page and end page mode, the operator inputs two numerical values respectively representative of the start page and end page to be copied. In response, the apparatus calculates the number of pages from the start page to the end page, and copies the pages corresponding to the difference. On the other hand, in the total page number mode, the operator directly inputs the total number of pages to be copied. In this case, the apparatus repeats copying a number of times corresponding to the designated number of pages from the designated left and right pages. The total page number mode is used mainly when a book is not paginated at all or not serially numbered.

The operator inputs the above pages or the total number of pages in accordance with the guidances shown in FIGS. 4A–9, as stated earlier. Inputting the pages or the total number of pages is essential with the repeated page turning of a book, so that the guidances are displayed with priority when the book mode is selected.

As shown in FIG. 11, the pages entered in the start page and end page mode or the total number of pages entered in the total page number mode is written to a memory included in the main controller. The pages or the number of pages is read out of the memory when the mode is sequentially switched from the start page and end page mode to the end sheet mode via the total page number mode and again restored on the copy page set key 99-3. The pages or the number of pages input blinks to show the operator that it can be corrected. The operator, watching the pages or the number of pages, may correct it and then enter it on the enter key 99-39.

Figure 12A:
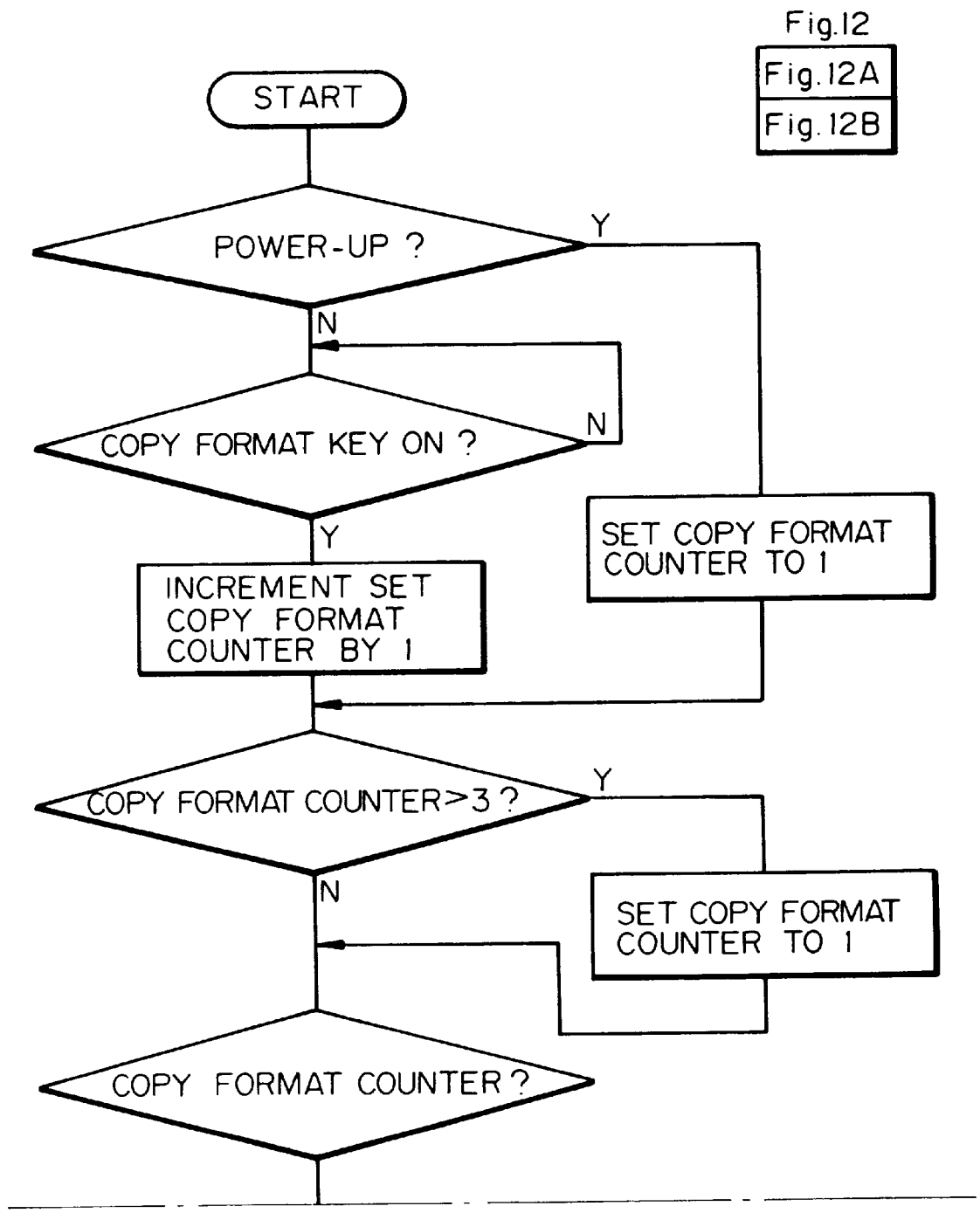
FIG. 12 is a flowchart showing how a copy format is selected in the illustrative embodiment.

The copy format key 99, FIGS. 1A and 1B, and LEDs 99-5a and 99-5b associated therewith are used to input and display a copy format mode selected, as follows. The copy format mode is valid when the book mode is selected. As shown in FIG. 12, the separate page mode and spread page mode are available with the illustrative embodiment. Every time the copy format key 99-5 is pressed, the separate page mode and spread page mode are sequentially set up with the LEDs 99-5a (separate page) and 99-5b (spread page) glowing alternately. In the illustrative embodiment, priority is given to the separate page mode generally used more often than the spread page mode. Also, the separate page mode is initially set at the time of power-up or when the book mode is selected.

In the separate page mode, the images of a book are read out of a frame memory page by page, and each is reproduced on a respective paper. To match the images, the position of each page image is calculated on the basis of detection of the edge of a page, as will be described later. On the other hand, in the spread page mode, image data representative of two spread pages are continuously read out of the frame memory and reproduced on a single paper.

Books in general carry images on both sides of each leaf, and so do some office documents bound by, e.g., staples. It is therefore possible with a book image forming apparatus of the type reading a book and forming the images of consecutive pages while turning over the pages to produce copies in different formats if the above separate page mode and spread page mode are available. Particularly, the separate page mode produces copies identical in page arrangement with a book. The spread page mode halves the number of copies and allows an image extending over two spread pages, e.g., gravure to be continuously reproduced.

In the illustrative embodiment, images are read by a single scanning effected in one direction under identical control without regard to the image forming format. Specifically, two spread pages are read by a single scanning and written to image storing means. In the separate page mode, the image stored in the above storing means is read out while being separated into the two pages, and reproduced on a single paper. In the spread page mode, the image stored in the storing means is continuously read out over the two pages and reproduced on a single paper.

The start page to be copied is either the left page or the right page and can be selected on the copy start page key 99-6, as shown in FIG. 13. When the right page is selected, the apparatus forms the image of the right page of a spread book first and then turns over the page in order to form the image of the next page. In this case, the one page of image data written to the frame memory in the separate page mode are read at a time; the consecutive images are matched in position in the manner which will be described later. When the left page is selected, the apparatus forms the image of the left page first and then turns over the page in order to form the image of the next page.

In the separate page mode, the apparatus does not copy undesired pages. Even in the separate page mode, the apparatus can be so controlled as to erase the images of pages other than designated pages or not to forms such images. For example, when the right page is selected to be the page to be copied first in the spread page mode, the apparatus can transform the image of the first left page to white data. When the left page is the last page to be copied, the apparatus can transform the image of the last right page next to the left image to white data.

Figure 14:
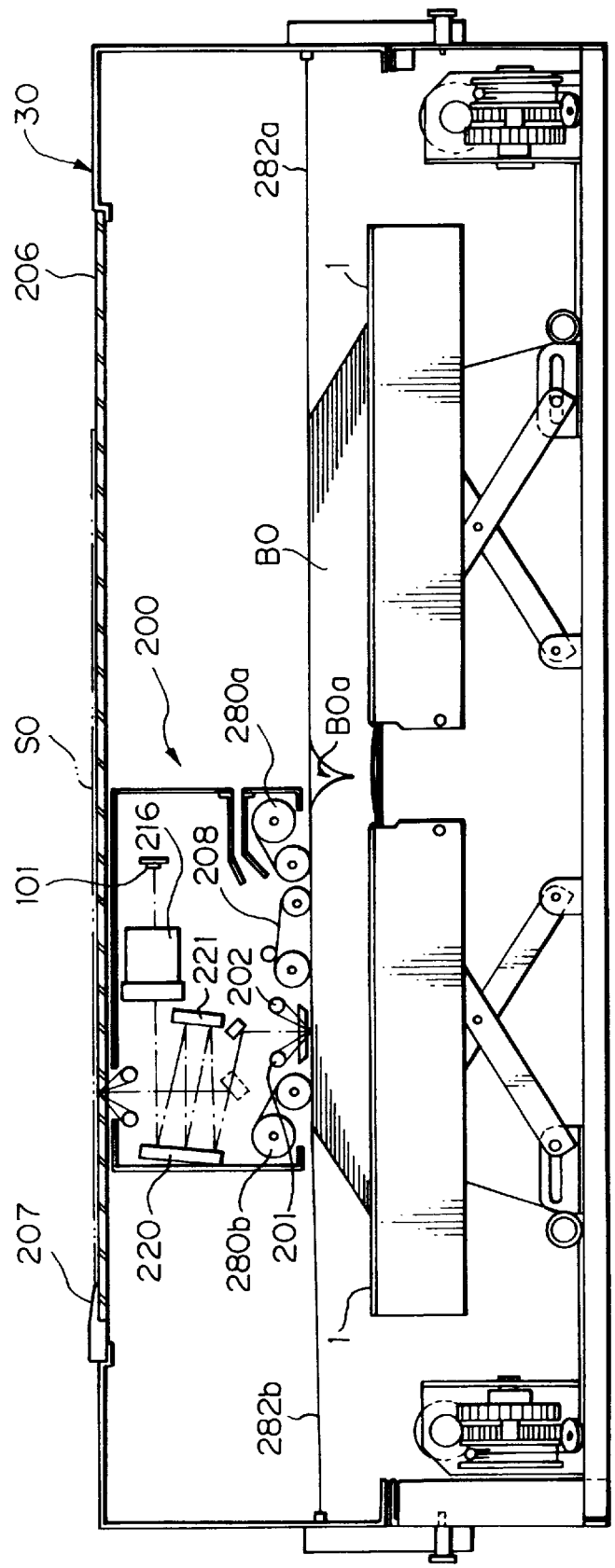
FIG. 14 is a section showing the general configuration of a turn-the-page scanner (TPS) included in the illustrative embodiment.

Referring to FIG. 14, a scanner unit 30 included in the illustrative embodiment will be described. As shown, a scanning unit 200 is movable within the scanner unit 30 in the right-and-left direction, as viewed in FIG. 14, reading a book BO spread on a right and a left table 1.

Figure 15:
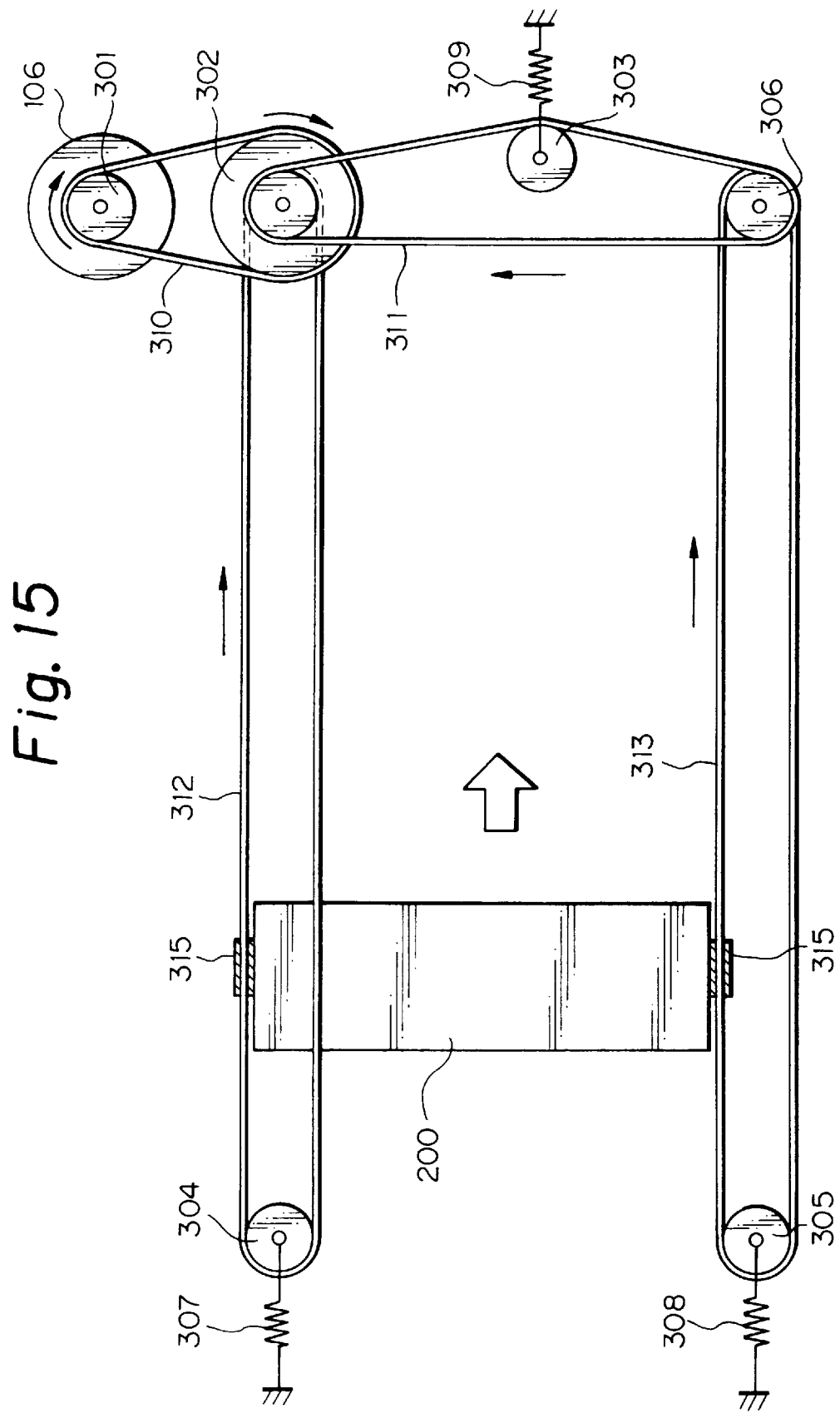
FIG. 15 is a plan view showing a drive mechanism for driving a scanning unit included in the TPS.

FIG. 15 shows a driveline for driving the scanning unit 200. As shown, the driveline includes a timing belt 312 passed over a pulley 304 and a three-step pulley 302 at the rear side of the apparatus body. Likewise, a timing belt 313 is passed over a pulley 305 and a two-step pulley 306 at the font side of the apparatus body. Springs 307 and 308 respectively support the shafts of the pulleys 304 and 305, and each constantly applies a preselected degree of tension to the associated timing belt 312 or 313. The three-step pulley 302 is connected to a motor pulley 301 by a timing belt 310 and connected to the two-step pulley 306 by a timing belt 311. A spring 309 constantly pulls an idler 303 outward so as to apply a preselected degree of tension to the timing belt 311. The scanning unit 200 is affixed to the timing belts 312 and 313 at its rear end and front end, respectively, by clamps 315. In this configuration, the rotation of the scanner motor 106 is transferred to the timing belts 312 and 313 via the motor pulley 301.

Figure 16:
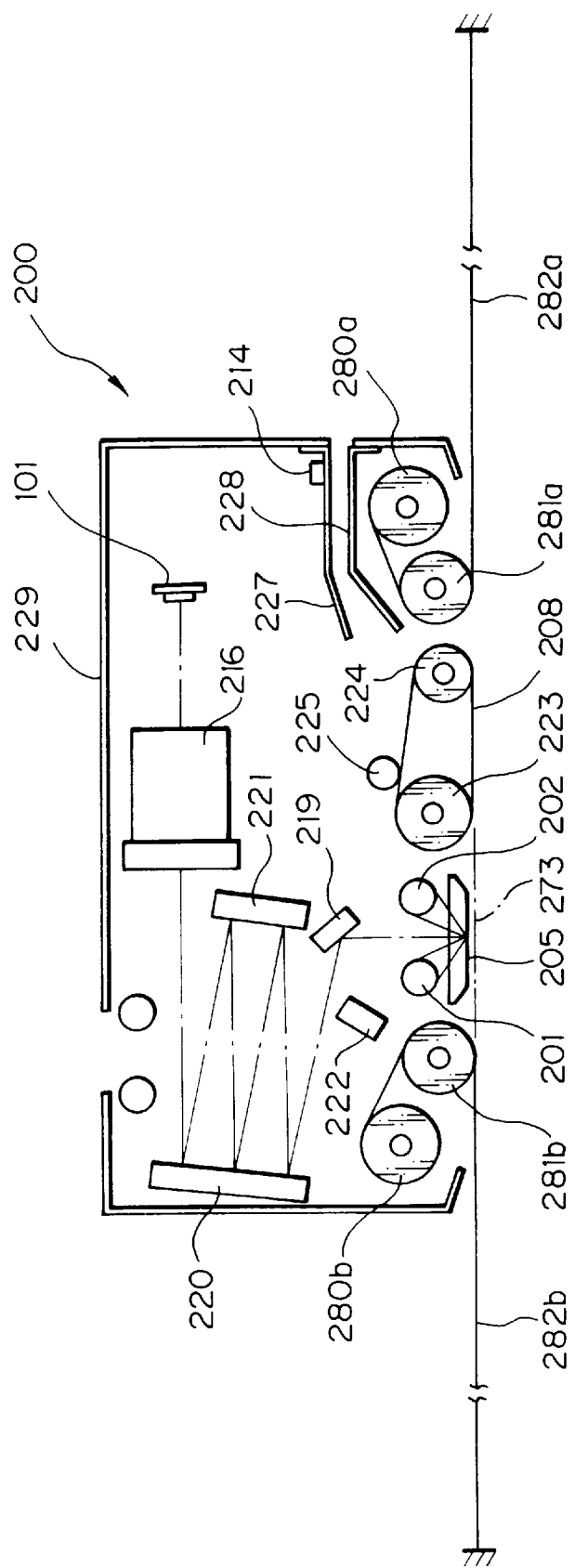
FIG. 16 is a section of the scanning unit.

FIG. 16 shows the construction of the scanning unit 200 in detail. As shown, press rollers 281a and 281b for pressing the book are respectively mounted on the bottom right and bottom left of the scanning unit 200. Take-up rollers 280a and 280b are positioned at the outside of the press rollers 281a and 281b, respectively, and freely rotatable about their own axes. Press sheets 282a and 282b are respectively affixed to opposite side walls of the scanner unit 30 at their outer ends, as illustrated. The inner end portions of the press sheets 282a and 282b are wound round the take-up rollers 280a and 280b, respectively.

Figure 17:
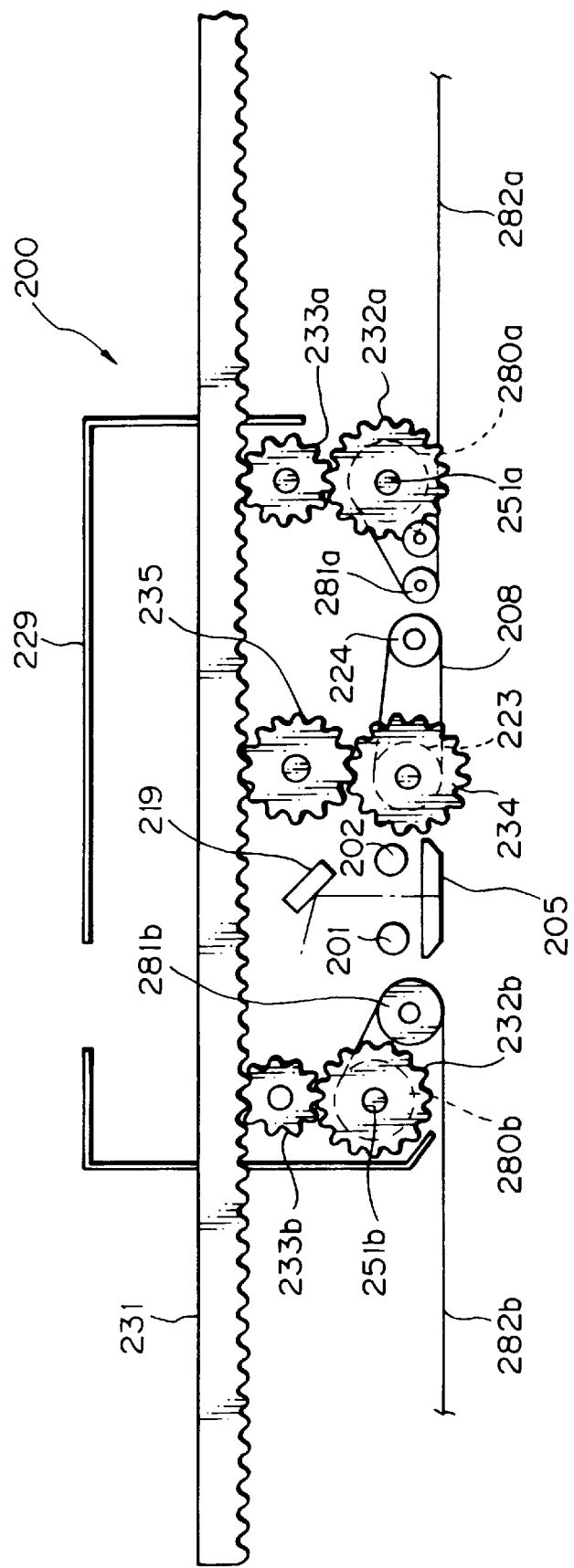
FIG. 17 is a side elevation showing a mechanism for driving a turn belt included in the scanning unit.

As shown in FIG. 17, the take-up rollers 280a and 280b are mounted on shafts 251a and 251b, respectively. Take-up gears 232a and 232b are affixed to the outer ends of the shafts 251a and 251b, respectively. A rack 231 is affixed to the side walls of the scanner unit 30 at both ends thereof and formed with teeth over substantially the entire length thereof. The take-up gears 232a and 232b are held in mesh with the rack 231 via idle gears 233a and 233b, respectively. In this condition, when the scanning unit 200 runs, the take-up gears 232a and 232b are caused to rotate together with the idle gears 233a and 233b, respectively. As a result, the press sheets 282a and 282b each is paid out or taken up via the associated shaft 251a or 251b, spiral spring, not shown, and take-up roller 280a or 280b. This maintains the tension acting on the two take-up rollers 280a and 280b substantially constant.

Referring again to FIG. 16, a glass platen 205 for reading the book and a turn belt 208 for turning over the pages of the book are positioned between the press rollers 281a and 281b. Two fluorescent lamps 201 and 202 are located inside of the glass platen 205 and respectively arranged at the right and left of the book reading section. While the lamps 201 and 202 illuminate the book, the resulting imagewise reflection is reflected by a first mirror 219, then reflected by a second and a third mirror 220 and 221 alternately, and then incident to a CCD (Charge Coupled Device) image sensor 101 via a lens 216 in a reduced size. The turn belt 208 is passed over a drive roller 223 and a turn roller 224. A charge roller 225 is held in contact with the upper run of the turn belt 208 at a position slightly spaced from the drive roller 224. A pair of page guides 227 and 228 and a page sensor 214 are positioned above the press roller 281a.

Figure 18:
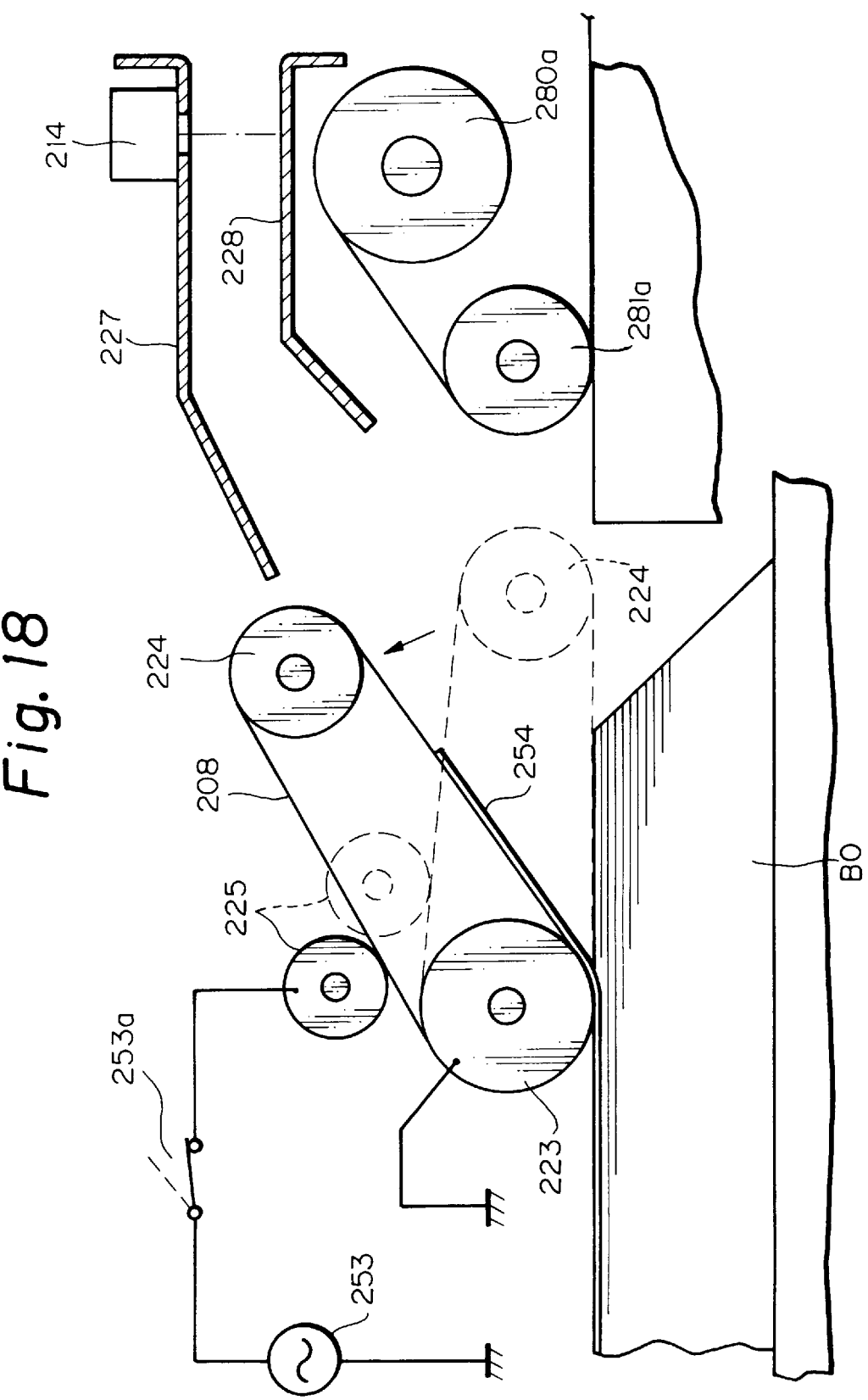
FIG. 18 is a fragmentary section of the scanning unit, demonstrating its page lifting operation.

How the page turning section of the scanning unit 200 operates will be described with reference to FIG. 18. In the illustrative embodiment, the turn belt 208 is formed of PET, PC, PVT or similar material. The turn belt 208 has a double layer structure consisting of a front layer or film whose resistance is as high as $10^{14}\Omega$ or above and a rear layer or film whose resistance is as low as $10^{8}\Omega$ or below. The drive roller 223 is made up of a metal roller connected to ground and conductive rubber covering the roller. With this configuration, the drive roller 223 insures the drive of the turn belt 208 and grounding. The charge roller 225 is implemented by a metal roller. An AC power source 253 applies a high voltage of ±2 kV to the charge roller 225 via a switch 253a at a preselected timing. While the scanning unit 200 is in movement with the turn belt 208 being driven, the switch 253a is turned on at a preselected timing which will be described. As a result, ±2 kV is applied from the AC power source 253 to the charge roller 225 via the switch 253a, producing an alternating electric field on the front of the turn belt 208. The resulting electrostatic attraction causes the top page 254 of the spread book contacting the turn belt 208 to adhere to the belt 208.

Figure 19:
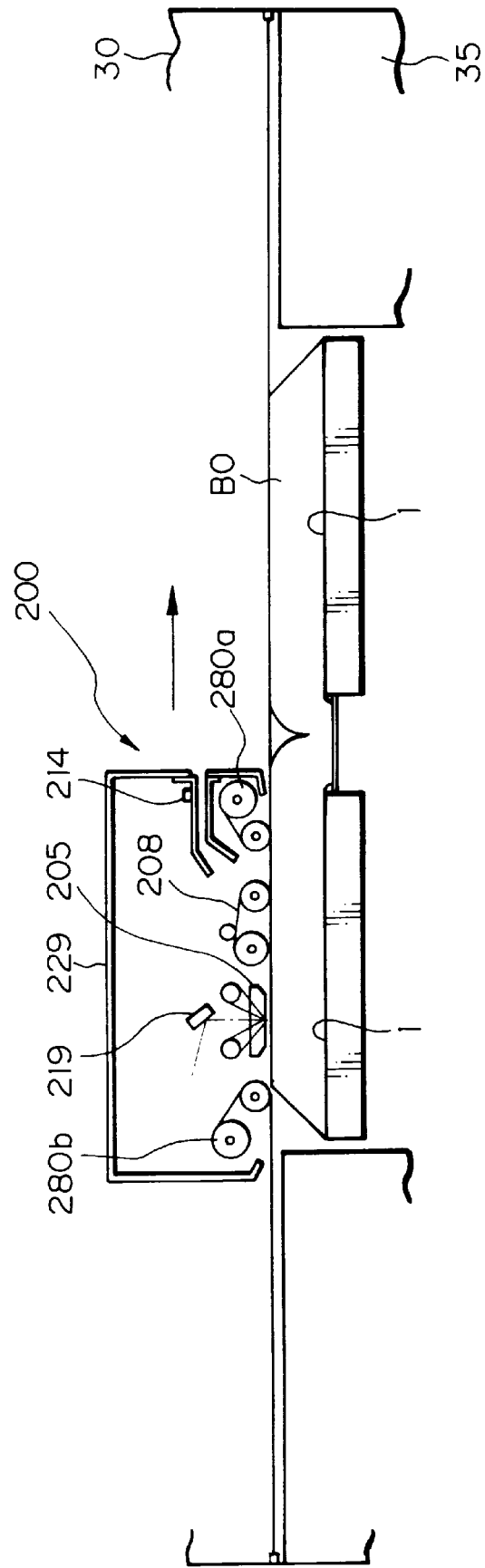
FIGS. 19–24 each shows the scanning unit in a particular position occurring during page turning mode operation.
Figure 20:
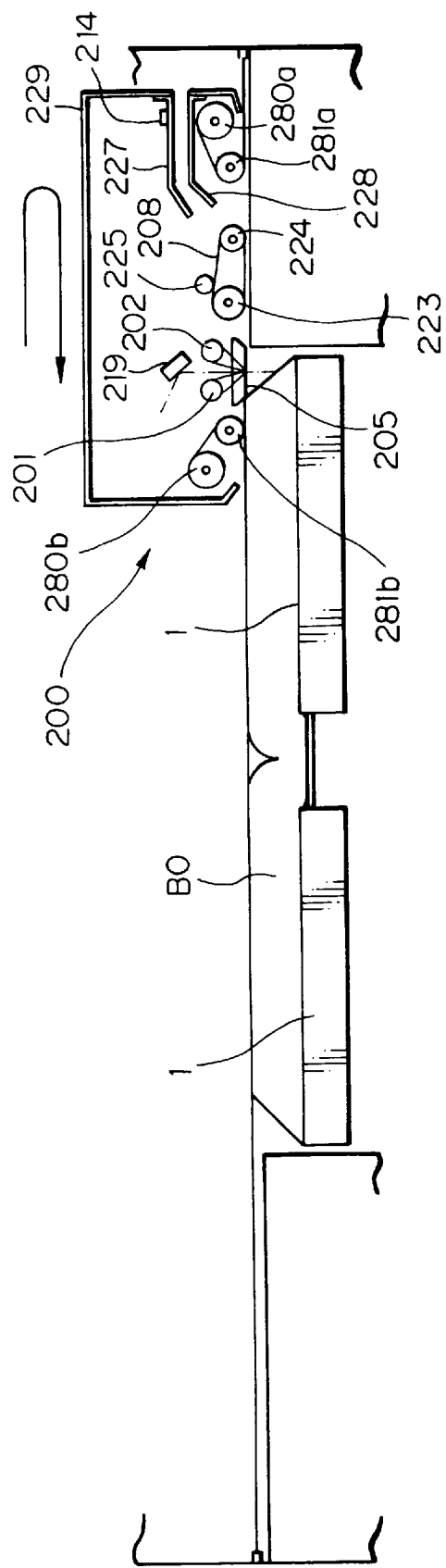

The scanning unit 200 held at the center of the spread book BO starts moving to the right, as viewed in FIG. 14, in response to a read start signal so as to optically read the edge of the right page of the book BO (prescanning). The position of the right page detected is memorized as position information relating to the first page turning. The scanning unit 200 completed the prescanning moves to the rightmost end of the apparatus and then starts moving to the left, as viewed in FIG. 14, toward its end home position defined at the left end of the apparatus. Subsequently, as shown in FIG. 19, the scanning unit 200 again starts moving to the right so as to read the left page and right page in this order. As shown in FIG. 20, on reading the right page, the scanning unit 200 moves in the opposite direction so as to start turning over the right page.

Figure 21:
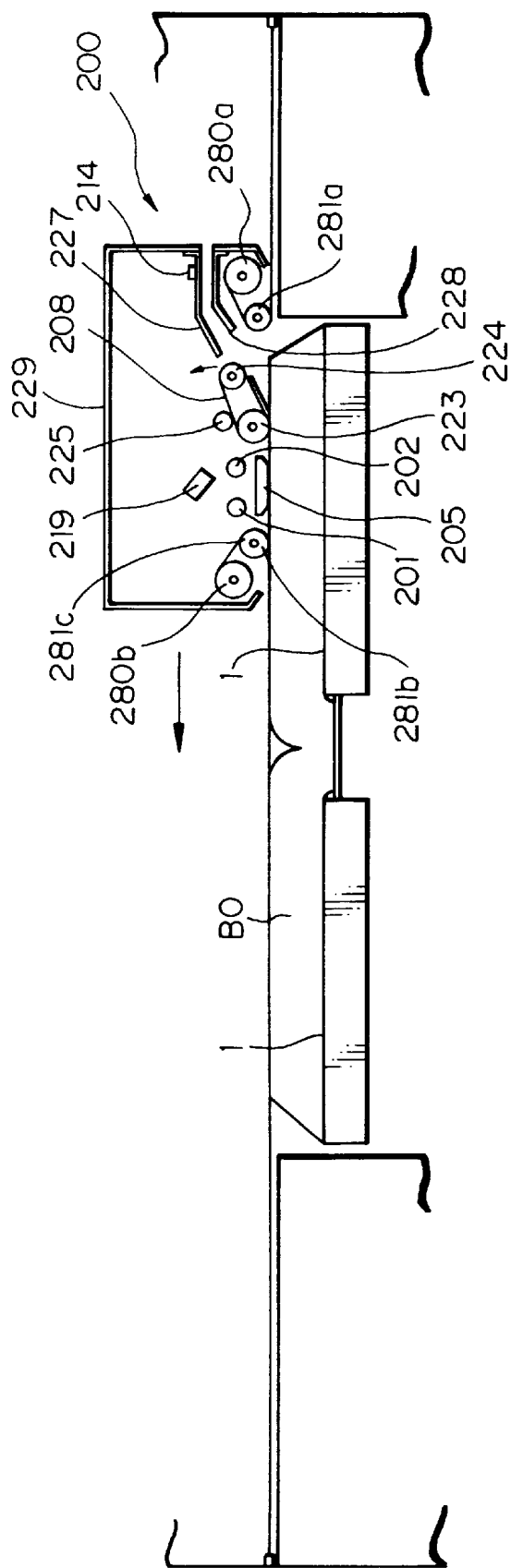

Before the scanning unit 200 starts turning over the right page, a charge pattern formed on the front of the turn belt 208 is caused to overly the top page 254 of the book BO. When the edge of the top page 254 moves over the center of the lower run of the turn belt 208, the belt 208 is lifted to a position indicated by a solid line in FIG. 18 by a solenoid (not shown), as shown in FIG. 21. As a result, only the top page 254 is cause to adhere to the front of the turn belt 208 by the electrostatic attraction of the partial electric field formed on the belt 208 by the charge pattern. Therefore, the edge of the top page 254 is lifted together with the turn belt 208. The attraction derived from the partial electric field prevents the pages underlying the top page 254 from adhering to the turn belt 208.

Figure 22:
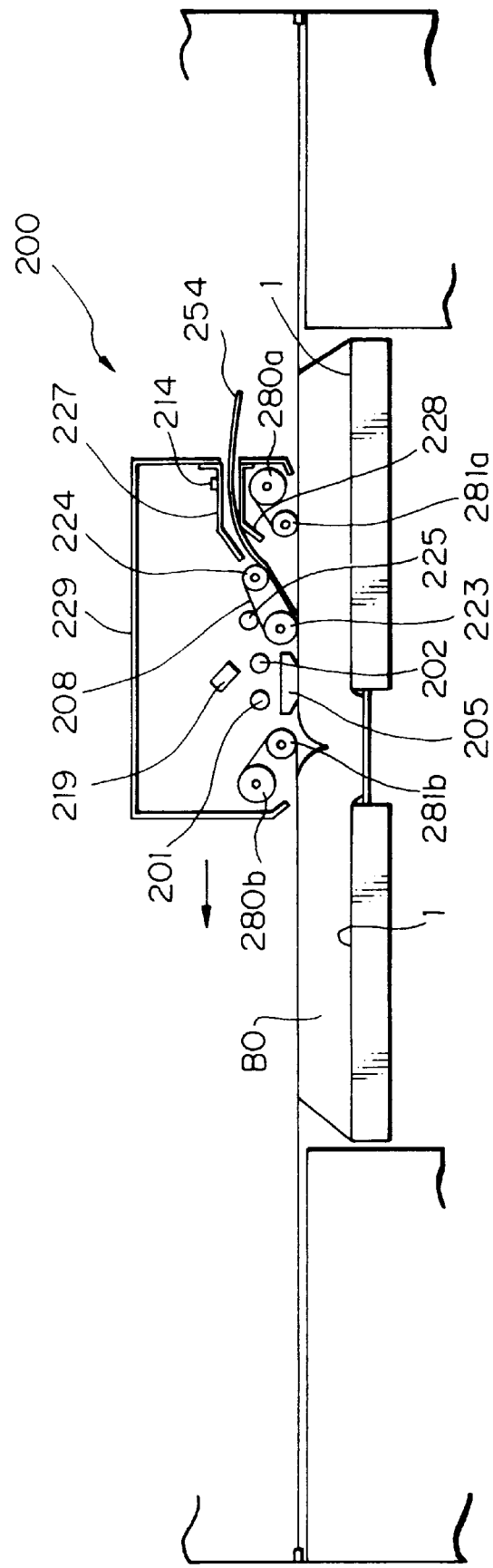

The scanning unit 200 runs toward its home position while lifting the top page 254, as shown in FIG. 21. As a result, as shown in FIG. 22, the top page 254 is surely conveyed with its right edge sequentially protruding to the outside of the scanning unit 200 via the page conveying path between the page guides 227 and 228, FIG. 16, positioned at the right end of the scanning unit 200. The page sensor 214 mounted on the upper page guide 227 senses the top page 254 protruding to the outside of the scanning unit 200, and shows that the top page 254 has been accurately lifted.

As stated above, the apparatus maintains the lifted page in a natural position, i.e., prevents it from being rolled or bent and therefore protects it from damage. Moreover, it is not necessary to arrange special means for accommodating the lifted page in the scanning unit 200, so that the scanning unit 200 can be reduced in size.

Figure 23:
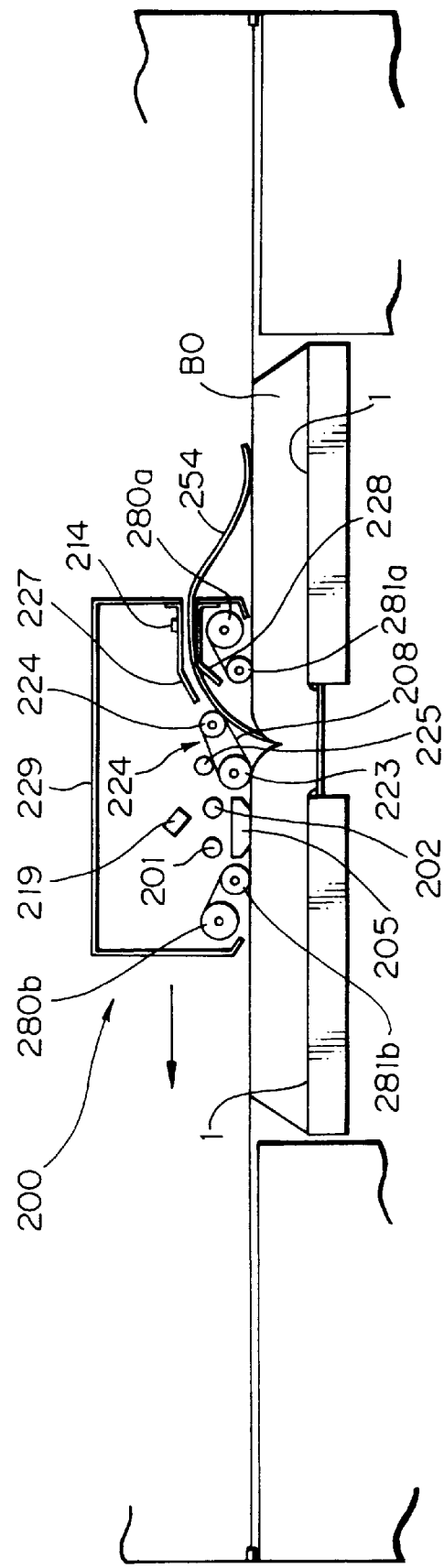
Figure 24:
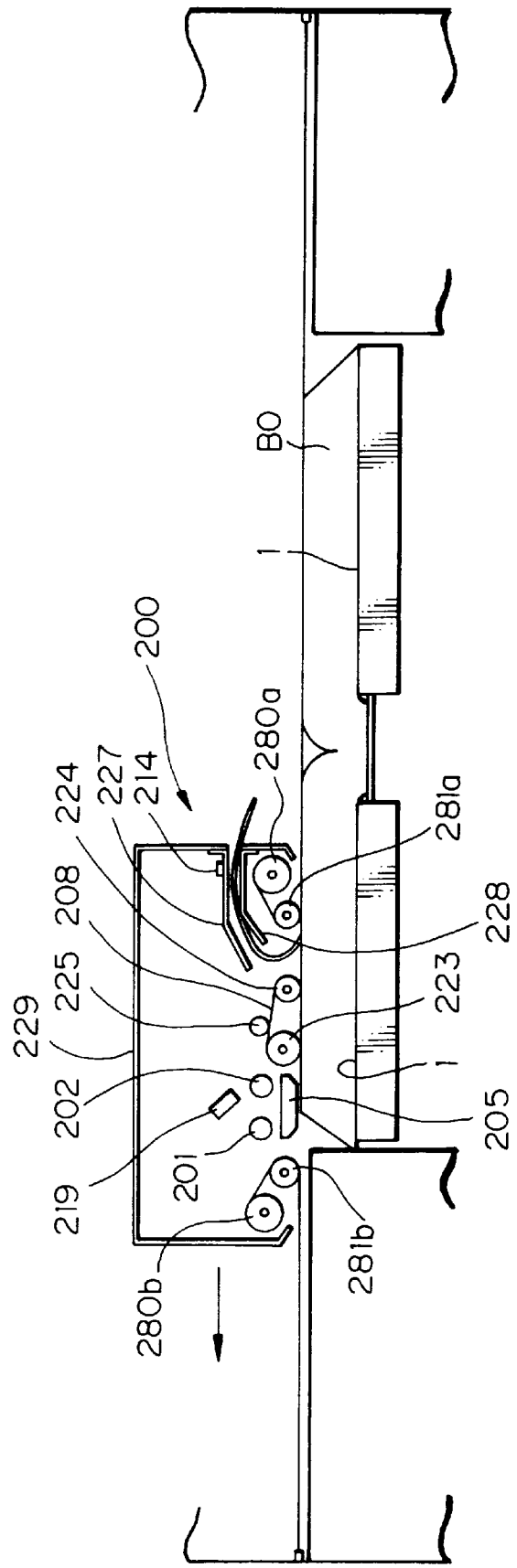

In the illustrative embodiment, the right edge of the page before turning can be calculated on the basis of the time when the page sensor 214 senses the right edge. The resulting value is used as the start position of the image read and the next page turning position. Subsequently, as shown in FIG. 23, after the scanning unit 200 has lifted the top page 254 up to the bound portion BOa of the spread book BO, the unit 200 further moves to the left toward its end home position. As a result, as shown in FIG. 24, the lifted top page 254 is pulled by the bound portion BOa and caused to return the path between the page guides 227 and 227. Consequently, the top page 254 is discharged from the scanning unit 200 while sequentially lying on the left page of the book BO. Because the page comes out of the page guides 227 and 228 in the same configuration at all times, it is possible to calculate a position for starting the next page reading on the basis of the time when the page sensor 214 senses the edge of the page being discharged.

Figure 25:
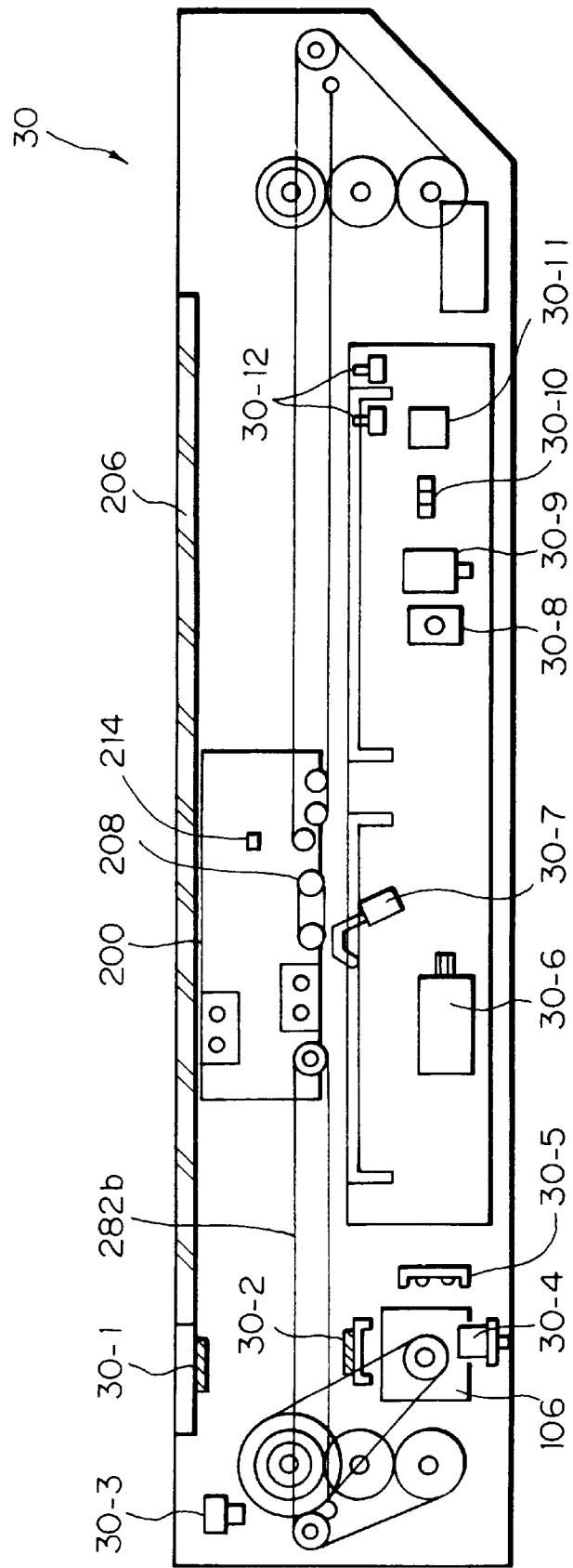
FIG. 25 shows the configuration of a carriage included in the TPS.

As shown in FIG. 25, the scanner unit 30 further includes reference white plates 30-1 and 30-2 assigned to a sheet and a book, respectively. An HP (Home Position) sensor 30-3 is responsive to the scanning unit 200 brought to its home position. A scanner open sensor 30-4 is responsive to the opening of the scanner 30. A heater 20-5 prevents dew condensation from occurring in the scanner 30. An elevation motor 30-6 causes the tables 1 to rise. A book set sensor 30-7 is responsive to a book set on the tables 1. A sensor 30-8 is responsive to a book set on a book tray. A lock solenoid 30-9 locks the book tray in position. A lower limit sensor 30-10 is responsive to the tables 1 lowered to their lower limit positions. A set solenoid 20-11 sets the book tray. Switches 30-12 are accessible for changing page turning conditions.

Another glass platen 206 is mounted on the top of the scanner unit 30. As shown in FIG. 14, to read a sheet laid on the glass platen 206, the sheet is set at a reference position defined by the right edge of a scale 207 positioned at the left-hand side of the glass platen 206. Therefore, the reference position differs from the read start position assigned to a book and minimizes the configuration. That is, when a sheet is positioned on the glass platen 206 at its edge, it begins to be read at the same position at all times and therefore simplifies control.

In a sheet mode for reading the sheet laid on the glass platen 206, the scanning unit 200 is moved from its center home position to the left and then stopped when sensed by an end HP sensor at an end home position. In this condition, the scanning unit 200 waits for the input of reading conditions and the operation of a start button. If desired, the scale 207 may be positioned at the right-hand side of the glass platen 206, i.e., at the side where the scanning unit 200 starts turning over the page of a book. In such a case, the scanning unit 200 may turn over the page of a book set on the tables 1 while reading the document laid on the glass platen 206.

In the above configuration, an optical path provided in the scanning unit 200 for reading a document is switched at the time of turning of the page. This allows the reading direction of the scanning unit 200 in the subscanning direction to be identical on both of the tables 1 and glass platen 206, thereby causing papers to be driven out in the same direction at the time of printing. Therefore, it is not necessary to reverse the memory.

Further, an arrangement may be made such that after the book BO and a sheet SO have been respectively set on the tables 1 and glass platen 206, the scanning unit 200 is moved from its end home position to read the book BO and then reads the sheet SO during its return while turning over the page of the book BO. In this case, even when the scanning unit 200 is reading and turning over the pages of the book BO, the operator may set the sheet SO on the glass platen 206 and input an interrupt mode. As a result, the scanning unit 200 can read both of the documents BO and SO without interrupting its operation for reading and turning the pages of the document BO. The image read out of the sheet SO is turned in the main scanning direction in a mirror fashion without regard to the position of the scale 207 and then written to the frame memory.

In the illustrative embodiment, a book and a sheet each is set on the tables 1 or the glass platen 206 in the front-and-rear direction at a reference position defined by the front side of the apparatus body. This facilitates the positioning of the book on the tables 1 and the sheet on the glass platen 206. In the illustrative embodiment, when the scanning unit 200 is to start operating, the output of the center HP sensor is again checked to see if the unit 200 is held at its center home position. In response to a start signal fed from the operation panel 99, the scanning unit 200 is moved to the left away from the center home position and then stopped at the end home position where the end HP sensor is located.

Figure 26:
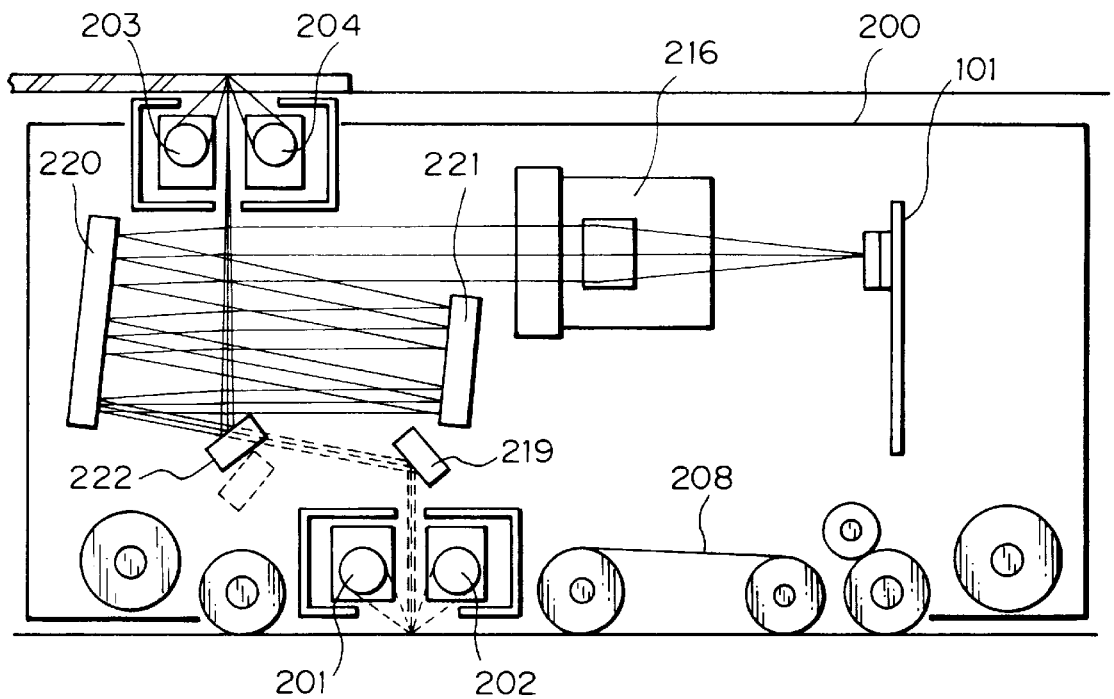
FIG. 26 shows the configuration of optics included in the TPS for reading a document.
Figure 27:
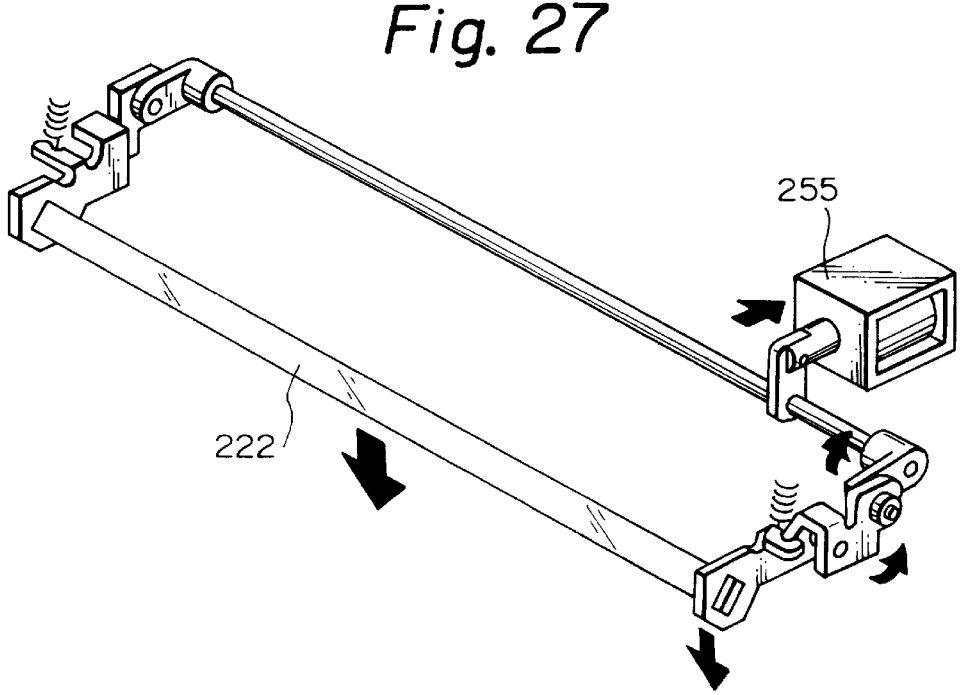
FIG. 27 is a perspective view showing a device for driving a retractable mirror included in the optics.

As shown in FIG. 16, a retractable or switching mirror 222 is usually retracted from the optical path of the scanning unit 200. As shown in FIG. 26, when a sheet laid on the glass platen 206 should be read, the mirror 222 is brought into the optical path of the scanning unit 200 by a solenoid 255 (see FIG. 27). Consequently, as shown in FIG. 26, the optical path between the first and second mirrors 219 and 220 is switched from the glass platen 205 side (phantom line) to the glass platen 206 side (solid line). In this condition, the image of the sheet laid on the glass platen 206 and illuminated by lamps 203 and 204 is reflected by the second and third mirrors 221 alternately and then incident to the image sensor 101 via the lens 216 in the same manner as the image of the book.

Figure 28:
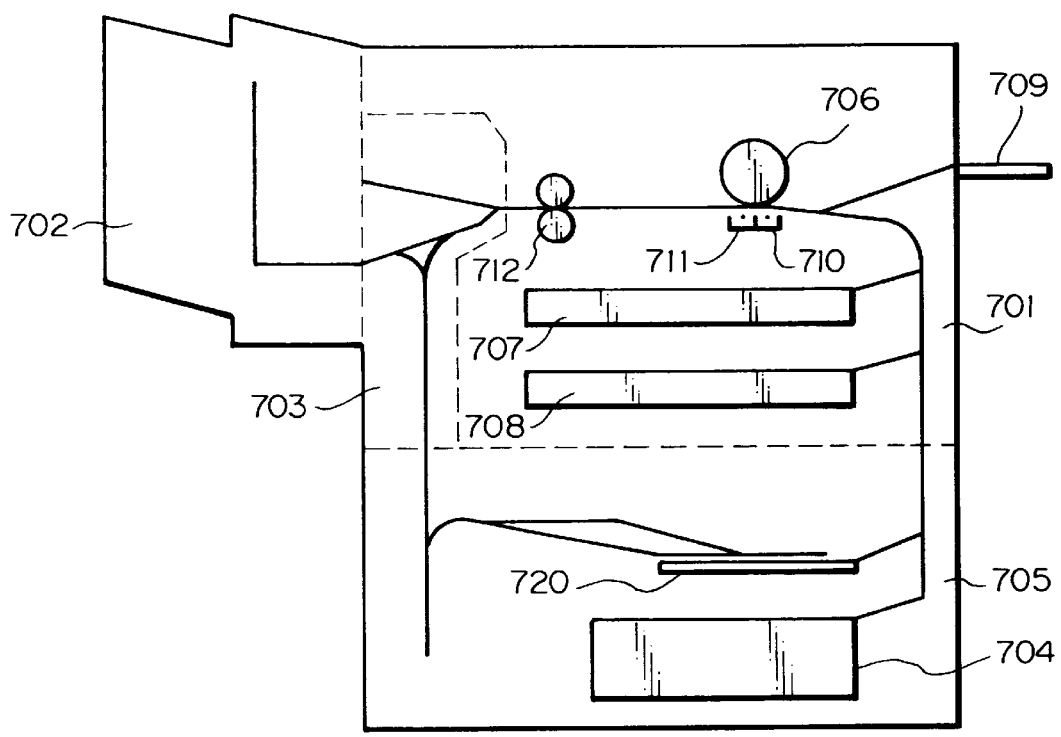
FIG. 28 shows the configuration of an image forming section included in the illustrative embodiment.

FIG. 28 shows the image forming section included in the illustrative embodiment. As shown, the image forming section includes a printer body 701 for feeding a paper from a paper tray 707 or 708, forming an image, and transferring it to the paper. A fixing unit 712 is disposed in the printer body 701. Peripherals associated with the printer body 701 include a manual feed tray 709, a sorter 702, and a paper turning unit 703. A bank 705 has a duplex copy unit 720 and a large capacity tray (LCT) 704 loaded with a great amount of papers. A toner image is formed on a photoconductive drum 706 by a sequence of charging, exposing and developing steps. The toner image is transferred to a paper by an image transfer unit 710. The paper with the toner image is separated from the drum 706 by a paper separation unit 711 and then driven out of the apparatus via the fixing unit 712. After the image transfer, the drum 706 is cleaned and prepared for the next image formation. A semiconductor laser LD optically scans the drum 706 in order to form a latent image in the form of a charge pattern.

The basic operation to be performed by the operator in the book mode is as follows.

(1) Selection of book mode: If the apparatus is held in the sheet mode, the operator presses the book key 99-2 in order to select the book mode.

(2) Copy mode setting: The operator selects either the separate page mode or the spread page mode, selects sorting, duplex copy, erasure, reference, page limitation, and face-up discharge, inputs the start page and end page or the total number of pages to be copied (essential) and the right page or the left page to be copied first, and then sets desired copying functions (magnification change, paper selection, character, photo, density, and number of copies to be produced.

(3) Book setting: The operator opens the book tray, sets a book on the tables 1 while positioning its bound portion at the left end and front end, press the right and left covers with a left presser and a right pressure, respectively, opens the book at the page to be copied first, and then closes the book tray. As a result, the tables 1 are raised in order to position the spread pages of the book flat.

(4) Copying: The operator presses the start key 99-41. The apparatus starts a copying operation and then ends it on copying the number of pages set while turning them over.

(5) Book removal: The operator presses the book tray set switch 30-8 in order to lower the tables 1, opens the book tray when allowed, pulls a release lever, releases the right and left covers, takes out the book, and then closes the book tray.

The book and sheet reading apparatus (TPS (Turn the Page Scanner) hereinafter) included in the illustrative embodiment performs the following operation (TPS mode).

(1) Read mode: In the book mode, the retractable mirror 222 is retracted, and the lower lamps 201 and 202 are turned on. After shading correction executed at the left home position, the scanning unit or carriage 200 is moved to the right in order to read the spread two pages at a time. The resulting image data are written to the frame memory. In the sheet mode, the mirror 222 is brought into the optical path, and upper lamps 203 and 204 are turned on. Then, after shading correction executed at the left home position, the scanning unit 200 is moved to the right in order to read a sheet. The resulting image data are also written to the frame memory.

(2) Return mode: In the book mode, the scanning unit 200 is moved to the left with the high bias applied thereto. The scanning unit 200 is brought to a stop when its turn roller reaches the right edge of bound documents, and then the turn roller is lifted. On the elapse of 0.5 second, the scanning unit 200 is moved to the left. The right edge and top edge of the spread book are detected on the basis of the image data output from the image sensor. These edges are used to calculate the first page attracting position and the valid image area in the main scanning direction. In the sheet mode, the scanning unit 200 is moved to the left (return).

(3) Homing mode: At the time of usual power-up, the tables 1 are lowered away from the scanning unit 200. Then, the scanning unit 200 is brought to its center home position.

(4) Prescanning mode: The scanning unit 200 is brought to its end or left home position and prepared for shading correction and image reading.

(5) Postscanning mode: After the return, the scanning unit 200 is brought to its center home position. Then, the tables 1 are lowered away from the carriage in order to allow the operator to take out a book.

Figure 29:
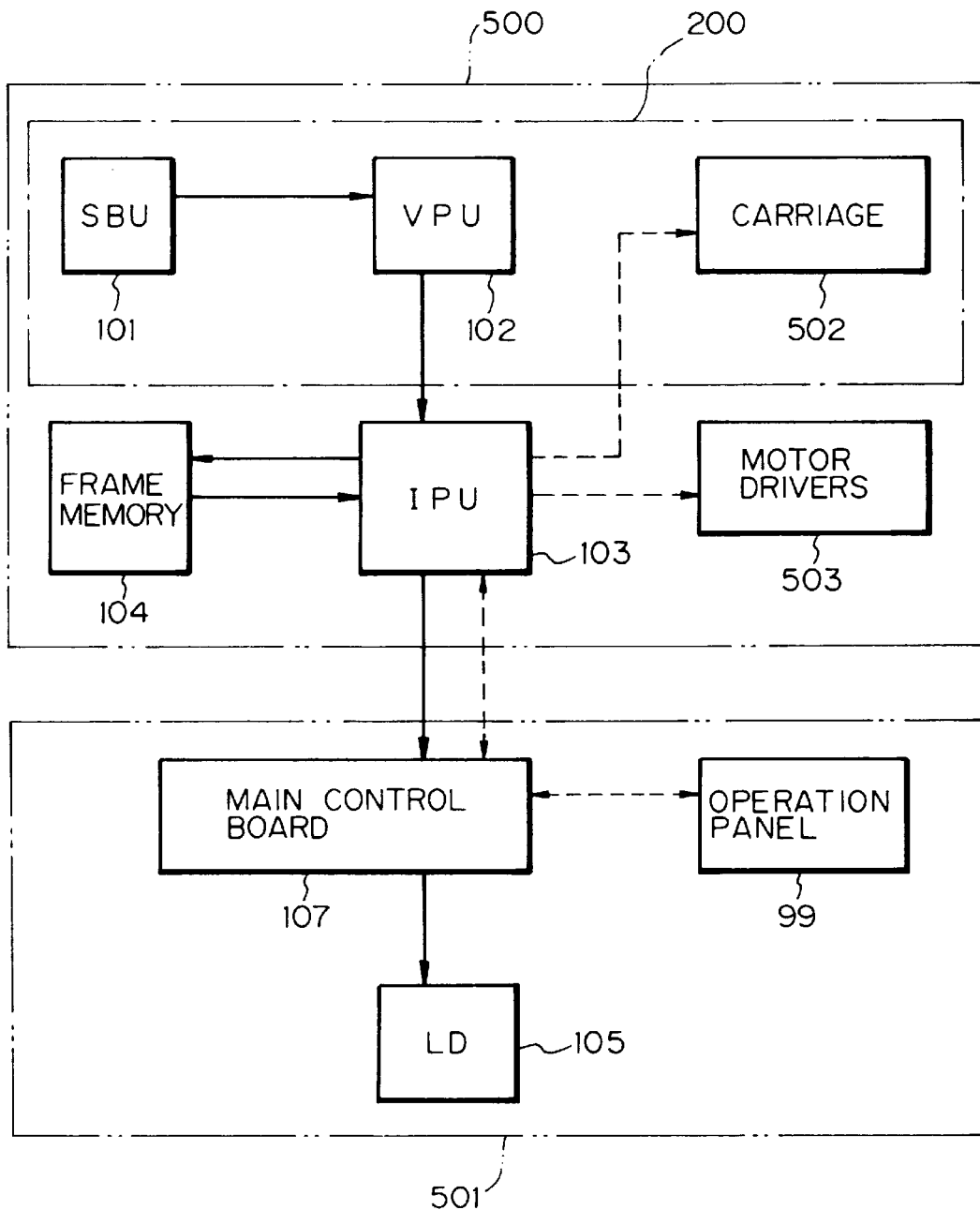
FIG. 29 is a block diagram schematically showing a system for causing an electrophotographic printer to output an image read by the TPS.

The TPS system will be described more specifically with reference to FIG. 29. The TPS system to be described outputs an image read by the TPS by use of an electrophotographic printer. As shown, the TPS system includes a scanner 500 for reading a document and a printer 501 for printing an image. The scanner 500 includes the scanning unit or carriage 200 capable of reading a book while turning over its pages. The scanning unit 200 has an SBC (Scanning Board Unit) 101 including a CCD image sensor, a VPU (Video Processing Unit) 102 for executing a procedure beginning with the processing of an analog image signal output from the SBU 101 and ending with analog-to-digital conversion, and a carriage 502 connecting signal lines between fluorescent lamps, an inverter power source associated with the lamps, a heater, a thermistor, a fan, a solenoid and other loads and a power source line. The carriage 502 and VPU 102 each is connected to an IPU 103 by a respective flexible cable.

The IPU 103 includes a frame memory 104 removably connected to the IPU 103 by a connector and implemented by a DRAM (Dynamic Random Access Memory) module for storing an image signal. A microcomputer included in the IPU 103 controls via motor drivers 503 various motors including a stepping motor for driving the scanning unit 200 and a DC motor for driving the tables 1, while receiving the outputs of various sensors. The printer 501 has a main control board 107 consisting of a main control section for controlling copy modes, receiving key inputs on the operation panel 99, and controlling display, and a sequence control section for controlling copy timings. Microcomputers included in the main and sequence control sections and operation panel 99 interchange commands by serial communication. The main control board 107 controls the image forming sequence by controlling the motors, solenoids and clutches while receiving the outputs of sensors relating image formation.

Figure 30:
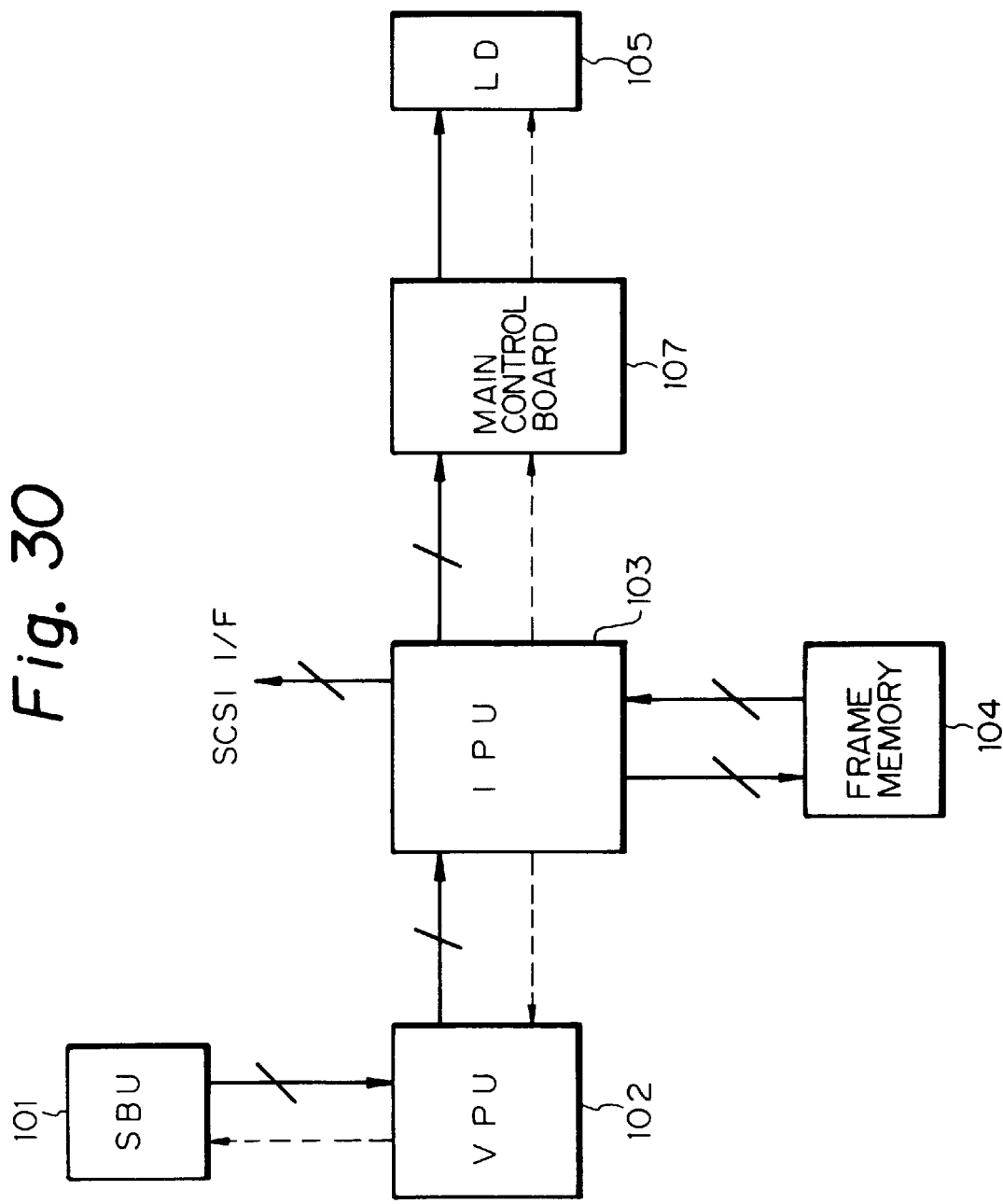
FIG. 30 is a block diagram associated with FIG. 29 and schematically showing the flow of data.

FIG. 30 shows the flow of data occurring when a document image read by the TPS is output by the printer. The system of FIG. 30 is generally made up of an image reading section included in the TPS, an image data processing section, and an image forming section. The SBU 101 is located at the right end of the scanning unit or carriage. In response to a reference signal output from the IPU 103, the VPU 102 generates a drive signal meant for the CCD image sensor and executes a procedure beginning with the correction of an analog data signal output from the image sensor and ending with analog-to-digital conversion. The VPU 102 feeds to the IPU 103 image data having eight bits for a dot and synchronous with a clock and a main scanning gate signal at a rate of about 7.5 MHz. The IPU 103 executes magnification change or similar editing with the input image data while executing electrophotographic high quality processing. The IPU 103 executes gamma correction and other tonality processing at its last processing stage and then transforms the image data to video data having four bits for a dot. The video data are written to the frame memory 104.

The above TPS reads both of a book and a sheet at a rate of 90 mm/sec, but an image is formed at a rate of 180 mm/sec. In light of this, the frame memory 104 capable of storing one page of size A3 is used for a buffering purpose. In a repeat copy mode, the image data written to the frame memory 104 should only be repeatedly read out. This protects a book despite that the TPS reads the document in contact therewith. Further, in a page continuous mode for printing the right and left pages of a spread book independently, images representative of the right and left pages and output by a single scanning can be divided via the frame memory 104. This makes it needless for the TPS to be synchronized to the image writing of the laser printer 501 or to repeat an approach run.

The frame memory 104 having a four bits per dot configuration is positioned after the IPU 103 and stores the image data processed by the IPU 103. This allows the capacity of the frame memory 104 to be halved for the image data having eight bits for a dot.

The frame memory or DRAM 104 has 128 megabits corresponding to one page of size A3 with respect to a resolution of 400 dpi (dots per inch). The IPU 103 inputs two dots of image data to the frame memory 104 in parallel and sequentially inputs such image data at a rate of about 3.8 MHz. The frame memory 104 also outputs two dots of image data in parallel and sequentially delivers such image data to the main control board 107 at a rate of about 7.5 MHz in synchronism with a clock and a main and a subscanning gate signal output from the IPU 103. Additionally included in the system is a general-purpose SCSI interface (I/F) for allowing the image data to be transferred to another system equipment, e.g., a printer or a work station.

The main control board 107 connects the image data output from the frame memory 104 at a high speed matching with the image forming speed of the printer, thereby outputting serial data whose rate is about 15 MHz. The main control board 107 further increases the rate of the serial data by use of a FIFO (First In First Out) memory so as to synchronize them to a write clock having a frequency of about 18 MHz. In addition, the main control board 107 executes PWM (Pulse Width Modulation) with the image data having four bits for a dot and thereby transforms them to emission time data. The emission time data or PWM data are sent to an LD controller assigned to an LD (Laser Diode) 105 in synchronism with the write clock. The LD controller including an LD driver causes the LD 105 to emit in accordance with the emission time data and scan the photoconductive element.

The IPU 103 controls the operation of the scanning unit 200 also. In the book mode, the IPU 103 causes the scanning unit or carriage 200 to read a book at a rate of 90 mm/sec while turning over the pages of the book. At the time of magnification change of from 71% to 141%, including zooming, the IPU 103 causes the scanning unit 200 to read a book or a sheet at a linear velocity 1.41 times to 0.71 time higher than the above speed. When the scanning unit 200 is returned to its start position or turns over the page of a book, the scanner motor or stepping motor 106 assigned to the scanner is driven at a rate of 227 mm/sec.

A circuit for detecting an image representative of the edge of a document is built in the IPU 103. The circuit detects such an image by sampling pixel data not subjected to magnification change in the main scanning direction. The start and end of edge detection are commanded by a microcomputer included in the IPU 103. The edge detection in the subscanning direction is controlled by the microcomputer on the basis of the position of the scanning unit 200. For the detection in the main scanning direction, the microcomputer references a pixel counter assigned to the main scanning direction. The microcomputer calculates the page attraction position and the image range in the main scanning direction on the basis of the detected positions.

Figure 31:
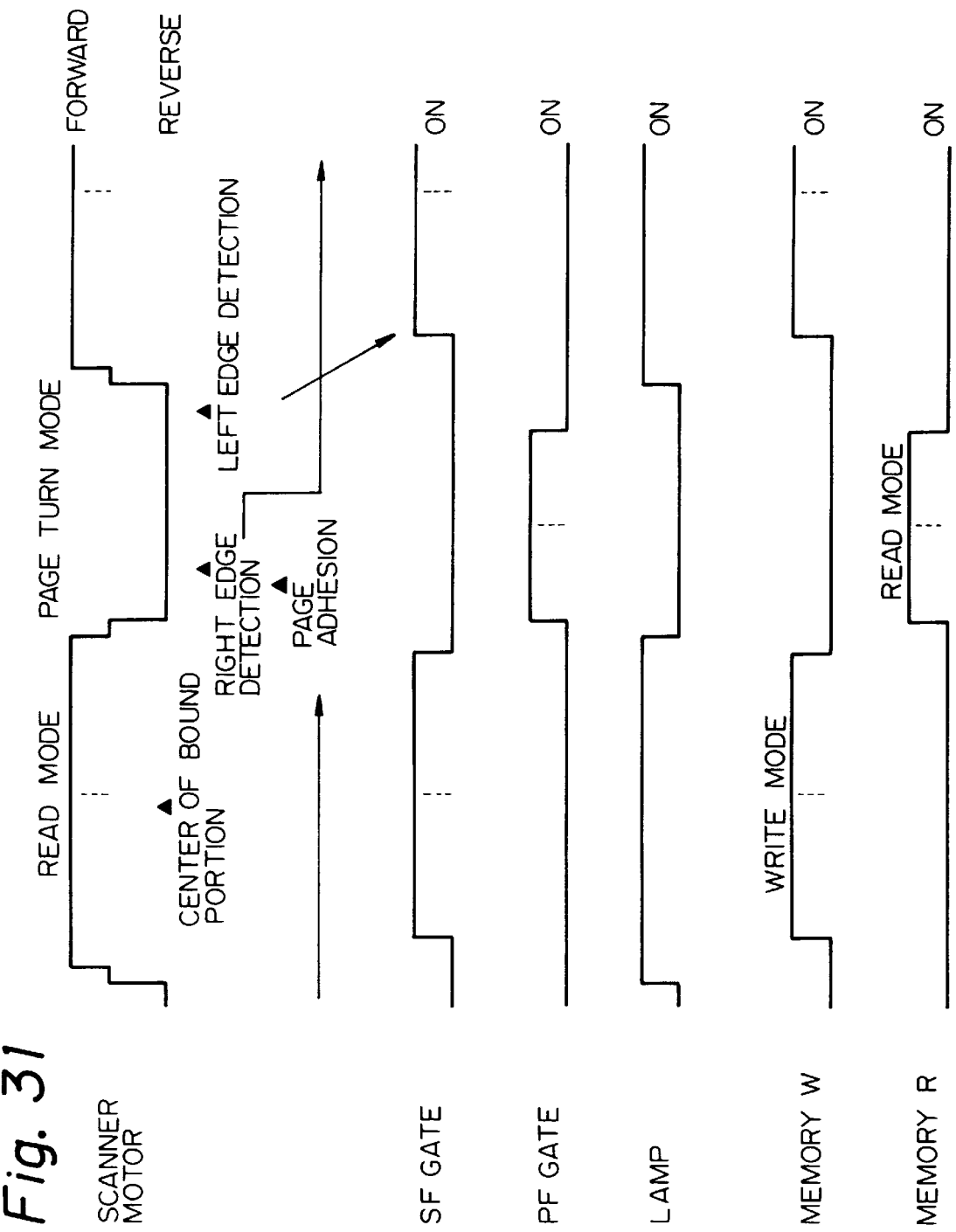
FIG. 31 is a timing chart demonstrating how the TPS operates in a spread page, one-to-one copy mode.
Figure 32:
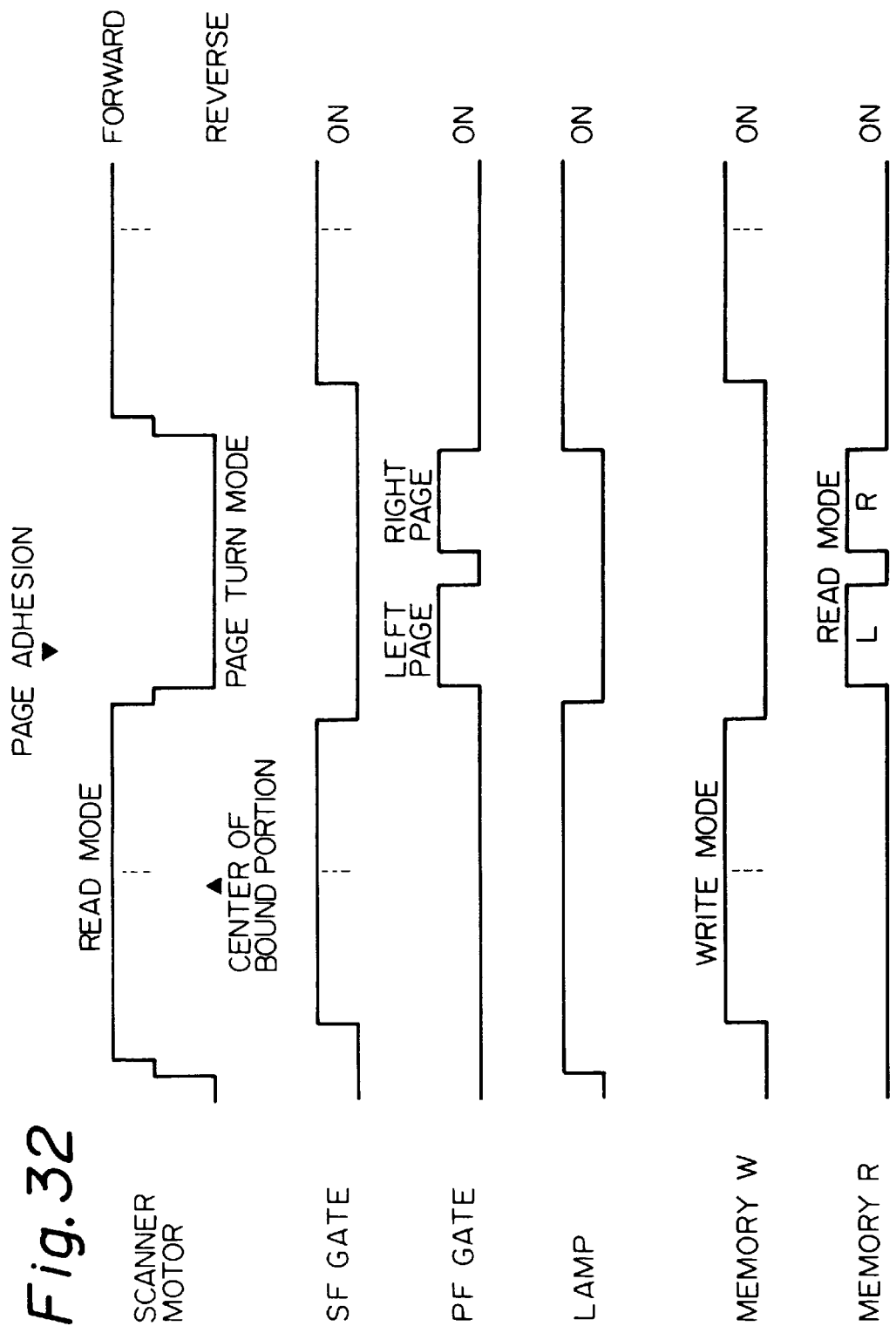
FIG. 32 is a timing chart demonstrating how the TPS operates in a separate page, one-to-one copy mode.

FIGS. 31 and 32 are timing charts each showing a specific operation of the apparatus to occur in the book mode. In the initial mode following the operation of the print key (start key 99-41), the edge of a book is detected on the basis of an image. In FIGS. 31 and 32, the edge of a book is detected on the basis of the received position of a page in the page conveying path while a continuous copy mode operation is under way. In each mode, the book has pages of size A4 and has its spread two pages read continuously by a single scanning of the carriage. As a result, image data corresponding to size A3 are written to the frame memory. Such data area read out of the frame memory in a manner matching with an output mode and printed on a paper.

Specifically, FIG. 31 shows a one-to-one copy mode for producing a single set of copies of a book. FIG. 32 shows a one-to-one mode for printing each of the right and left pages of a spread book on a respective paper of size A4 (separate page mode) and thereby producing a single set of copies of the book.

When the start key 99-41 on the operation panel 99 is turned on, the scanner motor 106 is driven in the forward direction in order to move the scanning unit 200 to the right (read start direction) from its center home position. As a result, an edge position for turning over the page for the first time is detected. Subsequently, at the timing shown in FIG. 16, the scanning unit or carriage 200 is moved toward its read start position defined at the left end at a high speed. When the scanning unit 200 reaches the read start position, the scanner motor 106 is driven in the forward direction while the lamps 201 and 202 are turned on. In this condition, the scanning unit 200 starts reading the spread book.

The microcomputer of the IPU 103 processes the edge and successive portions of the left page of the document as a document image, outputting a valid image range signal SFGATE in the subscanning direction. Also, the microcomputer operates a data write signal memory W included in the frame memory 104 with the valid image range signal FGATE so as to control the data writing range.

After the above scanning movement, the scanning unit 200 is returned while turning the page of the book. At first, image formation begins after a valid image range has been determined on the basis of the received and discharged positions of the page, as stated earlier. The second and successive image formation each begins just after the scanning unit 200 has fully scanned the above valid image range.

Specifically, when the scanning unit 200 turns over the page of the book, the positions of the spread two pages are calculated from the control addresses of the scanner motor 106 on the basis of the time when the page is inserted into the path between the page guides and the time when it is discharged from the path. Then, the center or bound portion of the spread book is calculated and used to, e.g., form the image read in the spread mode at the center of a paper.

A data read signal memory R also included in the frame memory 104 is operated by a valid image range signal PFGATE generated in the printer, so that the image is output in synchronism with the printer. The page sensor senses the edge of the page every time the scanning unit 200 turns over the page. By the above procedure, the spread pages of the book are sequentially read while being automatically turned over.

In the separate page mode operation shown in FIG. 32, a read mode occurs at the same timing as in FIG. 31. When the page of the book is turned over, the data read signal memory R is operated by two consecutive pulses PFGATE in synchronism with two consecutive papers. As a result, the two spread pages each is reproduced on the respective paper. As for the image data of the right page, an address counter associated with the frame memory 104 is masked by the signal PFGATE. Consequently, the image data contiguous with the first image of the left page are read out by the second pulse PFGATE at an interval equal to the interval between the papers.

The apparatus is operable stably with the system of the type attracting and separating the page of a book due to the displacement of a roller. The attracting position is important with this type of system because the system attracts only the edge of a page and lifts it to a page receiving portion. In the illustrative embodiment, when the page of a book is turned over, the page sensor senses the edge of the page. The position where the edge of the page should be attracted and separated is accurately determined, despite that the position of the edge varies due to the repeated page turning operation. That is, the edge of the page at the side where scanning ends is detected on the basis of data representative of a page received position, and a position to which the roller should be lifted for page turning is determined on the basis of the above edge. This allows the consecutive pages to be attracted and separated by a constant amount.

Figure 33:
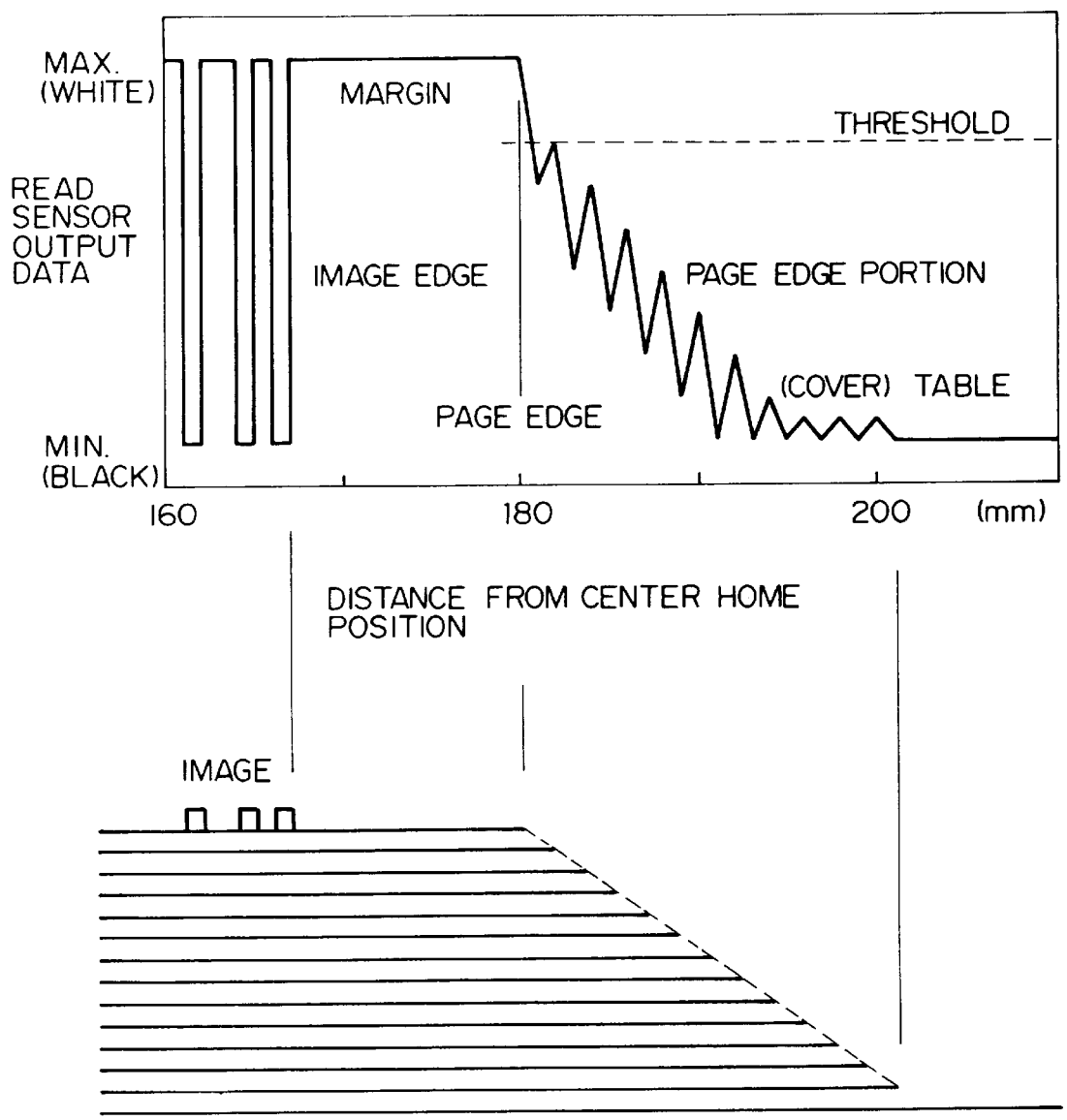
FIG. 33 shows data output from the TPS and representative of the edge portion of a spread book in the subscanning direction.

Reference will be made to FIG. 33 for describing how the illustrative embodiment detects the edge of a spread book in the subscanning direction. FIG. 33 shows specific data representative of the right edge of a spread book and sensed by the read sensor. In the case of a spread size of B4, the edge of the book is about 180 mm remote from the center set position or center home position in the subscanning direction. As shown, at the time of page turning following image reading, the read sensor senses the frame of the table first, then senses the margin or background of the top page which is generally 10 and some millimeters wide, and then senses an image. The data continuous in the subscanning direction are compared with a threshold value so as to detect the beginning of the margin. The beginning of the margin is determined to be the edge of the page.

Specifically, to detect the edge in the subscanning direction, changes in the output of a particular pixel of the read sensor is used. In the illustrative embodiment, the reference for positioning a book is defined at the front side and corresponds to the minimum document size. Therefore, a counter 300 and a data latch 301 shown in FIG. 34 sample the output of the 1,024th pixel of the read sensor which is 64 mm remote from the CCD reference on the front side of the apparatus. Upper four of eight bits of data output from the 1,024th pixel are compared with the threshold value by a digital comparator 302. The threshold value is set by a microcomputer. D flip-flops (F/Fs) 303 and 304 delay the output of the digital comparator 302. When the output of the above particular pixel exceeds the threshold value three consecutive times in the subscanning direction, an AND gate 305 outputs a detection signal and feeds it to a controller.

The reading operation for the detection of the edge begins at the black portion of the table or the frame of the table located at the right end in the scanning direction. The controller cancels a reset signal at the beginning of the detection. After a stripe pattern representative of the edges of the cover and consecutive pages and continuous in the main scanning direction has been detected, image information on the right page are detected at random from the right to the left. Books in general have white background and have no images in their margins extending over 10 and some millimeters from the edges. In light of this, the position where even white color exceeding the threshold value appears is determined to be the beginning of a margin. To enhance accurate detection, a plurality of sensor outputs may be used in the main scanning direction. Of course, the number of consecutive outputs of the particular pixel is not limited to three. The threshold value may be varied in matching relation to the system or the kind of documents.

By the above procedure, the edge of the specific book shown in FIG. 33 is determined to be 180 mm remote from the home position.

The edge of an image depends on the size of a spread book set with its center or bound portion used as a reference. Further, the position of the page differs from one page to another page, and the length of the page depends on the bound portion. In the illustrative embodiment, the edge in the subscanning direction is derived from the calculated page attracting position. Alternatively, the left edge of the left page may also be detected from the left portion of the table during reading. The edge in the subscanning direction is used to determine a valid image range in the subscanning direction. At the time of copying, for example, the above edge is used to bring an image into registration on a paper. Further, with the edge detection, it is possible to erase images outside of the valid image range and thereby eliminate wasteful solid black images. In addition, when the embodiments applied to, e.g., a file system, it is possible to reduce the amount of data and thereby save the capacity of a memory.

Figure 35:
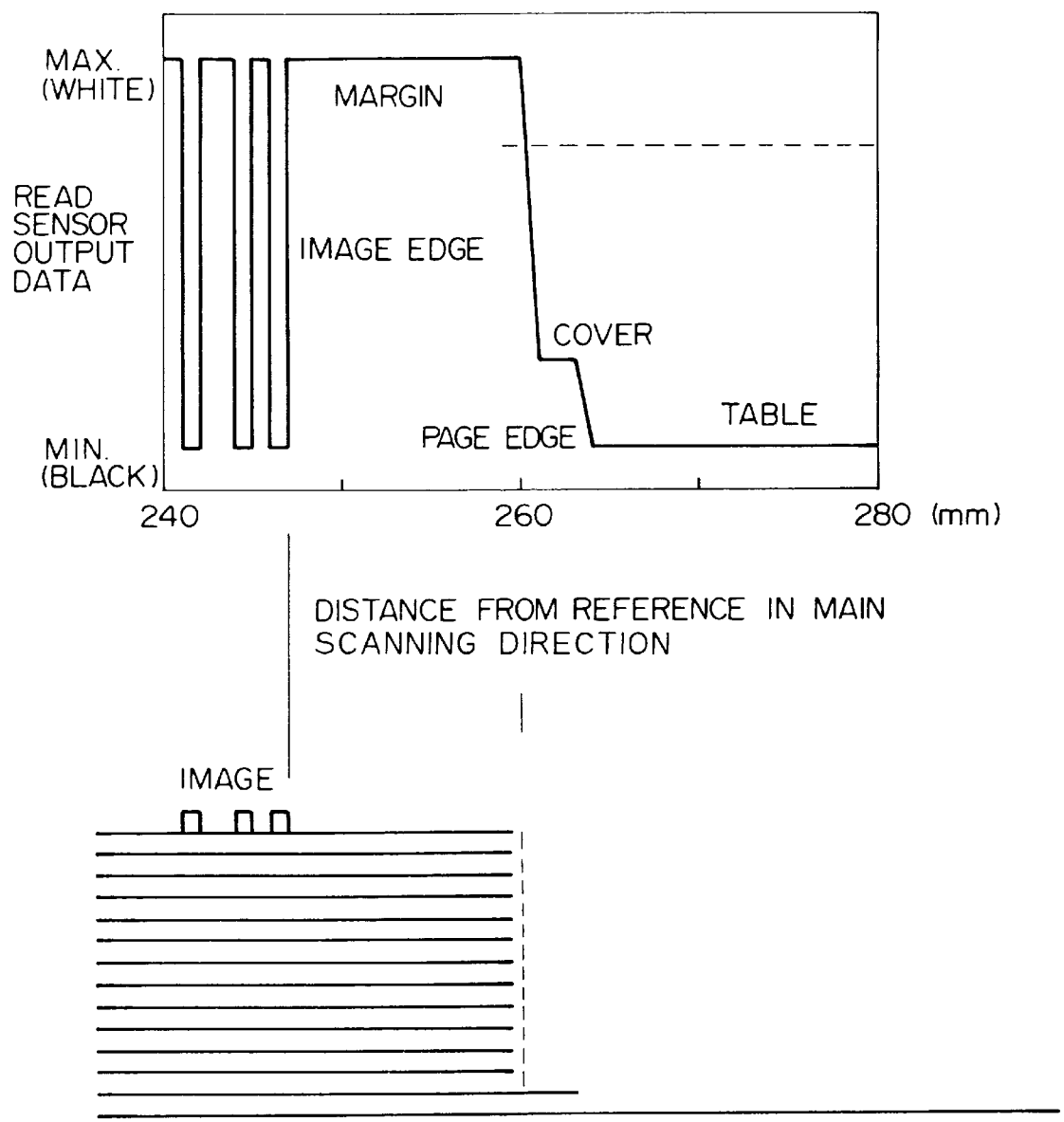
FIG. 35 shows data output from the TPS and representative of the edge portion of a spread book in the main scanning direction.

How the apparatus detects the edge of a spread book in the main scanning direction is as follows. FIG. 35 shows data output from the read sensor and representative of the top edge of a spread book. In the case of a spread size of B4, the edge is about 270 mm remote from the front reference position in the main scanning direction. When the scanning unit performed image reading is brought to a stop for attracting and lifting the page of a spread document, the read sensor starts detecting the edge of the document from the frame of the table toward the front side of the apparatus. The read sensor therefore reads the black frame of the table first and then reads the black table. As for a certain kind of book, the read sensor reads the inside of the right portion of a cover, then reads the background or black portion of the top page generally extending over a width of 10 and several millimeters, and then detects an image. The resulting data continuous in the main scanning direction are compared with a threshold value in order to detect the beginning of a margin.

Figure 36:
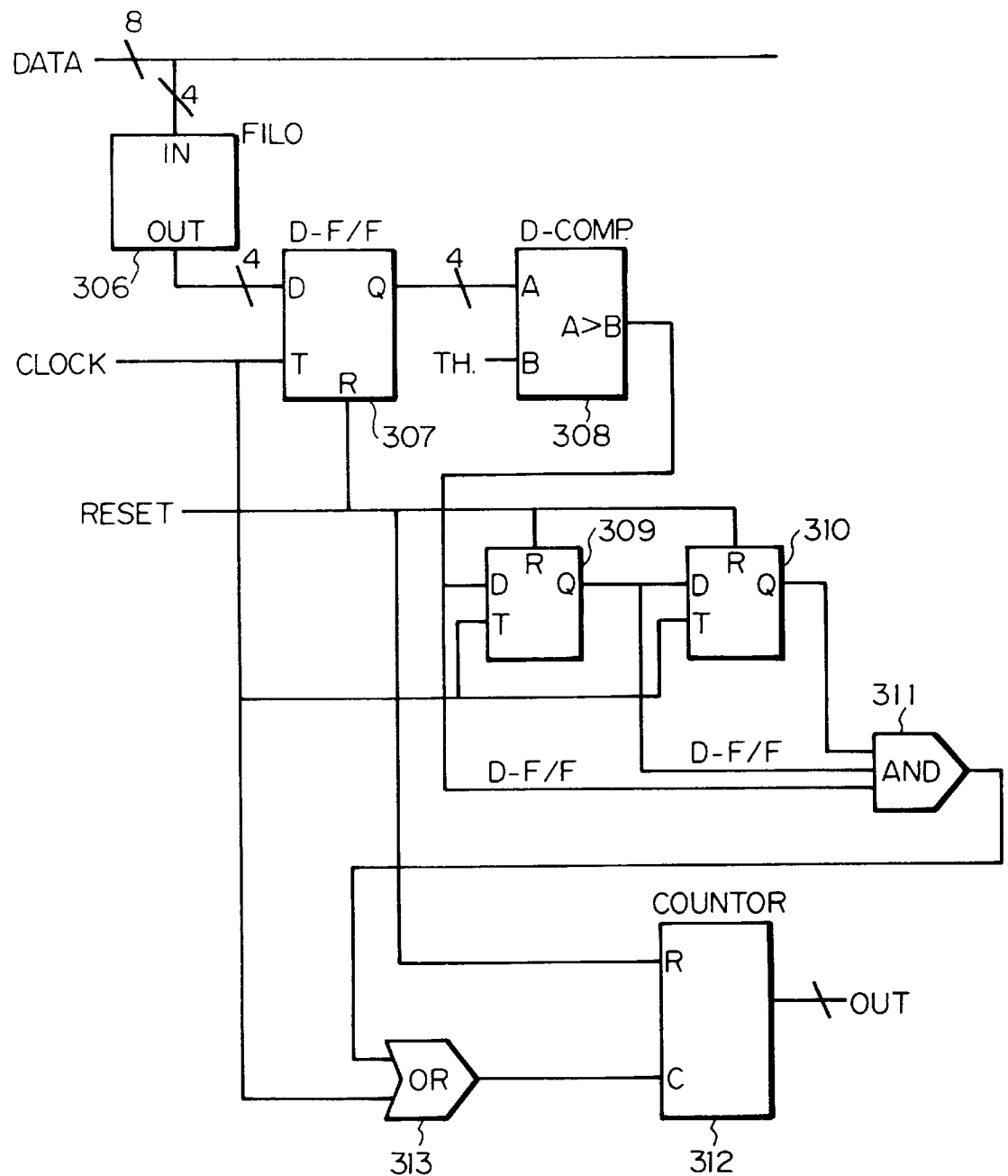
FIG. 36 shows a circuit included in the TPS for detecting the edge of a spread book in the main scanning direction.

The above detection of the edge in the main scanning direction is implemented by a circuit shown in FIG. 36 and responsive to a change in one line of data output from the read sensor in the main scanning direction. As shown in FIG. 37A, a spread book is positioned on the tables with the right end of its bound portion aligning with the reference position in the subscanning direction. Because the reference position in the main scanning direction is defined at the front side, and because the read sensor starts reading at the rear side, certain data in the main scanning direction are rearranged in the reverse order by a FILO (First In Last Out) memory 306. A data latch 307 samples the data every main scanning line. Upper four of the resulting eight bits of data are compared with a threshold value by a digital comparator 308. The threshold value is set by a controller. D-F/Fs 309 and 310 delay the output of the digital comparator 308. When the output of the particular pixel of the read sensor exceeds the threshold value three consecutive times in the main scanning direction, an AND gate 311 outputs a detection signal. In response, an OR gate 313 masks and stops a counter 312 which counts the pixels in the main scanning direction, and the count of the counter 312 is sent to the controller.

The read sensor detects the edge by sequentially reading the black table or the frame thereof located at the rear side and the spread book, thereby detecting the background of the page. The detection is effected when the scanning unit is held in a halt for page attraction, i.e., when the controller does not control scanning and has a sufficient processing time. At the time of detection, the controller cancels a reset signal.

The edge in the main scanning direction is used to determine a valid image range in the main direction. At the time of copying, for example, the above edge is used to automatically erase images outside of the valid image range and thereby eliminate wasteful solid black images. In addition, when the embodiments applied to, e.g., a file system, it is possible to reduce the amount of data and thereby save the capacity of a memory.

Figure 34:
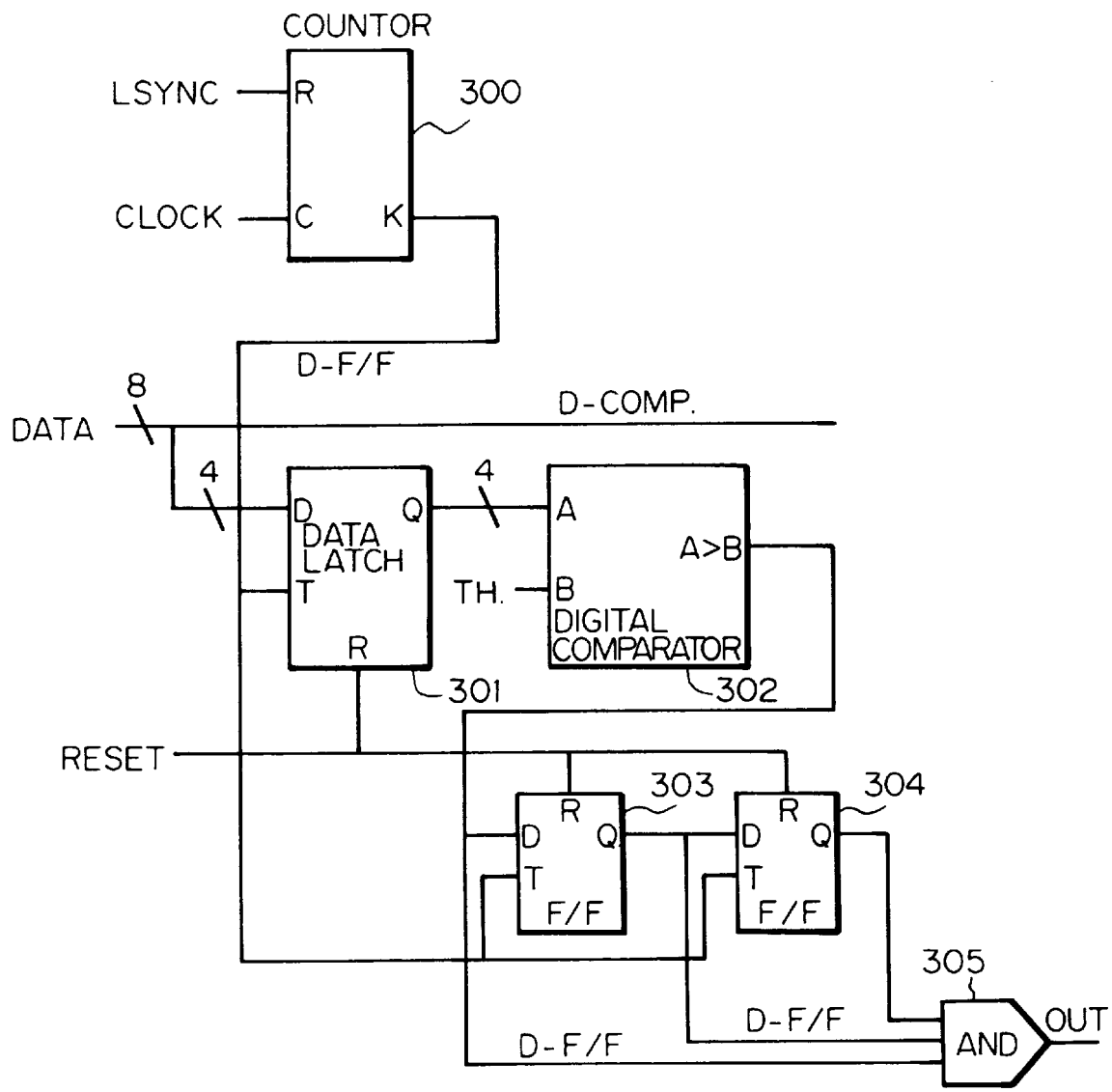
FIG. 34 shows a circuit included in the TPS for detecting the edge of a spread book in the subscanning direction.

As stated above, in the illustrative embodiment, the circuits shown in FIGS. 34 and 36 are used to detect the edges of a page on the basis of an image read. Alternatively, the image data may be fed to a CPU (Central Processing Unit) which controls the IPU, and compared with threshold values in order to eliminate the need for hardware cost. Again, to enhance accurate detection, there may be used data of a plurality of pixels, or the threshold value may be varied.

A procedure for detecting the edge of a spread book in the subscanning direction by use of the page sensor will be described hereinafter. After the first page turning, the edge of the top page is calculated accurately and stably by use of the page sensor (transmission type) located on the page conveying path. In the illustrative embodiment, because the front and rear covers of a spread book are affixed to the tables, the book is displaced little. Further, the displacement of the book ascribable to page turning is rare.

Figure 38:
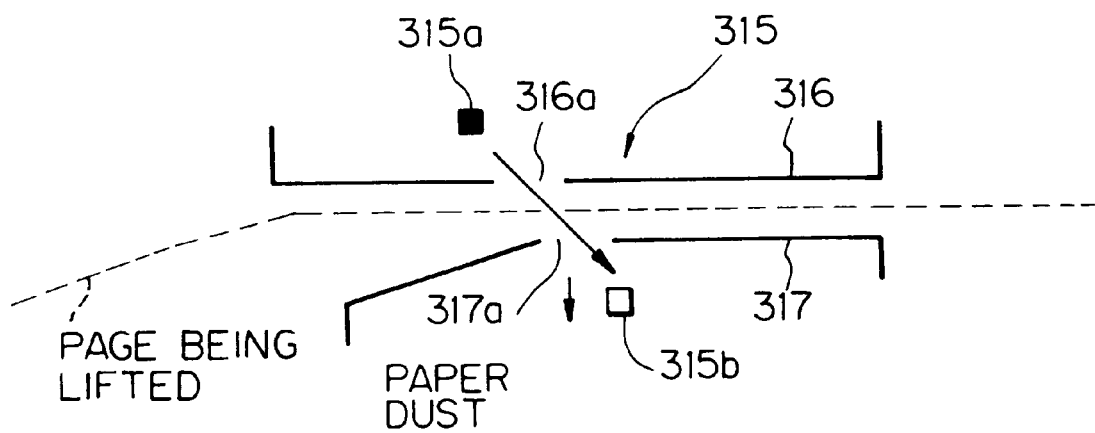
FIG. 38 is a section showing the configuration of a transmission type page sensor included in the TPS.

Specifically, as shown in FIG. 38, a transmission type page sensor 315 is made up of an LED 315*a* and a photodiode 315*b* respectively mounted on an upper page guide 316 and a lower page guide 317. The page guides 316 and 317 are respectively formed with holes 316*a* and 317*a*. The LED 315*a* and photodiode 315*b* face each other via the holes 316*a* and 317*a* obliquely with respect to the perpendicular direction. In this condition, paper dust ascribable to the pages sequentially received between the page guides 316 and 317 drop and do not deposit on the page sensor 315. Because one page is detected after it has been separated, the page sensor 315 is operable with any kind of document and has detection accuracy as high as 1 mm or less in terms of scattering. The page sensor 315 is also used to detect a page jam, i.e., a page failed to enter or come out of the path between the page guides 316 and 317.

The scanning unit 200 shown in FIG. 14 reads the spread book BO and then moves to the left in order to turn over the page of the book BO. After the edge of the right page of the book BO has adhered to the turn belt 208 and the scanning unit 200 has been brought to a stop, the turn belt 208 is lifted to bring the above page to the page conveying path. Subsequently, the scanning unit 200 moves further to the left while causing the lifted page to enter the page conveying path and protrude to the outside of the scanning unit 200, as stated earlier. The locus of the lifted page extends along the lifted turn belt 208 and remains substantially constant and is determined by a mechanical layout. The page sensor 315 is positioned in the vicinity of the inlet of the page receiving portion or page conveying path. The microcomputer of the IPU 103 calculates the position where the right edge of the page has been positioned before lifting, on the basis of the time when the page sensor 315 starts sensing the above page.

Therefore, by detecting the edge of the page separated from the underlying page, it is possible to determine the edge of the page in the page turning direction (right edge in the illustrative embodiment) surely and accurately. Because the trailing edge of the valid image area of the book BO and the entire book BO displace little during page turning, the next page turning position can be calculated and corrected.

Control over the page attracting position and using the result of the above calculation is as follows. In the illustrative embodiment, the right edge of the page is adhered to the turn belt 208 over a width of about 40 mm and lifted thereby. When the turned page of the book BO is received in the page receiving section at a time earlier than expected one, the width over which the turned page is adhered to the turn belt 208 is greater than 40 mm. In this case, the time when the edge of the page in the turn start direction should be adhered to and lifted by the turn belt 208 is shifted to the advancing side. For example, when the turned page is sensed 2 mm earlier in terms of a distance, the adhesion width is presumably 42 mm. Therefore, the next page attracting position will be shifted by 2 mm to the right in terms of the address of the scanning unit 200.

On the other hand, when the lifted page of the book BO is received in the page receiving section at a timer later than the expected time, the width of adhesion of the page is smaller than 40 mm. In such a case, the time when the edge of the page in the turn start direction should be adhered to and lifted by the turn belt 208 is shifted to the delaying side. As a result, the adhesion width is maintained constant and obviates the failure of page turning or the simultaneous turning of two or more pages which would damage the book BO.

After the lifted page of the book BO has been fully received in the page receiving portion, the scanning unit 200 moves further to the left. As a result, the page is pulled by the bound portion of the book BO and sequentially discharged from the page conveying path along a generally U-shaped focus. This locus also remains constant along the page conveying path and press roller 281a. The microcomputer of the IPU 103 calculates from the output of the page sensor 315 a right edge position where the turned page should get on the left page, on the basis of the time when the page sensor 315 senses the beginning of the discharge of the turned page from the page receiving section.

The valid image range between the right edge and the left edge of the book BO calculated by the above procedure has a start address A and an end address B. The center between the two addresses A and B coincides with the bound portion of the spread two pages. Therefore, the microcomputer of the IPU 103 calculates an address C representative of the bound portion, as follows:

$$C=(A+B)/2$$

At the time of copying, the address C gives a reference position for dividing the two spread pages read at a time. Because the image corresponding to the center or bound portion of the spread book BO is often shadowed or distorted, the microcomputer of the IPU 103 surely erases such an image. Further, in the separate page mode, the microcomputer of the IPU 103 brings the right page into registration by using the address C.

As stated above, although the position of the top page of the spread book varies due to repeated page turning, a displacement caused by one page is extremely small. This, coupled with the fact that a displacement after ten pages have been turned over is less than 1 mm inclusive, a reproduced image (registration) deviates little. It follows that the calculation of the page attracting position should only be effected once for a plurality of times of page turning, e.g., for ten consecutive pages so as to update the data. This successfully reduces the calculations and period of time which the scanning unit 200 needs for detecting the edge of the book BO.

Figure 39:
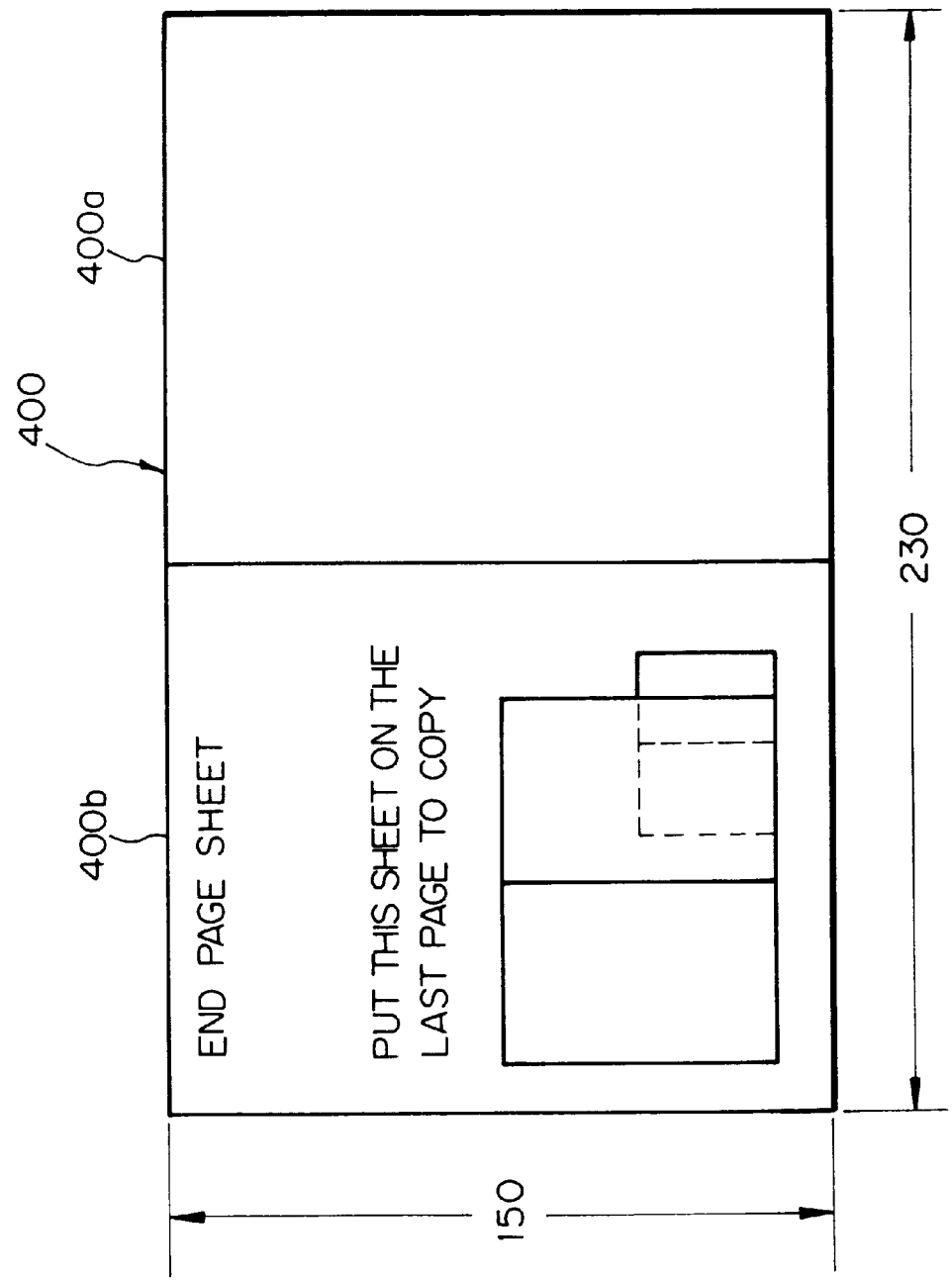
FIG. 39 is a plan view showing the end sheet.

Now, the end sheet for designating the last page to be read or printed will be described. As shown in FIG. 39, the end sheet, labeled 400, is formed of resin and sized 150 mm vertically and 230 mm horizontally, i.e., slightly smaller than size of A5. The end sheet 400 is as elastic as paper and can freely bend together with the pages of a book. The end sheet 400 has a black solid area 400a on its right side and is inserted between pages such that the solid area 400a protrudes from the pages. Assuming a book of size A4 which is the maximum page size, the horizontal size of a page is 210 mm. Therefore, the end sheet 400 protrudes 20 mm from the pages of such a book. The width over which the end sheet 400 protrudes increases with a decrease in the size of a book. The solid portion 400a is as black as the tables in order to facilitate the detection of the right edge of the page when the page turning position should be detected for the first time. The end sheet 400 has a printed area 400b at its left side. How the end sheet 400 should be used is printed on the printed area 40b in both of a message and a figure.

Figure 37B:
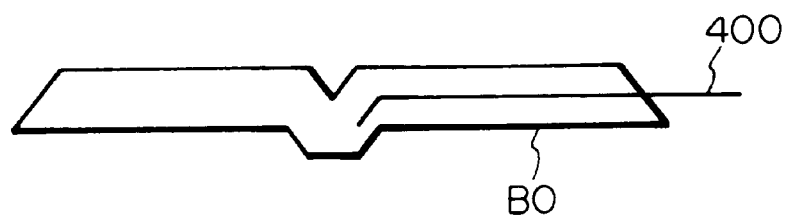
FIG. 37B is a front view showing the book and end sheet.

Before copying, the operator sets the end sheet 400, as follows. The operator pulls the book tray out of the apparatus body, sets a desired book on the right and left tables in a spread position, affixes the covers of the book to the tables, and then inserts the end sheet 400 between desired pages. For example, assume that the operator desires to copy page 1 of a book positioned on the right when spread through page 100. Then, the operator puts the end sheet 400 between page 100 which will be positioned at the left when spread and page 101 which will be positioned at the right when spread. The operator opens the book at the desired start page, adjusts the height of the book such that the spread right and left pages are substantially flush with each each other, and then closes the book tray. When the operator inputs the previously stated copy mode and then presses the print key, the apparatus starts the procedure for reading the book while turning over its pages. FIGS. 37A and 37B show the end sheet 400 inserted in the book BO spread on the book tray.

In the illustrative embodiment, the apparatus is capable of determining whether or not the page turning operation of the scanning unit 200 was successful. Specifically, the page sensor 214 responsive to a page is mounted on the upper page guide 227, as stated earlier. Whether or not the page sensor 214 has sensed a page is determined at a preselected position of the scanning unit 200. If the answer of this decision is negative, it is determined that the page turning operation has failed or that the last page has been reached. In addition, the page sensor 214 is used to detect the edge of a page. For example, if the output of the page sensor 214 is representative of the presence of a page when the scanning unit 200 reaches its left end position, i.e., when the page being turned over is expected to be fully discharged, it is determined that page has been ripped off.

In the illustrative embodiment, when a page is too thick to be turned over or when no more pages to be turned over exist, the scanning unit 200 stops operating. On detecting the failure of page turning, the scanning unit 200 again returns to the left end position and repeats the page turning operation three consecutive times in case of incidental failure.

The stop of operation caused by the end sheet 40 will be described more specifically hereinafter. Assume that the pages between which the end sheet 400 is positioned are spread as a result of the repeated page scanning and page turning operation. Then, after the left and right pages have been sequentially read, the page turning operation begins. However, because the end sheet 400 protrudes to the right from the page, it tends to adhere to the belt 208 while extending to the right over the belt 208 when acted on at the same position as the previous page. As a result, the end sheet 400 cannot be inserted in the path between the page guides 227 and 228 or turned over. Although the scanning unit 200 repeats the page turning operation, as stated above, it cannot turn over the end sheet 400. Consequently, a detection procedure ascribable to the failure of page turning begins. Specifically, as shown in FIG. 37A, changes in the image are searched for from the rear to the front in the main scanning direction. In the case of a page of relatively small size, the black portion of the table is detected first, and then an image on the right page is detected. When black pixels are continuously detected from substantially the center in the main scanning direction, it is determined that the end sheet 400 is present. In response, the apparatus stops operating and displays a guidance meant for the operator. If the end sheet 400 is not detected, the failure of page turning is dealt with as an incidental failure.

The operator inserts the end sheet 400 between desired pages and then inputs the start page and end page or the total number of pages to be copied. When the apparatus detects the end sheet 400 before reaching the input end page, it also stops operating on the basis of the previously stated failure and image detection. In this case, the apparatus displays an alarm message, e.g., "The end sheet found before the end page."

Assume that the end sheet 400 is absent between the desired pages despite that the apparatus is operating in the end sheet mode. Then, the apparatus repeats the copying operation up to the last page of the book due to the absence of the end sheet 400, as stated earlier. In this case, the apparatus stops the copying operation on detecting the failure of the turning of the last page and displays an alarm message, e.g., "Reached the last page."

While the above embodiment includes key inputting means for allowing the operator to select the end sheet mode, the key inputting means is not essential, as follows. Assume that the operator puts the end sheet 400 between desired pages of a spread book, but does not input the start page and end page or the total number of pages to be copied. Then, the apparatus repeats the image reading and page turning operation up to the position where the end sheet 400 is present in the end sheet mode, and then stops the operation. When the end sheet 400 is absent, the apparatus copies the book to the last page. The flowchart of FIG. 13 includes the above procedure in which the apparatus starts operating without the start page and end page or the total number of pages input and then ends operating on reaching the end sheet 400.

Another specific configuration of the end sheet 400 is as follows. The entire end sheet 400 or the right half thereof corresponding to the page turning position is formed of resin harder than the leaves of a book. This end sheet 400 is sized 150 mm vertically and horizontally and smaller in horizontal size than the above end sheet 400. Such a hard end sheet 400 does not have to protrude from the edges of the pages, but may be substantially flush with the edges of the pages. This kind of end sheet 400 does not bend as easily as the leaves of a book and cannot be lifted by electrostatic attraction. This results in the previously stated failure and followed by the same stop processing. In this alternative configuration, the left half of the end sheet 400 should only be bendable together with the leaves of a book so as not to obstruct the contact scanning.

As stated above, the embodiment shown and described has various unprecedented advantages, as enumerated below.

(1) Stopping means is provided for designating the last page of a book to be read or output. The operator can therefore designate the last page even when the operator does not know the number of pages of the book. The apparatus is therefore easy to operate.

(2) The stopping means is implemented as a sheet to be inserted in the position of a book where a reading and page turning operation should end. The operator can therefore surely designate the last page simply by inserting the sheet without considering the number of pages. This promotes easy and rapid operation of the apparatus. Moreover, physically inserting such a matter, replacing control relying on numerical values, is simple and insures the designation of the last page without increasing the cost.

(3) The stopping means in the form of a sheet cannot be turned over by a page turning mechanism, so that the operation can be surely topped at the designated last page.

(4) The stopping means in the form of a sheet is at least partly sized greater than a book. The stopping means therefore protrudes from a book without exception when put in the book. This surely causes a failure of page turning to occur at the position of the stopping means.

(5) The stopping means in the form of a sheet is as elastic as the pages of a book and bendable together with the pages. The stopping means therefore follows the pages when the pages are bent, and therefore does not obstruct the contact scanning for reading and page turning.

(6) The stopping means in the form of a sheet is harder than the pages of a book and do not bend at the time of page turning. This surely causes a failure of page turning to occur at the position of the stopping means.

Figure 40:
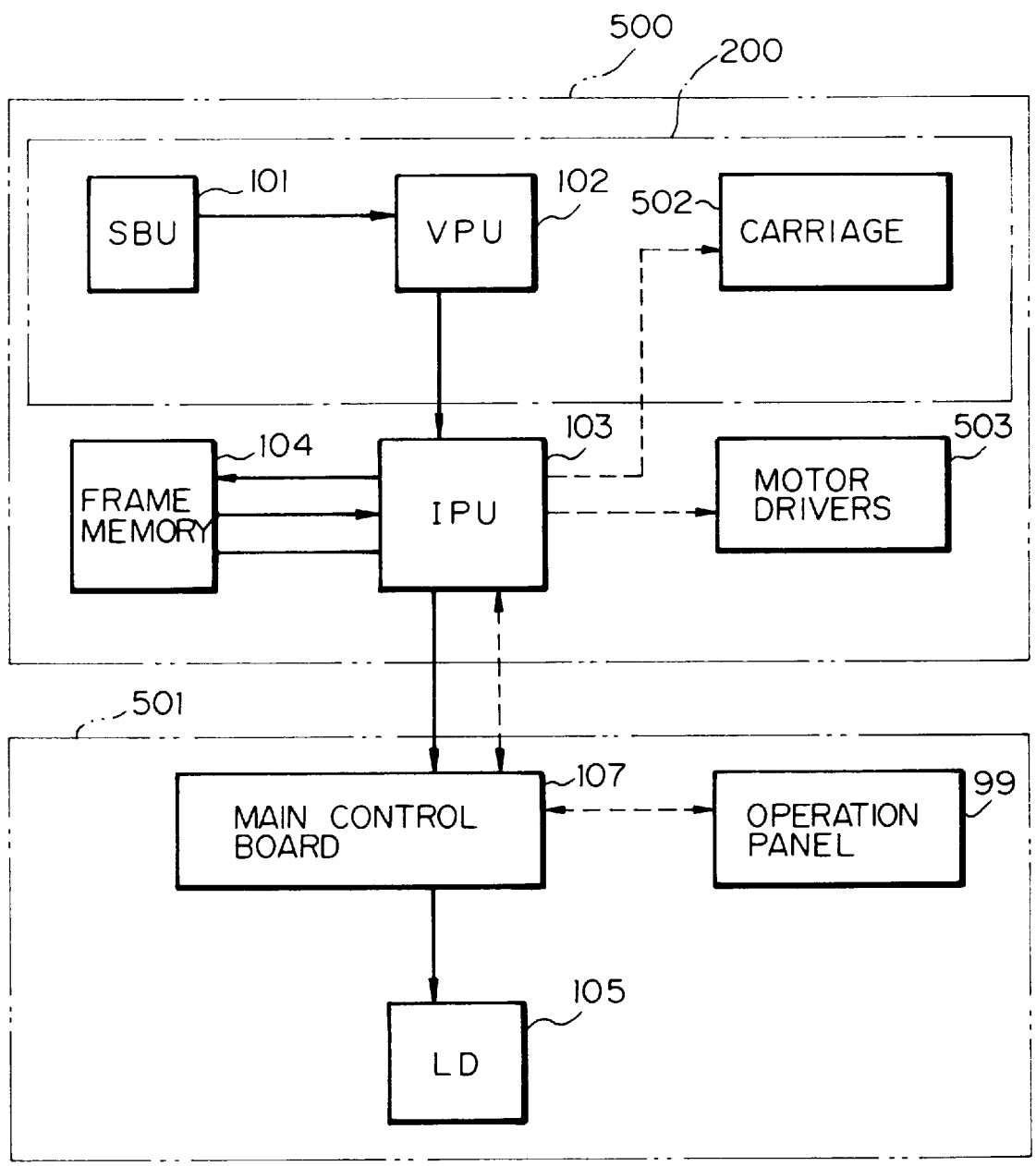
FIG. 40 is a block diagram schematically showing a control system included in an alternative embodiment of the present invention.

An alternative embodiment of the present invention will be described hereinafter. FIG. 40 shows a control system included in the alternative embodiment. This embodiment is also implemented as a system in which an image read by a TPS or image reading means is output by an electrophotographic printer or image forming means. As shown, the TPS also includes the scanner 500 for reading a document and the printer 501 for printing an image. The scanner 500 includes the scanning unit or carriage 200 capable of reading a book while turning over its pages.

Again, the scanning unit 200 has the SBU 101 including a CCD image sensor, VPU 102 executing a procedure beginning with the processing of an analog image signal output from the SBU 101 and ending with analog-to-digital conversion, and carriage 502 connecting signal lines between fluorescent lamps, an inverter power source associated with the lamps, a heater, a thermistor, a fan, a solenoid and other loads and a power source line. The carriage 502 and VPU 102 each is connected to the IPU 103 by a respective flexible cable.

The IPU 103 includes the frame memory 104 removably connected to the IPU 103 by a connector and implemented by a DRAM module for storing an image signal. A microcomputer included in the IPU 103 controls via the motor drivers 503 various motors including the stepping motor for driving the scanning unit 200 and DC motor for driving the tables 1, while receiving the outputs of various sensors.

The printer 501 has the main control board 107 consisting of a main control section for controlling copy modes, receiving key inputs on the operation panel 99, and controlling display, and a sequence control section for controlling copy timings. The microcomputers included in the main and sequence control sections and operation panel 99 interchange commands by serial communication. The main control board 107 controls the image forming sequence by controlling the motors, solenoids and clutches while receiving the outputs of sensors relating image formation.

Figure 41:
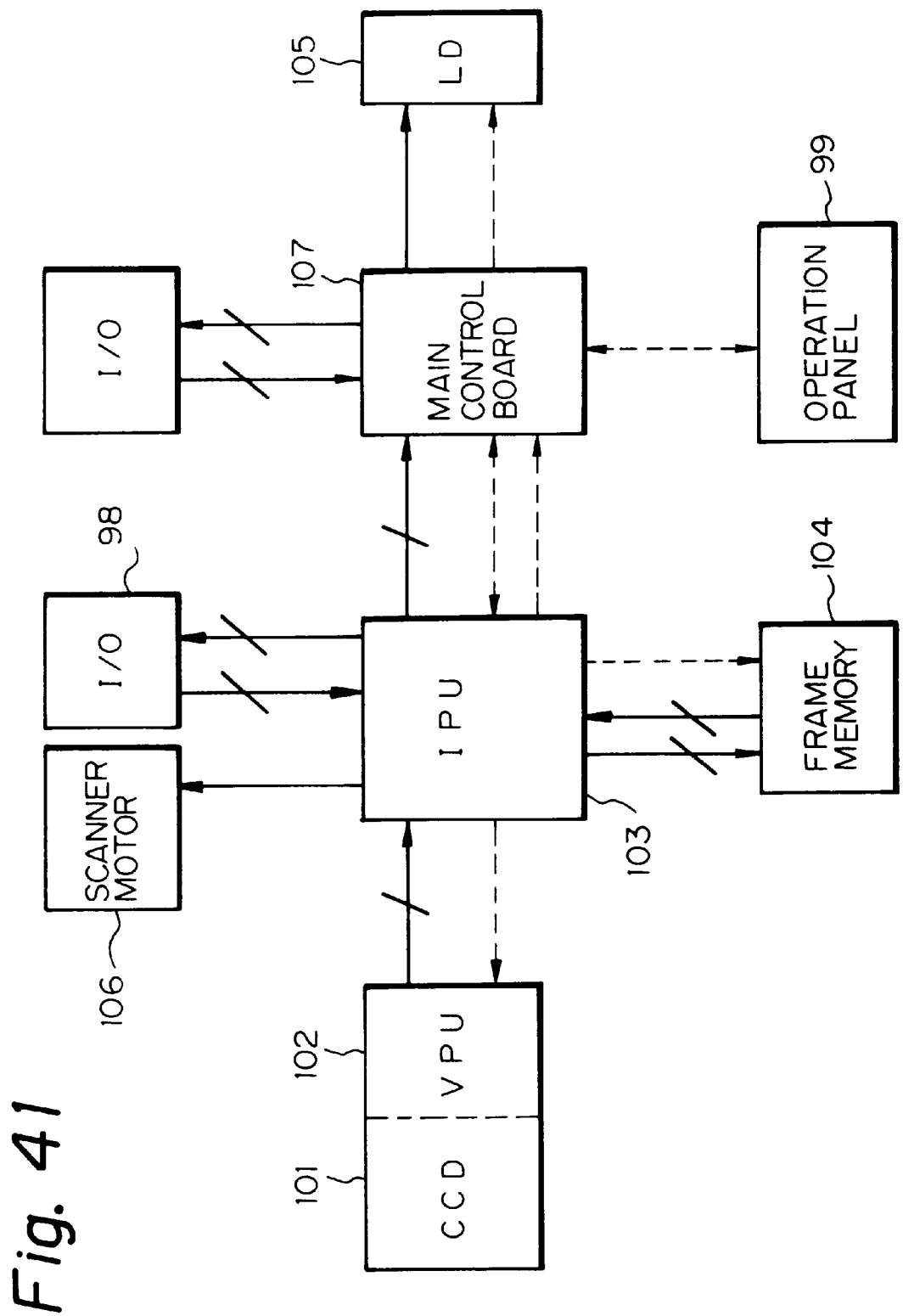
FIG. 41 is a block diagram schematically showing the flow of data occurring in the alternative embodiment.

FIG. 41 shows the flow of data occurring in this embodiment. As shown, the apparatus is generally made up of an image reading section included in the TPS, an image data processing section including the IPU 103, and the printer or image forming section 501. The SBU 101 is located at the right end of the scanning unit 200 and includes the CCD image sensor. In response to a reference signal output from the IPU 103, the VPU 102 generates a drive signal meant for the CCD image sensor and executes a procedure beginning with the correction of an analog data signal output from the image sensor and ending with analog-to-digital conversion. The VPU 102 feeds to the IPU 103 image data having eight bits for a dot and synchronous with a clock and a main scanning gate signal at a rate of about 7.5 MHz. The IPU 103 executes magnification change or similar editing with the input image data while executing electrophotographic high quality processing. The IPU 103 executes gamma correction and other tonality processing at its last processing stage and then transforms the image data to video data having four bits for a dot. The video data are written to the frame memory 104.

The above TPS reads each of a book and a sheet at a rate of 90 mm/sec, but the printer 501 forms an image at a rate of 180 mm/sec. In light of this, the frame memory 104 capable of storing one page of size A3 is used for a buffering purpose. In a repeat copy mode for repeatedly copying a single book, the image data written to the frame memory 104 should only be repeatedly read out. This protects a book despite that the TPS reads it in contact therewith. Further, in a page continuous mode for printing the right and left pages of a spread book independently, images representative of the right and left pages and output by a single scanning can be divided via the frame memory 104. This makes it needless for the TPS to be synchronized to the image writing of the laser printer 501 or to repeat an approach run.

The frame memory 104 having a four bits per dot configuration is positioned after the IPU 103 and stores the image data processed by the IPU 103. This allows the capacity of the frame memory 104 to be halved for the image data having eight bits for a dot. The frame memory 104 has 128 megabits corresponding to one page of size A3 with respect to a resolution of 400 dpi.

The IPU 103 inputs two dots of image data to the frame memory 104 in parallel and sequentially inputs such image data at a rate of about 3.8 MHz. The frame memory 104 also outputs two dots of image data in parallel and sequentially delivers such image data to the main control board 107 at a rate of about 7.5 MHz in synchronism with a clock and a main and a subscanning gate signal output from the IPU 103.

The main control board 107 connects the image data output from the frame memory 104 at a high speed matching with the image forming speed of the laser printer 501, thereby outputting serial data whose rate is about 15 MHz. The main control board 107 further increases the rate of the serial data by use of a FIFO memory so as to synchronize them to a write clock having a frequency of about 18 MHz. In addition, the main control board 107 executes PWM (Pulse Width Modulation) with the image data having four bits for a dot and thereby transforms them to emission time data. The emission time data or PWM data are sent to the LD controller assigned to the LD 105 in synchronism with the write clock. The LD controller including the LD driver causes the LD 105 to emit in accordance with the emission time data and scan the photoconductive element.

The IPU 103 controls the operation of the scanning unit 200 also. In the book mode or the sheet mode, the IPU 103 causes the scanning unit 200 to read a document at the rate of 90 mm/sec. At the time of magnification change of from 71% to 141%, including zooming, the IPU 103 causes the scanning unit 200 to read a document at a linear velocity 1.41 times to 0.71 time higher than the above speed.

When the scanning unit 200 is returned to its start position or turns over the page of a book, the scanner motor or stepping motor 106 assigned to the scanner is driven at a rate of 227 mm/sec. Additionally included in the apparatus is a general-purpose SCSI I/F 98 for allowing the image data to be transferred to another system equipment, e.g., a printer or a work station. The main control board 107 receives key inputs from the operation panel 99 while outputting signals to the operation panel 99.

A circuit for detecting images representative of the edges of a document is built in the IPU 103. The circuit detects such images by sampling pixel data not subjected to magnification change in the main scanning direction. The start and end of edge detection are commanded by the microcomputer included in the IPU 103. The circuit detects the edge of a book in the subscanning direction on the bias of the position of the scanning unit 200 under the control of the microcomputer of the IPU 103. Also, the circuit detects the edge of a book in the main scanning direction by referencing a pixel counter assigned to the main scanning direction under the control of the microcomputer of the IPU 103. The microcomputer calculates a position for attracting the page of a book and a valid image range in the main scanning direction on the basis of the positions of detected edges.

Figure 42:
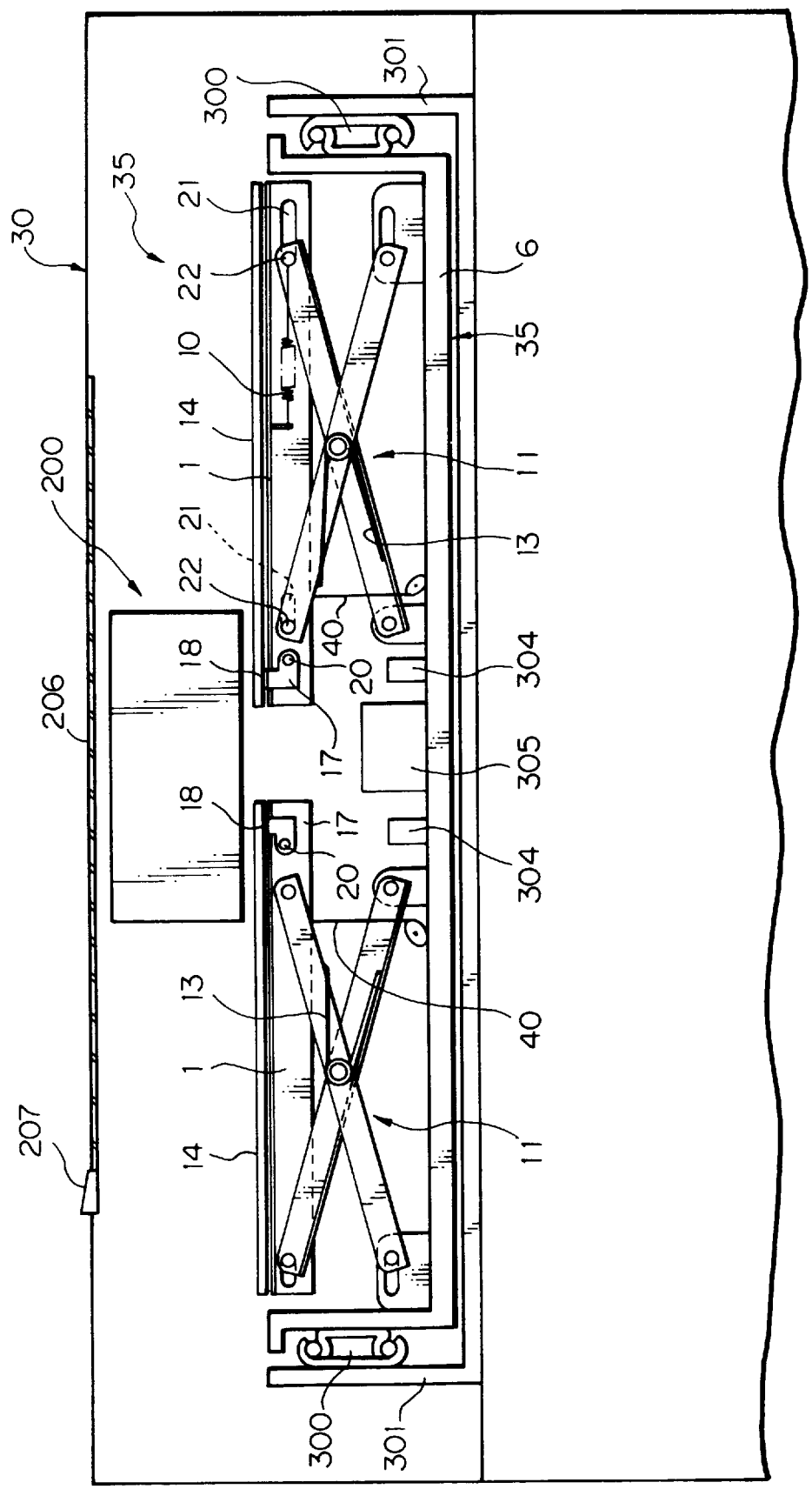
FIG. 42 is a section of an image reading section included in the alternative embodiment.

FIG. 42 shows the overall configuration of the TPS. As shown, the TPS has the glass platen 206 and scale 207 mounted on the top of its body. A sheet is laid on the glass platen 206 and pressed by a cover plate not shown. The scanning unit 200 scans the sheet in order to read its image. The upper half of the TPS body is implemented as the scanner unit 30. The scanning unit 200 is movable in the right-and-left direction, as viewed in FIG. 42, within the scanner unit 30 while scanning the sheet.

Figure 43:
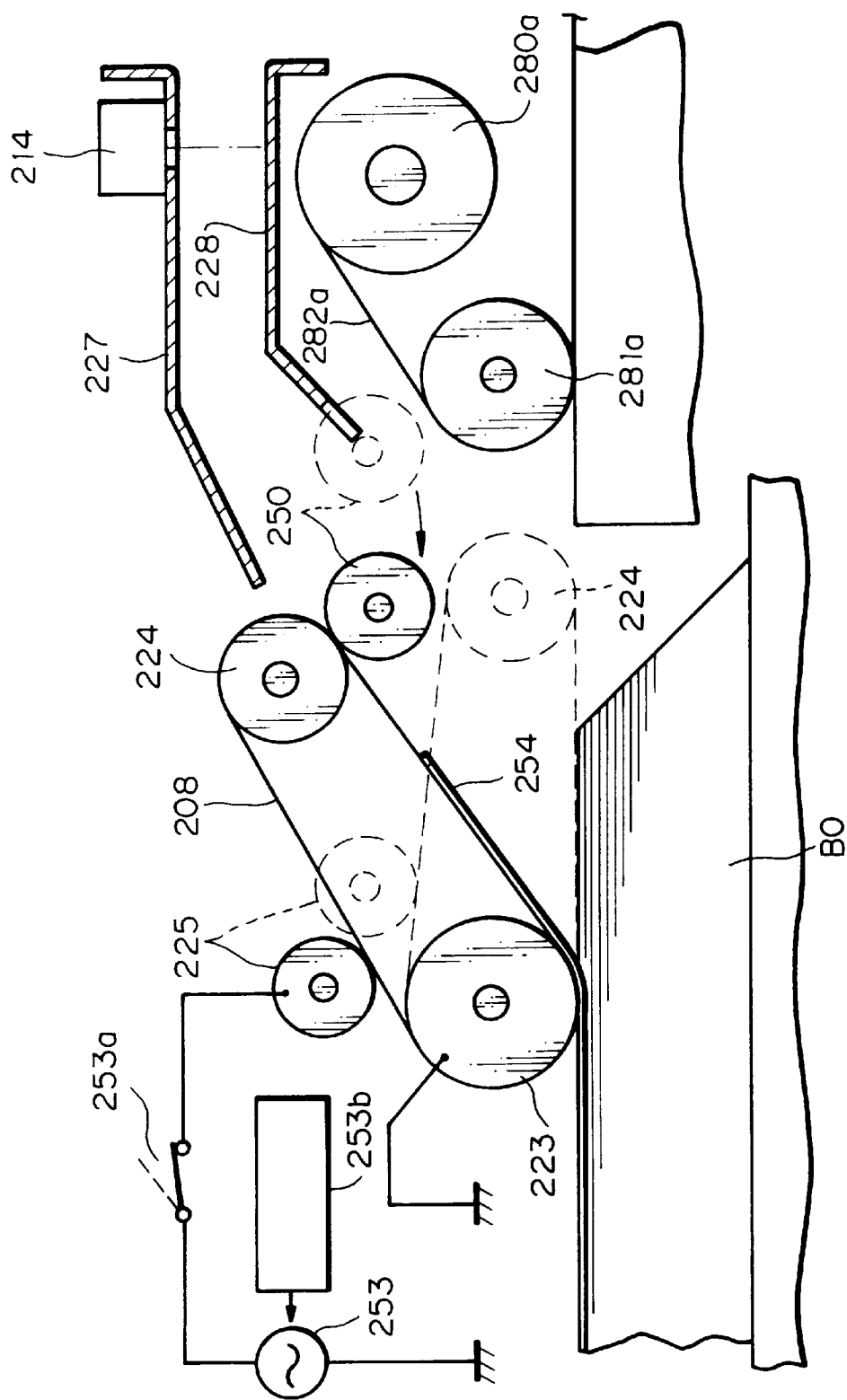
FIG. 43 is a section of a page turning section included in the alternative embodiment.

FIG. 43 shows the paging turning section of the scanning unit 200. Again, the turn belt 208 is formed of PET, PC, PVT or similar material. The turn belt 208 has a double layer structure consisting of a front layer or film whose resistance is as high as $10^{14}\Omega$ or above and a rear layer or film whose resistance is as low as $10^8\Omega$ or below. The drive roller 223 is made up of a metal roller connected to ground and conductive rubber covering the roller. With this configuration, the drive roller 223 insures the drive of the turn belt 208 and grounding.

The charge roller 225 is implemented by a metal roller with or without a conductive rubber coating. The AC power source 253 applies a high voltage of ±2 kV to 4 kV to the charge roller 225 via the switch 253a at a preselected timing. The AC power source 253 is controlled by pulses output from a pulse generator 253b. While the scanning unit 200 is in movement with the turn belt 208 being driven, the switch 253a is turned on at a preselected timing which will be described. As a result, ±2 kV to 4 kV matching with the frequency of the pulse generator 253b is applied from the AC power source 253 to the charge roller 225 via the switch 253a, producing an alternating electric field on the front of the turn belt 208. The resulting electrostatic attraction causes the top page 254 of the spread book BO contacting the turn belt 208 to adhere to the belt 208. The AC power source 253 is included in the scanning unit 200.

Figure 44:
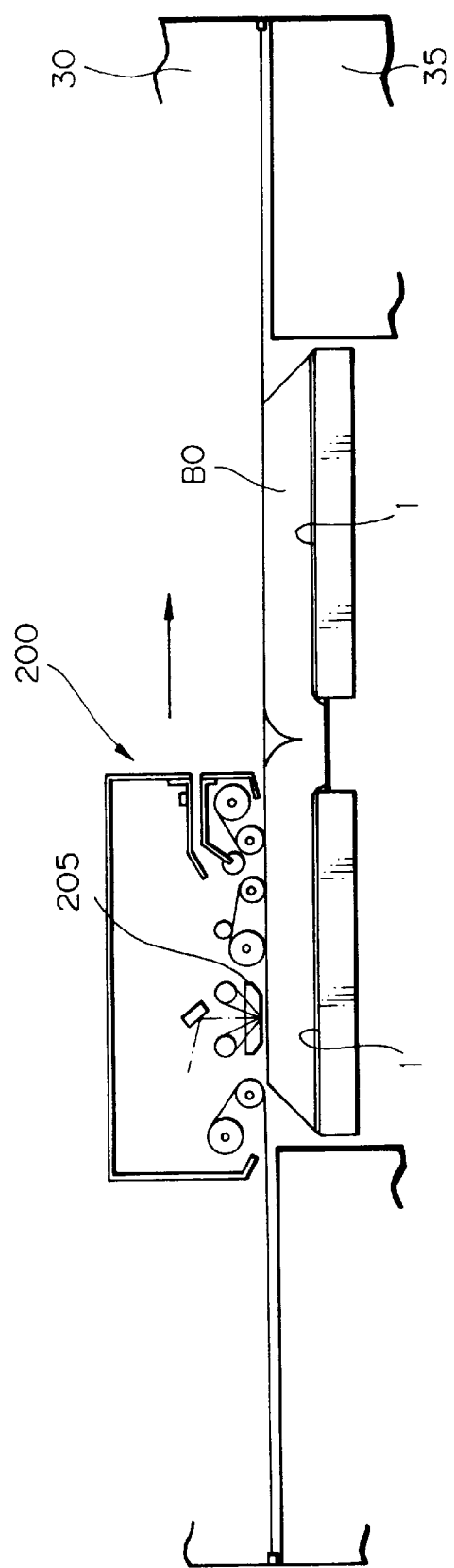
FIGS. 44–49 each shows a scanning unit included in the alternative embodiment at a particular position.

To start reading the spread book BO, the scanning unit 200 held at its home position defined at the left end of the scanning unit 30 moves to the right, as viewed in FIG. 44. At this instant, a solenoid, not shown, moves the turn belt 208 and a page feed roller 250 to positions indicated by solid lines in FIG. 43. As shown in FIG. 44, when a book reading position defined on the underside of the glass platen 205 reaches the left page of the book BO, the scanning unit 200 starts reading the book BO and sequentially reads it from the left page to the right page. The position where the scanning unit 200 starts reading the book BO depends on the size of the book BO.

Figure 45:
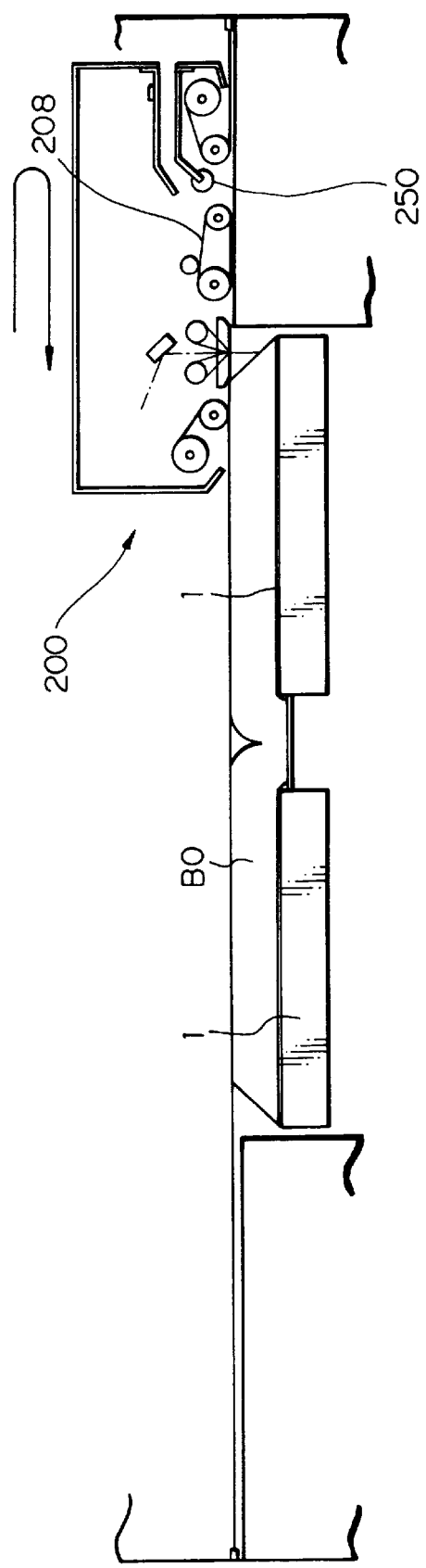

While the scanning unit 200 reads the document BO, as shown in FIG. 44, the turn belt 208 and page feed roller 250 are held in their solid line positions shown in FIG. 43. As shown in FIG. 45, when the scanning unit 200 fully reads the document BO to the edge of the right page, the running direction of the unit 200 is reversed. At this time, the turn belt 208 and page feed roller 250 are moved to positions indicated by phantom lines in FIG. 43 by the solenoid. Substantially at the same time, the switch 253a is turned on with the result that the AC voltage having a preselected frequency is applied from the AC power source 253 to the charge roller 225, forming a charge pattern on the front of the turn belt 208.

Figure 46:
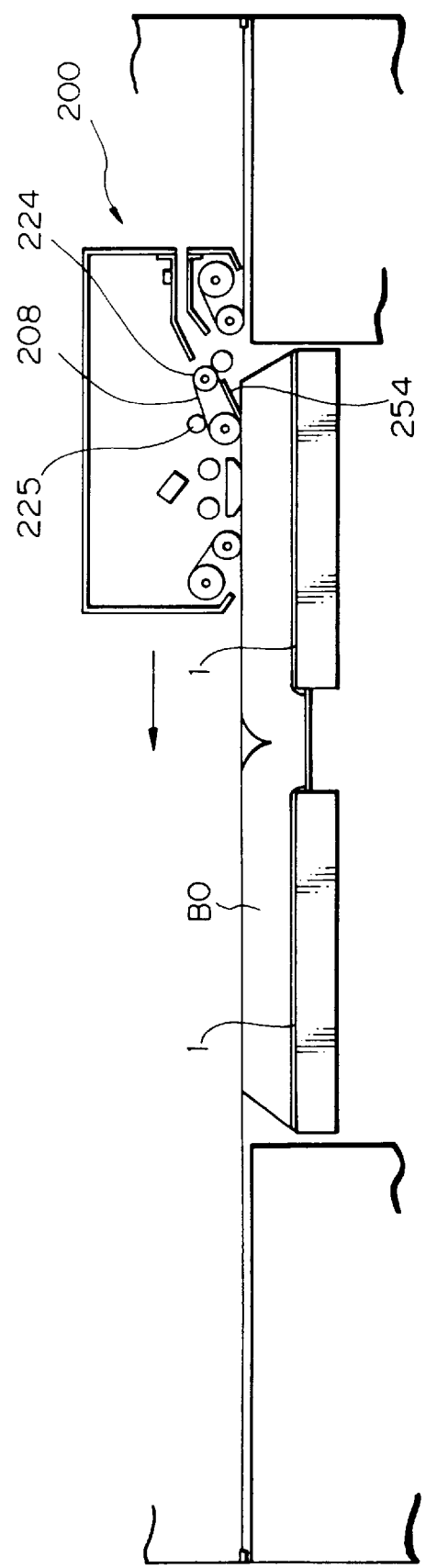
Figure 47:
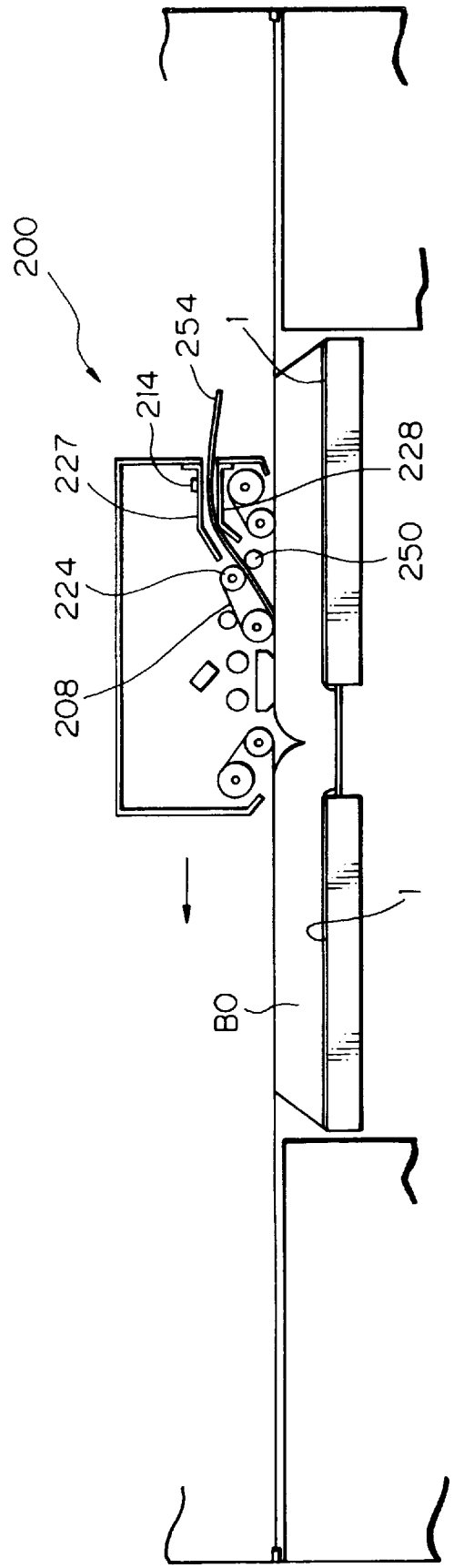

When the page of the book BO is to be turned over, the turn belt 208 and page feed roller 250 are held in the phantom line positions shown in FIGS. 43. Before the scanning unit 200 starts turning over the right page, a charge pattern formed on the front of the turn belt 208 is caused to overly the top page 254 of the book BO. When the edge of the top page 254 moves over the center of the lower run of the turn belt 208, the belt 208 and page feed roller 250 are moved to the solid line positions shown in FIG. 43 by the solenoid, as shown in FIG. 46. As a result, only the top page 254 is cause to adhere to the front of the turn belt 208 by the electrostatic attraction of the partial electric field formed on the belt 208 by the charge pattern. Therefore, the edge of the top page 254 is lifted together with the turn belt 208.

The scanning unit 200 runs toward its end home position while lifting the top page 254, as shown in FIG. 46. As a result, as shown in FIG. 477, the top page 254 is surely conveyed by being nipped between the turn roller 224 and the page feed roller 250. The top page 254 has its edge sequentially fed out to the outside of the scanning unit 200 via the path between the page guides 227 and 228 positioned at the right end of the scanning unit 200. The page sensor 214 mounted on the upper page guide 227 senses the top page 254 protruding to the outside of the scanning unit 200, and shows that the top page 254 has been accurately lifted.

Figure 48:
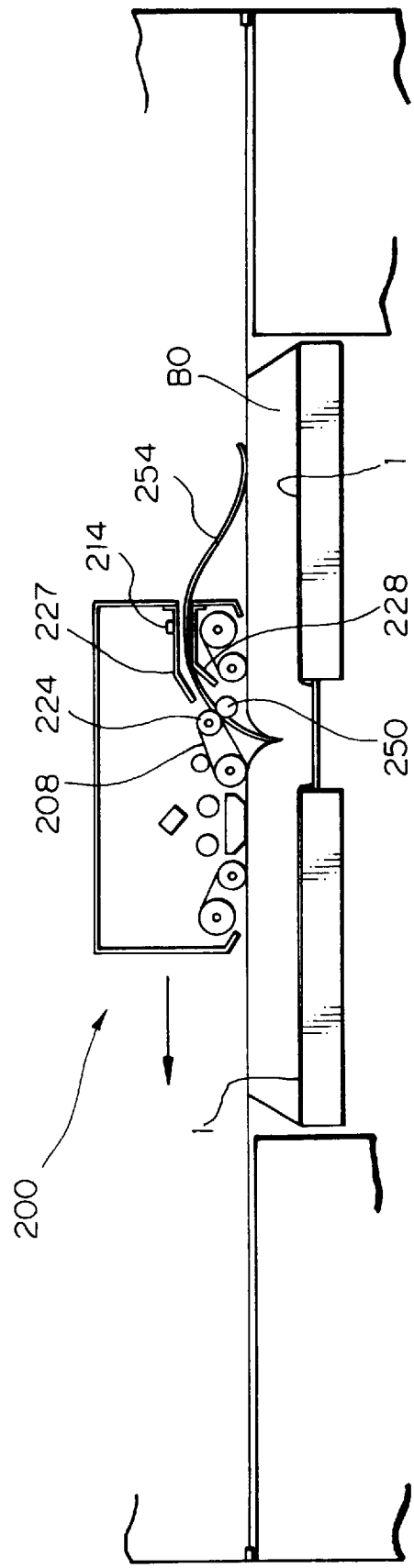
Figure 49:
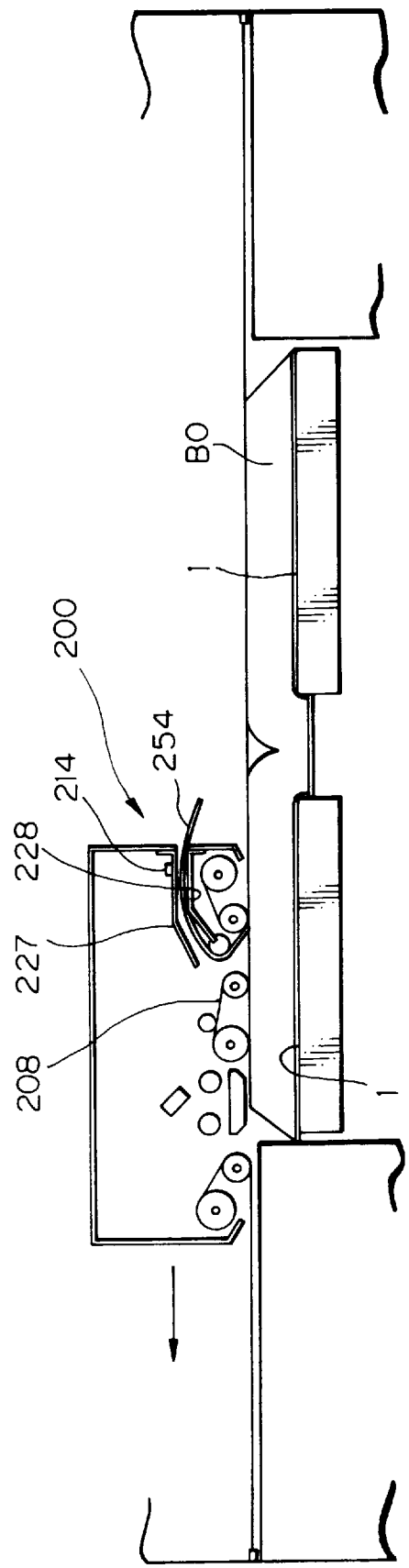

Subsequently, as shown in FIG. 48, as soon as the top page 254 is lifted up to the bound portion of the book BO, the turn belt 208 and page feed roller 250 return to their phantom line positions shown in FIG. 43. As the scanning unit 200 further moves toward its end home position, the page 254 is pulled by the bound portion of the book BO and sequentially laid on the left page of the book BO while sequentially coming out of the path between the page guides 227 and 228.

When the top page 254 is fully laid on the left page of the book BO, the scanning unit 200 completes a single image reading and page turning operation. To repeat the image reading and page turning operation with the book BO or to repeat either the image reading operation or the page turning operation, the scanning unit 200 is reversed as soon as the top page 254 is fully laid on the left page, and caused to repeat its reciprocating movement at the shortest distance to the surface of the book BO. It is to be noted that the scanning unit 200 may be operated only to read the images of the book BO or only to turn over the pages of the book BO.

To turn over the top page 254 electrostatically adhered to the turn belt 208, the turn belt 208 is lifted by the solenoid so as to raise the edge of the page 254 toward the scanning unit 200. At this instant, the page sensor 214 determines whether or not the page 254 has been successfully lifted. When the page sensor 214 does not sense the page 254 at a preselected timing, the scanning unit 200 repeats the above page turning operation.

Figure 50:
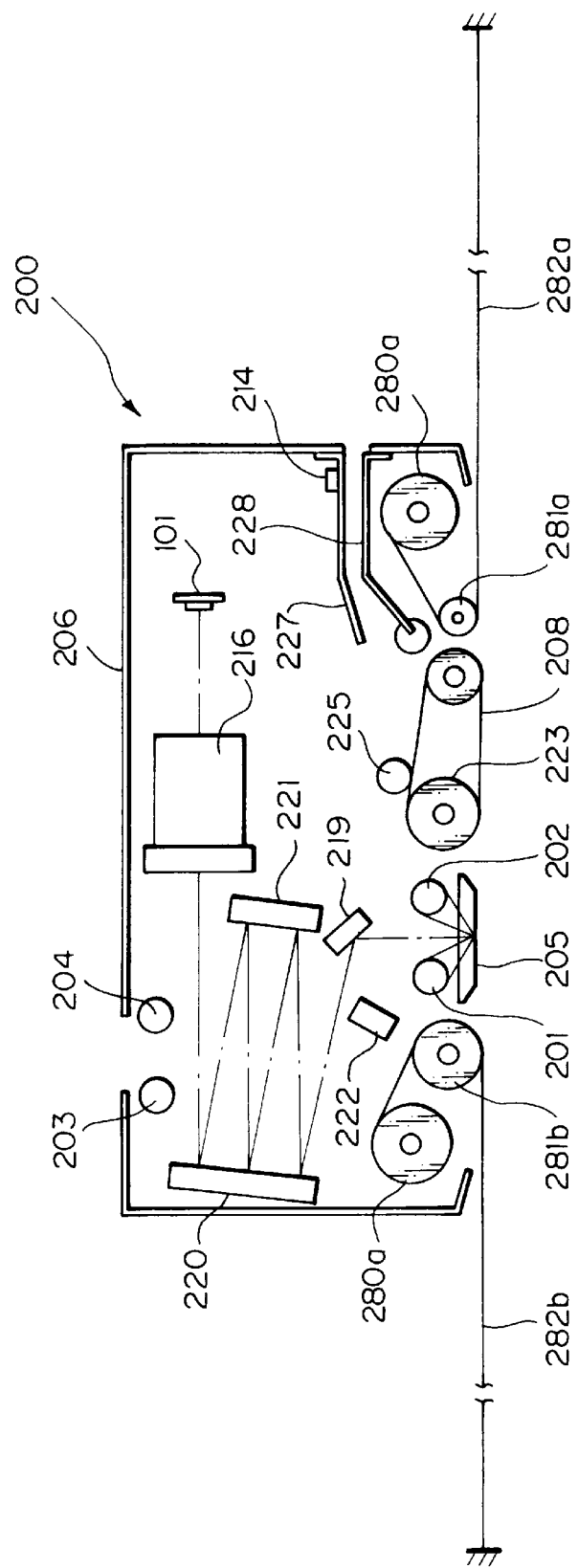
FIG. 50 is a section showing the scanning unit of the alternative embodiment.

As shown in FIG. 50, the retractable mirror 222 is driven by a mirror switching solenoid to move into or out of the optical path, thereby selecting either the optical path assigned to a book or the optical path assigned to a sheet. The fluorescent lamps 201 and 202 mounted on the scanning unit 200 are used to illuminate a book. Two fluorescent lamps 203 and 304 are positioned above the lamps 201 and 202 in order to illuminate a sheet.

Specifically, to read a sheet laid on the glass platen 206, the mirror 222 is brought into the optical path, so that the lamps 203 and 204 illuminate the document. The resulting reflection from the sheet is incident to the CCD image sensor of the image reading board 101 via the mirrors 222, 220 and 221 and lens 216. On the other hand, to read a book laid on the right and left tables 1, the mirror 222 is retracted from the optical path, so that the lamps 201 and 202 illuminate the document via the glass platen 205. The resulting reflection from the sheet document is incident to the CCD image sensor via the mirrors 219, 220 and 221 and lens 216.

Figure 51:
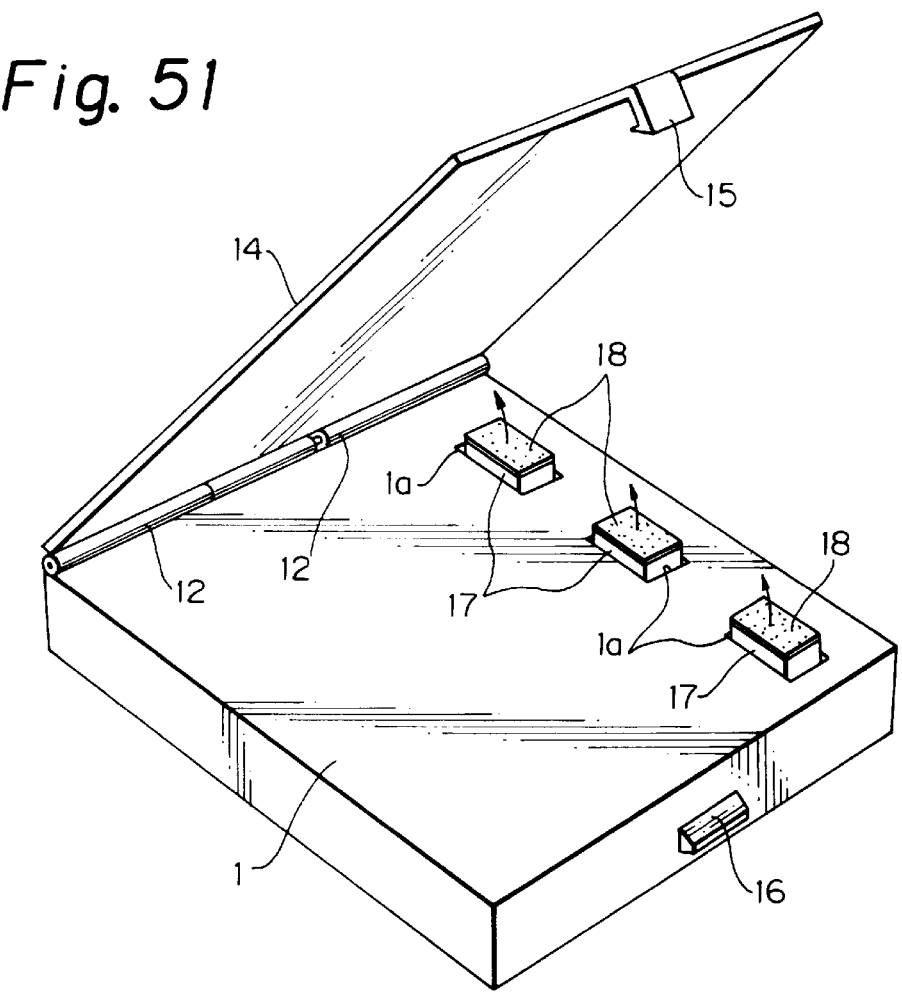
FIG. 51 is a perspective view of a table unit included in the alternative embodiment.

As shown in FIG. 42, the right and left tables 1 are disposed in a table unit 36, and each is movable up and down by being driven by a respective link mechanism 11. A spring 13 is anchored to each link mechanism 11 and constantly biases the associated table 1 upward. As shown in FIG. 51, a press plate 14 is rotatably connected to the rear side of each table 1 by a hinge 12. A catch 15 is provided on the free end of the press plate 14. When the press plate 14 is lowered onto the table 1, as viewed in FIG. 51, the catch 15 catches a stop 16 provided on the front end of the table 1. Because such a stop mechanism is arranged on the front on the table unit 36, the press plate 14 is easy to handle.

A plurality of holes 1a are formed in the top of each table 1. A fixing member 17 is received in the respective hole 1a while partly protruding from the hole 1a. A rubber plate 18 is fitted on each fixing member 17 in order to surely press and affix the front cover or the rear cover of the book BO. The fixing members 17 are rotatably supported by a shaft 20 (see FIG. 52) affixed to the portion of each table 1 adjoining the center of the scanner unit 30. The fixing members 17 each is constantly biased by a respective spring, not shown, in the direction indicated by an arrow in FIG. 51.

Figure 52:
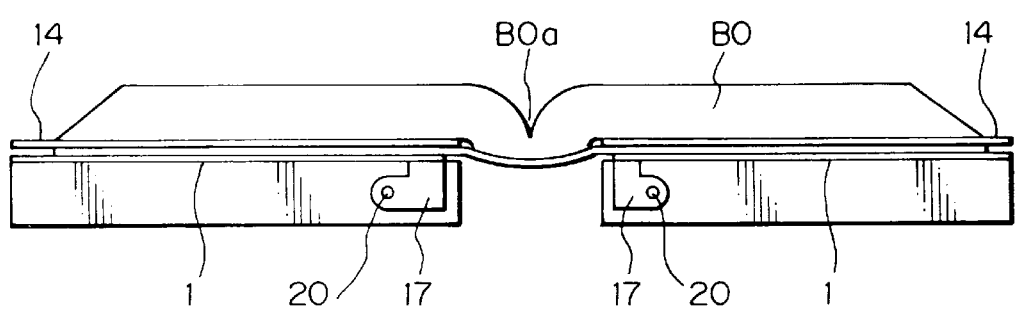
FIG. 52 is a section of a book loading section included in the alternative embodiment.

As shown in FIG. 52, the book BO is surely retained on the left and right tables 1 with its front cover and rear cover respectively held between the tables 1 and the press plates 14. The catch 15 of each press plate 14 is engaged with the stop 16 of the associated table 1. Because the fixing members 17 are arranged in the vicinity of the center of the scanner unit 30, the front cover and rear cover of the book BO are pressed between the fixing members 17 and the press plates 14 at their portions adjoining the bound portion labeled BOa in FIG. 52. This allows the book BO to be more surely fixed in place on the tables 1.

When the press plates 14 are locked to the associated tables 1 while the book BO is absent, a gap of several millimeters exists between each press plate 14 and the table 1 facing each other. Such gaps allow even a book having relatively thick front and rear covers to be fixed in place on the tables 1. Further as shown in FIG. 42, the left table 1 is movable only in the up-and-down direction in order to prevent the book BO from being dislocated. On the other hand, the right table 1 is movable not only in the up-and-direction but also in the right-and-left direction, as viewed in FIG. 42, via slots 21. A spring 10 constantly biases the right table 1 leftward, as viewed in FIG. 42. When shafts 22 each being slidably received in the respective slot 21 abut against the edges of the slots 21, the leftward movement of the right table 1 is stopped.

The illustrative embodiment further includes table pressure switching devices and table retracting devices each being associated with the respective table, as follows. The tables 1 movable up and down each is constantly biased upward by the respective spring 13, as stated with reference to FIG. 42. Therefore, in a table press mode in which the table unit 35 is received in the scanner unit 30, the tables 1 constantly press the book BO spread thereon upward such that the right and left pages of the book BO are pressed against the bottom of the scanning unit 200.

The pressures exerted by the top pages of the spread document BO usually act on the scanning unit 200. However, when the scanning unit 200 is moved to a position outside of the book BO, it is likely that the tables 1 and book BO move further upward into the scanner unit 30 because the tables 1 are biased upward, obstructing the smooth movement of the scanning unit 200. It is therefore necessary that the tables 1 be fixed in place on reaching an adequate level. Further, when the mirror 222 is switched in order to read a sheet laid on the glass platen 206, the tables 1 must be retracted to the lower portion of the table unit 35 so as not to contact the bottom of the scanning unit 200.

Figure 53:
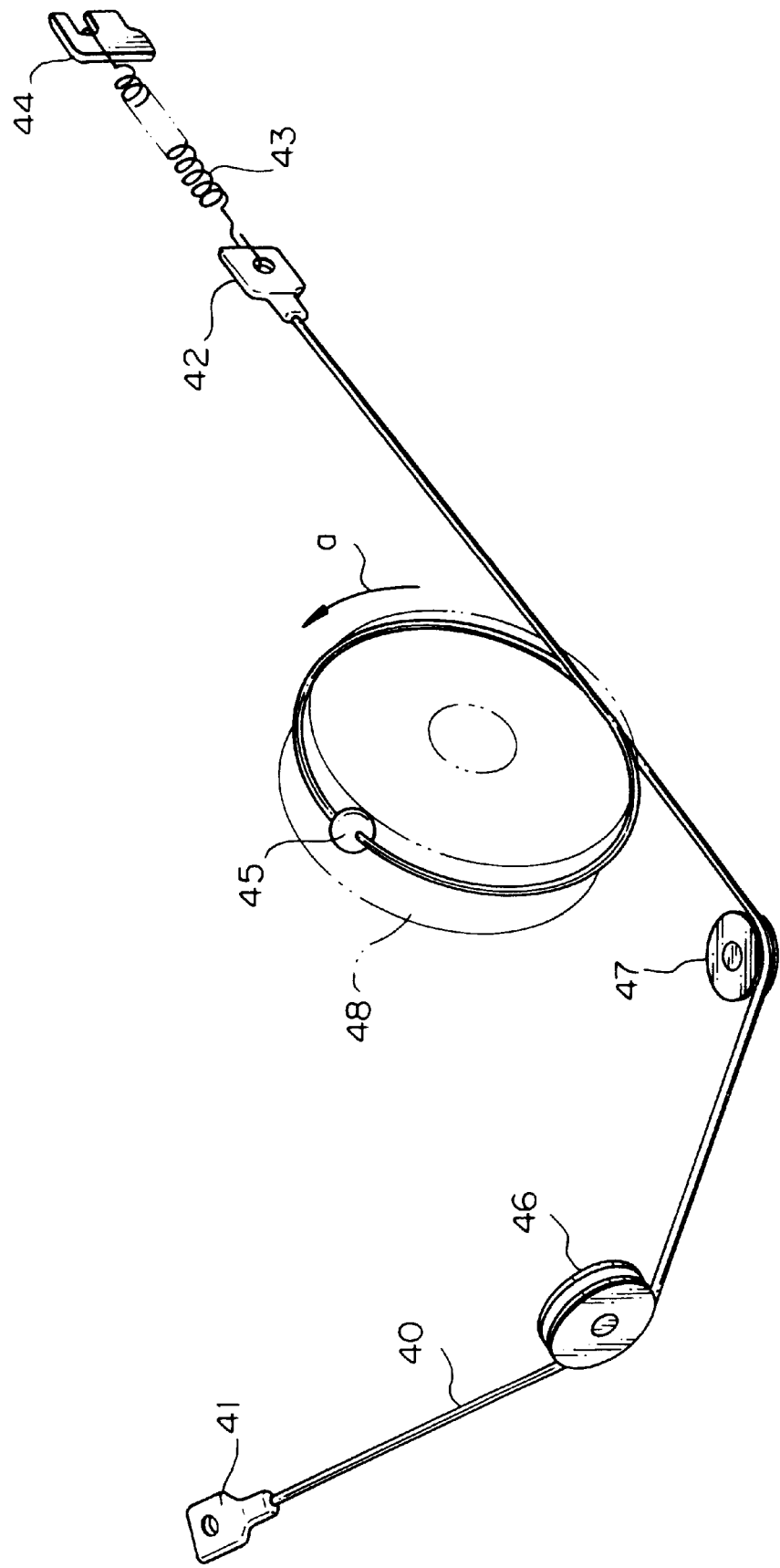
FIG. 53 is a perspective view of a table pressure switching device and a table retracting device included in the alternative embodiment.

Each table pressure switching device and associated table retracting device to be described satisfy the above conditions and are implemented by a single mechanism, as will be described with reference to FIGS. 53–57. As shown in FIG. 53, a control wire 40 has a hook 41 affixed to one end thereof. Another hook 42 is affixed to the other end of the control wire 40 while a stop ball 45 is affixed to substantially the intermediate between the opposite ends of the wire 40.

Figure 54:
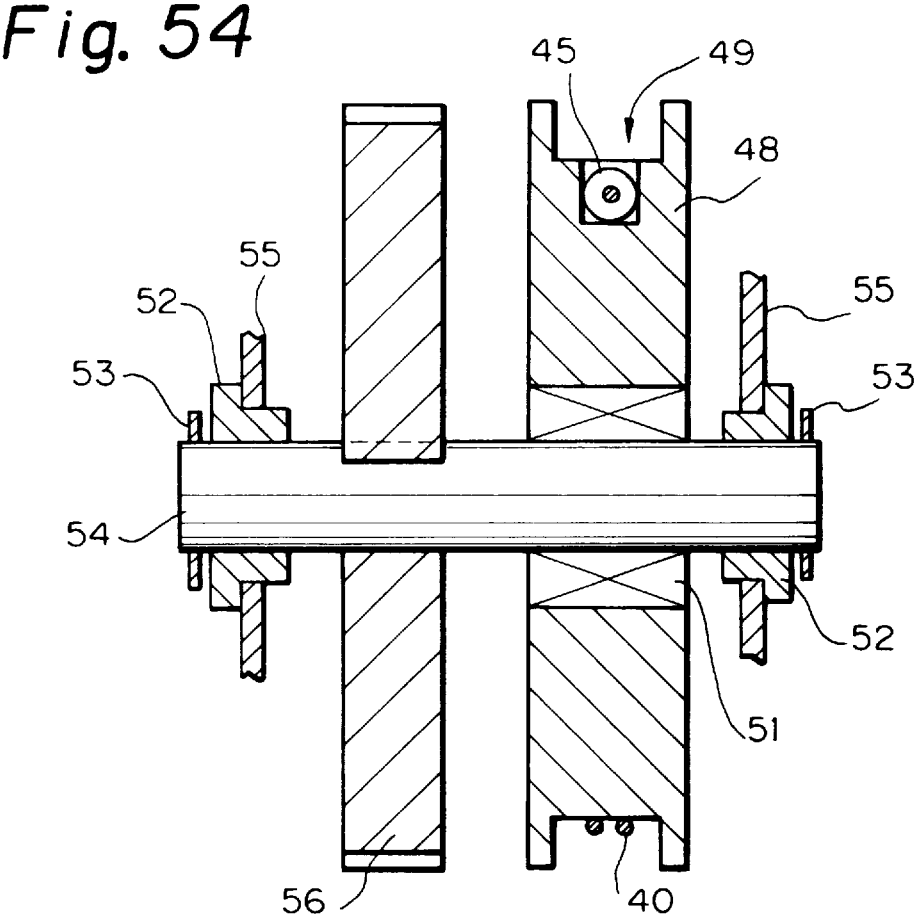
FIG. 54 is a section of the devices shown in FIG. 53.
Figure 55:
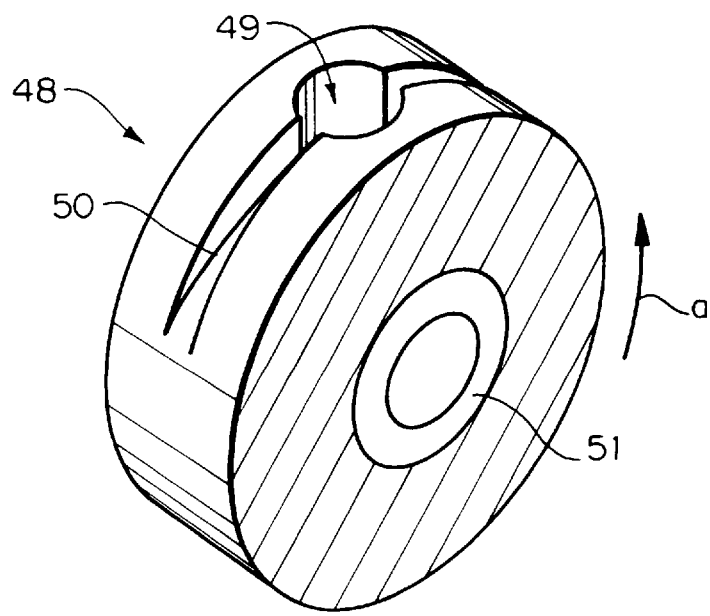
FIG. 55 is a perspective view of a control pulley included in the devices shown in FIG. 53.

The hook 41 is affixed to the outer end of the link mechanism 11 which moves up and down due to the movement of the table 1. The control wire 40 extending from the hook 41 has its direction changed by pulleys 46 and 47 and is wound round a control pulley 48. As shown in FIGS. 54 and 55, the control wire 40 is received in a groove 50 formed in the control pulley 48 while the stop ball 45 is received in a bore 49 also formed in the pulley 48. In this condition, the movement of the control wire 40 is surely transformed to the rotation of the control pulley 48.

As shown in FIG. 53, a tension spring 43 is anchored at one end thereof to the hook 42 of the control wire 40. The other end of the spring 43 is anchored to a hook 44 affixed to a base 6 included in the table unit 35. The spring 43 therefore constantly pulls the control wire 40. As shown in FIG. 54, the control pulley 48 is supported by a shaft 54 via a one-way clutch 51. Slide bearings 52 each is mounted on one of opposite side walls 55. The shaft 54 is rotatably supported by the slide bearings 52 while being prevented from slipping out by E rings 53. In this configuration, the control pulley 48 is freely rotatable relative to the shaft 54 in one a shown in FIG. 55, but prevented from rotating in the other direction relative to the shaft 54 by the one-way clutch 51. Therefore, when the shaft 54 is locked by a mechanism which will be described, the control pulley 48 is rotatable only in the direction a as when the table 1 is lowered.

How the table pressure switching device moves the table 1 downward and fixes it as follows. In FIGS. 53–55, assume that the table 1 is pressed downward by some extraneous force, e.g., the weight of the book BO or the pressure ascribable to page turning. Then, the end portion of the control wire 40 including the hook 41 and affixed to the table 1 slackens. At the same time, the control pulley 48 rotates in the direction a while absorbing the slack of the control wire 40, allowing the wire 40 to move toward the hook 44 side while maintaining its initial tension. Because the control pulley 48 is not movable in the direction opposite to the direction a due to the one-way clutch 51, it is prevented from rotating in the above direction despite the bias acting of the table 1 even though the bias may exceed the pressure forcing the table 1 downward. As a result, the control pulley 48 is stopped in the position rotated in the direction a. The control wire 40 wound round the control pulley 48 is also stopped. The table 1 is therefore brought to a stop at its lowered position.

Figure 56:
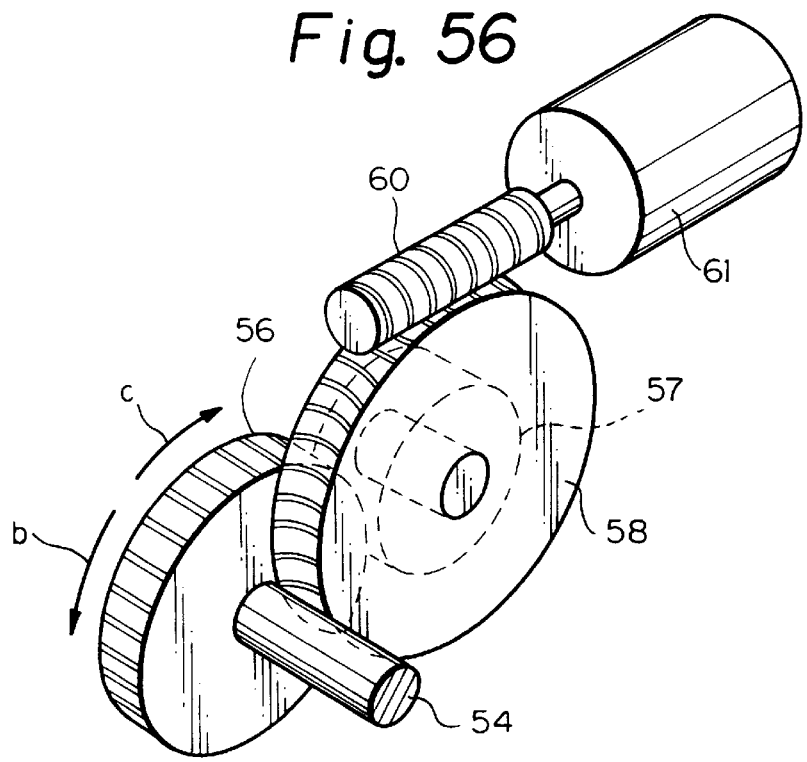
FIG. 56 is a fragmentary perspective view of the devices shown in FIG. 53.
Figure 57:
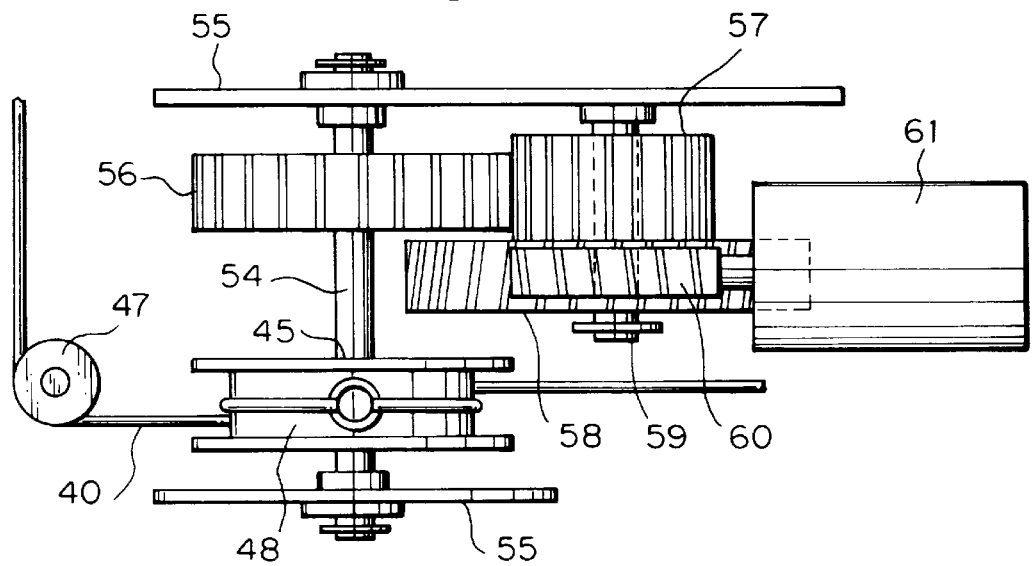
FIG. 57 is a fragmentary side elevation showing another portion of the devices shown in FIG. 53.

The shaft 54 is locked by the following table moving mechanism. As shown in FIG. 56, a gear 56 is affixed to the shaft 54 and rotatable integrally with the shaft 54. As shown in FIG. 57, the gear 56 is held in mesh with another gear 57 rotatably supported by a stud 59 which is affixed to the side wall 55. The rotation of the gear 56 is transmitted to the gear 57. The gear 57 is molded integrally with a worm wheel 58. A worm gear 60 affixed to the output shaft of a table motor 61 is held in mesh with the worm wheel 58. In this configuration, when the motor 61 is not energized, the worm wheel 58 meshing with the worm gear 60 cannot rotate and locks the shaft 54 connected to the worm wheel 58 via the gears 57 and 56.

Figure 58:
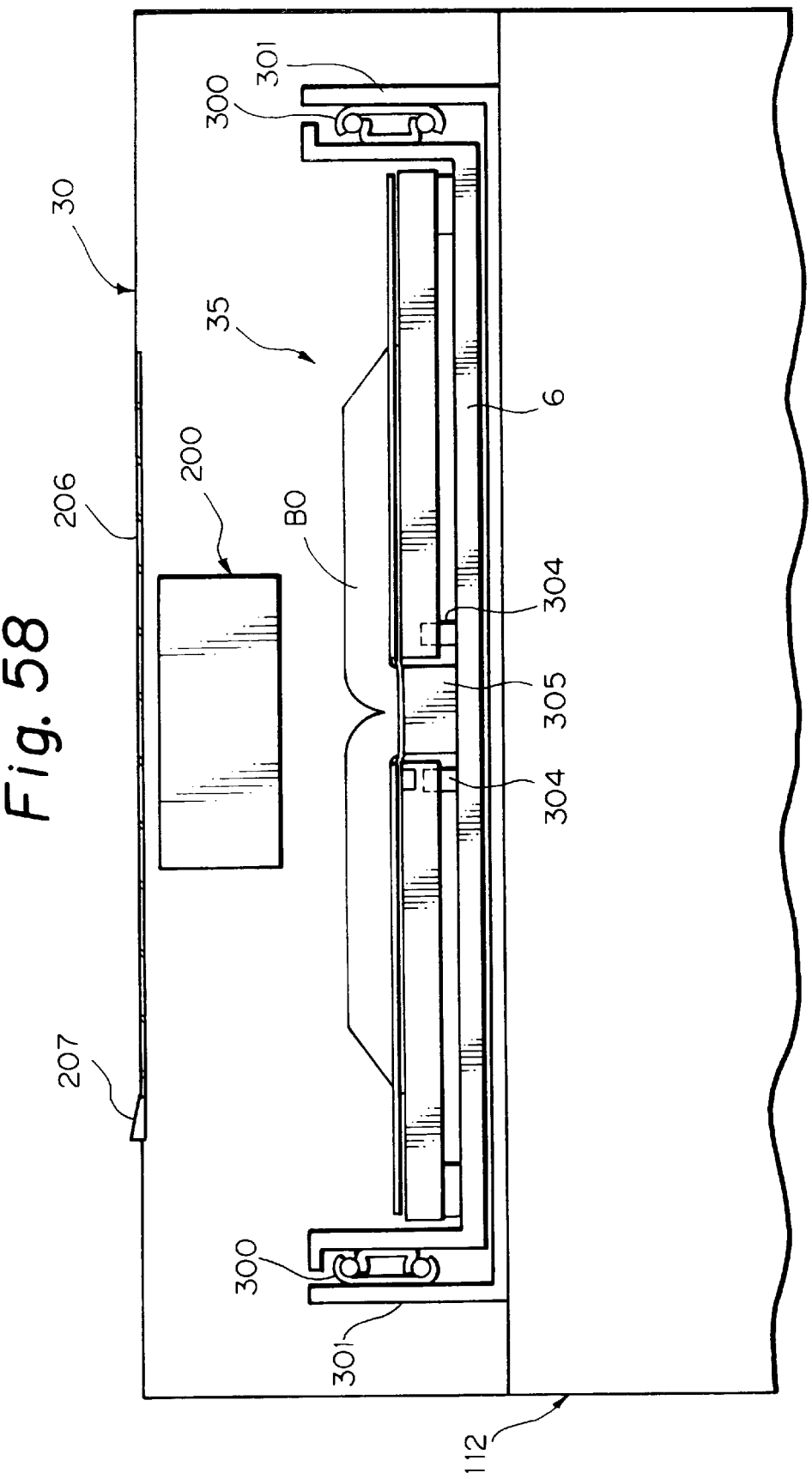
FIG. 58 is a section showing tables brought to their retracted positions.
Figure 59:
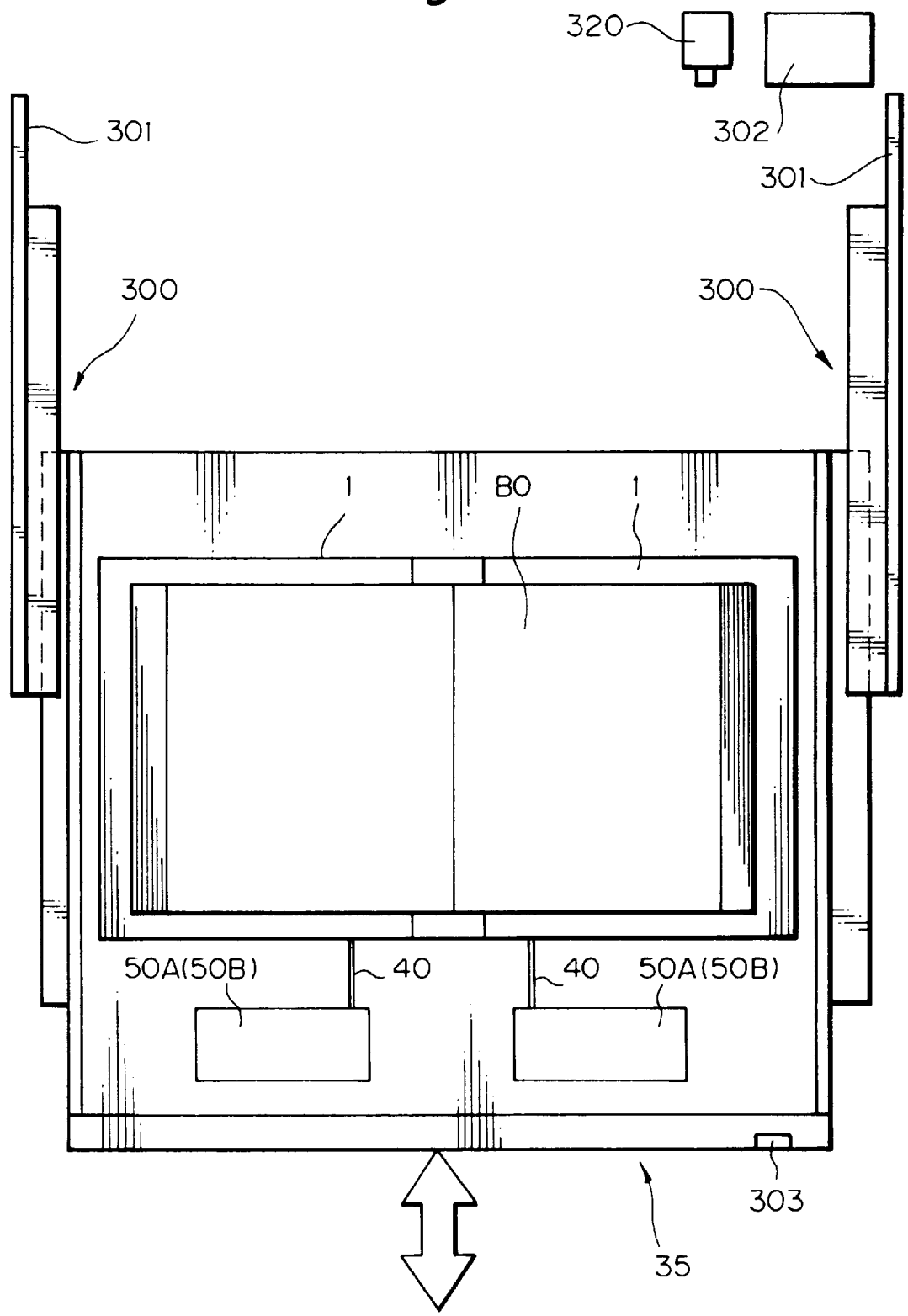
FIG. 59 is a plan view showing the tables in the retracted positions.

A procedure for retracting the tables 1 to the lower portion of the table unit 35 will be described. In FIGS. 56 and 57, when the table motor 61 is so driven as to rotate the gear 56 in a direction b, the control pulley 48 and shaft 54 are rotated integrally via the one-way clutch 51. As a result, the control pulley 48 is rotated in the direction a, causing the control wire 40 to move toward the hook 44 side. As shown in FIGS. 42 and 59, such a movement of the control wire 40 causes the associated table 1 to move downward. When a right and a left lower limit sensor 304 (see FIG. 58) respectively sense the right and left tables 1, the table motors 61 is deenergized in order to stop the tables 1. That is, the tables 1 each is retracted to the lower portion of the table unit 35 spaced from the scanning unit 200, as shown in FIG. 59. This procedure is executed at the time of power-up, in a waiting status in which the reading operation is not performed, when a sheet laid on the glass platen 206 is read, and when the table unit 35 is drawn out.

The tables 1 are pushed upward to the upper portion of the table unit 35, as follows. As shown in FIGS. 56 and 57, when each table motor 61 is so driven as to rotate the gear 56 in a direction c, the shaft 54 is rotated in the direction opposite to the direction a, FIG. 53, with the result that the control pulley 48 becomes freely rotatable relative to the shaft 54 due to the one-way clutch 51. In the illustrative embodiment, the torsion springs 13 biasing the tables 1 upward each exerts a force greater than the force pulling the control wire 40 downward.

Therefore, while the control pulley 48 is freely rotatable in the direction opposite to the direction a, the associated control wire 40 moves to the hook 41 side due to the action of the spring 13 biasing the table 1 upward. As a result, in FIG. 42, the right and left tables 1 rise and press the opposite pages of the book BO spread thereon against the scanning unit 200.

As stated above, when the table motors 61 are continuously driven with the opposite pages of the spread book BO contacting the scanning unit 200, the shafts 54 become freely rotatable relative to the control pulley 48 due to the associated one-way clutches 51 and hold the book BO in contact with the scanning unit 200. This operation is executed only when the scanning unit 200 is positioned above the tables 1.

As shown in FIG. 59, the table pressure switching device and table retracting device, respectively labeled 50A and 50B, are provided in a pair for each of the right and left tables 1. Two pairs of these devices are controlled independently of each other in accordance with the position of the scanning unit 200. More specifically, two table motors 61 are respectively assigned to the above two pairs and controlled independently of each other.

Figure 60:
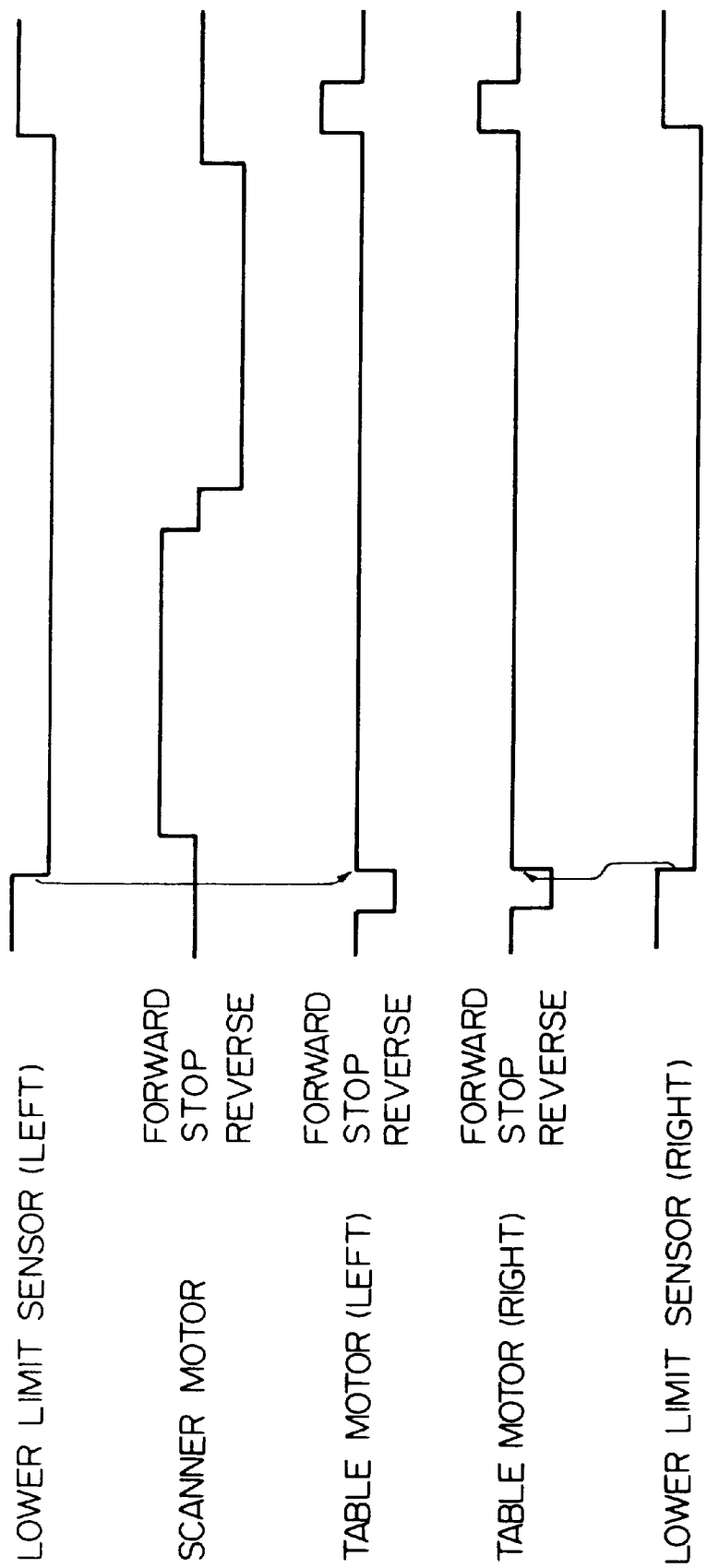
FIG. 60 is a timing chart demonstrating the retraction of the tables.

FIG. 59 shows the retraction of the tables 1 in the above retract mode while FIG. 60 demonstrates it in a timing chart. As shown in FIG. 60, before the start of movement of the scanning unit 200, the right and left table motors 61 are reversed until the right and left lower limit sensors 304 respectively sense the right and left tables 1. As a result, the two tables 1 are lowered to the positions shown in FIG. 58. Subsequently, the scanner motor 106 is energized to move, repeatedly if necessary, the scanning unit 200 in the preselected direction. At the end of the retract mode, the scanning unit 200 returns to its center home position. At this time, the two table motors 60 each makes a preselected number of rotations forward, raising the associated table 1 to its original position.

To read a sheet laid on the glass platen 206, the scale 207 is used as a reference for positioning the edge of the sheet. This reference differs from the read start position assigned to a book and minimizes the configuration. Therefore, the point where the scanning unit 200 starts reading a sheet remains constant, and the control is simplified. In the sheet mode, after the tables 1 have been retracted downward, the scanning unit 200 moves to the left from its center home position. When the end HP sensor senses the scanning unit 200 reached the end home position shown in FIG. 61, the scanning unit 200 is brought to a stop. The scanning unit 200 waits in this condition until the operator inputs desired reading conditions and operates the start switch. On the operation of the start switch, the scanner motor 106 is energized to cause the scanning unit 200 to move to the right, as viewed in FIG. 42, while scanning the sheet.

Figure 62:
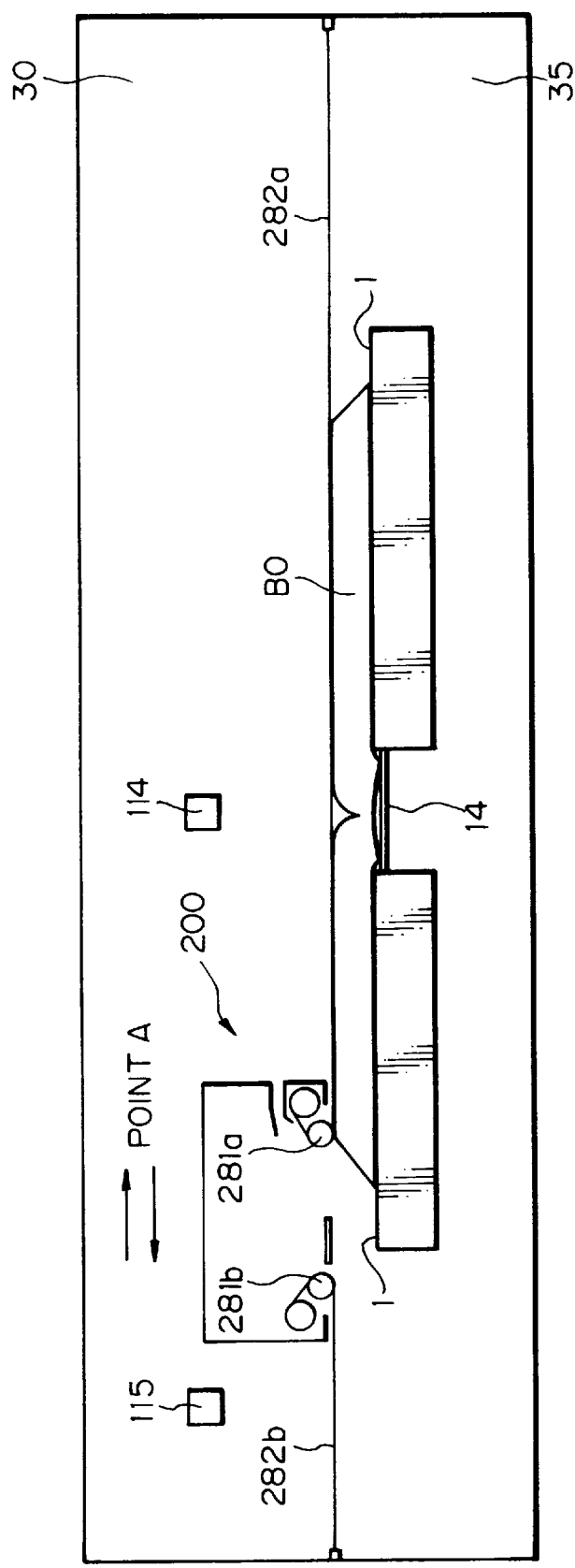
Figure 63:
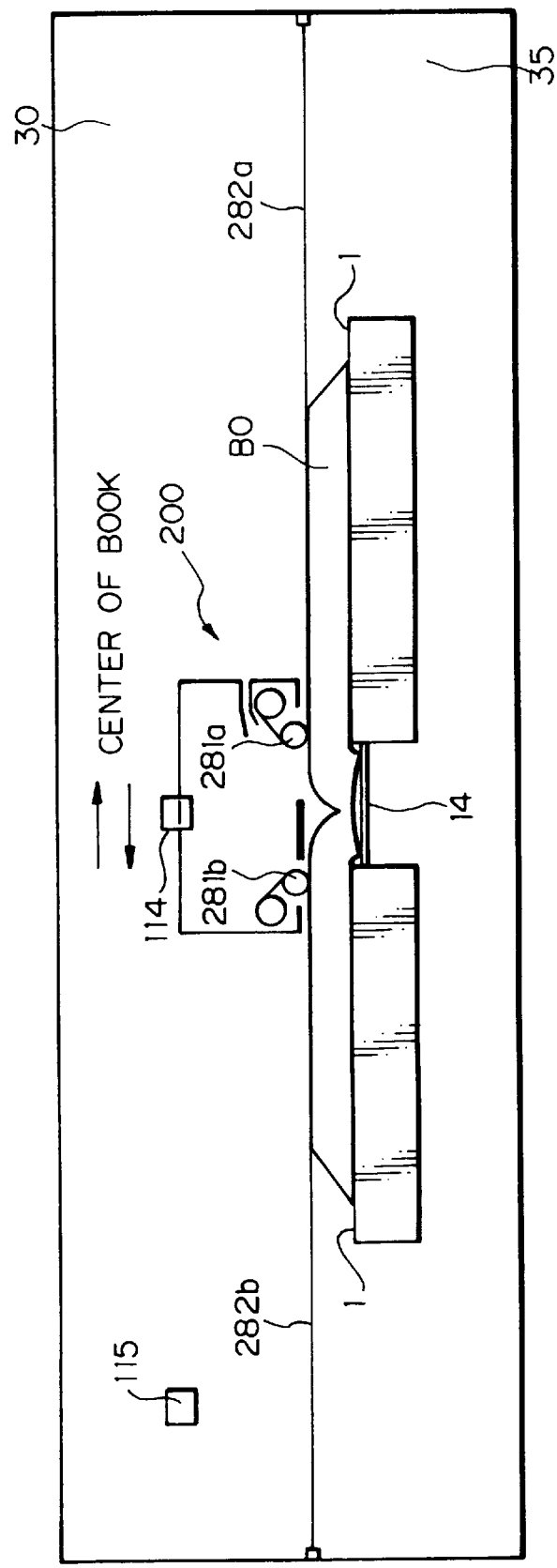

A table press and fix mode particular to the illustrative embodiment is as follows. When the operation of the TPS ends in the book mode, the scanning unit 200 is brought to its center home position shown in FIG. 42. The scanning unit 200 is therefore held in the center home position also when the book BO is to be set on the TPS. Because the book BO is set by using the center of the TPS as a reference, locating the scanning unit 200 at the above home position at the time of setting of the book BO is successful to surely press a book of any side when the tables 1 of the table unit 35 slid into the apparatus body are raised. At the beginning of this mode operation, the center HP sensor again determines whether or not the scanning unit 200 is held a the center home position. The scanning unit 200 moves to the left from the center home position and then stops on reaching the end home position (see FIG. 62) where the end HP sensor is located.

Figure 66:
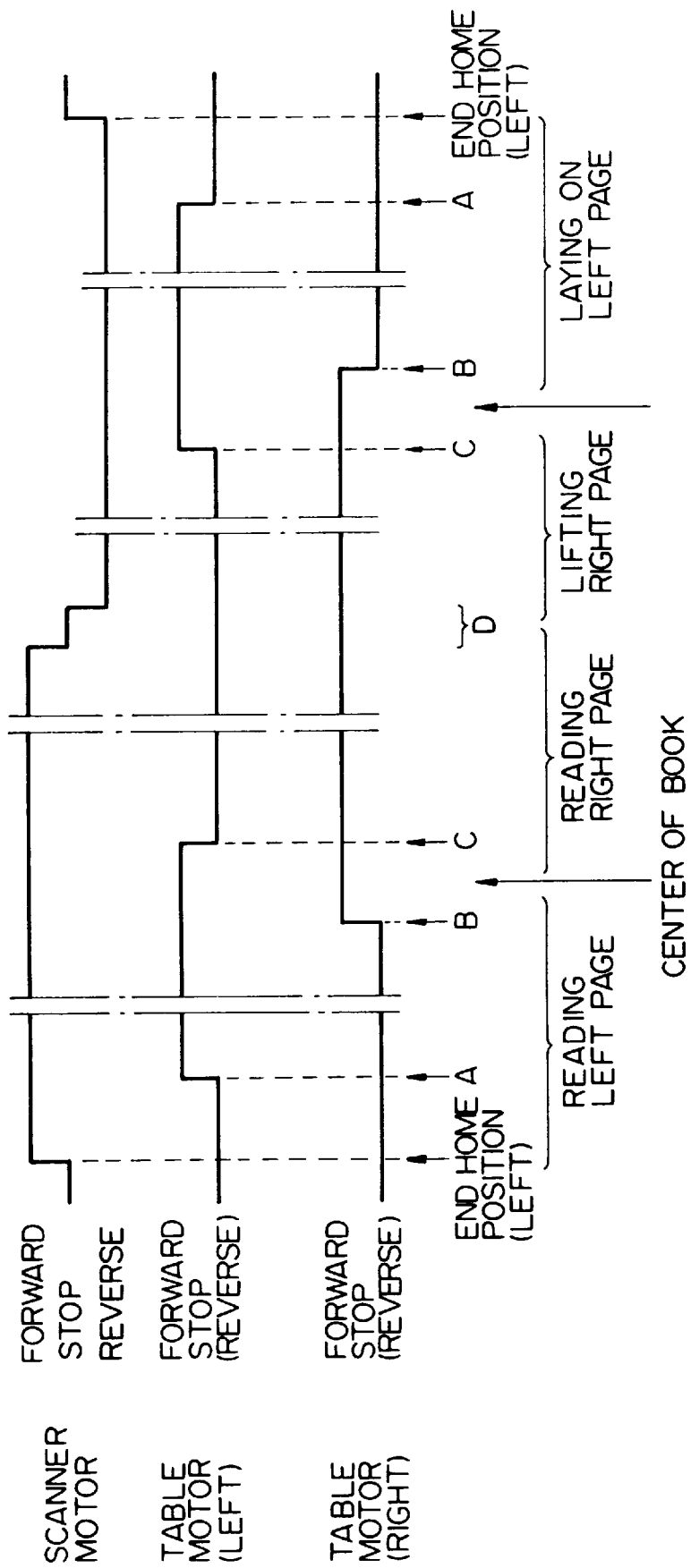
FIG. 66 is a timing chart demonstrating the operation of the scanning unit of the alternative embodiment.

FIGS. 61–65 show the consecutive positions of the scanning unit 200 to occur in the table press and fix mode while FIG. 66 demonstrates them in a timing chart. The end home position of the scanning unit 200 (see FIG. 61) is the point where the unit 200 starts its image reading and page turning operation and ends it. At the end home position, the scanning unit 200 does not overly the tables 1. In this condition, the two table motors 61 are not energized, maintaining the associated tables 1 stationary.

Figure 61:
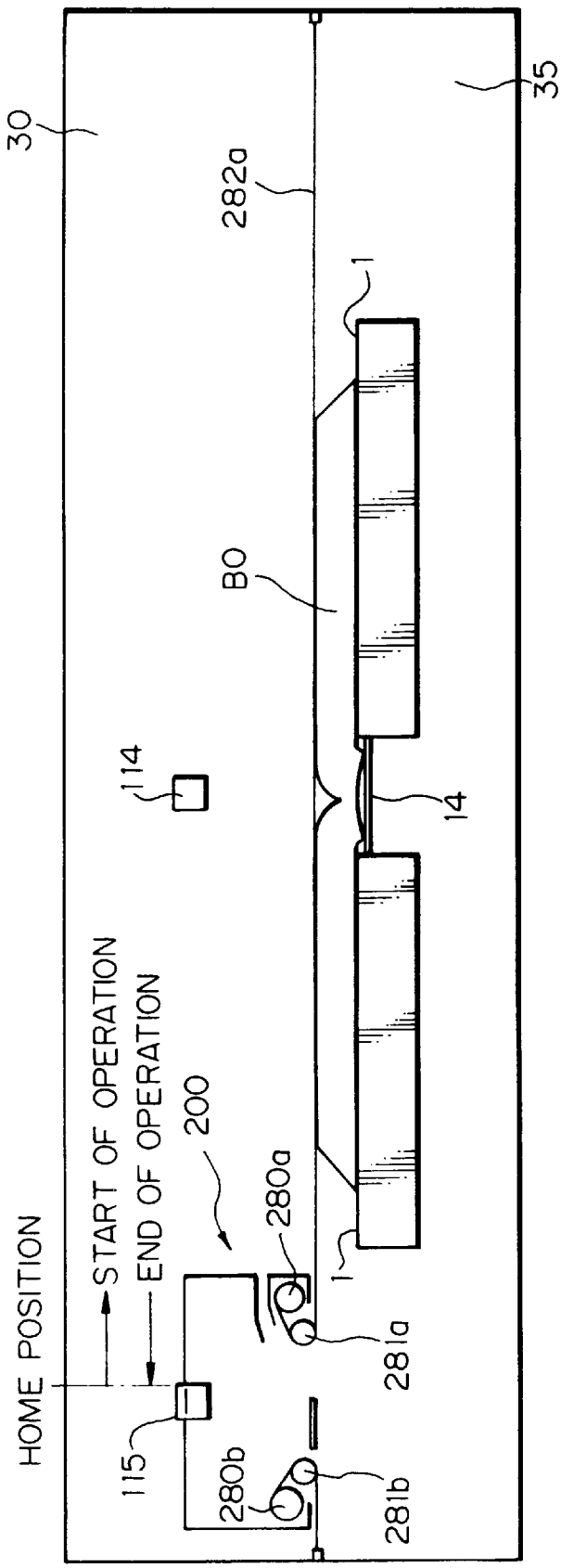
FIGS. 61–65 each shows the scanning unit of the alternative embodiment at a particular position.

The press and fix mode operation begins with the step of driving the scanner motor 106 in the forward direction and thereby moving the scanning unit 200 to the right, as viewed in FIG. 61. When the right press roller 281a of the scanning unit 200 arrives at the left edge of the spread book BO (point A shown in FIG. 62), the left table motor 61 is caused to rotate forward so as to press the left table 1, i.e., the book BO against the scanning unit 200. In this condition, the scanning unit 200 is capable of reading the book BO in the optimal condition.

Just before the scanning unit 200 reaches the center point of the book (see FIG. 63), the right press roller 281a aligns with the left edge of the right table 1 (point B shown in FIG. 66). At this time, the right table motor 61 is rotated forward so as to press the right table 1 against the scanning unit 200 with the intermediary of the book BO. The scanning unit 200 moves away from the center point of the book BO and starts reading the right page of the book BO. When the left press roller 281b aligns with the right edge of the left table 1 (point C shown in FIG. 66), the left table motor 61 is deenergized with the result that the left table 1 is locked in position. Consequently, the book BO is fixed in place and pressed by the press sheet 282b without protruding into the scanner unit 30. The book BO therefore waits until the next passage of the scanning unit 200 while remaining at the same level or height.

Figure 64:
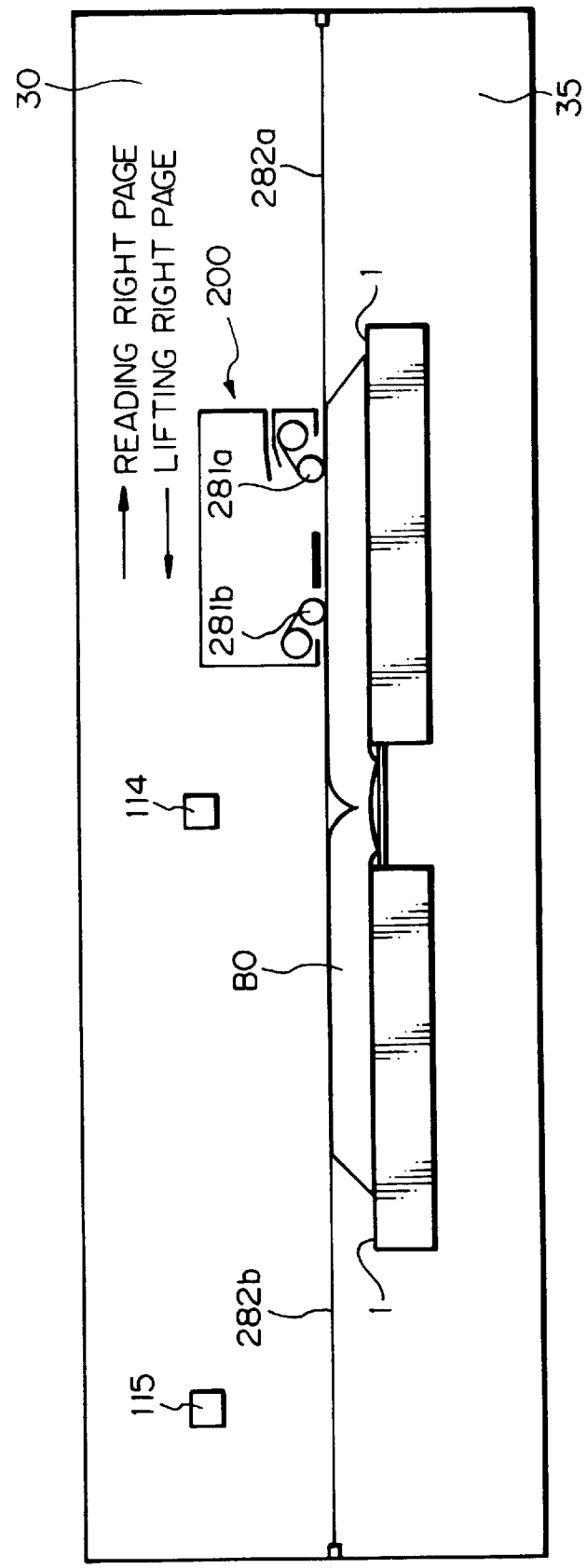
Figure 65:
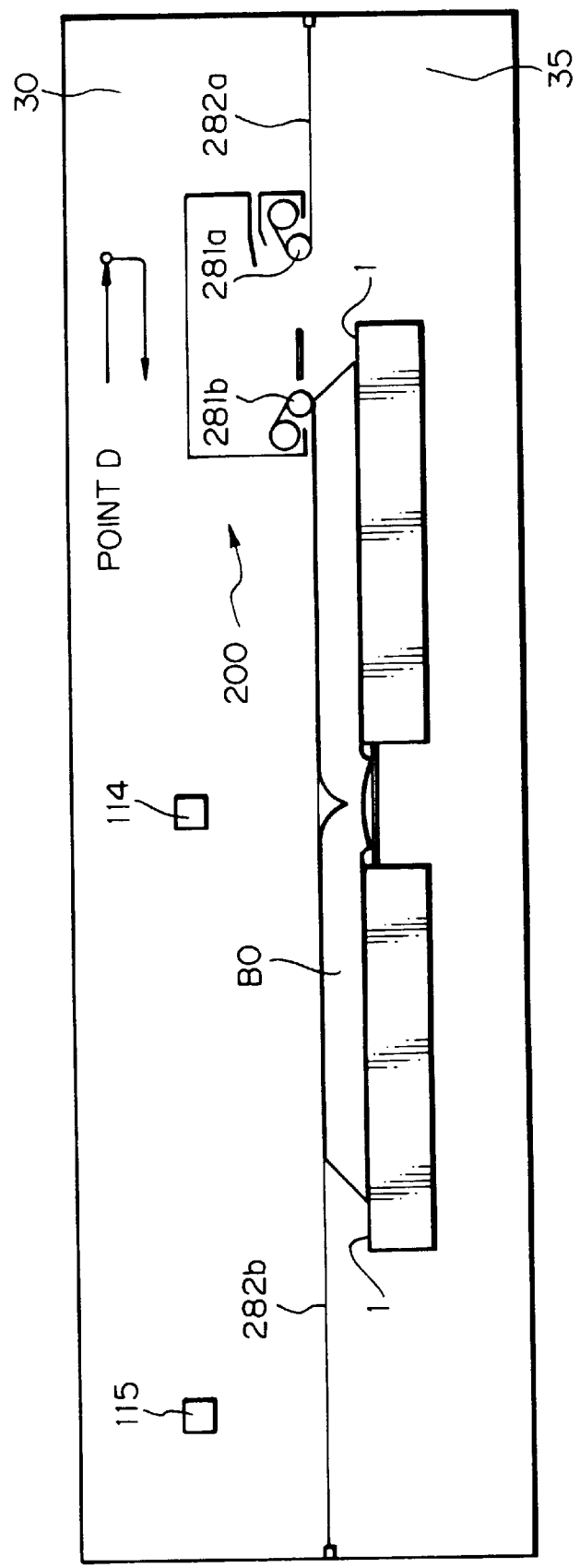

FIG. 64 shows the position of the scanning unit 200 reading the right page of the book BO or turning over the right page of the same. On fully reading the right page of the book BO, the scanning unit 300 is brought to a stop when the left press roller 282b aligns with the right edge of the right table 1 (point D shown in FIG. 65). Then, the scanner motor 106 is reversed in order to move the scanning unit 200 to the left. The scanning unit 200 moves to the left while lifting the right page of the book BO. Just before the scanning unit 200 reaches the center point, FIG. 63, of the book BO, the left press roller 281b aligns with the right edge of the left table 1 (point C). At this time, the left table motor 61 is rotated forward in order to bring the left table 1 to the pressing position.

The scanning unit 200 moved away from the center point starts laying the lifted right page on the left page. When the right press roller 281a aligns with the left edge of the right table (point B), the right table motor 61 is deenergized so as to lock the right table 1. The book BO is fixed in place and pressed by the press sheet 282a without protruding into the scanner unit 30. The book BO therefore waits until the next passage of the scanning unit 200 while remaining at the same level or height.

The scanning unit 200 moves further to the left while laying the right page on the left page. After the right page has been laid flat on the left page, the right press roller 281a arrives at the left edge of the left table 1 (point A, FIG. 62). Then, the left table motor 61 is deenergized so as to lock the left table 1. The book BO is fixed in place and pressed by the press sheet 282b without protruding into the scanner unit 30. The book BO therefore waits until the next passage of the scanning unit 200 while remaining at the same level or height. The scanning unit 200 stops on reaching the end home position (see FIG. 61).

A mechanism for allowing the table unit 35 to be drawn out of the scanner unit 30 will be described hereinafter. As shown in FIGS. 42 and 59, slide rails 300 are mounted on the right and left sides of the table unit 35 and respectively connected to rail brackets 301 disposed in the scanner unit 30. The slide rails 300 are slidable in the front-and-rear direction of the apparatus body. So long as the table unit 35 is set in the scanner unit 30, a locking device 302 shown in FIG. 59 locks the table unit 35 to the scanner unit 30 unless it receives a particular command, preventing the operator from pulling out the table unit 35. This condition is sensed by a lock sensor 320. The slide rails 300 are extendable such that the table unit 35 can be sufficiently pulled out from the front of the apparatus body. An open/close switch 303 and a knob, not shown, for facilitating the pull-out of the table unit 35 are mounted on the front end of the table unit 35.

To set a book on the tables 1, the operator presses the open/close switch 303 after confirming that the book mode is set up on the operation panel 99. If the book mode is not set up, the operator presses the book mode switch provided on the operation panel 99. In any case, if the tables 1 are not held in the lowered or retracted positions, the procedure for retracting them is executed. If the scanning unit 200 is not held at the center home position, the procedure for moving it to the center home position is executed.

If the scanning unit 200 is held at the center home position, the locking device 302 is deenergized to allow the operator to draw out the table unit 35. At this instant, a message showing the operator that the table unit 35 can be pulled out appears on the operation panel 99. The operator pulls the table unit 35 toward the front of the apparatus body by gripping the knob. Then, the operator releases the catches 15 of the right and left press plates 14 from the stops 16 and lifts the front ends of the press plates 14 so as to uncover the tables 1 (see FIG. 51).

In the above condition, the operator places the front and rear covers of the book BO on the two tables 1 while positioning the book BO in the previously stated manner. Then, the operator turns down the press plates 14 so as to sandwich the front and rear covers between the press plates 14 and the tables 1 facing them, and locks the catches 15 to the stops 16 (see FIG. 52).

Subsequently, the operator opens the book BO at a desired page to copy first and then pushes the table unit 35 into the scanner unit 30 while pressing the bound portion of the spread book BO with one hand. When the lock sensor 320 senses the table unit 35 set in the scanner unit 30 by the operator, the locking device 302 again locks the table unit 35 at a preselected position. Thereafter, the two motors 61 are driven to raise the tables 1 until the book BO reaches the preselected reading position.

Figure 67:
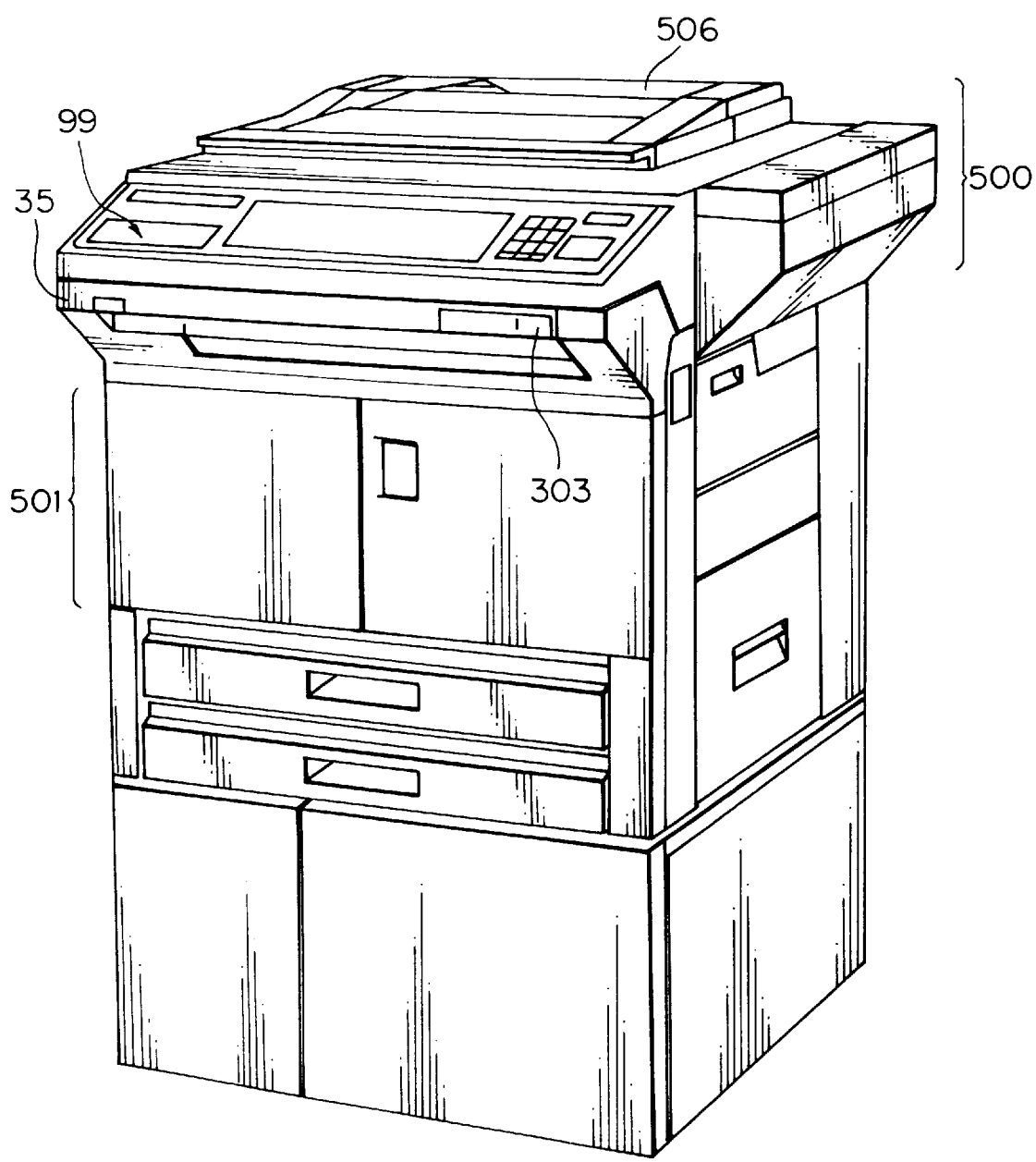
FIG. 67 is a perspective view showing the tables in a set condition.
Figure 68:
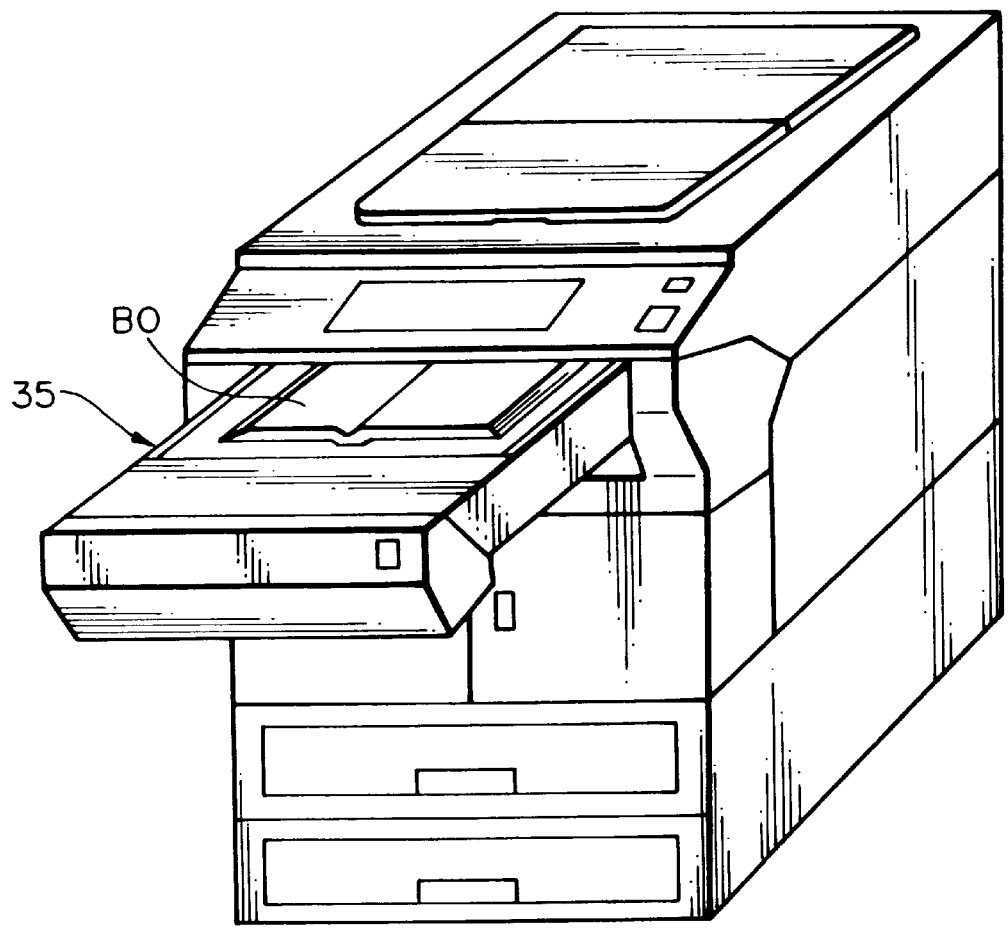
FIG. 68 is a perspective view showing the tables drawn out of the apparatus body.

FIG. 67 is an external view of the apparatus of the illustrative embodiment. As shown, the apparatus includes a cover plate 506 for pressing a sheet. FIG. 68 shows the apparatus in a condition wherein its table unit 35 is drawn out for setting or removing a book. As shown in FIG. 68, the book BO is set on or removed from the table unit 35 after the table unit 35 has been drawn out from the apparatus body.

How the TPS illuminates a book is as follows. As shown in FIG. 50, the fluorescent lamps 201 and 202 are assigned to a book while the fluorescent lamps 203 and 204 are assigned to a sheet. The illustrative embodiment includes an illumination circuit having the four lamps 201–204 and two inverter circuits each being associated with two of the four lamps. When a sheet document or a book is read, the two inverter circuits are switched by a relay in response to a control signal in order to turn on the lamps 201 and 202 or the lamps 203 and 204. The lamps 201 and 202 for a book are disposed above the opposite ends of the glass platen 205 which is located at a slit position in the direction perpendicular to the running direction of the scanning unit 200.

The lamps 201 and 202 illuminate the spread book BO from opposite sides via the glass platen 205 in order to obviate irregularity in density ascribable to the right and left pages of the book BO and a shadow ascribable to the bound portion of the book BO. The other lamps 203 and 204 for a sheet are disposed below a slit position above the scanning unit 200 in the direction perpendicular to the above direction. After a sheet SO has been set on the glass platen 206 by use of the scale 207, the lamps 203 and 204 illuminate it from opposite sides via the glass platen 206. The inverter circuits each drives the lamps 201 and 202 or the lamps 203 and 204 at a frequency of 40 kHz in synchronism with the pixel sampling of the CCD image sensor, thereby obviating irregularity in density.

Figure 69:
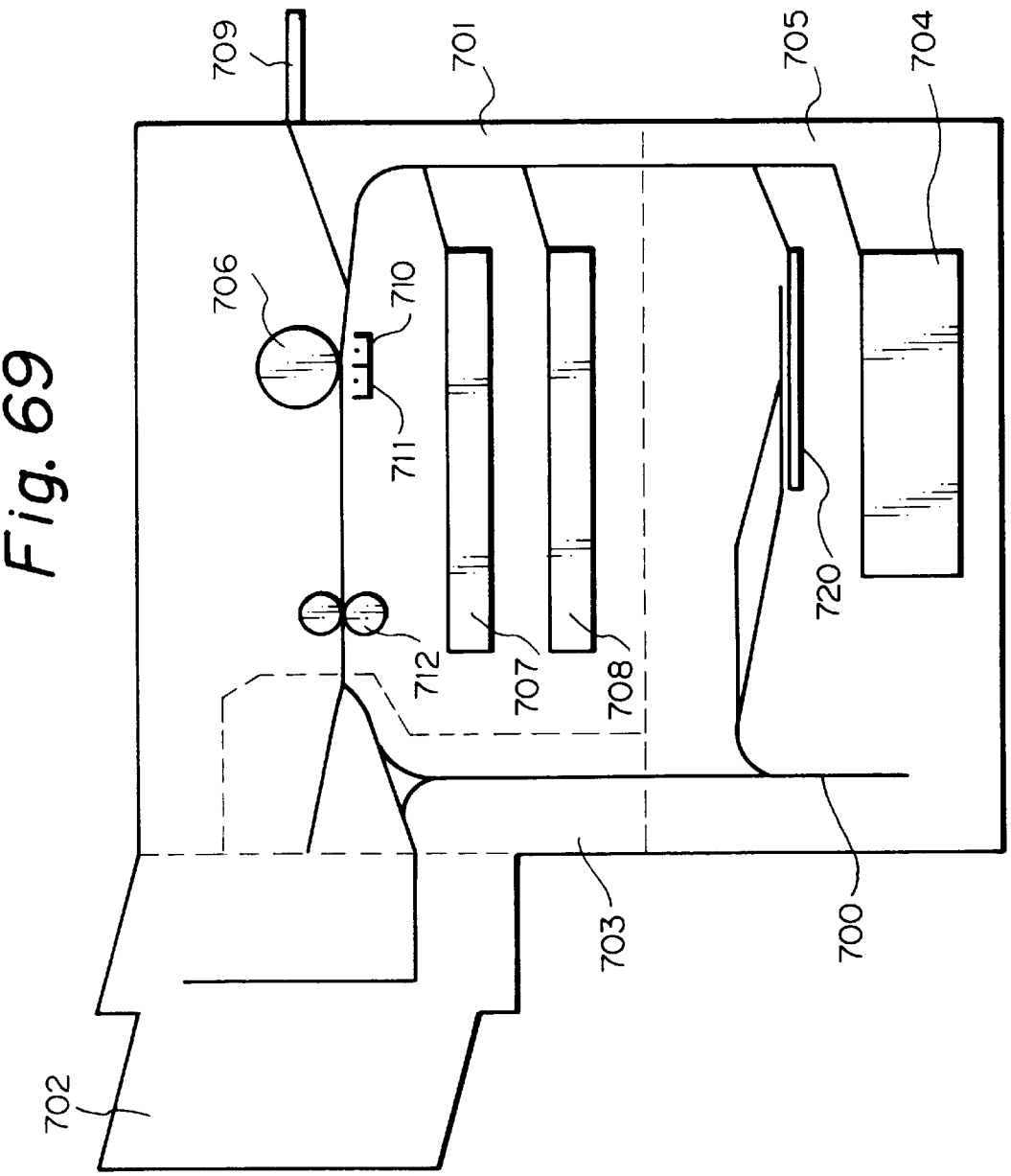
FIG. 69 is a section showing the general construction of the alternative embodiment.

FIG. 69 shows an image forming section or image forming means included in the illustrative embodiment. As shown, the image forming section has the printer body 701 implemented by a laser printer, the sorter 702 and turning unit 703 which are peripherals associated with the printer body 701, and the bank 705 including a duplex copy unit and LCT. The printer body 701 includes the photoconductive element or similar image carrier 706. While the drum 706 is rotated by a drive section, a charger, not shown, uniformly charges the surface of the drum 706. Exposing means including the semiconductor laser 105 scans the charged surface of the drum 706 in accordance with image data read out of the frame memory 104, thereby electrostatically forming a latent image on the drum 706. A developing unit, not shown, develops the latent image so as to produce a corresponding toner image.

A paper or similar recording medium is fed from any one of the cassettes 707 and 708 and LCT 704 or from the manual feed tray 704 toward a registration roller not shown. The registration roller drives the paper such that the paper meets the toner image formed on the drum 706. The image transfer charger or image transferring means 710 transfers the toner image from the drum 706 to the front or upper surface of the paper. The separator charger or separating means 711 separates the paper carrying the toner image thereon from the drum 706. Then, the toner image is fixed on the paper by the fixing unit 712. Subsequently, the paper with the fixed toner image conveyed to the turning unit 703. After the separation of the paper, the drum 706 is cleaned by a cleaning unit not shown. In the illustrative embodiment, the sorter 702 may be implemented by an optional unit and substituted for a copy tray not shown.

In a usual operation mode, the turning unit 703 discharges the paper or one-sided copy coming out of the fixing unit 712 to the copy tray face up. In a sort mode, the one-sided copy from the fixing unit 712 is driven out to a bin included in the sorter 702. In a duplex copy mode, the one-sided copy from the fixing unit 712 is steered into a turning path 700 extending vertically in the bank 705.

The turning path 700 switches back the one-sided copy and then delivers it to the duplex copy tray or unit 720 face up. Subsequently, the one-sided copy is again fed from the tray 720 toward the registration roller. As a result, another toner image is formed on the rear of the same paper and then fixed thereon. The resulting two-sided or duplex copy is driven out to the sorter 702 or the copy tray.

In a turn mode, the pages of a book are sequentially copied on consecutive papers. In a usual simplex copy mode, each paper coming out of the fixing unit 712 is steered into the turning path 700. The turning path 700 switches back the paper and feeds it upward. As a result the paper is discharged face down. Because the pages of the book are sequentially read and sequentially formed on papers, the papers are stacked in order of page.

In the illustrative embodiment, a book is set on the tables 1 in its spread position while being accurately positioned at the left edge of its bound portion and the front side. The front and rear covers of the book document are respectively fixed in place on the two tables 1, so that the top pages of the spread book are protected from displacement ascribable to the configuration of the bound portion varying during repeated image reading.

Figure 70A:
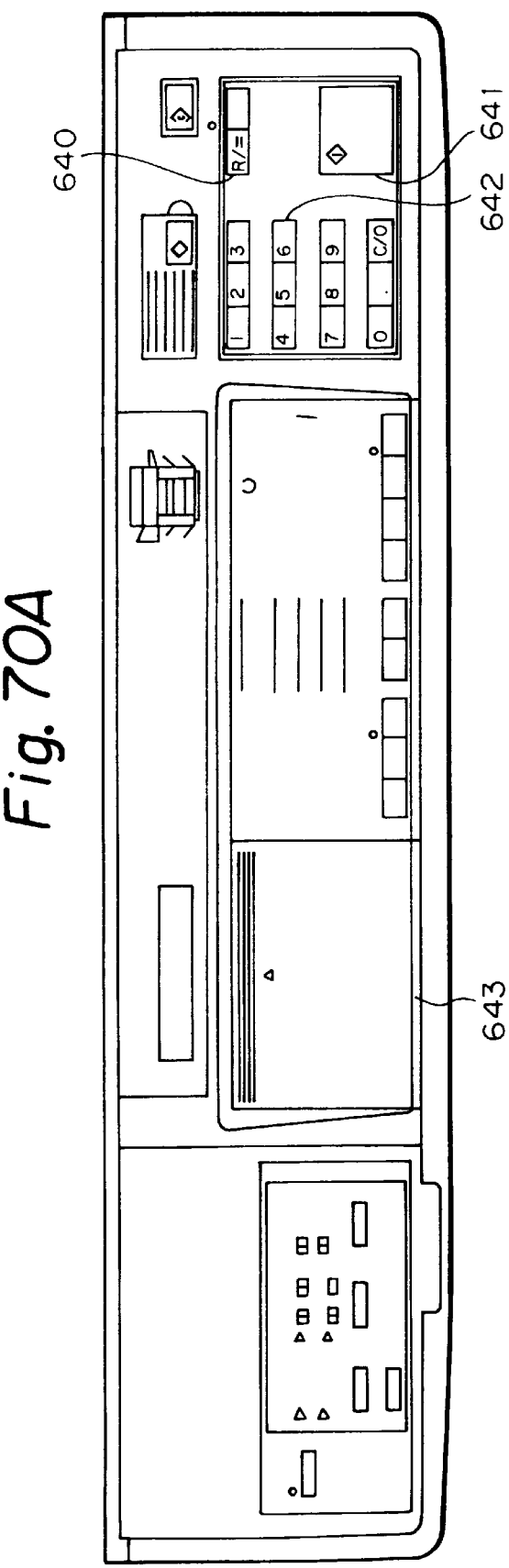
FIGS. 70A and 70B are plan views respectively showing an operation panel included in the alternative embodiment and a part thereof.
Figure 70B:
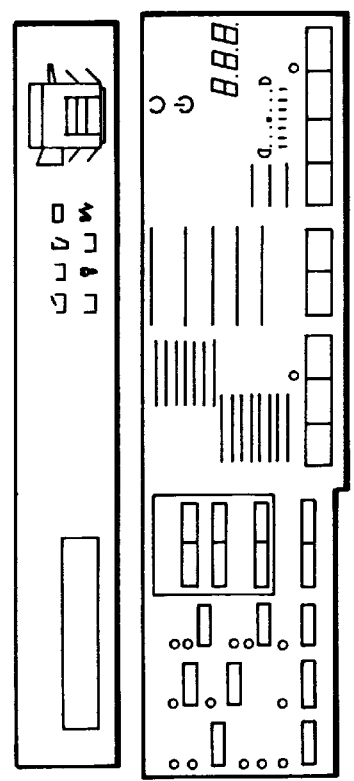
Figure 71:
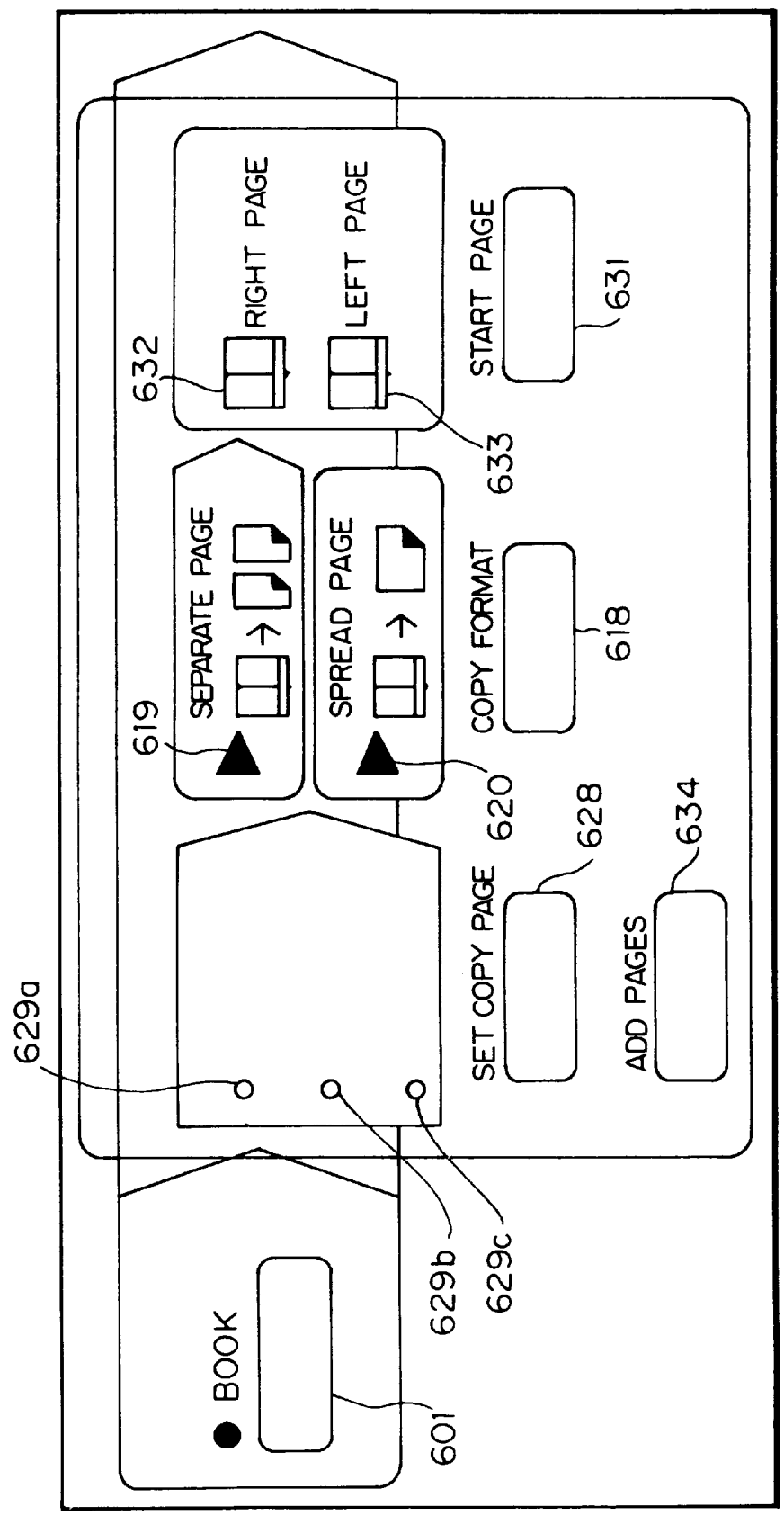
FIGS. 71 and 72 are plan views each showing a particular portion of the operation panel shown in FIGS. 70A and 70B.
Figure 72:
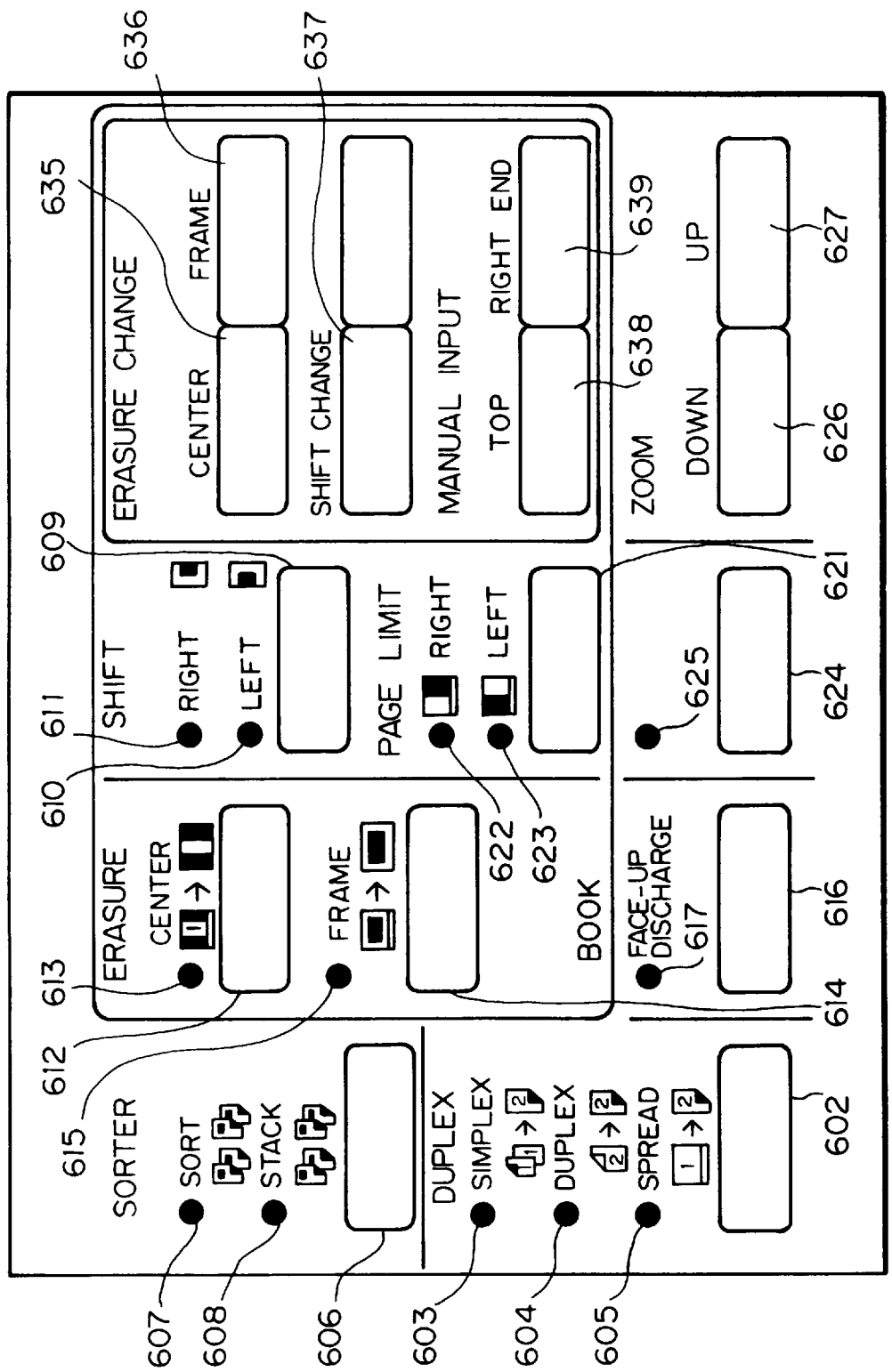

FIGS. 70A and 70B respectively show the overall configuration of the operation panel 99 and a part of the panel 99. FIG. 71 shows a portion of the operation panel 99 assigned to the basic book mode operation and arranged in the left part of the operation panel 99. Essential information relating to the book mode are input on the portion shown in FIG. 71. In the book mode, the operator sequentially operates keys 610, 628, 634, 618 and 631 arranged from the right to the left so as to select the book mode, set pages to be copied and additional pages, and select a desired copy format; in the separate page mode, the operator selects the left page or the right page to be copied first. In this condition, the apparatus is ready to copy a book. FIG. 72 shows a behind panel portion usually hidden by a behind cover. By opening the behind cover, the operator may select any one of the sort mode, duplex copy mode, zoom mode and other editing modes shared by a sheet and a book, and the erasure, shift or similar mode particular to a book document.

Specifically, the operation panel 99 includes a key 609 for selecting an image reference mode in the event of copying a book, and LEDs 610 and 611. The image reference position is either the paper left edge (left positioning) or the paper right edge (right positioning). Every time the key 609 is pressed, the image reference mode is switched to a center mode, a left edge mode or a right edge mode. The LED 610 glows when the left positioning is selected while the LED 611 glows when the right positioning is selected. The basic image reference mode, i.e., center mode, is not displayed.

The above center mode is set up with priority at the time of power-on, mode clearing, book mode selection and other default conditions. This successfully obviates the local omission of an image ascribable to the erroneous size detection or the misregistration of image formation itself, and prevents images to be formed at edge portions in order to render the deviation of an image inconspicuous. In the duplex copy mode, priority is given to the left edge mode or the right edge mode in order to form a binding margin.

The key 601 allows the operator to select either the sheet mode for reading a sheet laid on the glass platen 206 or the book mode for reading a book set on the tables 1. Every time the key 601 is pressed, the sheet mode and book mode are set alternately.

A key 602 is used to select the duplex copy mode while LEDs 603, 604 and 605 are associated with the key 602. Every time the key 602 is pressed, a duplex mode for a simplex document, a duplex mode for a duplex document and a simplex copy mode are sequentially set while the LEDs 603–605 are sequentially turned on.

As shown in FIG. 71, the operation panel 99 further includes an enter key 640, a print key 641 and numeral keys 642 and various LEDs. As shown in FIGS. 71 and 72, a key 606 is used to select either the sort mode or the stack mode available with the sorter 702; LEDs 607 and 608 are associated with the key 606. Every time the key 606 is pressed, the sort mode and stack mode are set alternately.

A key 612 allows the operator to select a center erase mode for erasing the image of a bound portion over a desired width, using the center of a spread book as a reference; an LED 613 is associated with the key 612. A key 614 allows the operator to select an erase mode for erasing the image of a frame over a desired with, using a book as a reference; an LED 615 is associated with the key 614. A key 616 allows the operator to select a face-up discharge mode for discharging copies face up; an LED 617 is associated with the key 616.

The key 618 mentioned earlier is used to select either the separate page mode or the spread page mode; LEDs 619 and 620 are associated with the key 618. Every time the key 618 is pressed, the separate page mode and spread page mode are set alternately. A key 621 is used to select either the right page limit mode for copying only the right page of a spread document or the left page limit mode for copying only the left page of the same; LEDs 622 and 623 are associated with the key 621. Every time the key 621 is pressed, the right page limit mode and left page limit mode are set alternately.

A key 624 allows the operator to select a desired magnification change ratio independently; an LED 625 is associated therewith. Keys 626 and 627 each is used to increase or decrease a zoom magnification. The key 628 allows the operator to select the mode for setting the number of pages to be copied on the basis of the start page and end page, the mode for setting it on the basis of the total number of pages, or the end sheet mode using the end sheet; LEDs 629a–629c are associated with the key 628. The key 631 is used to select the left page or the right page of a spread book to be copied first; LEDs 632 and 633 are associated with the key 631. The key 634 is used to add another bunch of pages of a book to be copied. Keys 635 and 636 are respectively used to change the center erasure width and frame erasure width of a book. A key 637 is used to change the position (shift) of an image in the book mode. Keys 638 and 639 are available for manually inputting a document position. The numeral keys 642 and enter key 640 are used to change the above settings input on the keys 635–639 and then enter new settings.

Assume that the operator presses the print key without setting any pages to be copied in either the start page and end page mode or the total page number mode. Then, the apparatus starts copying the book at the spread page and stops its operation on reaching the end sheet put in the book in the end sheet mode. When the end sheet is absent in the book, the apparatus stops it operation at the last page of the book. A flowchart shown in FIG. 85 in which the right page or the left page to be copied first is designated includes a procedure beginning with the start of copying without any page number input and ends with a stop caused by the end sheet.

Figure 73:
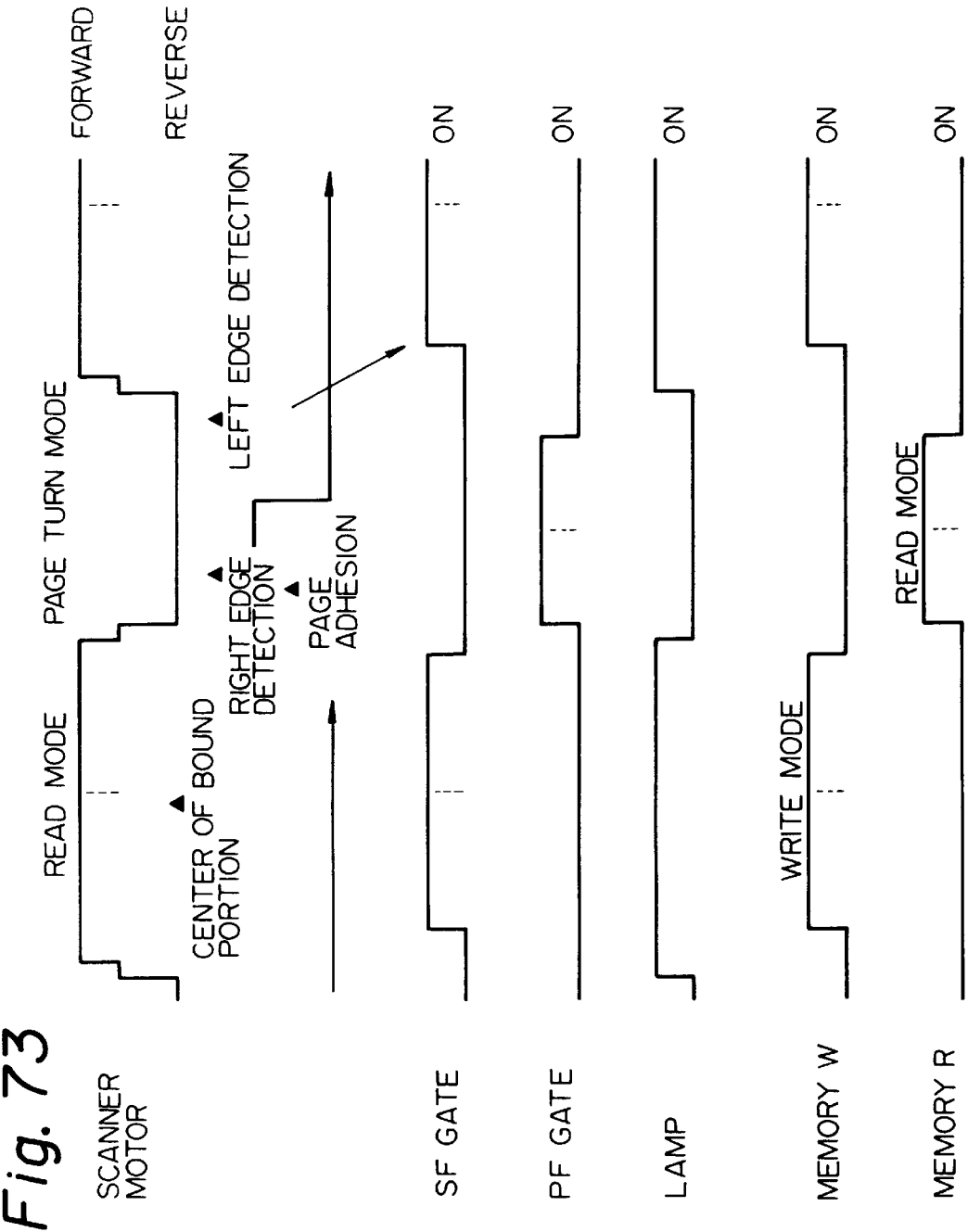
FIGS. 73 and 74 are timing charts each demonstrating a specific operation of the alternative embodiment in a book mode.
Figure 74:
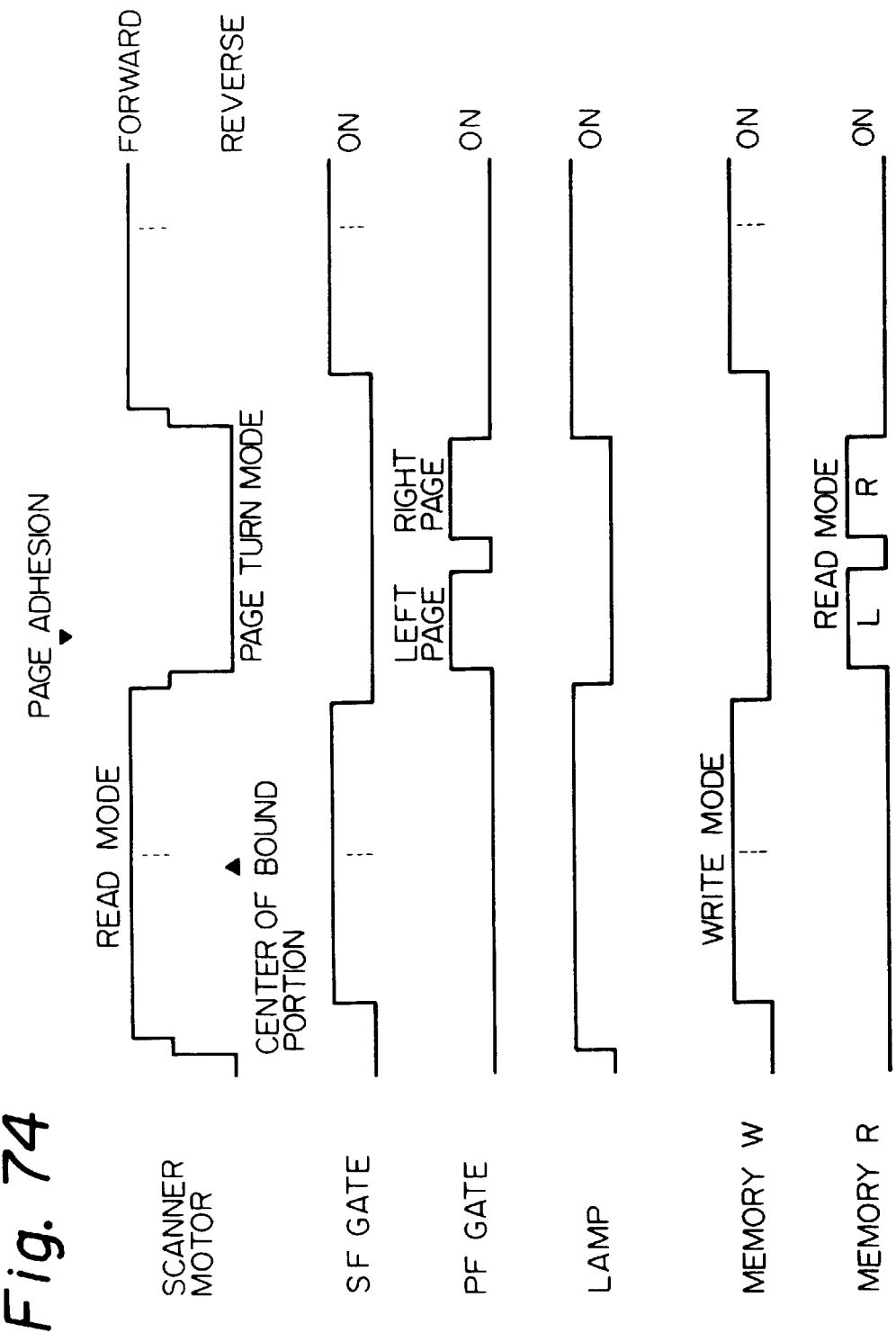

FIGS. 73 and 74 are timing charts each showing a specific operation of the apparatus to occur in the book mode. In the initial mode following the operation of the start key (print key), the edge of a book is detected on the basis of image data. In FIGS. 73 and 74, the edge of a book is detected on the basis of the received position of a page in the path while a continuous copy mode operation is under way. In FIGS. 73 and 74, letters R and L attached to the output of a read memory R included in the frame memory 104 are respectively representative of the right page and left page of a spread book. In each mode, the book has pages of size A4 and has its spread two pages read continuously by a single scanning of the scanning unit 200. As a result, image data corresponding to size A3 are written to the frame memory. Such data are read out of the frame memory in a manner matching with an output mode and printed on a paper.

Specifically, FIG. 73 shows a one-to-one copy mode for outputting the two pages of a spread document of size A3 on a single paper and producing a single set of copies of the book. FIG. 74 shows a one-to-one mode for printing each of the right and left pages of a spread book on a respective paper of size A4 (separate page mode) and thereby producing a single set of copies of the book.

When the print key 641 on the operation panel 99 is turned on, the scanner motor 106 is driven in the forward direction by the microcomputer of the IPU 103 in order to move the scanning unit 200 to the right from its center home position. As a result, an edge position for turning over the page for the first time is detected. Subsequently, at the timing shown in FIG. 73, the scanner motor 106 is driven by the microcomputer in order to move the scanning unit 200 toward its read start position defined at the left end at a high speed. When the scanning unit 200 reaches the read start position, the scanner motor 106 is driven in the forward direction by the microcomputer while the lamps 201 and 202 are turned on. In this condition, the scanning unit 200 starts reading the spread book.

The microcomputer of the IPU 103 processes the edge and successive portions of the left page of the book as a document image, outputting a valid image range signal SFGATE in the subscanning direction. Also, the microcomputer operates a data write signal memory W included in the frame memory 104 with the valid image range signal FGATE so as to control the data writing range.

After the above scanning movement, the scanning unit 200 is returned while turning over the page of the book. At first, the printer 501 starts forming an image after a valid image range has been determined on the basis of the received and discharged positions of the page, as stated earlier. The second and successive image formation each begins just after the scanning unit 200 has fully scanned the above valid image range. Specifically, when the scanning unit 200 turns over the page of the document, the microcomputer of the IPU 103 detects the page range of the book in terms of the addresses of the scanner motor 106 on the basis of the time when the page is inserted into the path between the page guides 227 and 228 and the time when it is discharged from the path, as determined by the page sensor 214. The microcomputer calculates the center or bound portion of the spread document. Such a page range and a center position are used to, e.g., form an image at a second image reference position in the separate page mode or at the center of a paper in the spread page mode.

The microcomputer of the IPU 103 operates a data read signal memory R also included in the frame memory 104 with a valid image range signal PFGATE generated in the printer 501, thereby outputting the image in synchronism with the printer 501. The page sensor senses the edge of the page every time the scanning unit 200 turns over the page. By the above procedure, the spread pages of the book are sequentially read while being automatically turned over.

In the separate page mode operation shown in FIG. 74, a read mode occurs at the same timing as in FIG. 31. When the page of the book is turned over, the data read signal memory R is operated by two consecutive pulses PFGATE in synchronism with two consecutive papers. As a result, the two spread pages each is reproduced on the respective paper. As for the image data of the right page, the address counter associated with the frame memory 104 is masked by the signal PFGATE. Consequently, the second image data of the right page contiguous with the first image of the left page are read out by the second pulse PFGATE at an interval equal to the interval between the papers.

The apparatus is capable of stably attracting and separating the edge of the page of a spread book varying due to the repeated page turning operation. The attracting position is important with the apparatus because the apparatus attracts only the edge of a page with the turn belt 208 and lifts it to the page receiving portion. In the illustrative embodiment, when the page of a book is turned over, the page sensor senses the edge of the page. The position where the edge of the page should be attracted and separated is accurately determined, despite that the position of the edge varies due to the repeated page turning operation. That is, the edge of the page at the side where scanning ends is detected on the basis of data representative of a page received position, and a position to which the roller should be lifted for page turning is determined on the basis of the above edge. This allows the consecutive pages to be attracted and separated by a constant amount.

Figure 75:
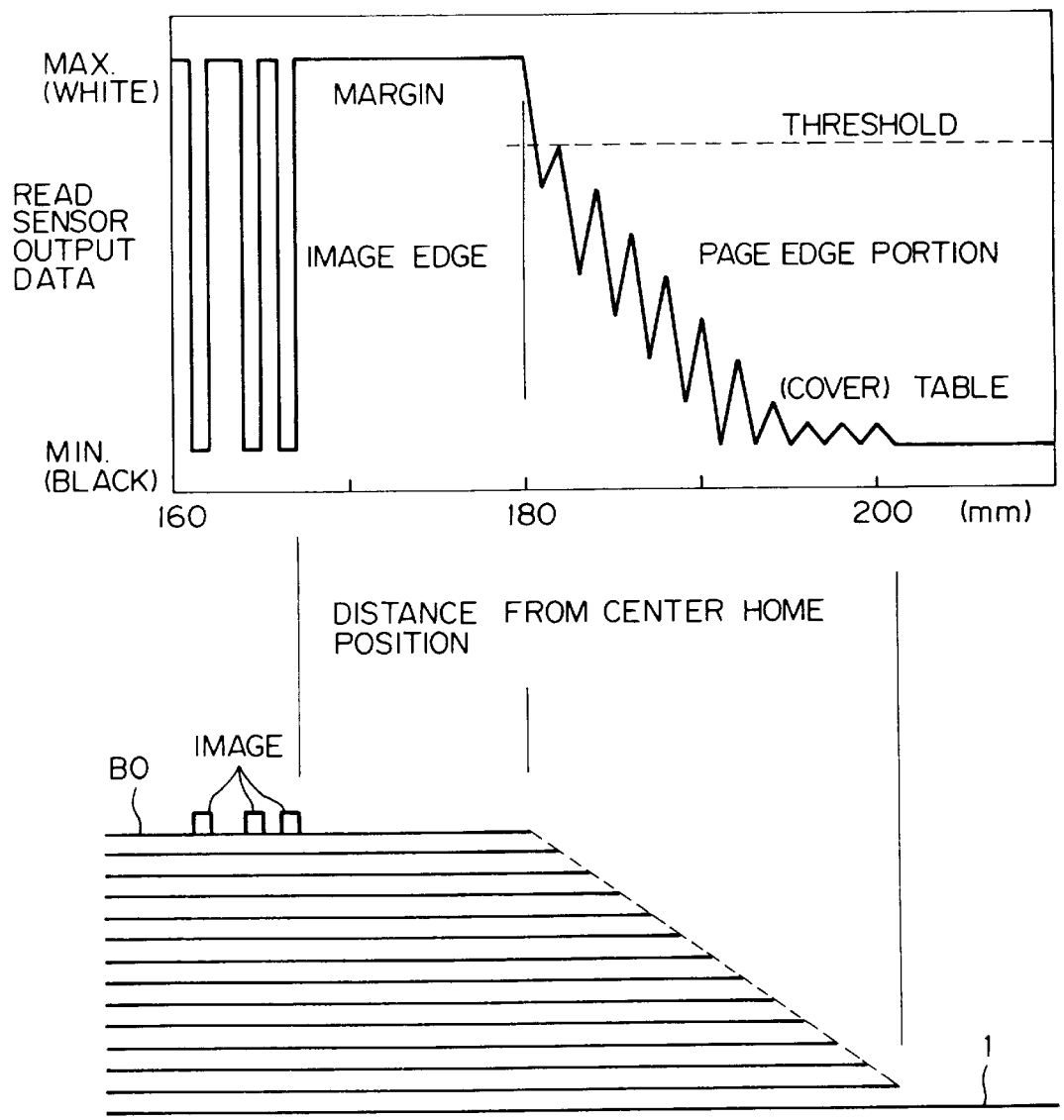
FIG. 75 shows data output from a read sensor included in the alternative embodiment and representative of the right edge portion of a spread book.

Reference will be made to FIG. 75 for describing how the illustrative embodiment detects the edge of a spread book in the subscanning direction. FIG. 75 shows specific data representative of the right edge of a spread book and sensed by the read sensor 101. In the case of a spread size of B4, the edge of the book is about 180 mm remote from the center set position in the subscanning direction. As shown, at the time of page turning following image reading, the read sensor 101 senses first the black frame of the table outside of the maximum size of a spread book in the main scanning direction. Then, the read sensor 101 senses, depending on the kind of the book, a stepped portion between the inside of the right cover and the edge of a page. Subsequently, the read sensor 101 reads the margin or background of the top page which is generally 10 and some millimeters wide, and then senses an image. The data continuous in the subscanning direction and output from the read sensor 101 are sampled and compared with a threshold value so as to detect the beginning of the margin. The beginning of the margin is determined to be the edge of the page.

Figure 76:
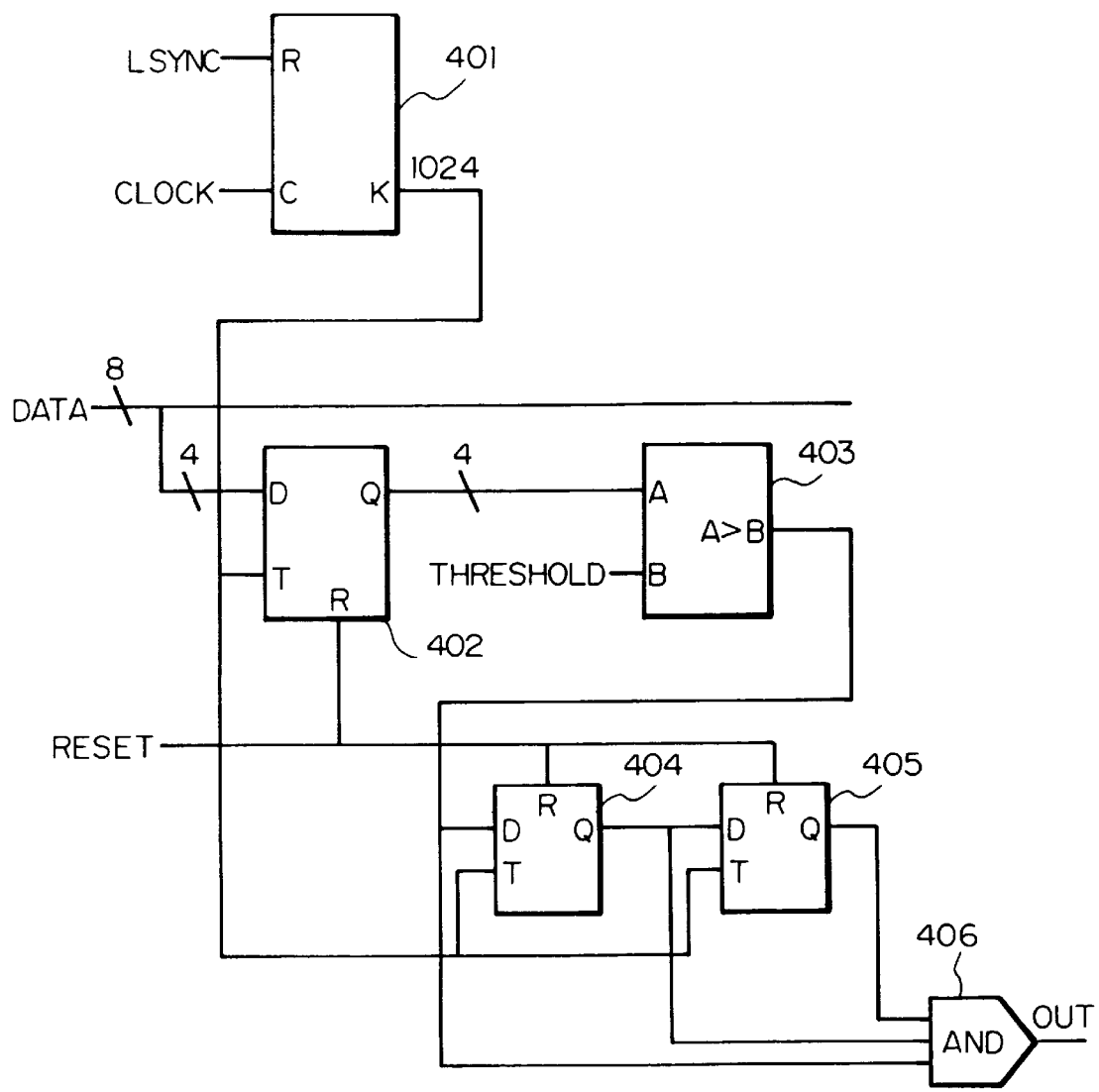
FIG. 76 is a block diagram schematically showing a circuit for detecting the right edge of the book in the subscanning direction.

FIG. 76 shows a circuit for detecting the edge of the spread book. The circuit detects the right edge in the subscanning direction on the basis of changes in the output of a particular pixel of the read sensor 101. In the illustrative embodiment, the reference for positioning a book is defined at the front side and corresponds to the minimum document size. Therefore, the particular pixel of the read sensor 101 is the 1,024th pixel which is 64 mm remote from the reference of the read sensor 101 at the front side of the apparatus. A counter 401 is reset by a synchronizing signal LSYNC synchronous with the main scanning of the read sensor 101. The counter 401 counts a clock CLOCK synchronous with a pixel signal output from the read sensor 101 and produces a signal going high in synchronism with the 1,024th pixel signal output from the read sensor 101.

A data latch 402 latches, at the positive-going edge of the output of the counter 401, the 1,024th pixel signal included in image data DATA output form the read sensor 101. A digital comparator 403 compares upper four of eight bits of data latched by the data latch 402 with a threshold value set by the microcomputer of the IPU 103 beforehand. Data output from the comparator 403 is delayed by each of D flip-flops 404 and 405 by a single scanning time. An AND gate 406 ANDs the output of the data output from the comparator 403 and the data output from the flip-flops 404 and 405. The AND gate 406 outputs an edge detection signal only when the data of the particular pixel output from the read sensor 101 exceeds the threshold value three consecutive times. The edge detection signal is sent to the microcomputer of the IPU 103.

As for the reading operation for the detection of the edge, the microcomputer of the IPU 103 causes the scanning unit 200 to start scanning at the right black table 1 or its frame portion to the left. At the same time, the microcomputer cancels a reset signal fed to the data latch 402 and flip-flops 404 and 405. After a stripe pattern representative of the edges of the cover and consecutive pages and continuous in the main scanning direction has been detected by the read sensor 101, image information on the right page are detected at random from the right to the left.

Books in general have white background and have no images in their margins extending over 10 and some millimeters from the edges. In light of this, the digital comparator 403 determines the position where the pixel signal of the 1,024th pixel is indicative of white evenly exceeding the threshold value to be the beginning of a margin. To enhance accurate detection, a plurality of sensor outputs may be used in the main scanning direction. Of course, the number of consecutive outputs of the particular pixel to be identified by the flip-flops 404 and 405 and AND gate 406 is not limited to three. The threshold value of the digital comparator 403 may be varied in matching relation to the system or the kind of documents.

By the above procedure, the edge of the specific book shown in FIG. 75 is determined to be 180 mm remote from the home position.

The edges of an image depend on the size of a spread book set with its center or bound portion used as a reference. Further, the position of the page differs from one page to another page, and the length of the page depends on the bound portion. In the illustrative embodiment, the result of edge detection in the subscanning direction is used for the microcomputer of the IPU 103 to calculate a page attracting position and a page lifting position. Likewise, during scanning of a book, the edge detecting circuit detects the left edge of the left page.

The result of edge detection in the subscanning direction is used for the microcomputer of the IPU 103 to determine a valid image range in the subscanning direction. At the time of copying, for example, the above result is used to bring an image into registration on a paper. Further, with the edge detection, it is possible to erase images outside of the valid image range and thereby eliminate wasteful solid black images. In addition, when the embodiment is applied to, e.g., a file system, it is possible to reduce the amount of data and thereby save the capacity of a memory.

Figure 77:
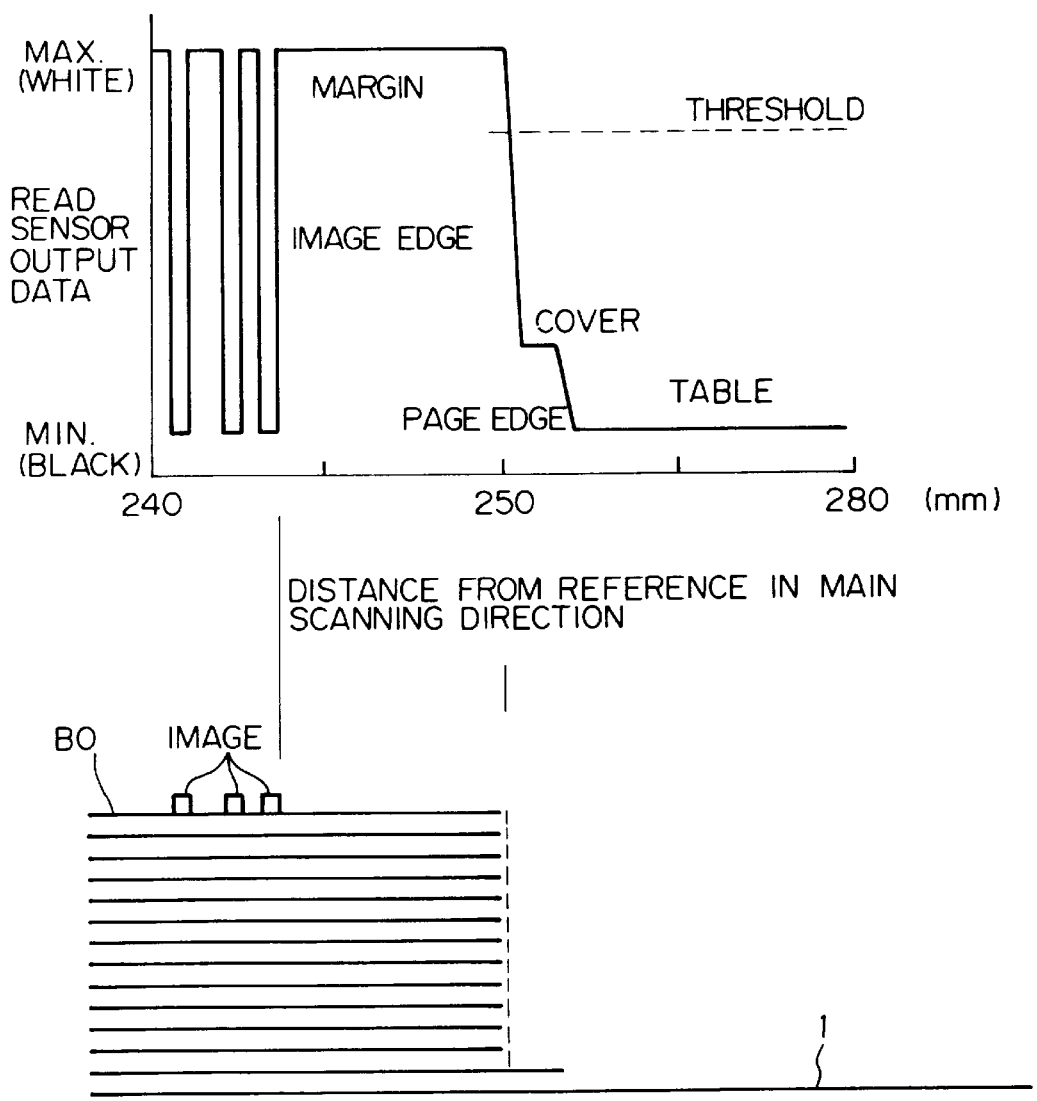
FIG. 77 shows data output from the read sensor and representative of the top edge portion of the book.

How the apparatus detects the edge of a spread book in the main scanning direction is as follows. FIG. 77 shows data output from the read sensor 101 and representative of the top edge of a spread book. In the case of a spread size of B4, the edge is about 270 mm remote from the front reference position in the main scanning direction. When the scanning unit 200 performed image reading is brought to a stop for attracting and lifting the page of a spread book, the read sensor 101 starts detecting the edge of the book from the fame of the table toward the front side of the apparatus in the main scanning direction. The read sensor 101 therefore reads the black frame of the table first, then reads the black table, and then reads, depending on the kind of the book, the inside of the right cover. Subsequently, the read sensor 101 reads the background or white portion of the top page generally extending over a width of 10 and several millimeters, and then detects an image. The resulting data continuous in the main scanning direction are compared with a threshold value in order to detect the beginning of a margin.

Figure 78:
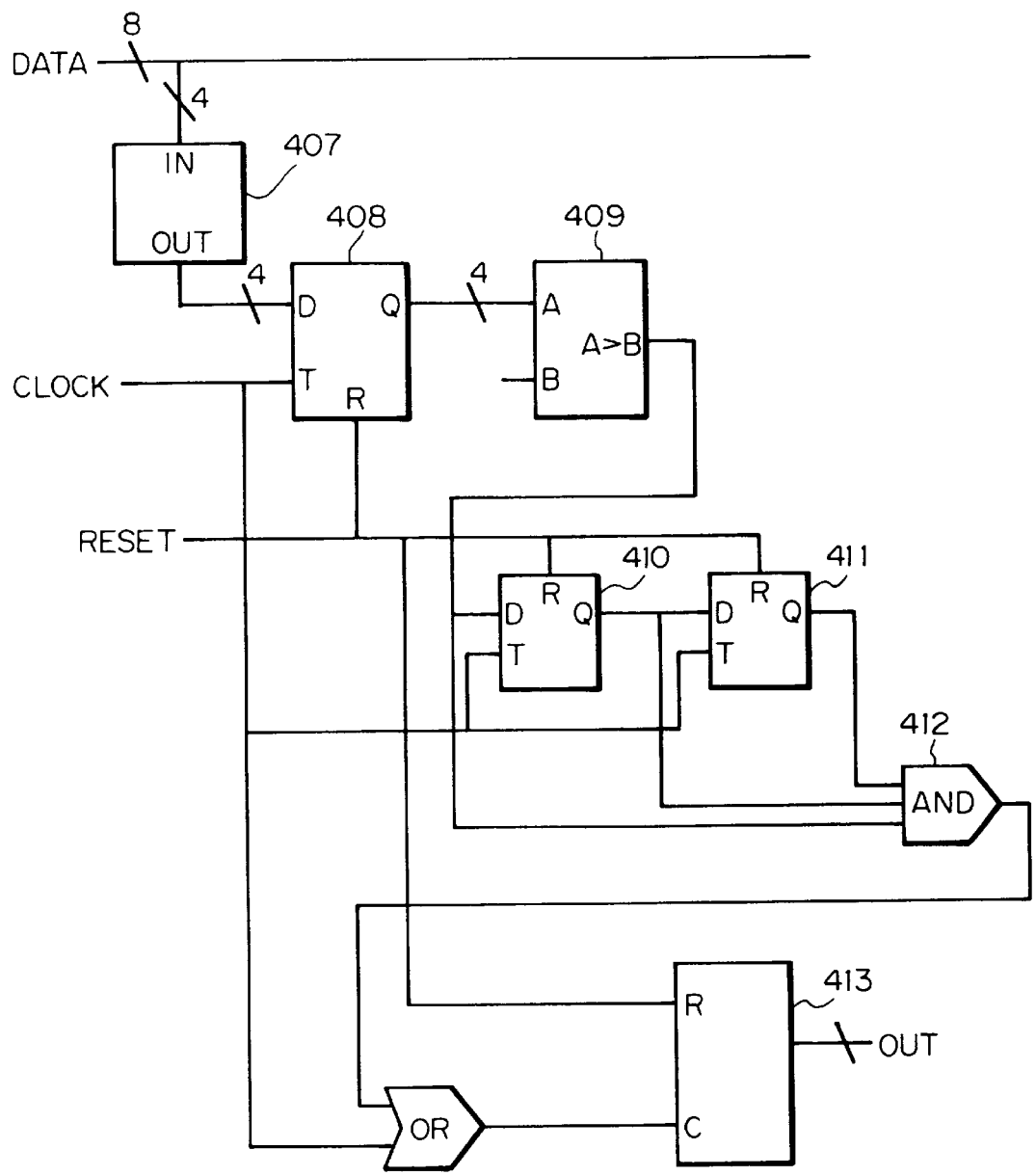
FIG. 78 is a block diagram schematically showing a circuit for detecting the edge of the book in the main scanning direction.
Figure 79B:
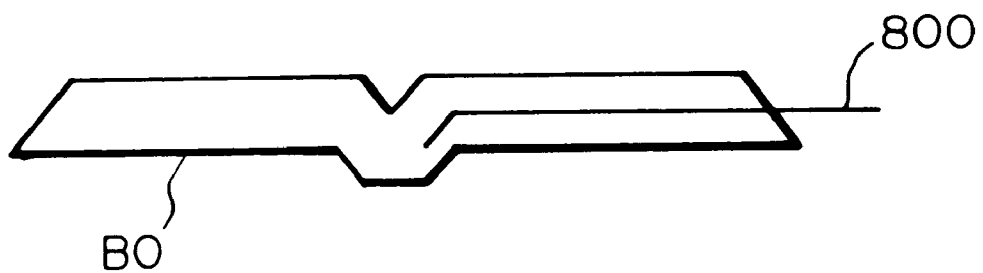

The above detection of the edge in the main scanning direction is implemented by a circuit shown in FIG. 78 and responsive to a change in one line of data output from the read sensor in the main scanning direction. As shown in FIGS. 79A and 79B, a spread book is positioned on the tables 1 with the right end of its bound portion aligning with the reference position at the front side of the apparatus. Because the reference position in the main scanning direction is defined at the front side, and because the read sensor 101 starts reading one line in the main scanning direction at the rear side, data output from the read sensor 101 and continuous in the main scanning direction are rearranged in the reverse order by a one-line FILO memory 407.

A data latch 408 latches the data output from the FILO memory 407 in synchronism with the clock CLOCK and samples them every main scanning line. Upper four of the resulting eight bits of data are compared with a threshold value by a digital comparator 409. The threshold value is set by the microcomputer of the IPU 103. D flip-flops 410 and 411 delay the output of the comparator 308. An AND gate 412 ANDs the data output from the comparator 409 and the data output from the flip-flops 410 and 411 and outputs an edge detection signal when the data DATA output from the read sensor 101 exceeds the threshold value three consecutive times in the main scanning direction.

A counter 413 counts pixels in the main scanning direction by counting the clock CLOCK input via an OR gate 414. When the detection signal output from the AND gate 412 is input to the OR gate 414, it masks the counter 413 and interrupts its operation. The resulting count of the counter 413 is sent to the microcomputer of the IPU 103.

The read sensor 101 detects the edge by sequentially reading the black table 1 or the frame thereof located at the rear side and the spread document, thereby detecting the background of the page. The detection is effected when the scanning unit is held in a halt for page attraction, i.e., when the microcomputer of the IPU 103 does not control scanning and has a sufficient processing time. At the time of detection, the microcomputer cancels a reset signal fed to the data latch 408, flip-flops 410 and 411, and counter 413.

The microcomputer of the IPU 103 uses the edge detection signal in the main scanning direction to determine a valid image range, in the main direction, of a book whose size is generally relatively irregular. At the time of copying, for example, the edge detection signal is used to automatically erase images outside of the valid image range and thereby eliminate wasteful solid black images. In addition, when the embodiment is applied to, e.g., a file system, it is possible to reduce the amount of data and thereby save the capacity of a memory.

As stated above, in the illustrative embodiment, the circuits shown in FIGS. 76 and 78 are used to detect the edges of a page on the basis of an image read. Alternatively, the image data may be fed to a CPU which controls the IPU 103, and compared with threshold values in order to eliminate the need for hardware cost. Again, to enhance accurate detection, there may be used data of a plurality of pixels, or the threshold value may be varied.

After the first page turning, the edge of the top page is detected accurately and stably by use of the transmission type page sensor 214 located on the page conveying path. In the illustrative embodiment, because the covers of a spread book are affixed to the tables 1, the book is displaced little.

Further, the displacement of the book ascribable to page turning is rare.

Figure 80:
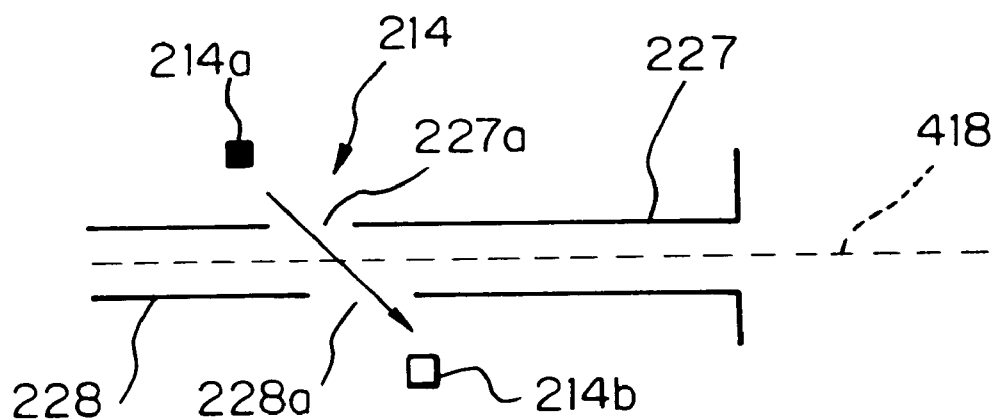
FIG. 80 is a section showing a part of a page receiving section included in the alternative embodiment.

Specifically, as shown in FIG. 80, the page sensor 214 is made up of the LED 214*a* and photodiode 215*b* respectively mounted on the upper page guide 227 and lower page guide 228. The page guides 227 and 228 are respectively formed with the holes 227a and 228a. The LED 215a and photodiode 215b face each other via the holes 227a and 227b obliquely with respect to the perpendicular direction. In this condition, paper dust ascribable to the pages sequentially received between the page guides 227 and 228 drop and do not deposit on the page sensor 214. Because one page is detected after it has been separated, the page sensor 315 is operable with any kind of document and has detection accuracy as high as 1 mm or less in terms of scattering. The page sensor 214 is also used to detect a page jam, i.e., a page failed to enter or come out of the path between the page guides 227 and 228.

The scanning unit 200 reads the spread book BO and then moves to the left in order to turn over the page of the book BO. After the edge of the right page of the book BO has adhered to the turn belt 208 and the scanning unit 200 has been brought to a stop, the turn belt 208 is lifted to bring the above page to the page conveying path. Subsequently the scanning unit 200 moves further to the left while causing the turned page to enter the page conveying path and protrude to the outside of the scanning unit 200, as stated earlier. The locus of the turned page extends along the lifted turn belt 208 and remains substantially constant and is determined by a mechanical layout. The page sensor 315 is positioned in the vicinity of the inlet of the page receiving portion or page conveying path.

The microcomputer of the IPU 103 calculates the position where the right edge of the page has been positioned before lifting, on the basis of the time when the page sensor 315 starts sensing the above page. Therefore, by causing the page sensor 214 to detect the edge of the page separated from the underlying page, the microcomputer of the IPU 103 is capable of determining the edge of the page in the page turning direction (right edge in the illustrative embodiment) surely and accurately. Because the trailing edge of the valid image area of the book BO and the entire book BO displace little during page turning, the microcomputer calculates and corrects the trailing edge of the valid image range and the next page turning position.

Control over the page attracting position and using the result of the above calculation is as follows. In the illustrative embodiment, the right edge of the page is adhered to the turn belt 208 over a width of about 40 mm and lifted thereby. When the lifted page of the book BO is received in the page receiving section at a time earlier than expected one, as determined by the IPU 103, the width over which the turned page is adhered to the turn belt 208 is greater than 40 mm. In this case, the time when the edge of the page in the turn start direction should be adhered to and lifted by the turn belt 208 is shifted to the advancing side. For example, when the turned page is sensed 2 mm earlier in terms of distance, the adhesion width is presumably 42 mm. Therefore, the next page attracting position will be shifted by 2 mm to the right in terms of the address of the scanning unit 200.

On the other hand, when the lifted page of the book BO is received in the page receiving section at a timer later than the expected time, as also determined by the IPU 103, the width of adhesion of the page is smaller than 40 mm. In such a case, the time when the edge of the page in the turn start direction should be adhered to and lifted by the turn belt 208 is shifted to the delaying side. As a result, the adhesion width is maintained constant and obviates the failure of page turning or the simultaneous turning of two or more pages which would damage the book BO.

After the lifted page of the book BO has been fully received in the page receiving portion, the scanning unit 200 moves further to the left. As a result, the lifted page is pulled by the bound portion of the book BO and sequentially discharged from the page conveying path along a generally U-shaped focus. This locus also remains constant along the page conveying path and press roller 281a. The microcomputer of the IPU 103 calculates from the output of the page sensor 315 a right edge position where the lifted page should get on the left page, on the basis of the time when the page sensor 315 senses the beginning of the discharge of the turned page from the page receiving section. Therefore, by detecting the edge of one page separated from the underlying page, the microcomputer can accurately and surely detect the page edge in the page turning direction (leftward in the illustrative embodiment) and therefore the leading edge of the valid image range. The leading edge of the valid image range is used for registration at the next image reading operation.

The valid image range between the right edge and the left edge of the book BO calculated by the microcomputer of the IPU 103 has a start address A and an end address B. The center between the two addresses A and B coincides with the bound portion of the spread two pages. Therefore, the microcomputer of the IPU 103 calculates an address C representative of the bound portion, as follows:

$$C=(A+B)/2$$

At the time of copying, the address C gives a reference position for dividing the two spread pages read at a time. Because the image corresponding to the center or bound portion of the spread book BO is often shadowed or distorted, the microcomputer of the IPU 103 surely erases such an image. Further, in the separate page mode, the microcomputer of the IPU 103 brings the right page into registration by using the address C.

As stated above, although the position of the top page of the spread document varies due to repeated page turning, a displacement caused by one page is extremely small. This, coupled with the fact that a displacement after ten pages have been turned over is less than 1 mm inclusive, a reproduced image (registration) deviates little. It follows that the calculation of the page attracting position should only be effected once for a plurality of times of page turning, e.g., for ten consecutive pages so as to update the data. This successfully reduces the calculations and period of time which the scanning unit 200 needs for detecting the edge of the book BO.

Guidances to be displayed in the illustrative embodiment will be described hereinafter. For the display of guidances and alarms, use is made of an LCD panel or displaying means arranged on the operation panel 99 and capable of displaying characters in twenty figures and two lines.

Figure 81F:
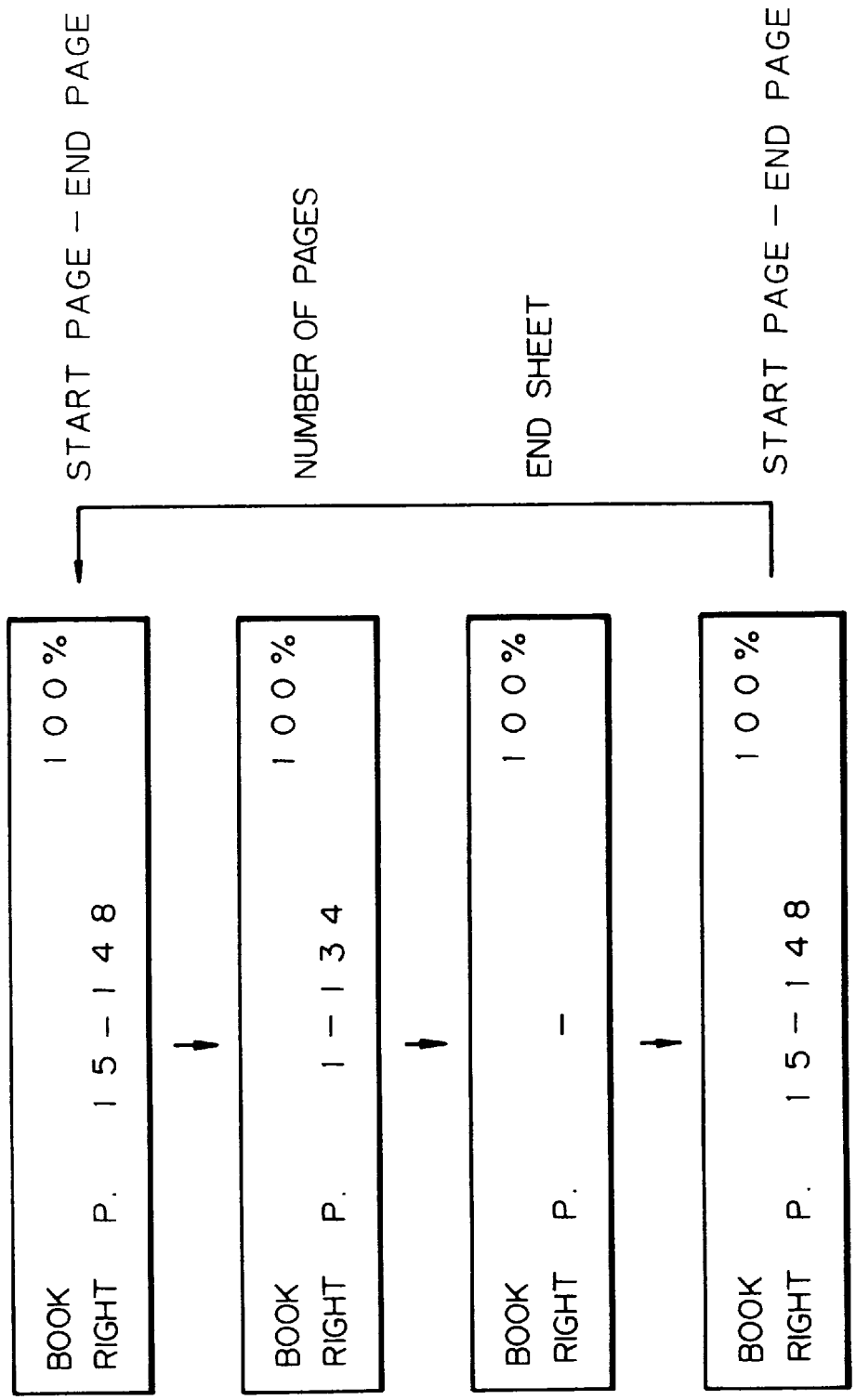

FIGS. 81A–81F each shows a particular guidance available with the illustrative embodiment. FIG. 81A shows a guidance usually appearing on the LCD 99 during copying of a book. The guidance of FIG. 4A shows that a book held in its spread position is read from page 15 on the right-hand side through page 48 at ×1 magnification, and that page 24 is being copied. Specifically, the guidance shows read selection at its top left portion, a magnification at its top right portion, pages set at its bottom left portion, and a page being copied at its bottom right portion.

FIG. 81B shows a guidance usually appearing when the apparatus is waiting in the book mode. The guidance shows specifically that a book in its spread position has forty pages in total and will be copied at ×1 magnification. In this condition, a page being copied does not appear at the bottom right because the apparatus is not in operation.

As stated above, for copying a book, the operator inputs the start page and end page or the total number of pages to be copied on the operation panel 99, while confirming (and correcting if necessary) the number of pages set. Also, when a book should be spread to show its start page, as in the illustrative embodiment, the operator sets the pages or the number of pages, looks at the display of the operation panel, and then spreads the bound documents. The pages or the total number of pages set is displayed on the operation panel 99 when the apparatus is in its waiting status and when it ends the reading operation. Further, the pages or the number of pages set and the page being copied are displayed on the operation panel 99 during document reading and copying.

In this manner, the apparatus automatically reads a book, forms the images of consecutive pages read, and turns over the last page read in a single continuous procedure. During such a procedure, the apparatus displays the pages or the number of pages set and the page being read or copied, informing the operator of the operating conditions of the apparatus. When the stop key is pressed, the apparatus interrupts or ends its operation, depending on the page being read or copied.

FIG. 81B shows a specific guidance usually appearing when a sheet is copied. The guidance shows that a sheet document is read at ×1 magnification. FIG. 81C shows in its upper portion a specific guidance showing the operator that the apparatus has automatically ended its operation at the last page of a book designated by the end sheet. A guidance shown in the upper portion of FIG. 81C shows that in the start page and end page mode or in the total page number mode, the apparatus has ended its operation on detecting the end sheet.

FIG. 81D demonstrates the procedure beginning with the selection of the book mode and ending with the setting of the pages or the total number of pages. Setting the pages or the total number of pages is essential with book reading, so that the guidances to be described are displayed with priority. The operator selects the start page and end page mode, total page number mode or end sheet mode on the copy page set key 628. In the case of start page and end page mode and total page number mode, the guidances shown in FIGS. 81D, respectively, are continuously displayed until the pages or the total number of pages has been input.

As shown in the upper portion of FIG. 81D, in the start page and end page mode selected by the operator, the portions expected to show numerical values blink while the start page and end page are being input. The operator inputs a numerical value representative of the start page on the numeral keys and then presses the enter key or the start-end page key to enter it. In response, the guidance changes in order to urge the operator to input a numerical value representative of the end page on the numeral keys. The operator entered the end page again presses the enter key in order to enter it. On the other hand, in the total page number mode, the guidance shown in the lower portion of FIG. 81D appears continuously until the operator inputs and enters the total number of pages to be copied; the operator inputs a numerical value representative of the total number of copies on the numeral keys and then presses the enter key.

FIG. 81E shows particular guidances usually appearing in the end sheet mode in which a book is copied up to the page where the end sheet is positioned. Specifically, FIG. 8E shows in its upper portion the separate page mode to be executed in the end sheet mode selected on the copy page set key 628. As shown, the apparatus automatically selects the right page as the initial independent page to be copied first. The guidance in the lower portion of FIG. 81E shows that copying in the spread page mode is under way, and that page 246 is being copied; the page number sequentially increases by two at a time.

FIG. 81F shows the transition of display occurring at the time of page setting. As shown, the guidances "Start Page— End Page", "Number of Pages" and "End Sheet" sequentially appear every time the copy page set key 628 is pressed. As shown, the pages input and entered in the start page and end page mode are also set in the total page number mode as page 134. Therefore, when the operator again presses the copy page set key in order to select the start page and end page mode, the above value is again read out. If the pages set do not need correction, the enter key is pressed.

Reference will be made to FIGS. 82–86 for describing control procedures to be executed in the above various modes. The control to be described is executed by the main controller executing image formation mode control which will be described. The IPU 103 controls image reading, data processing and page turning in response to commands received from the main controller. A sequence controller controls the timings of loads included in an image forming section.

Figure 82:
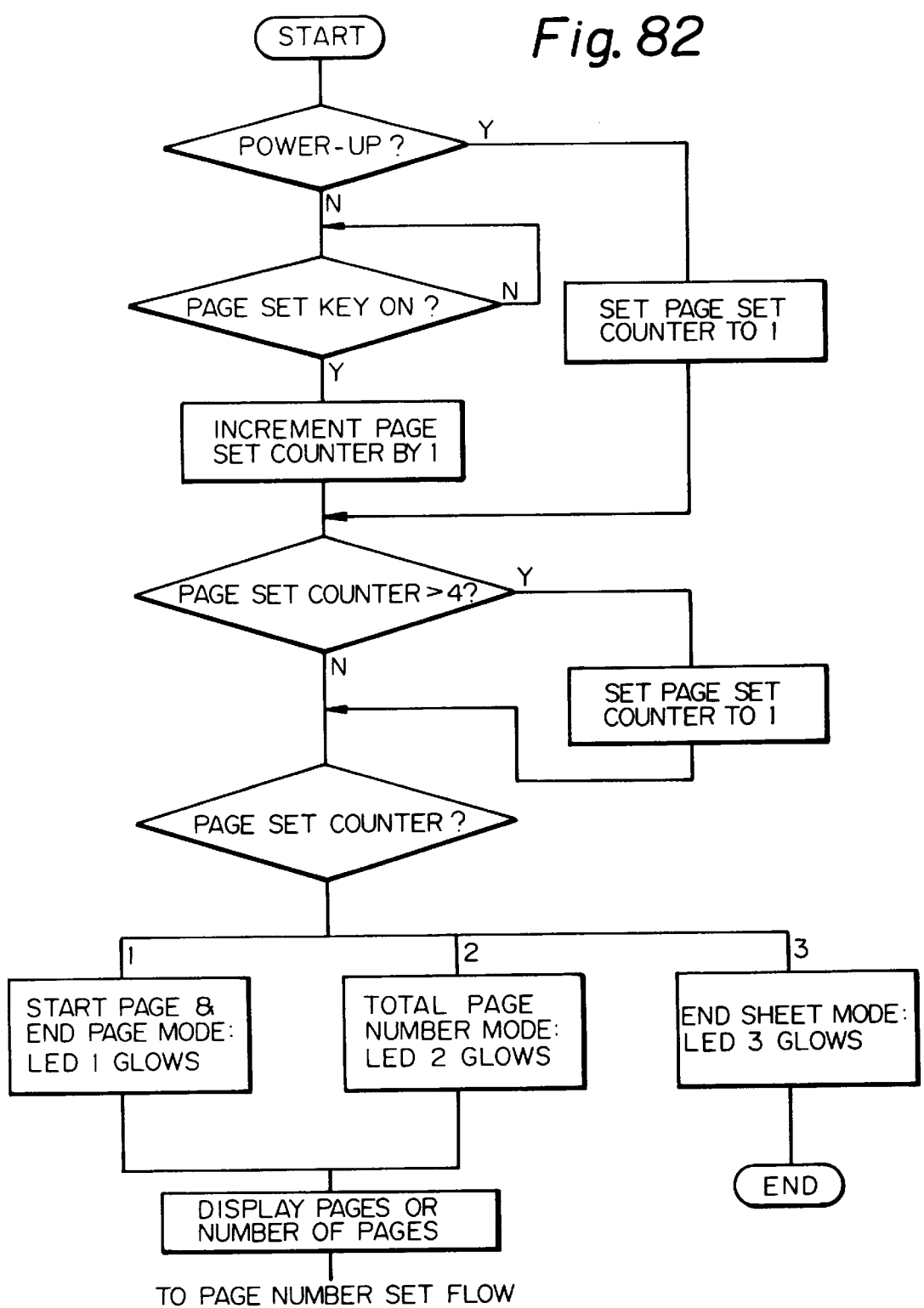

Specifically, FIG. 82 shows a copy page setting selection procedure. As shown, at the time of power-up, a page set counter is set to "1". Every time the copy page set key 628 is pressed, the page sent counter is incremented. When the page set counter exceeds "4", it is restored to "1".

When the count of the page set counter is "1", the LED 629a (LED 1) glows to show the start page and end page mode. When the count is "2", the LED 629b (LED 2) glows to show the total page number mode. When the count is "3", the LED 629c (LED 3) glows to show the end sheet mode. When the start page and end page mode is designated, no page numbers will be input on the numeral keys thereafter. In the start page and end page mode and total page number mode, the start page and end page of the total number of pages is displayed, as shown in FIG. 83.

When the start page and end page mode or the total page number mode is selected, the procedure shown in FIG. 82 is executed to allow the operator to input and enter the pages or the number of pages. As shown in FIG. 82, in the start page and end page mode, the operator inputs two numerical values respectively representative of the start page and end page to be copied. In response, the apparatus calculates the number of pages from the start page to the end page, and copies the pages corresponding to the difference. On the other hand, in the total page number mode, the operator directly inputs the number of pages to be copied. In this case, the apparatus repeats the designated number of pages from the designated left and right pages. The total page number mode is used mainly when a book is not paginated at all or not not serially paginated.

The operator inputs the above pages or the number of pages in accordance with the guidances shown in FIGS. 81a–81F, as stated earlier. Inputting the pages or the total number of pages is essential with the repeated page turning of a book, so that the guidances are displayed with priority when the book mode is selected.

As shown in FIG. 83, the start and end pages entered in the start page and end page mode or the total number of pages entered in the total page number mode is written to a memory included in the main controller. The pages or the number of pages is read out of the memory when the mode is sequentially switched from the start page and end page mode to the end sheet mode via the total page number mode and again restored. The pages or the total number of pages input blinks to show the operator that it can be corrected. The operator, watching the pages or the number of pages, may correct it and then enter it on the enter key.

More specifically, when the count of the page set counter is "1" in the start page and end page mode, the operator inputs the start page on the numeral keys and then presses the enter key (# key) to enter it. Subsequently, the operator inputs the end page on the numeral keys and again presses the enter key to enter it. As a result, a page enter flag is set while the start page and end page are written to a page number memory.

When the count of the page set counter is "2" in the total page number mode, the operator inputs the total number of pages on the numeral keys and then presses the enter key to enter it. As a result, the page enter flag is set while the number of pages is written to the page number memory. When the page enter flat is set, the pages of the number of pages stored in the memory is set.

The copy format mode is as follows. The copy format mode is valid when the book mode is selected, and is either one of the separate page mode and spread page mode. Every time the copy format key 618 is pressed, the separate page mode and spread page mode are sequentially set up with the LEDs 619 and 620 glowing alternately. In the illustrative embodiment, priority is given to the separate page mode generally used more often than the spread page mode. Also, the separate page mode is initially set at the time of power-up or when the book mode is selected.

Figure 84A:
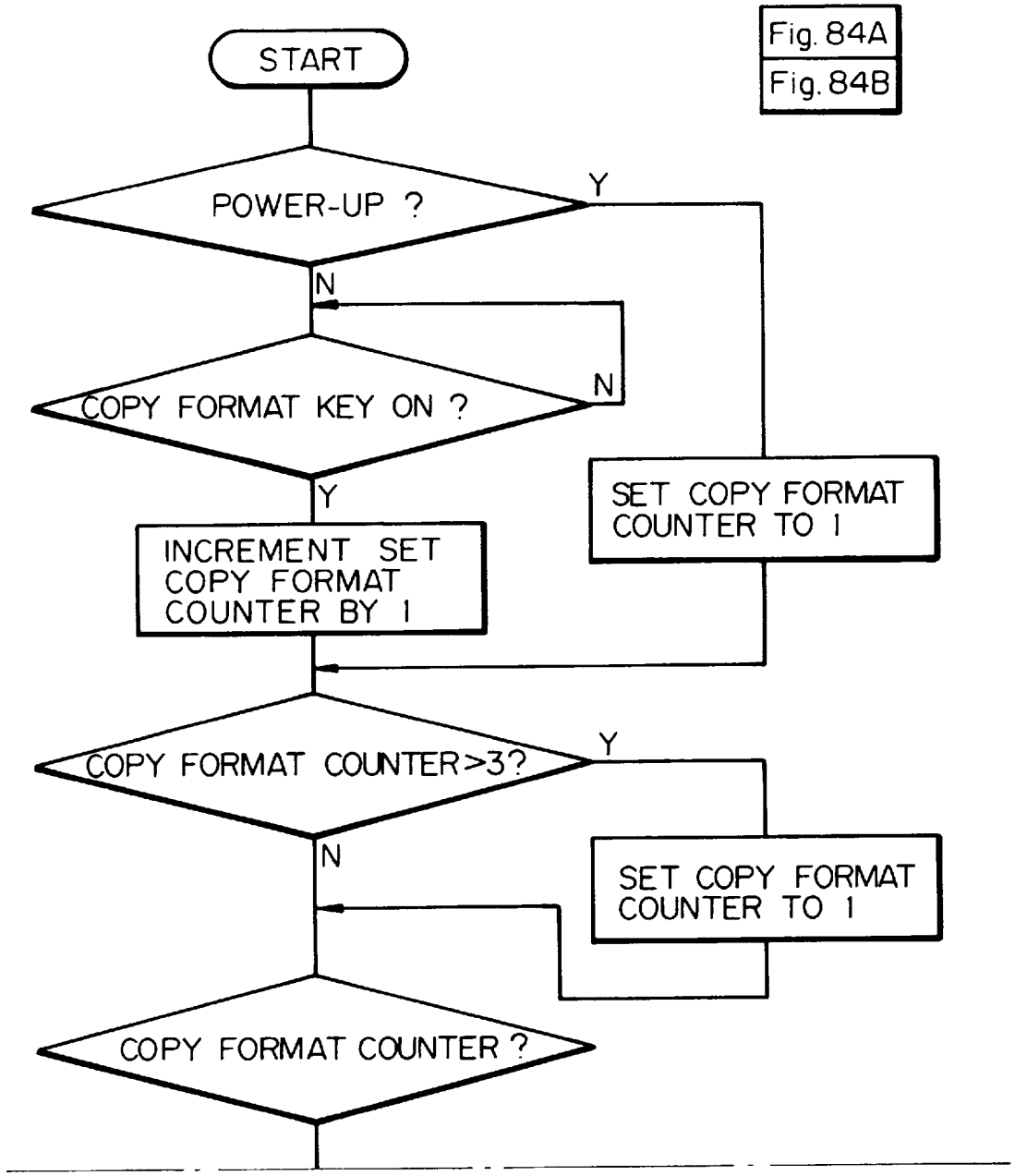
Figure 84B:
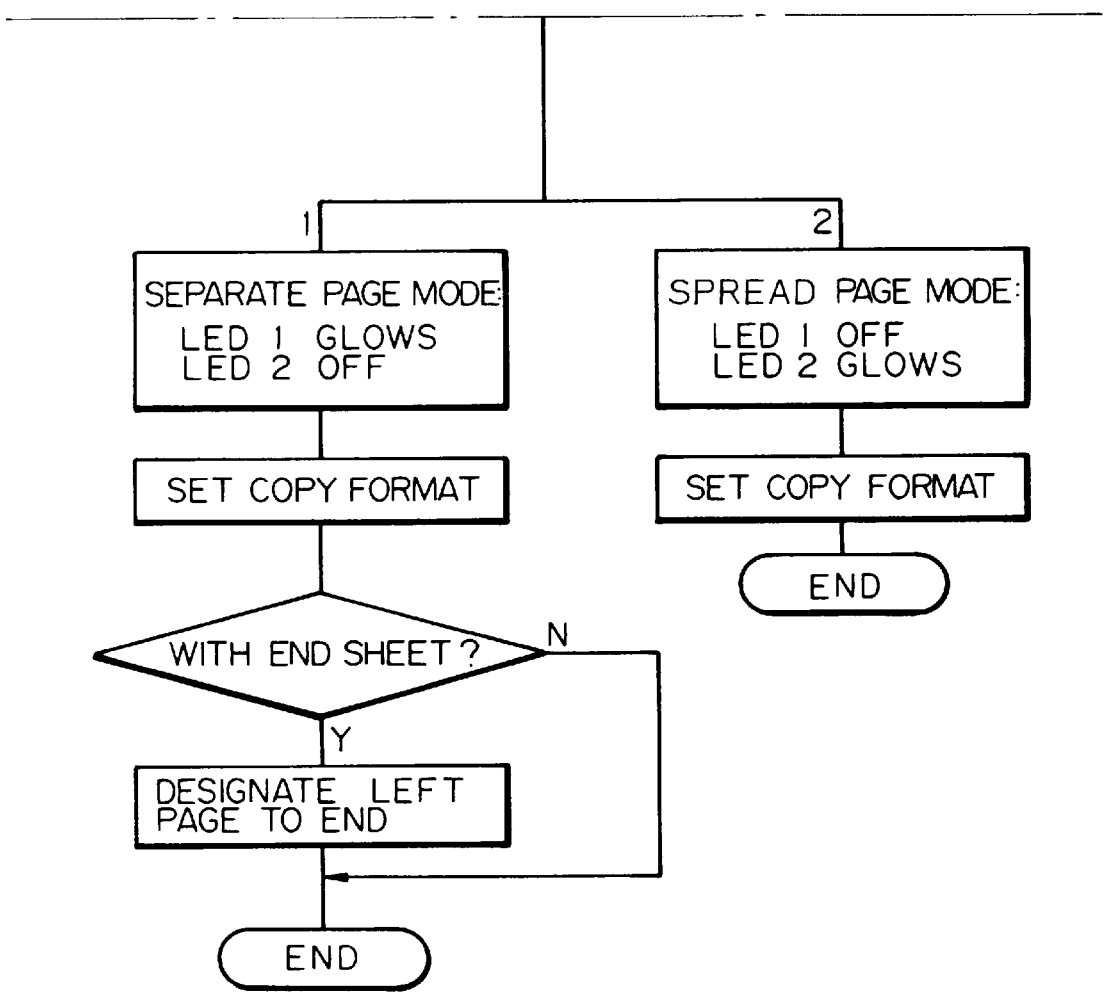

As shown in FIG. 84, at the time of power-up, "1" is set in a copy format counter. The copy format counter is incremented every time the copy format key 618 is pressed.

On reaching "3", the counter is restored to "1". When the count of the counter is "1", the separate page mode is set with only the LED 619 glowing. When the count is "2", the spread mode is set with only the LED 620 glowing. When the end sheet mode is selected, the left page is designated as a page where the image output should be ended.

In the separate page mode, the images of a spread book are read out of the frame memory page by page, and each is reproduced on a respective paper. To match the images, the position of each page image is calculated on the basis of detection of the edge of a page, as stated earlier. On the other hand, in the spread page mode, image data representative of two spread pages are continuously read out of the frame memory and reproduced on a single paper.

Books in general carry images on both sides of each leaf, and so do some office documents bound by, e.g., staples. It is therefore possible with a book image forming apparatus of the type reading a book and forming the images of consecutive pages while turning over the pages to produce copies in different formats if the above separate page mode and spread page mode are available. Particularly, the separate page mode produces copies identical in page arrangement with a book. The spread page mode halves the number of copies and allows an image extending over two spread pages, e.g., gravure to be continuously reproduced.

In the illustrative embodiment, images are read by a single scanning effected in one direction without regard to the image forming format. Specifically, two spread pages are read by a single scanning and written to the frame memory or image storing means 104. The image stored in the frame memory 104 is read out while being separated into the two pages, and reproduced on a single paper. Alternatively, the image stored in the frame memory 104 may be continuously read out over the two pages and reproduced on a single paper.

Figure 85B:
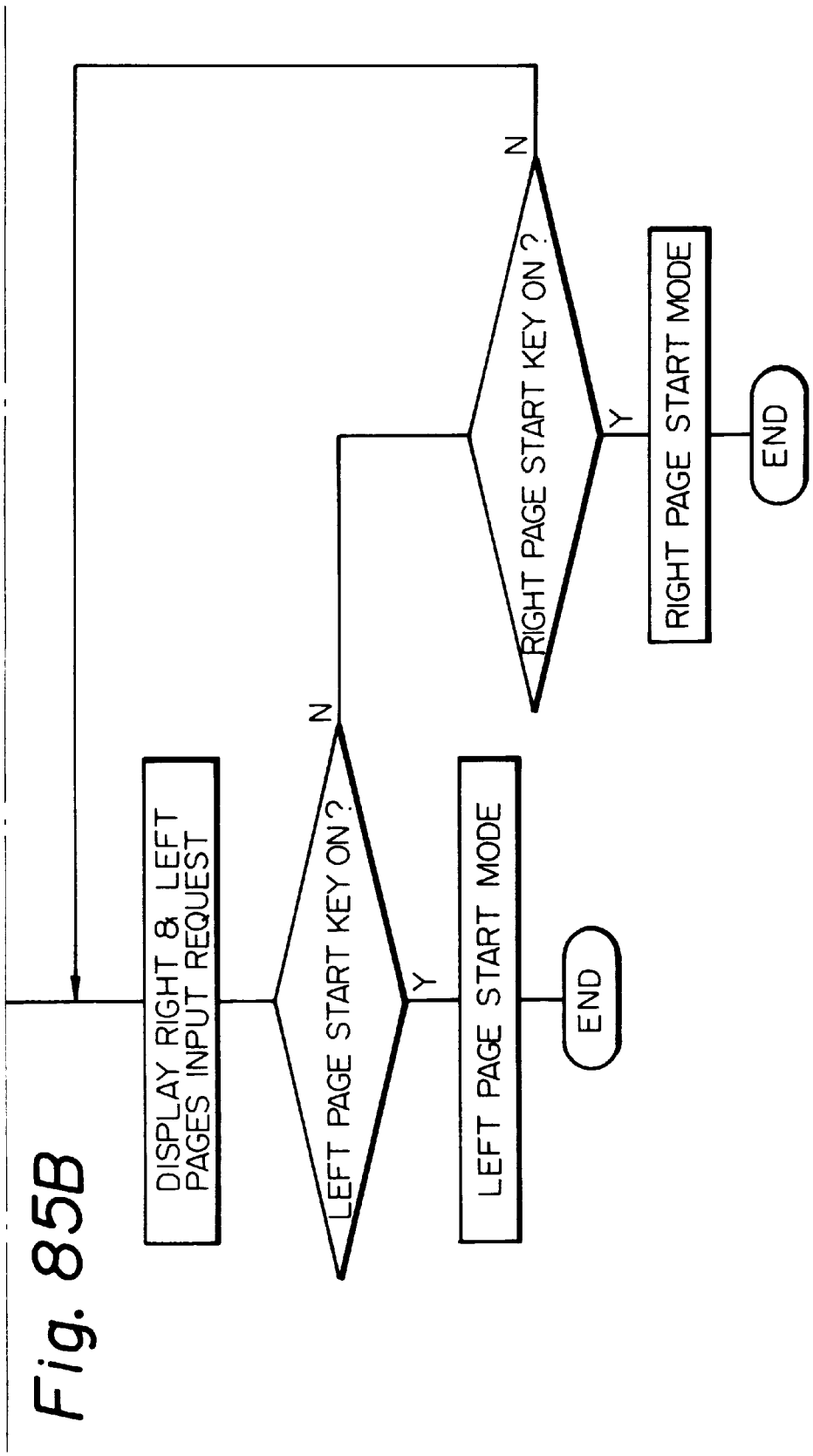

The start page to be copied is either the left page or the right page and can be selected on the copy start page key 631, as shown in FIG. 85. As shown, when the left page is input on the key 631 as a start page to be copied first in the separate page mode, the apparatus reads and outputs the image of the left page of a spread book first. When the right page is input on the key 631 as a start page, the apparatus reads and outputs the image of the right page first.

When the right page is selected on the key 631 as a start page, the apparatus forms the image of the right page of a book first and then turns over the page in order to form the image of the next page. In this case, the one page of image data written to the frame memory 104 in the separate page mode are read at a time; the consecutive images are matched in position in the manner described previously. When the left page is selected, the apparatus forms the image of the left page first and then turns over the pages in order to form the image of the next page.

In the separate page mode, the apparatus does not copy undesired pages. Even in the spread page mode, the apparatus can be so controlled as to erase the images of pages other than designated pages or not to forms such images. For example, when the right page is selected to be the page to be copied first in the spread page mode, the apparatus can transform the image of the first left page to white data. When the left page is the last page to be copied, the apparatus can transform the image of the last right page next to the left image to white data.

When the print key is pressed before no pages are input in the separate page mode, the apparatus operates in the end sheet mode. When the page limit mode is selected in the separate page mode, the apparatus invalidates the start page selected. In the separate page mode, but not in the page limit mode, the apparatus urges the operator to input the left and right pages via the operation panel.

Control over the stop ascribable to the end sheet will be described with reference to FIG. 86. The procedure to be described is executed when the end sheet mode is selected on the copy page set key 628. In the end sheet mode, the end sheet is put on the desired last page of a book document to be copied (end page where image reading or image outputting should end). The book is spread on the tables 1 to show its first page to be copied.

In the end sheet mode, the scanning unit 200 repeatedly reading the images of the book while turning over its pages reaches the end sheet in due course. Because the scanning unit 200 cannot turn over the end sheet, a failure of page turning is detected. To distinguish such a failure from an incidental failure, a failure counter is incremented when the failure ascribable to the end sheet is detected. Then, whether or not the count of the failure counter is greater than N (e.g. "3") is determined. If the count is not greater than N (not greater than "3"), then a failure is again detected.

Figure 87:
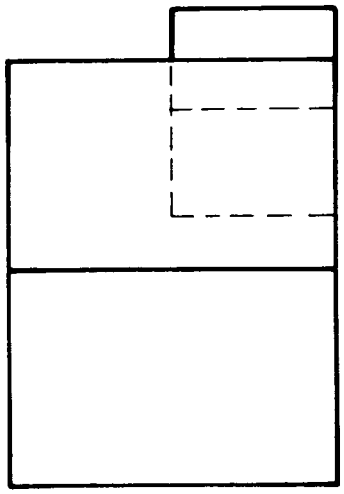
FIGS. 87–89 each shows a specific configuration of an end sheet included in the alternative embodiment.

If the failure ascribable to the end sheet is not detected, the program returns. If the count of the failure counter is greater than N, it is determined that a failure ascribable to the end sheet has occurred. Then, the operation of the scanning unit 200 is stopped. In this position, the SBU 101 reads an image in the main scanning direction, as stated with reference to FIGS. 79A and 79B. Whether or not black data continuously appears in the trailing edge portion of image data output from the SBU 101 is determined in order to detect the end sheet labeled 800 in FIG. 87. If the answer of this decision is positive, then it is determined that the end sheet 800 having a black solid portion at its right-hand side, as shown in FIG. 87, is present. Subsequently, any one of the guidances shown in the lower portions of FIGS. 81A–81D is displayed, and the program ends.

When all the image data output from the SBU 101 are black in the main scanning direction, it is determined that the scanning unit 200 is stopped above the right table 1. In this case, the guidance indicative of the last page is displayed, and the program ends. When neither the end sheet 800 nor the table 1 is detected by the SBU 101, it is determined that some pages to be copied are left. This kind of failure is determined to be an incidental failure and followed by error processing.

In any case, the image outputting is ended, and the scanning unit 200 is returned to its center home position. While the illustrative embodiment executes the stop procedure shown in FIG. 86 in the end sheet mode, the above procedure is also executed even at the time of a stop ascribable to the end sheet in any other mode. If desired, the end sheet 800 shown in FIG. 87 and having size A5 may have its background entirely painted black in order to be more surely detected on the basis of the image data output from the SBU 101.

Figure 86A:
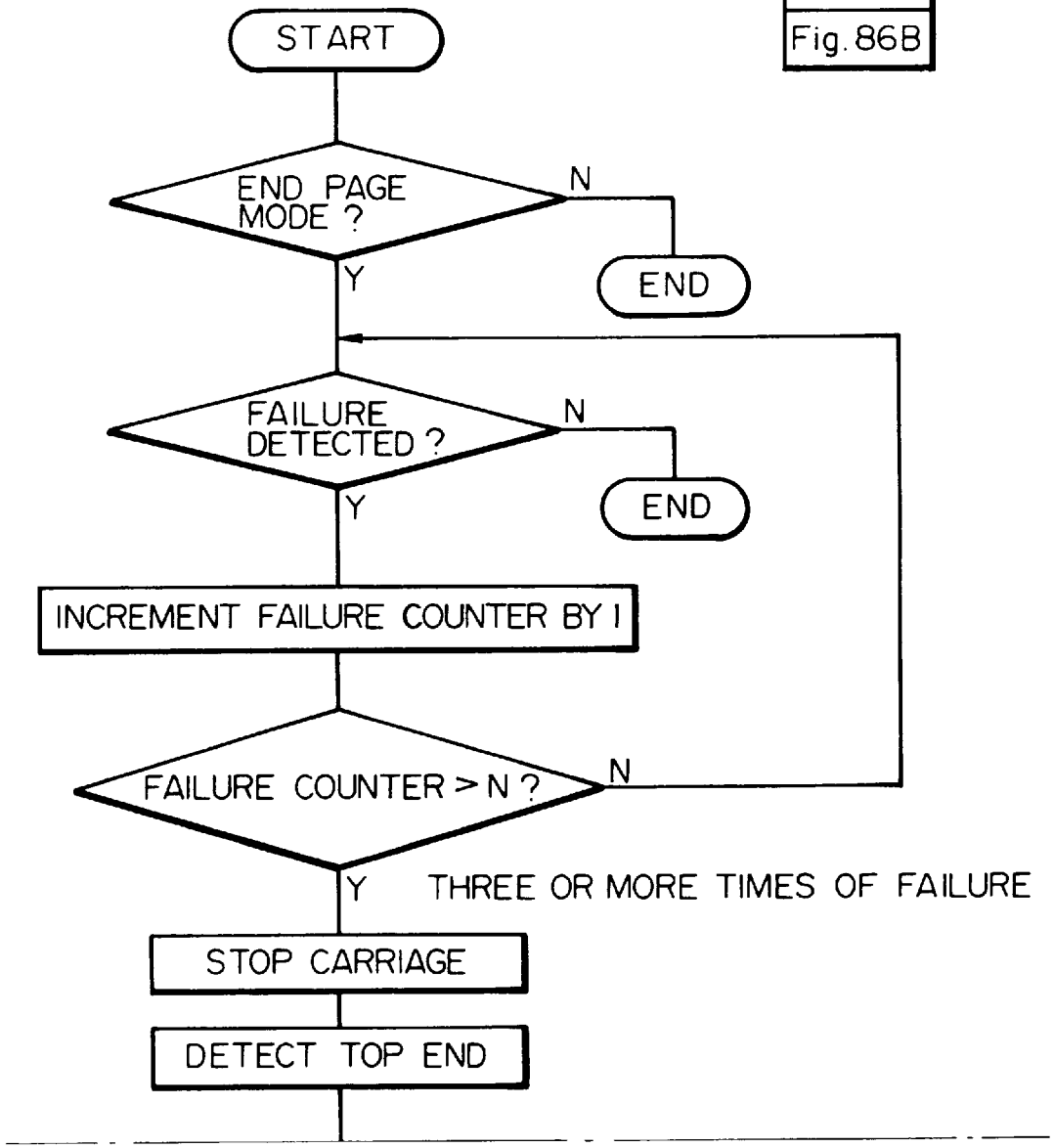
Figure 86B:
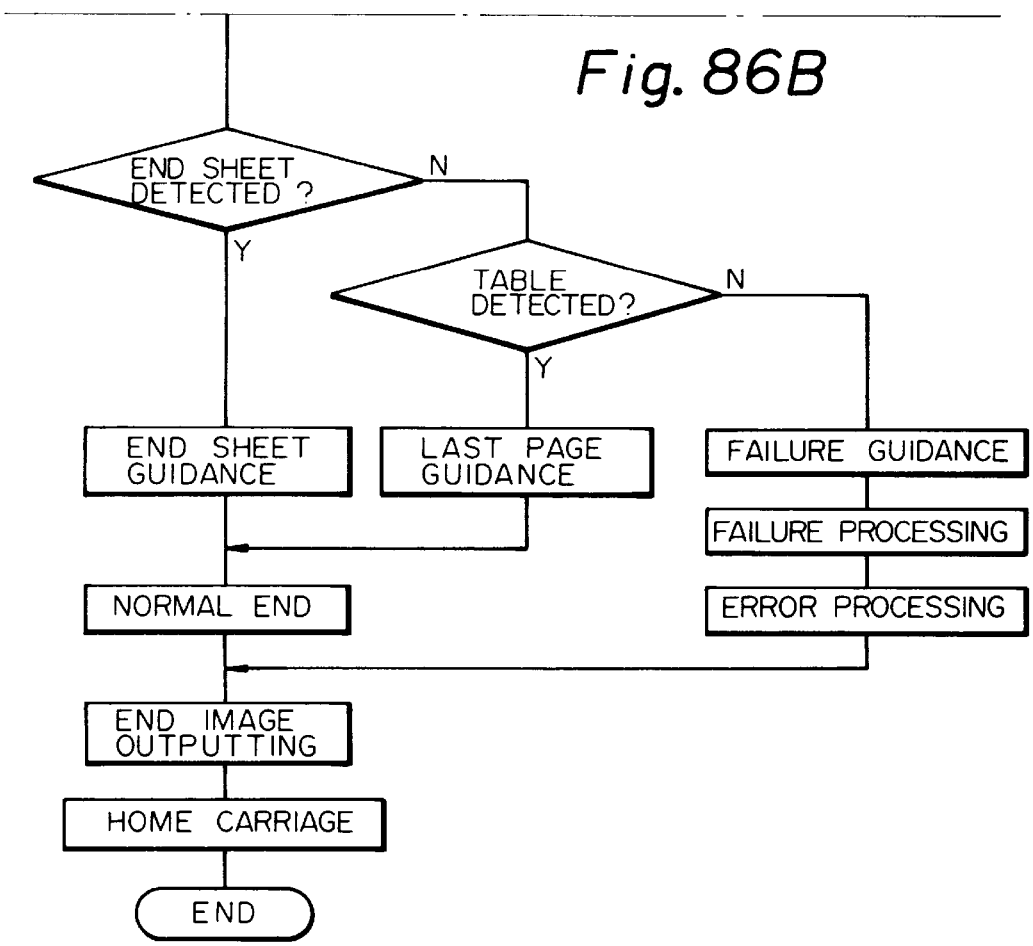

As stated above, with the operating means shown in FIG. 71 and including the copy page set key 628 and LEDs 629a–629c, it is possible to end the operation of the scanning unit 200 at a desired page designated by the end sheet, as shown in FIG. 86. When the operation of the scanning un it 200 is stopped due to the end sheet, any one of the guidances shown in FIGS. 81A–81D is displayed and informs the operator of the fact that the unit 200 has surely stopped operating at the desired page.

The basic operation to be performed by the operator in the book mode of the illustrative embodiment is as follows.

(1) Selection of book mode: The operator presses the book key 601 in order to select the book mode.

(2) Copy mode setting: The operator selects either the separate page mode or the spread page mode (copy format), selects sorting, duplex copy, erasure, reference, page limitation, and face-up discharge, inputs the start page and end page or the total number of pages to be copied (essential) and the right page or the left page to be copied first, and then sets desired copying functions (magnification change, paper selection, character, photo, density, and number of copies to be produced.

(3) Book setting: The operator opens the book tray, sets a book on the tables 1 while positioning its bound portion at the left end and front end, press the right and left covers with the left press plate and right press plate, respectively, opens the book at the page to be copied first, and then closes the book tray. As a result, the tables 1 are raised in order to position the spread pages of the documents flat.

(4) Copying: The operator presses the start key 641. The apparatus starts a copying operation and then ends it on copying the number of pages set while turning them over.

(5) Book removal: The operator presses the book tray set switch in order to lower the tables 1, opens the book tray when allowed, pulls the release lever, releases the right and left covers, takes out the book, and then closes the book tray.

The TPS of the illustrative embodiment performs the following operation (TPS mode).

(1) Read mode: In the book mode, the mirror 222 is retracted, and the lower lamps 201 and 202 are turned on. After shading correction executed at the left home position, the scanning unit 200 is moved to the right in order to read the spread two pages at a time. The resulting image data are written to the frame memory 104. In the sheet mode, the mirror 222 is brought into the optical path, and the upper lamps 203 and 204 are turned on. Then, after shading correction executed at the left home position, the scanning unit 200 is moved to the right in order to read a sheet. The resulting image data are also written to the frame memory 104.

(2) Return mode: In the book mode, the scanning unit 200 is moved to the left with the high bias being applied to the turn belt 208. The scanning unit 200 is brought to a stop when its turn roller 208 reaches the right edge of a book, and then the belt 208 is lifted. On the elapse of 0.5 second, the scanning unit 200 is moved to the left. The right edge and top edge of the spread book are detected on the basis of the image data output from the read sensor 101. These edges are used to calculate the first page attracting position and the valid image area in the main scanning direction. At the time of page turning, the right edge and left edges of the spread book are detected on the basis of the output of the page sensor 214. These edges are used to calculate a valid image range in the subscanning direction. In the sheet mode, the scanning unit 200 is moved to the left (return).

(3) Homing mode: At the time of usual power-up, the tables 1 are lowered away from the scanning unit 200. Then, the scanning unit 200 is brought to its center home position.

(4) Prescanning mode: The scanning unit 200 is brought to its end or left home position and prepared for shading correction and image reading.

(5) Postscanning mode: After the return, the scanning unit 200 is brought to its center home position. Then, the tables 1 are lowered away from the scanning unit 200 in order to allow the operator to take out the book.

Now, the end sheet for designating the last page to be read or printed will be described. The specific end sheet shown in FIG. 87 is formed of resin and sized 150 mm vertically and 230 mm horizontally, i.e., slightly smaller than size of A5. The end sheet 800 is as elastic as paper and can freely bend together with the pages of a book. As shown in FIG. 87, the name or application of the end sheet 800, e.g., "End Sheet" and a message showing how the sheet 800 should be set, e.g., "Put this sheet on last page to copy." are printed on the sheet 800 together with a figure.

The end sheet 800 has a black solid area on its right side and is inserted between pages such that the solid area protrudes from the pages. Assuming a book of size A4 which is the maximum page size, the horizontal size of a page is 210 mm. Therefore, the end sheet 800 protrudes 20 mm from the pages of such a book. The width over which the end sheet 800 protrudes increases with a decrease in the size of a book The solid portion is as black as the tables 1 in order to facilitate the detection of the right edge of the page when the page turning position should be detected for the first time. The specific messages are printed on the left side of the end sheet 800 together with the figure.

Figure 88:
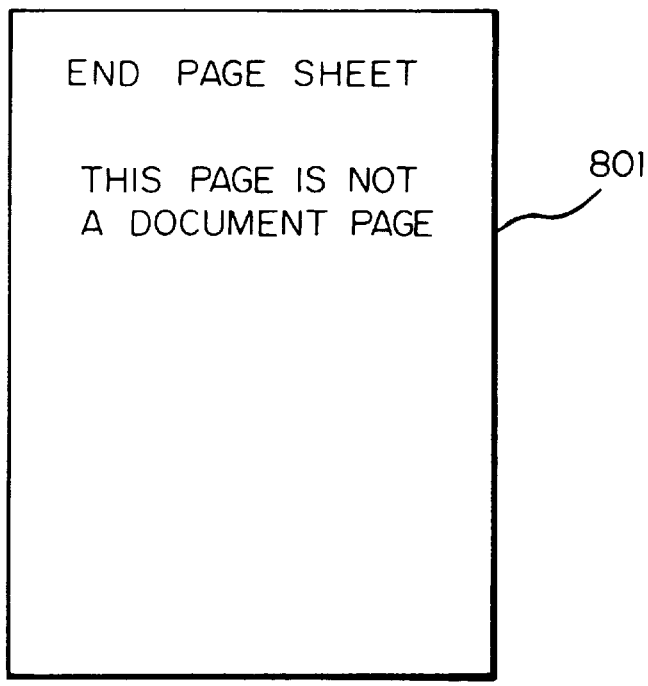

FIG. 88 shows another specific configuration of the end sheet. As shown, the end sheet, labeled 801, is sized 300 mm vertically and 210 mm horizontally substantially equal to size A4. A message showing that a message read out of the end sheet 801 is not a document image, e.g., "This page is not a document page." is printed on the black background of the end sheet 801 in outline characters. When the end sheet 801 is put between the pages of a book of maximum size A4, at least a part of the sheet 801 protrudes from the pages of the book and serves in the same manner as the sheet 800.

Figure 89:
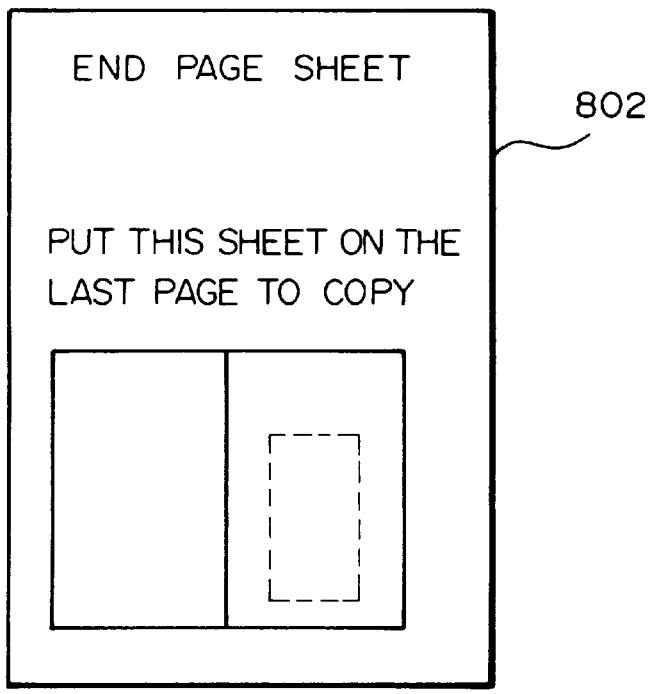

FIG. 89 shows still another specific configuration of the end page. As shown, the end sheet, labeled 802, is of size A6. The end sheet 802, like the end sheet 800, has white background and carries its name and a message relating to the usage thereon. The end sheet 802 is put between the pages of a book in such a manner as not to protrude from the pages. The end sheet 802 can therefore be smaller than size B6, which is the minimum allowable size, and may have low density other than black.

Before copying, the operator sets any one of the end sheets 800–802, as follows. In the book mode, the operator pulls the book tray (table unit 35) out of the apparatus body, sets a desired book on the right and left tables 1 in a spread position, affixes the covers of the book to the tables, and then inserts any one of the end sheets 800–802 between desired pages. For example, assume that the operator desires to copy page 1 of the book positioned at the right when spread through page 100. Then, the operator puts the end sheet between page 100 which will be positioned at the left when spread and page 101 which will be positioned at the right when spread. The operator opens the book at the desired start page, adjusts the height of the book such that the spread right and left pages are substantially flush with each each other, and then closes the book tray. When the operator inputs the book mode and then presses the print key, the apparatus starts the procedure for reading the book while turning over its pages. FIGS. 79A and 79B show the end sheet 800 inserted in the book BO spread on the book tray.

In the illustrative embodiment, the main controller of the apparatus is capable of determining whether or not the page turning operation of the scanning unit 200 was successful. Specifically, the page sensor 214 responsive to a page is mounted on the upper page guide 227, as stated earlier. Whether or not the page sensor 214 has sensed a page is determined at a preselected position of the scanning unit 200. If the answer of this decision is negative, it is determined that the page turning operation has failed or that the last page has been reached. In addition, the page sensor 214 is used to detect the edge of a page. For example, if the output of the page sensor 214 is representative of the presence of a page when the scanning unit 200 reaches its left end position, i.e., when the page being turned over is expected to be fully discharged, it is determined that page has been ripped off.

In the illustrative embodiment, when a page is too thick to be turned over or when no more pages to be turned over exist, the scanning unit 200 stops operating. On detecting the failure of page turning, the scanning unit 200 again returns to the left end position and repeats the page turning operation three consecutive times in case of an incidental failure.

The stop of operation caused by the end sheet will b e described more specifically hereinafter. Assume that the pages between which the end sheet is positioned are spread as a result of repeated page scanning and page turning operation. Then, after the left and right pages have been sequentially fed, the page turning operation begins. However, because the end sheet protrudes to the right from the page, it tends to adhere to the turn belt 208 while extending to the right over the belt 208 when acted on at the same position as the previous page. As a result, the end sheet cannot be inserted in the path between the page guides 227 and 228 or turned over. Although the scanning unit 200 repeats the page turning operation, as stated above, it cannot turn over the end sheet. Consequently, a detection procedure ascribable to the failure begins. Specifically, as shown in FIGS. 79A and 79B, changes in image data output from the SBU 101 are searched for from the rear to the front in the main scanning direction. In the case of a page of relatively small size, the black portion of the table 1 is detected first, and then an image on the right page is detected. When black pixels are continuously detected from substantially the center in the main scanning direction, the main controller determines that the end sheet is present. In response, the apparatus stops operating and displays a guidance meant for the operator. If the end sheet is not detected, the main controller determines that an erroneous stop ascribable to a failure of page turning has occurred, lowers the tables 1, and decrements the page counter. Thereafter, in any case, the main controller returns the scanning unit to its center home position.

Assume that the operator inserts the end sheet between desired pages and then inputs the start page and end page or the total number of pages to be copied. When the main controller detects the end sheet before reaching the input end sheet, it also stops operating on the basis of the previously stated failure and image detection. In this case, the main controller displays an alarm message, e.g., "The end sheet found before the end page."

Assume that the end sheet is absent between the desired pages despite that the apparatus is operating in the end sheet mode. Then, the main controller repeats the copying operation up to the last page of the book due to the absence of the end sheet, as stated earlier. In this case, the main controller stops the copying operation on detecting the failure of the turning of the last page and display an alarm message, e.g., "Reached the last page."

Assume that the operator puts the end sheet between desired pages of a spread book, but does not input the start page and end page or the total number of pages to be copied. Then, the apparatus repeats the image reading and page turning operation up to the position where the end sheet is present in the end sheet mode, and then stops the operation. When the end sheet is absent, the apparatus copies the book to the last page. The flowchart of FIG. 85 includes the above procedure in which the apparatus starts operating without the start page and end page or the number of pages input and the ends operating on reaching the end sheet.

The entire end sheet or the right half thereof corresponding to the page turning position may be formed of resin harder than the leaves of a book. This end sheet will be sized 150 mm vertically and horizontally and smaller in horizontal size than any one of the above end sheets. Such a hard end sheet does not have to protrude from the edges of the pages, but should only be substantially flush with the edges of the pages. This kind of end sheet does not bend as easily as the leaves of a book and cannot be lifted by electrostatic attraction. This results in the previously stated failure and followed by the same stop processing.

In summary, the alternative embodiment described above has the following advantages.

(1) The last page of a book to be read can be easily designated by a simple end sheet. When the end sheet is greater in size than the page of a book and protrudes from the book when put in the book, it can be clearly distinguished from the background of a page due to density difference. This allows the size and position of a page to be accurately calculated on the basis of the edge of the page derived from image data.

(2) With the end sheet, it is possible to discard image data other than document image data easily.

(3) Image forming matters other than a document are excluded by the end sheet.

(4) The end sheet does not obstruct page turning operation or edge detection. The edge of a page can be surely detected because the end sheet does not protrude from a page.

(5) It is possible to surely stop the operation for reading a book at a desired page, and inform the operator of the successful reading operation.

Various modifications will become possible for those skilled in the art after receiving the teachings of the present disclosure without departing from the scope thereof.

What is claimed is:

1. An image forming apparatus, comprising:

reading means for reading an image of a book, and turning means for turning over a page of the book, wherein the reading of the image of the book by said reading means and the turning over of the page of the book by said turning means ends between pages of the book where an end sheet is present, and said end sheet is formed with a particular image on a right portion thereof for designating a page of the book where the reading of the image of the book by said reading means should end.

2. An image forming apparatus, comprising:

reading means for reading an image of a book;

outputting means for outputting an image of a page of the book read; and turning means for turning over the page;

wherein the reading of the image of the book by said reading means and the tuning over of the page of the book by said turning means ends between pages of the book where an end sheet is present, and said end sheet is formed with a particular image on a right portion thereof for designating a page of the book where outputting of the image of the page of the book by said outputting means should end.

3. An image forming apparatus, comprising:

reading means for reading an image of a book; and turning means for turning over a page of the book, wherein the reading of the image of the book by said reading means and the turning over of the page of the book by said turning means ends between pages of the book where an end sheet is present, and said end sheet carries information representative of a last additional page of the book and/or an end sheet setting method and designates a page of the book where reading of the image of the book by said reading means should end.

4. An image forming apparatus, comprising:

reading means for reading an image of a book, outputting means for outputting an image of a page of the book read; and turning means for turning over the page of the book, wherein the reading of the image of the book by said reading means and the turning over of the page of the book by said turning means ends between pages of the book where an end sheet is present, and said end sheet is formed with a particular image on a right portion thereof for designating a page of the book where the outputting of the image of the page of the book by said outputting means should end.

5. An image forming apparatus, comprising:

reading means for reading an image of a book, and turning means for turning over a page of the book, wherein the reading of the image of the book by said reading means and the turning over of the page of the book by said turning means ends between pages of the book where an end sheet is present, and said end sheet is smaller in size than a minimum book size and does not protrude from the pages of the book.

6. An image reading apparatus for reading an image of a book and for turning over a page of the book, comprising:

inputting means for inputting a command for stopping an operation for reading the book at an end sheet; and setting means for setting, in response to a command signal from said inputting means, a condition for ending an operation for reading the image of the book and turning over the page of the book between pages of the book where said end sheet is inserted.

7. An image forming apparatus, comprising:

reading means for reading an image of a book;

outputting means for outputting an image of a page of the book read; and turning means for turning over the page of the book, wherein the reading of the image of the book by said reading means and the turning over of the page of the book by said turning means ends between pages of the book where an end sheet indicative of a page at which the outputting of the image of the page of the book by said outputting means should end is present, and said end sheet is smaller in size than a minimum book size and does not protrude from the pages of the book.

8. An image reading apparatus for reading an image of a book, for outputting an image of a page of the book read, and for turning the page of the book, comprising:

inputting means for inputting a command for stopping an operation for outputting the image of the book at an end sheet; and setting means for setting, in response to a command signal from said inputting means, a condition for ending an operation for reading the image of the book and turning over the page of the book between pages of the book where said end sheet is inserted.

9. An image reading apparatus for reading an image of a book and for turning over a page of the book, comprising:

detecting means for detecting an end sheet inserted between pages of the book and indicative of a page at which an operation for reading the book should end;

ending means for ending, in response to a detection signal output from said detecting means, an operation for reading the image of the book and for turning over the page of the book between pages of the book where said end sheet is present; and displaying means for displaying an end of the operation for reading the image of the book and turning over the page of the book caused by said ending means.

10. An image reading apparatus for reading an image of a book, for outputting an image of a page of the book read, and for turning over the page of the book, said image reading apparatus comprising:

detecting means for detecting an end sheet inserted between pages of the book and indicative of a page at which an operation for outputting an image of the book should end;

ending means for stopping, in response to a detection signal output from said detecting means, an operation for reading the image of the book and turning over the page of the book between pages of the book where said end sheet is present; and displaying means for displaying an end of the operation for reading the image of the book and turning over the page of the book caused by said ending means.

11. A book reading system, comprising:

turning means for turning over pages of a book;

reading means for reading the pages of the book;

stopping means for indicating a last page to be read from the book;

detecting means for detecting the stopping means; and control means for causing the reading means and the turning means to stop operating when the detecting means detects the stopping means.

12. A system as claimed in claim 11, wherein the stopping means obstructs a turning operation of the turning means.

13. A system as claimed in claim 12, wherein the stopping means comprises:

a sheet to be positioned at the last page or a page next to the last page.

14. A system as claimed in claim 13, wherein a portion of the stopping means is greater in size than the book.

15. A system as claimed in claim 13, wherein the stopping means is formed of a deformable material.

16. A system as claimed in claim 13, wherein the stopping means is formed of a material harder than the pages of the book.

17. A system as claimed in claim 11, wherein the book reading system further comprises:

an image forming means for outputting information read out of the book.

18. A system as claimed in claim 17, wherein the control unit is further configured to cause two adjacent pages of the book to be reproduced on respective of two recording media.

19. A book reading system, comprising:

a turning device configured to turn over pages of a book;

a reading device configured to read the pages of the book;

a stopping member configured to indicate a last page to be read from the book;

a detecting device configured to detect the stopping means; and a control unit configured to cause the reading device and the turning device to stop operating when the detecting device detects the stopping member.

20. A system as claimed in claim 19, wherein the stopping member obstructs a turning operation of the turning device.

21. A system as claimed in claim 20, wherein the stopping member comprises:

a sheet to be positioned at the last page or a page next to the last page.

22. A system as claimed in claim 21, wherein a portion of the stopping member is greater in size than the book.

23. A system as claimed in claim 21, wherein the stopping member is formed of a deformable material.

24. A system as claimed in claim 21, wherein the stopping member is formed of a material harder than the pages of the book.

25. A system as claimed in claim 19, further comprising:

an image forming device configured to output information read out of the book.

26. A system as claimed in claim 25, wherein the control unit is further configured to cause two adjacent pages of the book to be reproduced on respective of two recording media.

27. A method for reading a book, comprising:

turning over pages of a book with a turning device;

reading the pages of the book with a reading device;

positioning a stopping member adjacent a last page to be read from the book;

detecting the stopping member automatically; and discontinuing operation of the turning device and the reading device when the stopping member is detected.

28. A method as claimed in claim 27, further comprising the step of:

obstructing the operation of the turning device with the stopping member when the stopping member is detected.

29. A method as claimed in claim 28, wherein the stopping member comprises:

a sheet to be positioned at the last page or a page next to the last page.

30. A method as claimed in claim 29, wherein a portion of the stopping member is greater in size than the book.

31. A method as claimed in claim 29, wherein the stopping member is formed of a deformable material.

32. A method as claimed in claim 29, wherein the stopping member is formed of a material harder than the pages of the book.

33. A method as claimed in claim 27, further comprising:

outputting information read out of the book.

34. A method as claimed in claim 33, further comprising:

causing two adjacent pages of the book to be reproduced on respective of two recording media.

* * * * *